INVENTOR.
Harvey W. Balzer
BY Smith, Olsen & Baird
Attys.

INVENTOR.
Harvey W. Balzer
BY Smith, Olsen and Baird
Attys.

TOLL SWITCHING SYSTEM

Filed Aug. 25, 1950

INVENTOR.
Harvey W. Balzer

BY Smith, Olsen & Baird

Attys.

Dec. 14, 1954 H. W. BALZER 2,697,134

TOLL SWITCHING SYSTEM

Filed Aug. 25, 1950 26 Sheets-Sheet 4

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 5

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 6

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 7

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 8

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 9

INVENTOR.
Harvey W. Balzer
BY Smith, Olsen & Baird
Attys.

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 11

INVENTOR.
Harvey W. Balzer
BY Smith, Olsen & Baird
Attys.

INVENTOR.
Harvey W. Balzer
BY Smith, Olsen & Baird
Attys.

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 14

INVENTOR.
Harvey W. Balzer
BY Smith, Olsen & Baird
Attys.

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 16

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 17

INVENTOR.
Harvey W. Balzer
BY Smith, Olsen & Baird
Attys.

INVENTOR.
Harvey W. Balzer
BY Smith, Olsen & Baird
Attys.

INVENTOR.
Harvey W. Balzer
BY Smith, Olsen & Baird
Attys.

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 21

INVENTOR.
Harvey W. Balzer
BY Smith, Olsen & Baird
Attys.

Dec. 14, 1954

H. W. BALZER 2,697,134

TOLL SWITCHING SYSTEM

Filed Aug. 25, 1950

26 Sheets-Sheet 22

INVENTOR.
Harvey W. Balzer
BY Smith, Olsen & Bird
Attys.

INVENTOR.
Harvey W. Balzer
BY Smith, Olsen & Baird
Attys.

INVENTOR.
Harvey W. Balzer
BY Smith, Olsen & Baird
Attys.

Dec. 14, 1954 H. W. BALZER 2,697,134

TOLL SWITCHING SYSTEM

Filed Aug. 25, 1950 26 Sheets-Sheet 25

INVENTOR.
Harvey W. Balzer
BY Smith, Olsen & Baird
Attys.

INVENTOR.
Harvey W. Balzer
BY Smith, Olsen & Baird
Attys.

2,697,134

TOLL SWITCHING SYSTEM

Harvey W. Balzer, Downers Grove, Ill., assignor to Automatic Electric Laboratories, Inc., Chicago, Ill., a corporation of Delaware Application August 25, 1950, Serial No. 181,508

44 Claims. (Cl. 179—27)

The present invention relates to telephone systems in general and, more particularly, to improvements in automatic switching apparatus provided in conjunction with toll switchboards to enable toll operators to accept, complete and supervise toll calls over the links at the various positions more efficiently.

In handling toll switching at a centralized toll switchboard in a toll network, incoming toll calls from the distant exchanges may be routed by way of the interconnecting toll lines to a toll operator position and completed therefrom directly to the local subscriber substations in the central office area or they may be routed through the central office switching apparatus to subscriber substations in other exchange areas without the assistance of the central office toll operator. Normally, the toll switchboard at the central office includes several positions which are divided into several groups to provide one or more distinct groups of operators for handling different classes of toll calls. These groups are usually classified as inward, CLR and TX and each position of the switchboard may be arranged to handle calls in one of the above mentioned groups or each of the positions may be selectively operated so that it can handle all of the above classes of calls. Incoming calls from distant exchanges are normally routed to the inward operator positions of the central office toll switchboard. If these calls cannot be immediately completed by the inward toll operator, they may be transferred to the TX operator position for completion at a later time. Through calls between distant exchanges, including the central office as a tandem switching point, are also received at the inward operator positions. Outgoing toll calls originated by local subscribers in the central office or by subscribers in CAX exchanges in the central office area are first routed to the CLR operator positions at the switchboard and then completed over the interexchange toll lines to the desired called subscriber. A record is made of all toll calls so that the charge for the call may be assessed against the calling subscriber. If the call cannot be immediately completed by the CLR operator, she makes out a record, containing the necessary information for completing the connection to the calling and called subscriber, which is passed to a TX operator who will attempt to complete the connection at a later time.

The present invention is in the nature of an improvement over toll switching systems of the type noted above and toll switching systems of the type disclosed in the Thomas F. Crocker Patent No. 2,167,710, granted August 1, 1939, and the Imre Molnar Patent No. 2,361,313, granted October 24, 1944.

It is an object of the present invention to provide in a toll switching system of the character described, an improved toll switchboard in which each of the positions is capable of being selectively conditioned to handle any one or a plurality of classes of toll service.

It is another object of the present invention to provide in a toll switching system of the character described, improved circuit arrangements for distributing the different classes of toll calls to the different positions of the toll board which have been selectively conditioned to handle the corresponding class of service.

It is a further object of the present invention to provide in a toll switching system of the character described, an improved gate controlling circuit network for each of the classes of service, whereby the calls that have been received for distribution to the operator positions are locked-in until they have all been answered and disposed of by the operator and whereby subsequent calls are locked-out until the locked-in calls have been disposed of.

It is a further object of the invention to provide in a telephone system of the character described, an improved circuit network for controlling the distributor apparatus to distribute the locked-in calls to the proper positions one after another and for controlling the distributor to distribute a second call in the event the first call distributed to an operator is not answered within a predetermined elapsed time interval.

It is a still further object of the present invention to provide special facilities at each of the operator positions for selectively causing a waiting call to be brought into the position in the event the call distributor for the particular class of service fails to distribute the call to the operator position selectively conditioned to handle the class of call.

It is still a further object of the invention to provide, in a telephone switching system of the character described, novel circuits and apparatus whereby an inward operator may transfer a call received over a link at her position to a link at a TX operator position and render the said link at the inward position available for a subsequent inward call.

It is still another object of the invention to provide in a toll switching system of the character described, an improved switching arrangement in which the impulses of the digits for controlling the automatic switching apparatus and supervisory signals are transmitted over a special control conductor which is independent of the hold conductor and the two line or talking conductors of a connection in order to isolate the talking conductors from the circuits over which the impulses and supervisory signals are transmitted.

In the present system the positions of the toll switchboard are divided into at least three groups respectively arranged to handle inward toll calls, CLR toll calls and TX toll calls. The toll trunks at the central office are divided into the three groups mentioned and they are grouped together for answering by the operator positions which have been conditioned to handle the corresponding class of service. Accordingly, each operator position is equipped with three class of service keys, one for each of the three groups previously noted. Each of the three groups of trunks is provided with a trunk distributor for allotting the incoming calls within the group to the appropriate operator position, when an operator position corresponding to the particular class of service is available. The trunk distributors are arranged to distribute the calls on a substantially equal basis so that no particular group or class of service has answering preference over any other class.

Furthermore, each operator position is provided with a plurality of links over which toll connections are received and completed by the toll operator. The trunk circuits are provided with rotary type line switches which function, under control of the distributor, to connect an incoming call to a preselected idle link at an available operator position. As soon as the rotary switch individual to a trunk circuit seizes a preselected link, it will release the associated trunk distributor and, if other calls are waiting, the trunk distributor will search for the next trunk and cause it to search for another preselected idle link at an idle operator position. As soon as a call is received on a link at the operator position, a supervisory lamp is illuminated to identify the link and a link busy lamp is illuminated to indicate that the link is busy. In addition to the foregoing, a class of service lamp is illuminated to indicate the class of service of the call received at the operator position.

An impulse sender is provided at each operator position for controlling the automatic switching apparatus in the central office and in any distant automatic exchange to set up a connection to the desired called subscriber. This is accomplished in the present system by merely keying up the trunk routing digits and/or the directory number of the called subscriber on the keyset at the operator position. The impulse sender controls the automatic switching equipment by impulses transmitted over a fourth conductor and when all of the digits have been transmitted, the sender automatically disconnects itself from the connection thus established. Depending upon the destination of the particular connection, the operator may retire from the connection immediately after keying up the desired number on the keyset by actuating an appropriate key at her position. The sender will then function to automatically transmit a timed-automatic ring control signal as soon as the last digit is transmitted. If automatic ring control is not desired, the operator may actuate the automatic ringing key at her position and thereby prevent the impulse sender from transmitting the timed ring control signal after the transmission of the last series of impulses. In addition to the foregoing, the operator may prevent the disconnection of the impulse sender after the transmission of the last series of impulses. Finally, the impulse sender is arranged to recognize a stop dialing condition and an all-trunks-busy condition encountered during the setting up of any connection.

*Description of the drawings*

The invention, both as to its organization and method of operation, together with further objects and advantages thereof, will best be understood by reference to the following specification taken in connection with the accompanying drawings, in which Figs. 2 to 26, inclusive, when assembled in the manner illustrated in Fig. 27, illustrate the details of a system arranged according to the trunking plan of Figs. 1 and 2 and having incorporated therein the features of the invention briefly referred to above.

Figure 1:
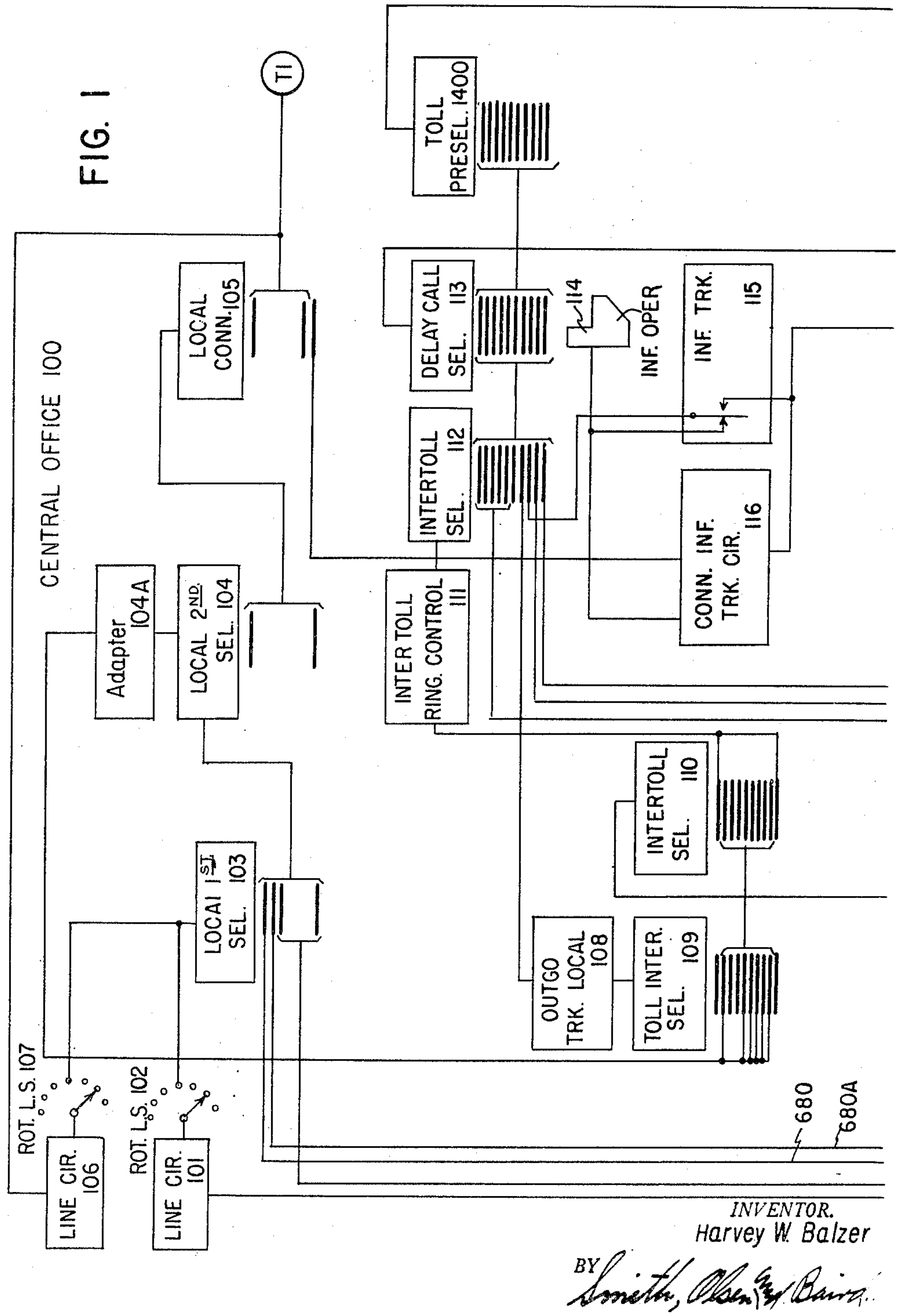
Figs. 1 and 2 illustrate the trunking plan and general arrangement of a toll switching telephone system embodying the invention.
Figure 2:
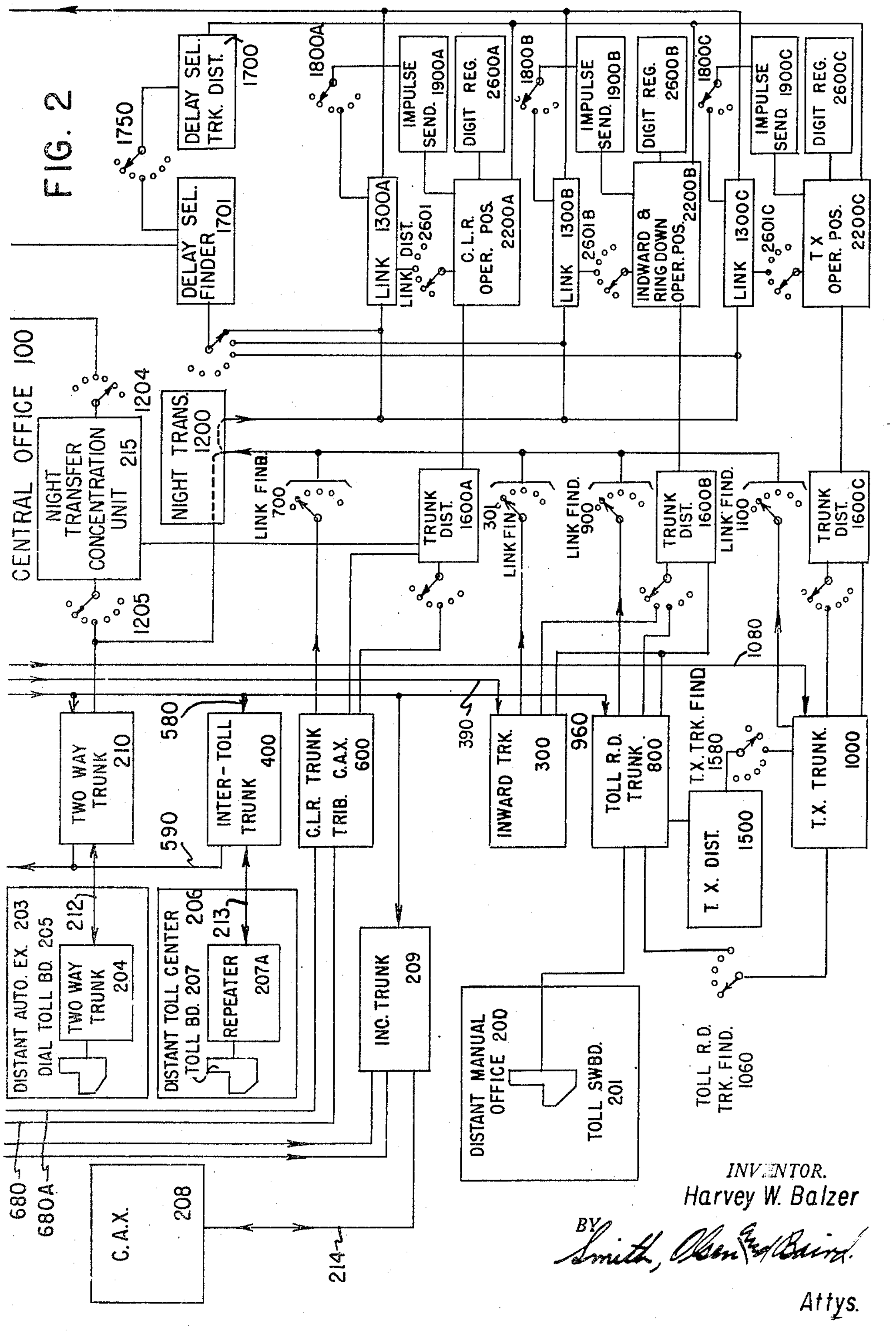

Referring now more particularly to Figs. 1 and 2 of the drawings, the toll switching system illustrated therein comprises a central office 100, a distant manual office 200, a distant automatic exchange 203 which is substantially the same as the central office 100, a distant toll center 206 which is also an automatic exchange and a community automatic exchange (CAX) 208 located in the same area as the central office 100. The automatic switching apparatus in the central office 100 serves the local subscriber substations, such as T1, and the local subscriber substations located in the CAX 208. The distant manual office 200 serves a plurality of local manual subscriber substations and it is connected to the central office 100 by means of a plurality of two-way toll trunks which are utilized for handling toll traffic between the two offices. Thus the distant manual office 200 is connected to the central office 100 over the two-way toll line 211 which terminates in the toll ring-down trunk 800. The distant automatic exchange 203 serves a plurality of local subscriber substations and is connected with the central office 100 by means of two-way toll trunks which are utilized for handling toll traffic between the two offices. Thus the distant automatic exchange 203 and the central office 100 are interconnected by the two-way toll line 212 which terminates in the two-way trunk circuits 204 and 210 provided in the respective exchanges. Also the distant automatic exchange 203 is provided with a dial toll board 205 which is substantially the same as the dial toll board provided in the central office 100. At this point it may be well to mention that the toll line 212 is accessible in either of the two exchanges by the operators at the respective dial toll boards in order to establish telephone connections between the toll boards or between a toll board in one of the exchanges and a local subscriber line in the other of the exchanges. The distant toll center 206 serves a plurality of local automatic subscriber substations and is trunk connected to the central office 100 by means of the toll line 213 which is utilized exclusively for handling two-way toll traffic between the two offices. Thus the distant toll center 206 is shown connected to the central office 100 by means of the toll line 213 which terminates respectively in the repeater 207A and in the intertoll trunk 400. The toll board 207 provided in the toll center 206, as well as the other apparatus provided thereat, is of the type normally employed by telephone exchanges of the Bell System. Finally, the CAX 208 serves a plurality of local subscriber substations and is trunk connected with the central office 100 by means of trunk lines which are utilized exclusively for handling two-way trunk traffic between the two offices. Thus the CAX 208 is shown connected to the central office 100 by means of the two-way trunk line 214 which terminates in the incoming trunk circuit 209 provided in the central office 100.

The automatic switching equipment provided in the central office 100 is of the well known Strowger type and includes a toll switch train and a local switch train, which are of the character described in the previously mentioned Crocker patent whereby toll calls may be extended to the local subscriber substations directly from the distant offices or from the distant offices through the medium of the operator toll board in the central office 100. Furthermore, toll calls originated by the local subscribers may be extended to the toll operator switchboard for completion.

The toll switchboard provided in the central office 100 is illustrated with three positions, that is the CLR operator position 2200A, the inward and ring-down operator position 2200B and the TX operator position 2200C. It should be understood, however, that any number of positions may be provided for each of the three different classes of positions noted above. It is contemplated that each position of the switchboard constitutes a universal position having facilities whereby the position may be selectively controlled to handle either CLR, inward and ring-down, and TX calls or any combination of these services. In order to distribute the calls to the various positions in accordance with the class of service, a plurality of trunk distributors 1600A, 1600B and 1600C have been provided for respectively distributing calls of the corresponding classes to the respective operator positions 2200A, 2200B and 2200C. For example, the trunk distributor 1600A is arranged to distribute CLR trunk calls to the CLR operator position 2200A; the trunk distributor 1600B is arranged to distribute both inward toll and ring-down toll calls to the inward and ring-down operator position 2200B; and the trunk distributor 1600C is arranged to distribute TX toll calls to the TX operator position 2200C.

Each operator position of the toll switchboard in the central office 100 is also provided with a plurality of link circuits, such as the links 1300A, 1300B and 1300C. Each link includes a toll preselector, such as the preselector 1400, which is utilized to extend connections from the operator position over the front end of the link to a local called subscriber in the central office 100 or to a desired called subscriber in any one of the distant offices. The rear end of the various links terminate in the banks of rotary line switches which are individually associated with the trunk circuits over which connections are established to the operator positions. For example, the CLR trunk 600 may be connected to the link 1300A at the CLR operator position 2200A by means of the link finder 700; the inward trunk 300 may be connected to the link 1300B at the inward and ring-down operator position 2200B by means of the link finder 301; the toll ring-down trunk 800 is also connected to the link 1300B at the inward and ring-down operator position 2200B by means of the link finder 900; and the TX trunk 1000 may be connected to the link 1300C at the TX operator position 2200C by means of the link finder 1100. However, it should be noted that all links are accessible to all link finders so that any position may be selectively controlled to receive any class of service call.

For the purpose of enabling the operator at the various positions at the switchboard to set up calls received thereat, each position is provided with an impulse sender and a digit register, such as the impulse sender 1900A and the digit register 2600A, which are common to all of the links at the associated operator position. It is also contemplated that a common impulse sender and digit register be provided which are accessible to any one of the operator positions of the switchboard. The common impulse sender and digit register, however, will only be utilized in the event that the individual sender and digit register at the associated position fail to operate correctly. A keyset is also provided at each operator position to enable the operator to register in the digit register the numerical digits of the desired called subscriber and/or the trunk route number required to extend a connection to a distant exchange.

When a toll call is received over the toll line 211 from the manual office 200, the toll ring-down trunk 800 is operated and if the operator at the inward and ringdown position 2200B is available, the trunk distributor 1600B will cause the link finder 900 to search for and seize an idle link 1300B and thus extend the incoming toll call through to the operator position. The trunk distributor 1600B is thereafter released and if other ring-down calls are waiting, the trunk distributor will prepare the same to be answered. A tone is now transmitted to the operator to indicate that she has been connected to the toll ring-down trunk 800. In addition to the foregoing, the connection of the calling toll ring-down trunk 800 to the link 1300B automatically causes the impulse sender 1900B and the digit register 2600B to be connected to the front of the link 1300B and made available to the keyset at the operator position. The operator, after acknowledging the call and receiving the information regarding the destination thereof, actuates the digit keys of her keyset in accordance with the number of the desired called local subscriber substation or the number of the desired toll destination. Thereafter, the impulse sender 1900B transmits impulses over an EC control conductor to the toll preselector, such as the toll preselector 1400, individual to the link 1300B, whereby the toll preselector and subsequent automatic switches respond to the various impulses to set up the desired connection. This connection may include, for example, the toll preselector 1400, the outgoing trunk circuit 108, the toll intermediate selector 109, the local second selector 104 and the local connector 105 if the connection is to be completed to a local subscriber, such as the subscriber at substation T1, in the central office 100. In addition to the foregoing, the connection may also be extended by way of the toll preselector 1400, the two-way trunk 210 and the interconnecting toll line 212 and the two-way trunk 204 to either a subscriber or an operator located in the distant automatic exchange 203; or via the intertoll trunk 400 and the interconnecting toll line 213 to an operator or a subscriber in the distant toll center 206; or via the incoming trunk 209 and the interconnecting trunk line 214 to a local subscriber in the CAX 208.

When a toll call is received over the toll line 213 from the toll board 207 in the distant toll center 206, the intertoll trunk circuit 400 is operated to seize the intertoll selector 110. The distant toll operator now transmits impulses of the digits of the number of the called subscriber in the central office or the trunk routing digit to extend the connection via the central office switching apparatus to the distant automatic exchange 203 or the distant manual office 200. If the distant toll operator transmits the digits of a local subscriber number, the connection is completed via the intertoll selector 110, the local second selector 104 and the connector 105, to the called subscriber. If the digits transmitted identify a subscriber in the automatic exchange 203, the connection is completed via the intertoll selector 110, the intertoll ring control circuit 111, the intertoll selector 112, the two-way trunk circuit 210, the toll line 212, the two-way trunk circuit 204 and the automatic switch train in the exchange 203, to the called subscriber. If the distant operator extends the connection over the above mentioned switching path to the intertoll selector 112, she may then complete the connection to the manual toll board 201 via the toll ring-down trunk circuit 800 and the toll line 211. Finally, if the distant operator is unable to complete any of the above mentioned connections, she may control the intertoll selector 112 to extend the connection to the dial toll board in the central office 100 via the inward trunk circuit 300 or via the TX trunk circuit 1000. The operator at the central office switchboard may complete the connection via her links and the toll preselector 1400 over any one of the above mentioned trunk routes to the desired destination.

When a toll call is received over the toll line 212, from the dial toll board 205 in the automatic exchange 203, the two-way trunk circuit 210 is operated to seize the intertoll selector 110. The completion of the connection to the called destination is exactly the same as described above in connection with the toll calls originating at the toll center 206.

Toll calls originated in the central office 100 by a local subscriber, such as the subscriber at substation T1 are first extended via the usual line equipment including, for example, the line circuit 106 and the rotary line switch 107 to a local first selector, such as the selector 103. The calling subscriber at substation T1 then dials the digit 0 thereby controlling the selector 103 to select an idle CLR trunk circuit, such as the trunk 600. When the CLR trunk 600 is seized, a waiting call condition is indicated to the trunk distributor 1600A and the trunk distributor, in turn, seizes the calling CLR trunk and thereby controls the link finder 700 to find an idle link, such as the link 1300A, at the CLR operator position 2200A. As soon as the CLR operator answers the connection thus extended to her position, the trunk distributor 1600A is disconnected from the CLR trunk 600. The calling subscriber may now inform the CLR operator as to the destination of the desired toll call. The manner in which the CLR operator extends the connection to the desired called subscriber is the same as has been described above. In addition to the foregoing, the calling subscriber at substation T1 may also control the local first selector 103 to seize an idle trunk, such as the incoming trunk 209, extending to the CAX 208 and thereafter dial over the incoming trunk 209 the digits of a called subscriber in the CAX 208. Finally, if the subscriber at substation T1 desires to complete a local call to another subscriber in the central office 100, the digits of the directory number of the desired called subscriber, dialed by the calling subscriber, will control the local first selector 103, the local second selector 104 and the local connector 105 in the well known manner.

The central office 100 is also provided with a night transfer arrangement which permits the operating telephone company to completely shut down the dial toll switchboard at the central office 100 while still providing all the necessary toll traffic facilities for completing the toll calls extended to the switchboard. The night transfer circuit 1200, provided in the central office 100, is rendered effective when the toll switchboard thereat is shut down and causes all incoming toll calls received on the CLR trunk, inward trunks, toll ring-down trunks and TX trunks to be automatically transferred via the associated link finders, the night transfer circuit 1200, the two-way trunk circuit 210 and the toll line 212 to the dial toll board 205 in the distant automatic exchange 203. With this arrangement all toll calls originated in the disclosed telephone system and destined to be extended to the toll switchboard in the central office 100 will automatically be forwarded to the dial toll board 205 in the distant automatic exchange 203 whenever the toll board at the central office 100 is placed in a night transfer condition. Finally, the central office 100 is provided with an information operator position 114 which is accessible to local subscribers in the associated office as well as to operators at the distant exchanges. This operator position may also be shut down at night and facilities are provided, through the medium of the night transfer concentration unit 215, for automatically routing all information service calls intended for the information operator position 114, via the two-way trunk 110 to the dial toll board 205 in the distant automatic exchange 203.

The trunking arrangement disclosed in Figs. 1 and 2 having been generally described, attention is now directed to the circuit drawings disclosed in Figs. 3 to 26, inclusive.

Fig. 2 discloses the inward trunk circuit 300 which is accessible over the cable 390 to the intertoll selector 112 and which has access by way of the associated link finder 301 to an idle link, such as the link 1300B at the inward and ring-down operator position 2200B. All incoming toll calls from the distant automatic exchange 203 and from the distant toll center 206 are normally extended over a trunking path to an inward trunk, such as the inward trunk 300, and then via the associated link finder to an idle link at the inward operator position. It may be well to mention at this time that the associated link finder 301 has access via its associated contact banks to the links at the CLR and TX operator positions and calls may therefore be extended to these positions in accordance with the selective operation of the class of service keys provided at such positions. The inward trunk 300 is also connected to the bank contacts of the rotary switch associated with the trunk distributor 1600B so that the trunk distributor may distribute calls, which are waiting on the inward trunks, to the operator position for answering.

Figure 4:
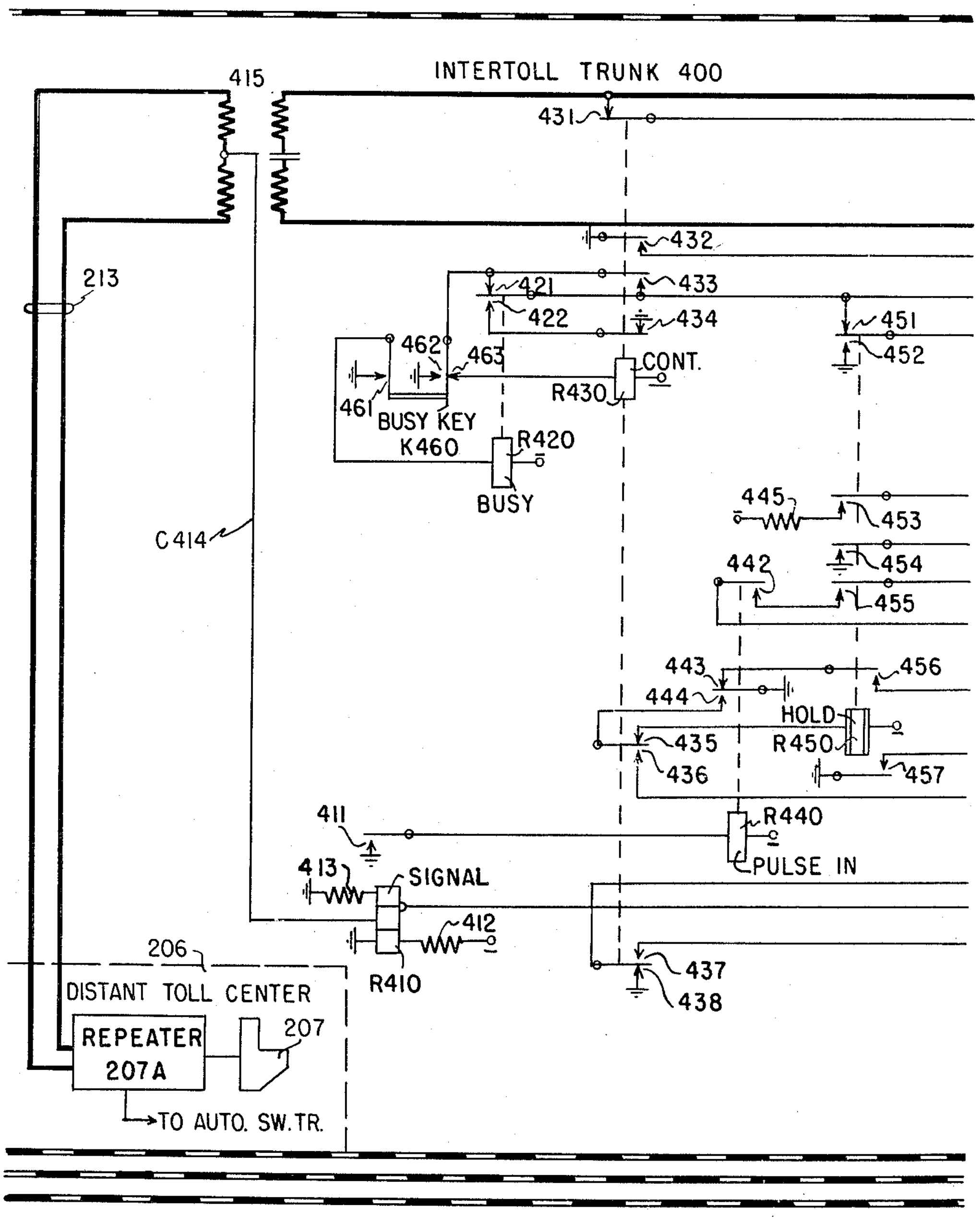
Figure 5:
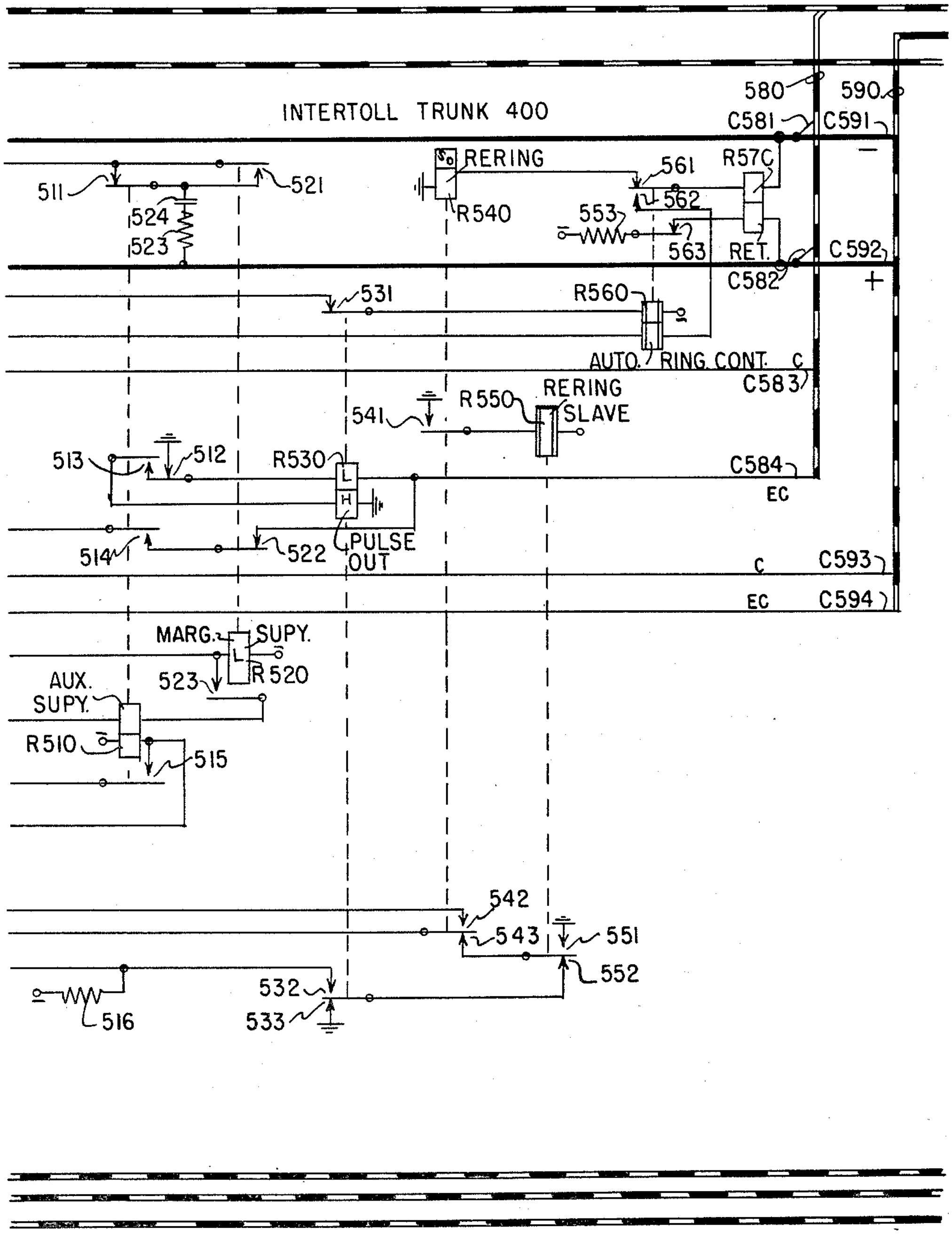

Figs. 4 and 5 disclose the intertoll trunk circuit 400 which terminates the toll line 213 from the distant toll center 206 and which is connected to the intertoll selector 110 over the cable 590. This trunk is also accessible to the intertoll selector 112, the delay call selector 113 and the toll preselector 1400 over the cable 580 in order to permit the establishment of connections over the interconnecting toll line 213 to the toll board 207 or subscriber substations in the distant toll center 206.

Figure 6:
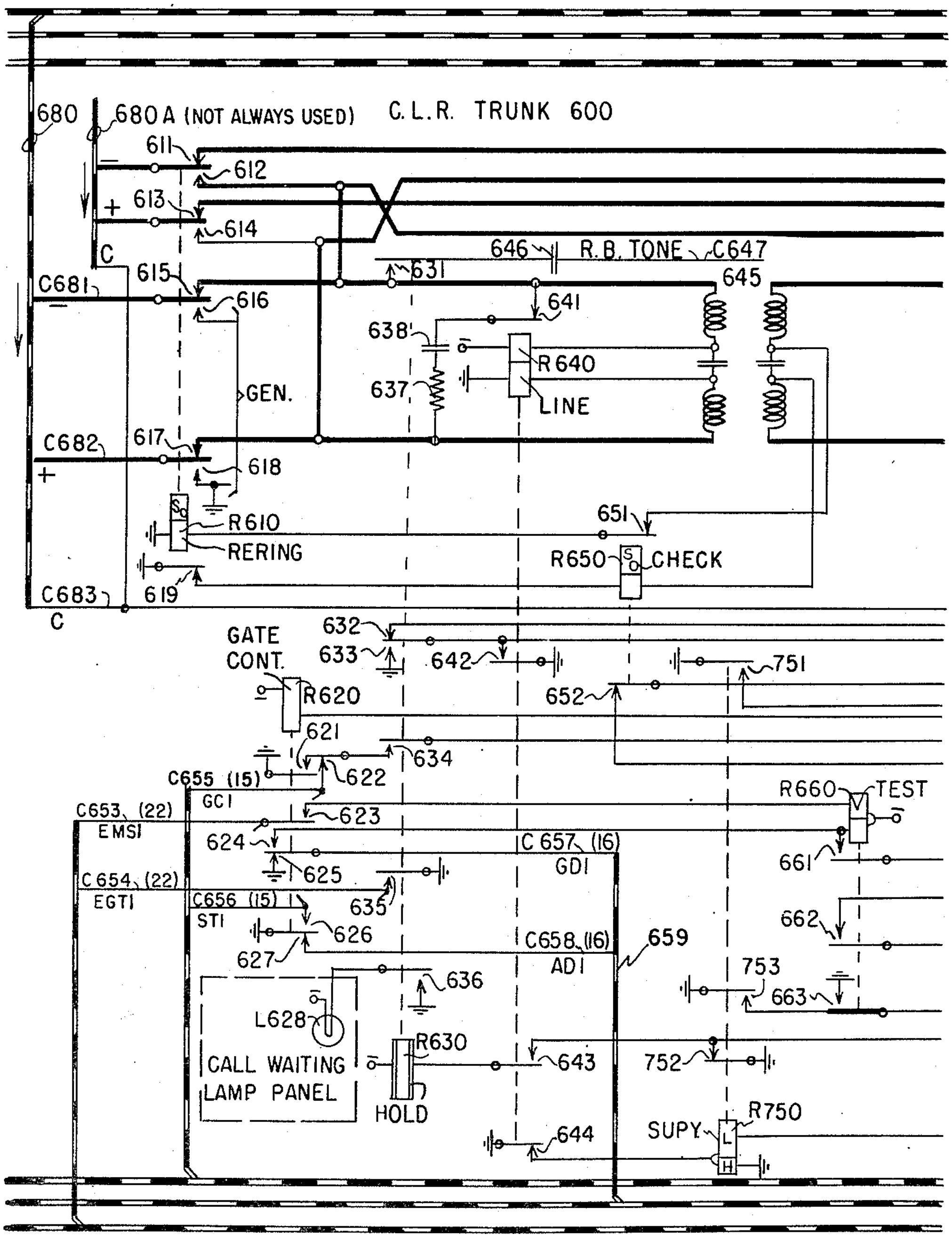
Figure 7:
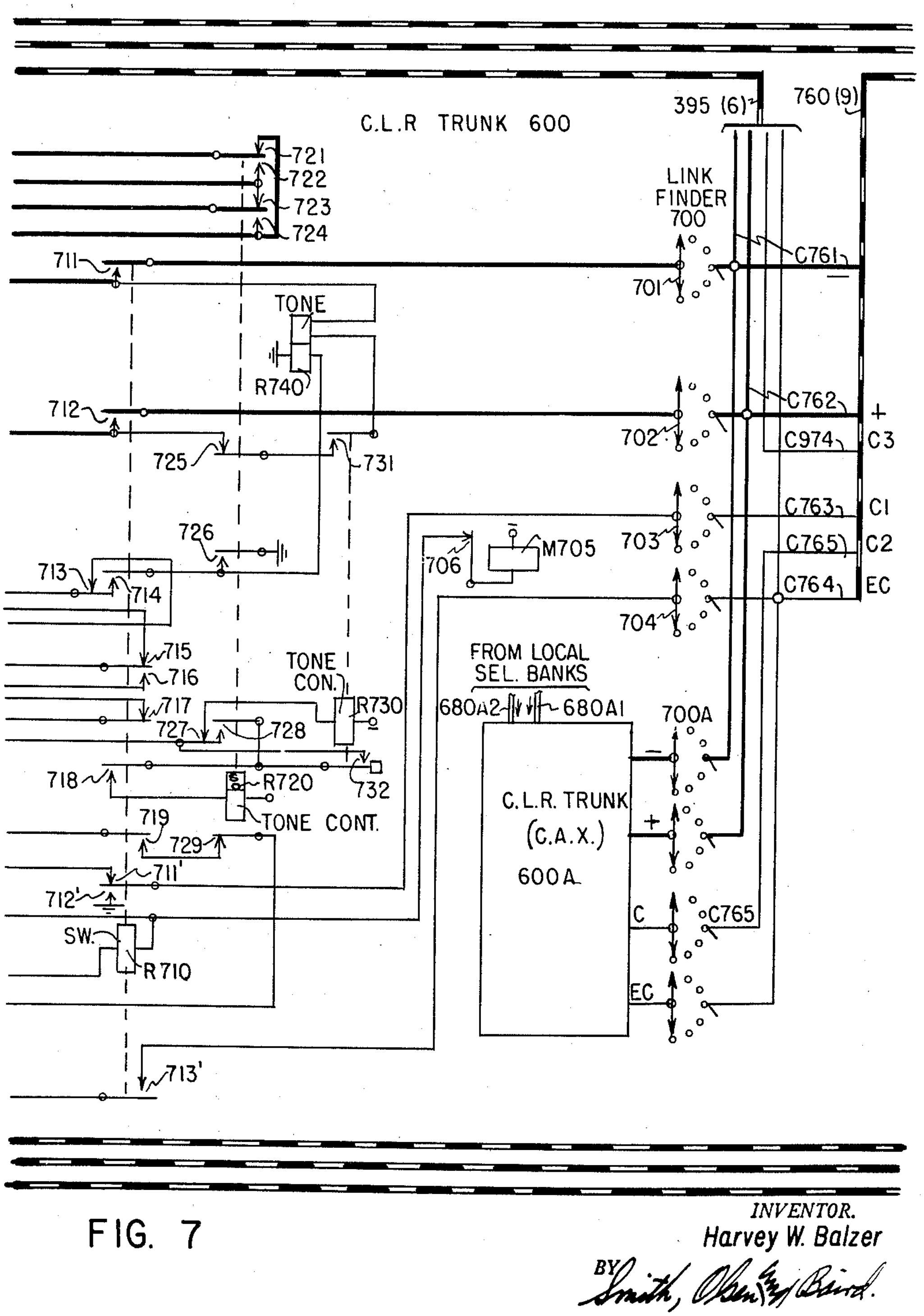

Figs. 6 and 7 disclose the CLR trunk circuit 600 which is accessible over the cable 680 by local subscribers and which has access by way of the associated link finder 700 to an idle link 1300A at the CLR operator position 2200A. This circuit is shown with another point of access over the cable 680A by nearby CAX subscribers. If the CAX is a nearby exchange, the calls therefrom may be treated as local CLR calls and the two points of access of any CLR trunk may be used respectively for local and nearby CAX subscribers. The two points of access enable the toll operator to rering a local subscriber over the cable 680 and to reverse the battery over the conductors of the cable 680A to resignal the CAX subscribers. If the CAX is a more remote exchange, calls therefrom are to be charged at a greater rate than calls from local or nearby CAX subscribers. In order to indicate to the CLR toll operator that a call is originated at a remote CAX, a separate group of CLR trunk circuits, such as 600A, are provided which are identical to the CLR trunk circuit 600. However, the CLR trunk 600A is only accessible over the cable 680A1 by the remote CAX subscribers. The associated link finder 700A extends the call thereover to the link 1300A and the CLR toll operator receives a special signal to indicate that the received CLR call is chargeable at a greater rate than local or nearby CAX subscriber CLR calls. The CLR trunk circuits 600 and 600A are also connected to the bank contacts of the rotary switch associated with the trunk distributor 1600A whereby the trunk distributor may distribute the CLR calls to the corresponding operator position to be answered.

Figure 8:
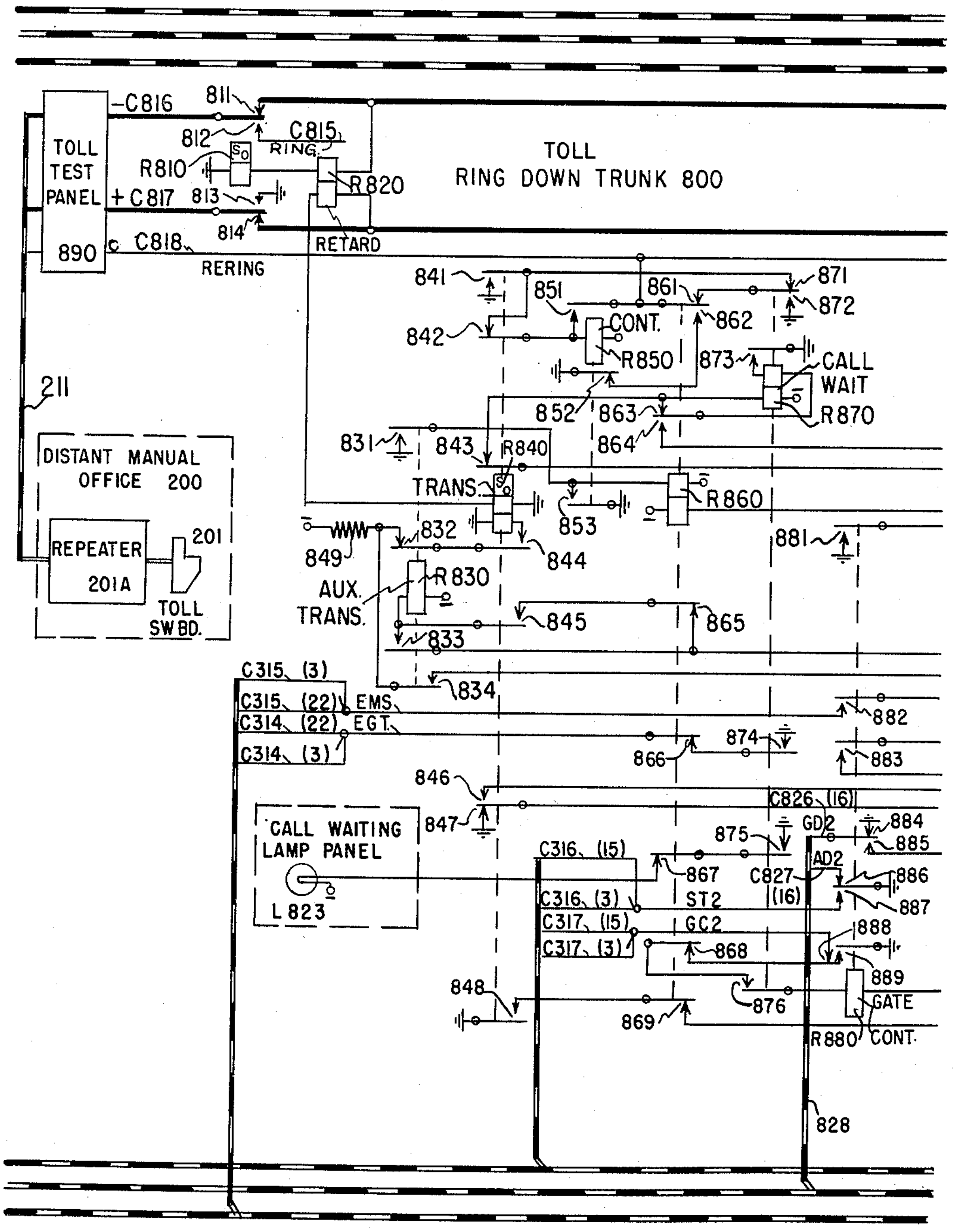
Figure 9:
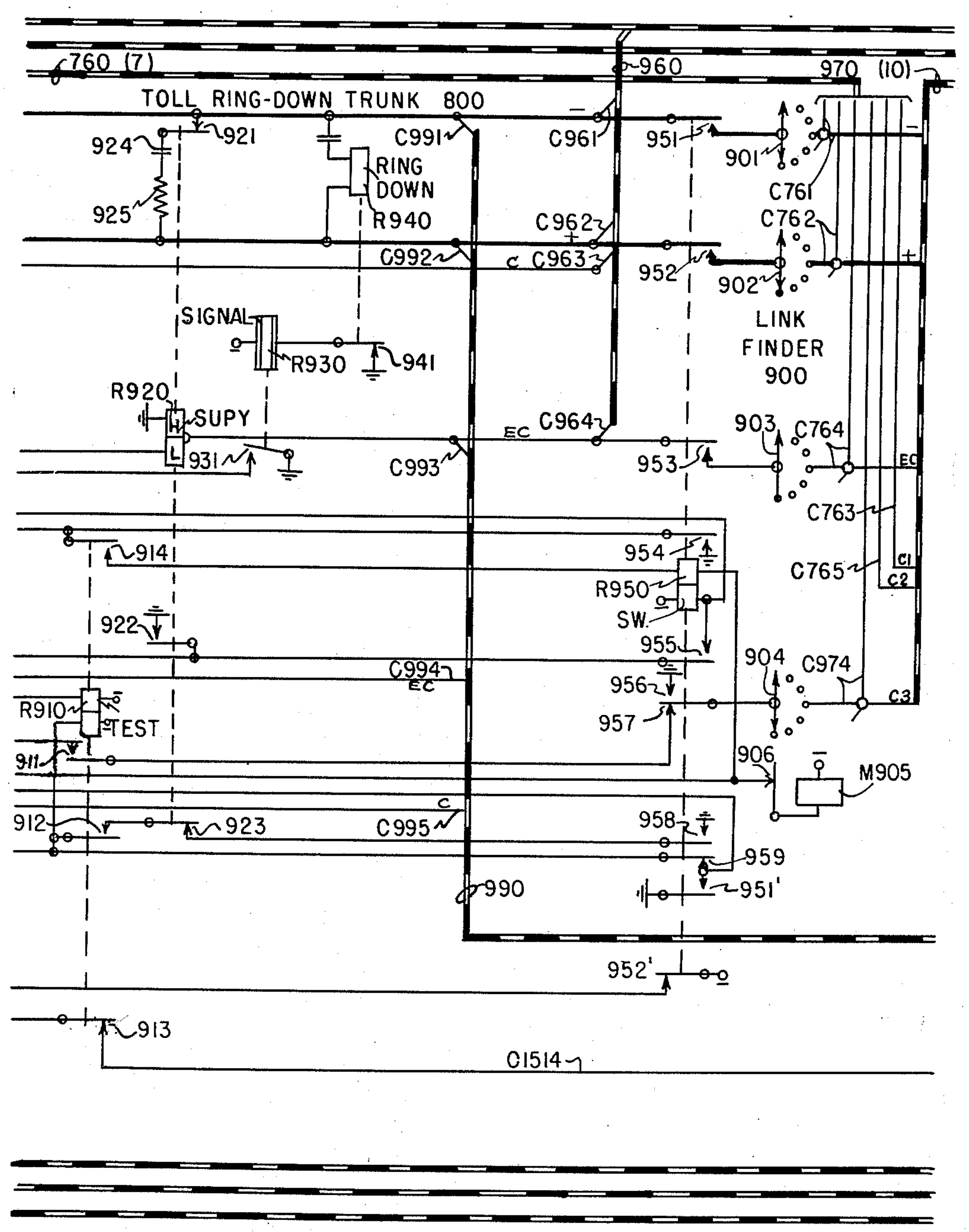

Figs. 8 and 9 disclose the toll ring-down trunk circuit 800 which terminates the toll line 211 interconnecting the toll switchboard 201 in the distant manual office 200 and the central office 100. This trunk also includes the link finder 900 which is governed under control of the trunk distributor 1600B to distribute calls to an idle link, such as the link 1300B, at the inward and ring-down operator position 2200B or to the other operator positions if they are conditioned to answer inward toll calls. Furthermore, the toll ring-down trunk circuit 800 is accessible over the cable 960 to the intertoll selector 112, the delay call selector 113 and the toll preselector 1400 for the purpose of extending toll calls via the trunk 211 to the operator at the toll switchboard 201. Finally, the toll ring-down trunk circuit 800 is provided with facilities whereby the answering inward operator may disconnect her link from the trunk circuit 800 and transfer the call over the cable 990 to the trunk finder 1060 associated with the TX trunk circuit 1000.

Figure 10:
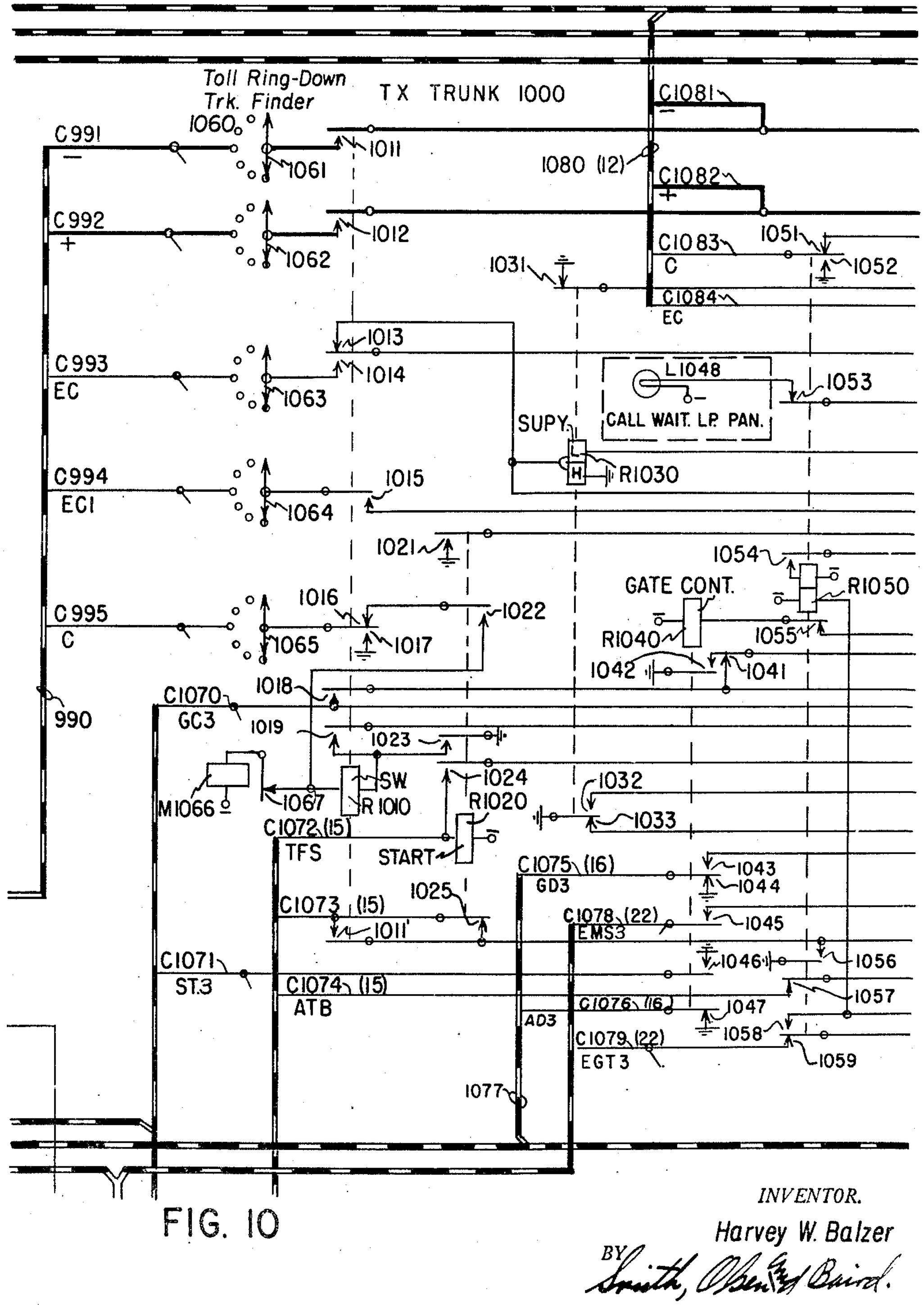
Figure 11:
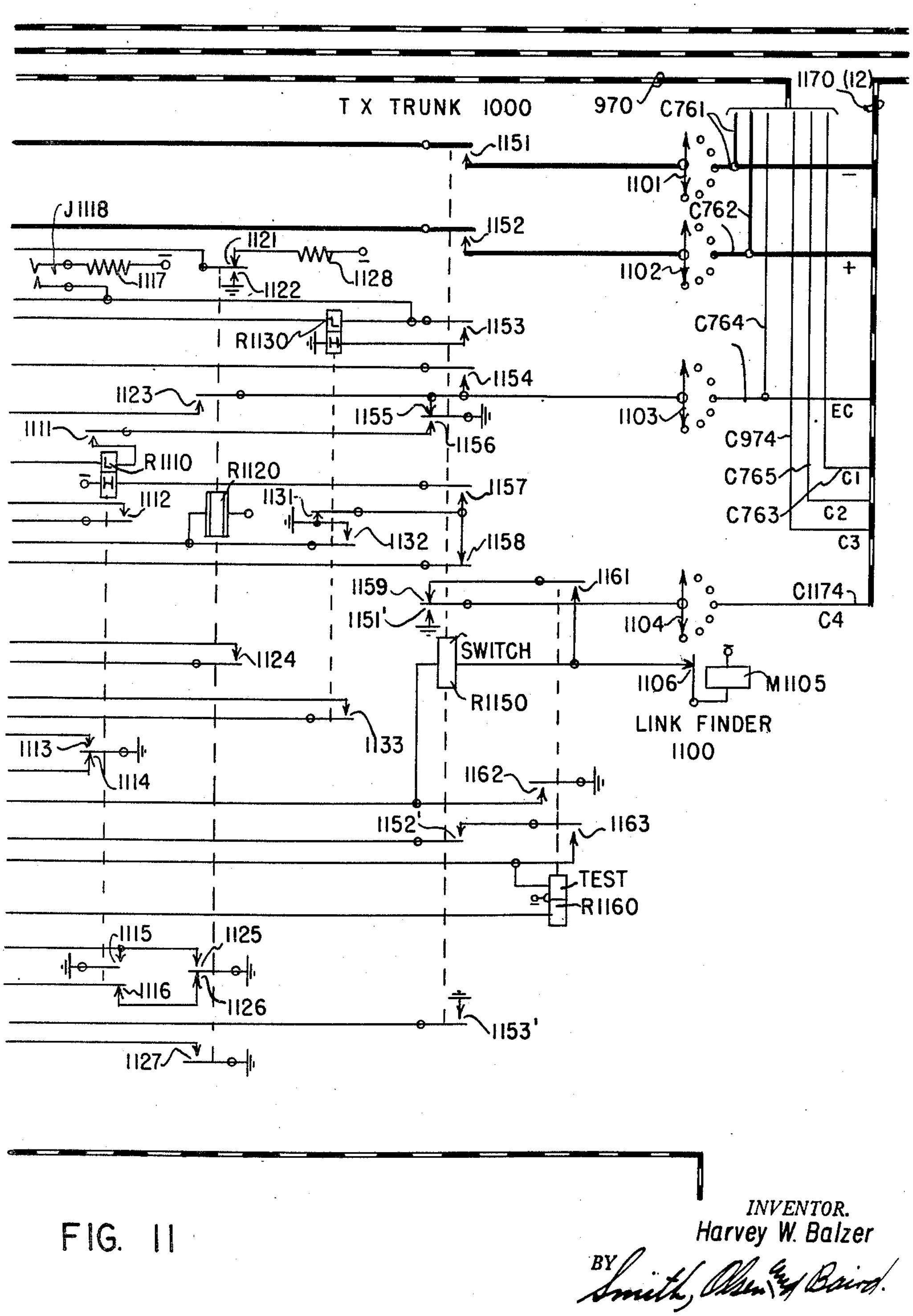

Figs. 10 and 11 disclose the TX trunk 1000 which is accessible over the cable 1080 to the intertoll selector 112, the delay call selector 113 and the toll preselector 1400. This trunk also includes a link finder 1100 which is governed under control of the trunk distributor 1600C to connect with an idle link, such as the link 1300C, at the TX operator position 2200C or at any other operator position conditioned to answer TX calls. Furthermore, by means of the TX transfer trunk distributor 1500, incoming toll calls routed via the toll ring-down trunk 800 to the inward and ring-down operator position 2200B, may be transferred over the cable 990 and trunk finder 1060 to the TX trunk 1000 and distributed via the link finder 1100 to the TX operator position 2200C. With this arrangement the inward operators may transfer calls to the TX operator position for completion without including, in such a connection, the link circuit at the inward operator position. The inward operator may then disconnect from the transferred connection and answer other calls.

Figure 12:
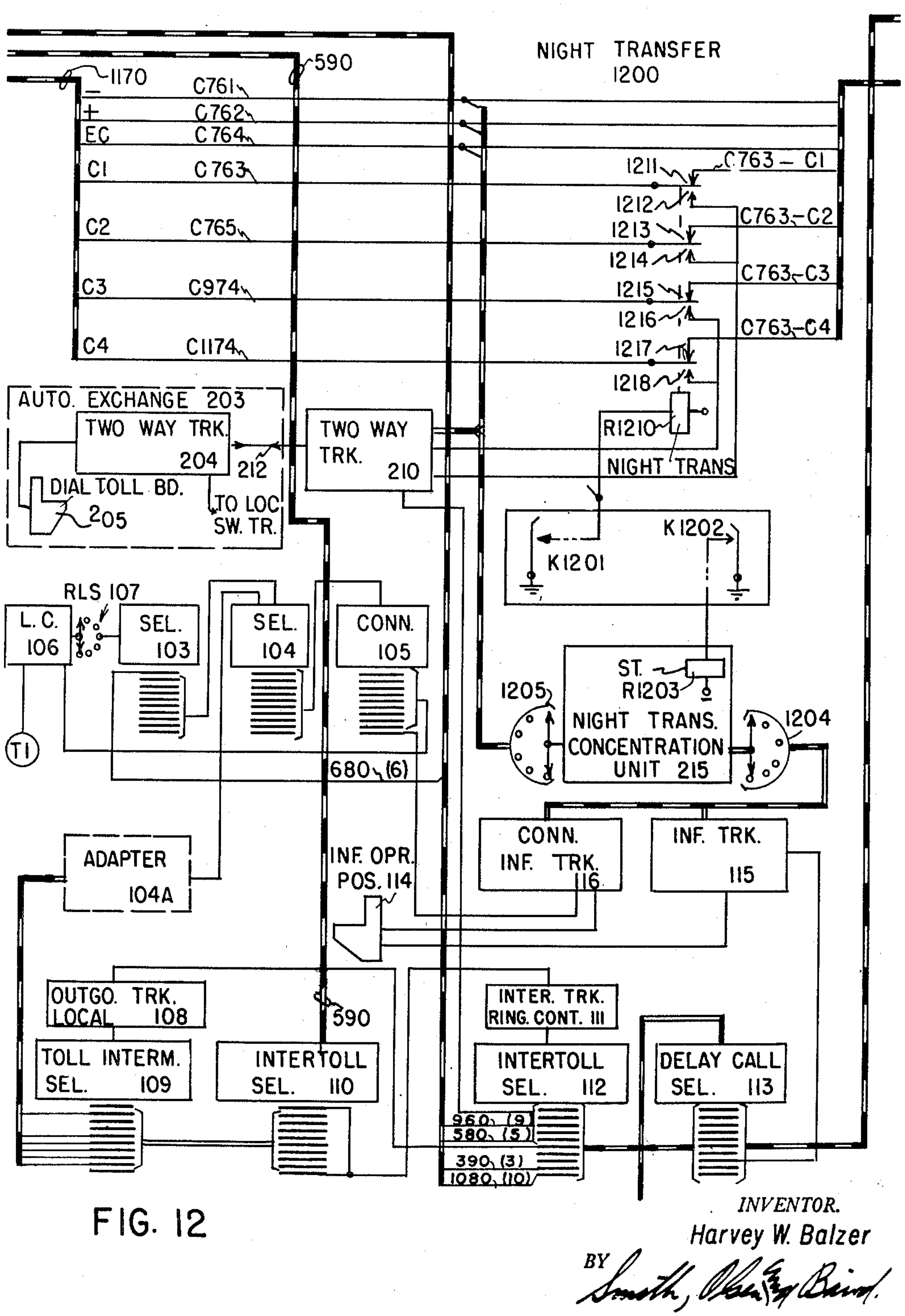

Fig. 12 schematically illustrates the night transfer circuit 1200 and certain of the local and toll switching apparatus provided in the central office 100.

Figure 13:
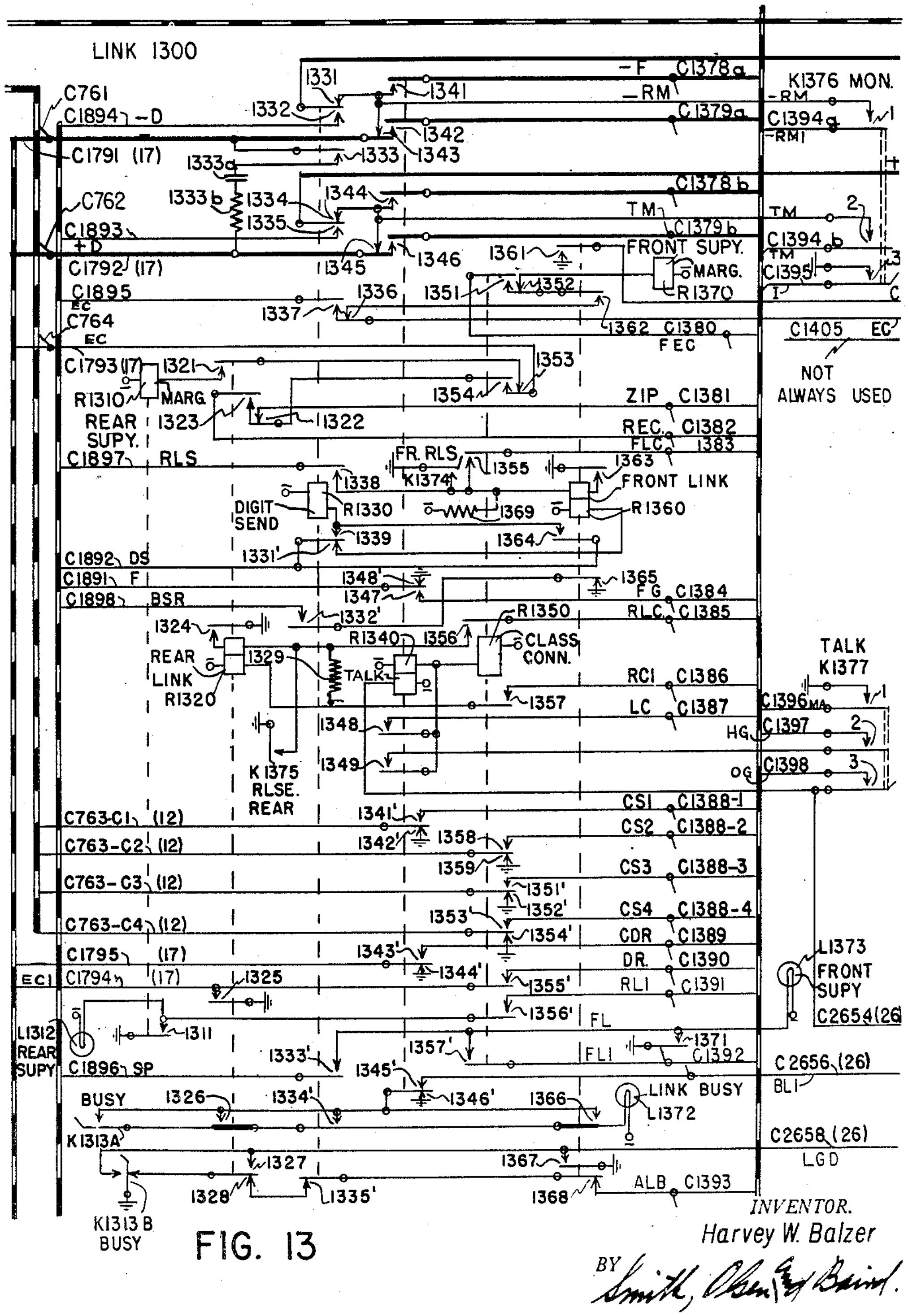

Fig. 13 discloses the link circuit 1300A provided at the CLR operator position 2200A. This circuit is one of a plurality of such circuits provided at the operator positions to enable the operator thereat to receive calls and also to extend calls via the associated toll preselector 1400. The links 1300B and 1300C provided respectively at the inward and ring-down operator position 2200B and the TX operator position 2200C are precisely the same as the link circuit disclosed in Fig. 13. The rear of the link 1300A is accessible by way of the bank contacts of the link finders and the front of the link is individually associated with a toll preselector 1400. In order to permit the CLR operator, or any other operator, to originate a call and extend it over the rear of the link, the delay selector trunk distributor 1700, the delay selector link finder 1701 and the delay call selector 113 are provided. These circuits may be selectively controlled to associate the rear of an idle link with the delay call selector 113. The above facilities are normally utilized by the TX operator. Each link circuit is provided with a talk key which may be actuated by the operator to connect the position equipment with the selected link circuit. Each link is also provided with a monitoring key to enable the operator to monitor a connection without disturbing the conversational connection between the two connected subscribers.

Figure 14:
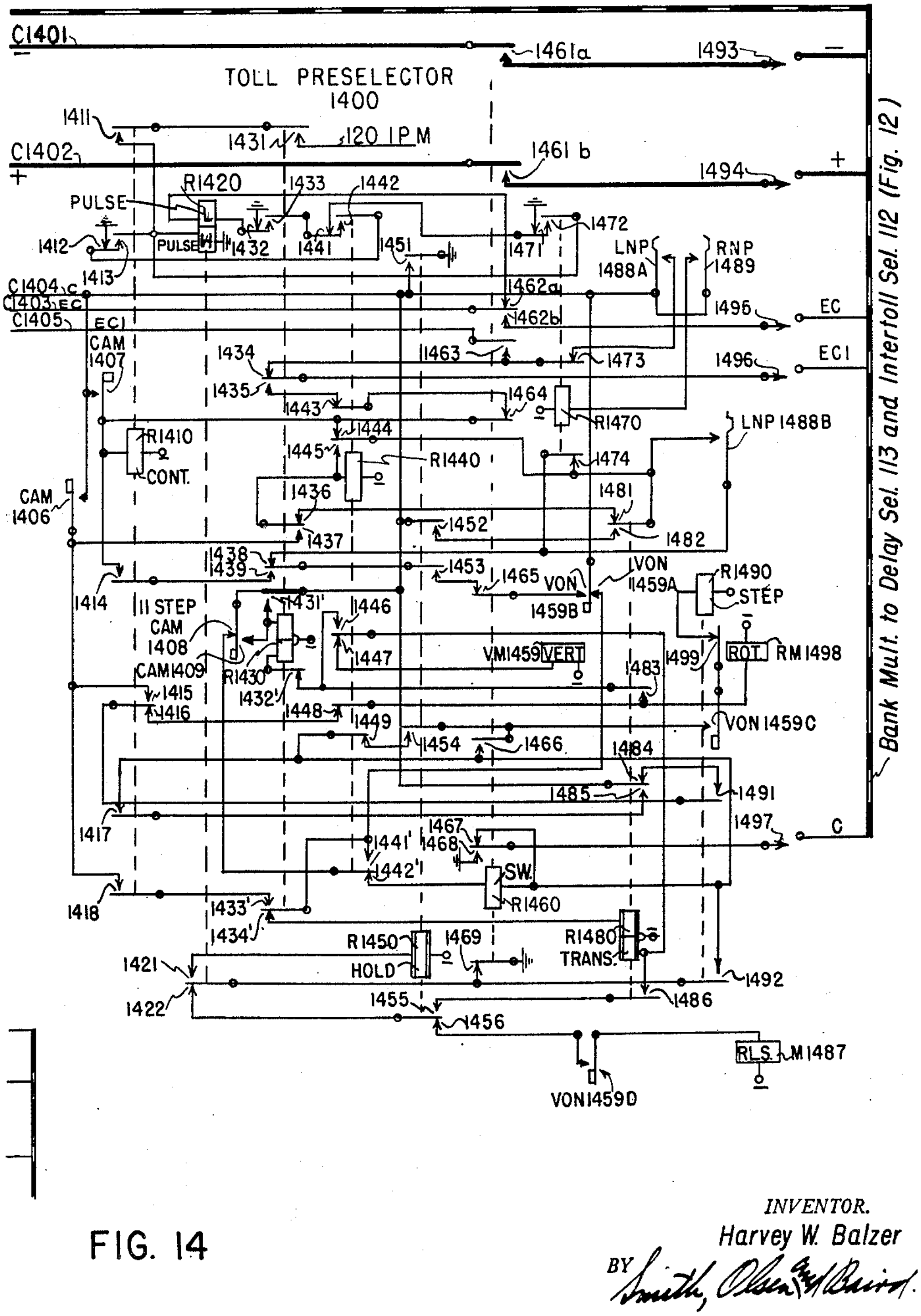

Fig. 14 discloses the toll preselector 1400 which is individually associated with the link 1300A and which is controllable by the central office toll operator to extend connections to local subscribers in the central office 100 or to subscribers or toll operators in the distant exchanges. The toll preselector 1400 is of the Strowger type having a plurality of wipers which are moved first in a vertical direction and then in a rotary direction in order to select an idle trunk to the next switching stage.

Figure 15:
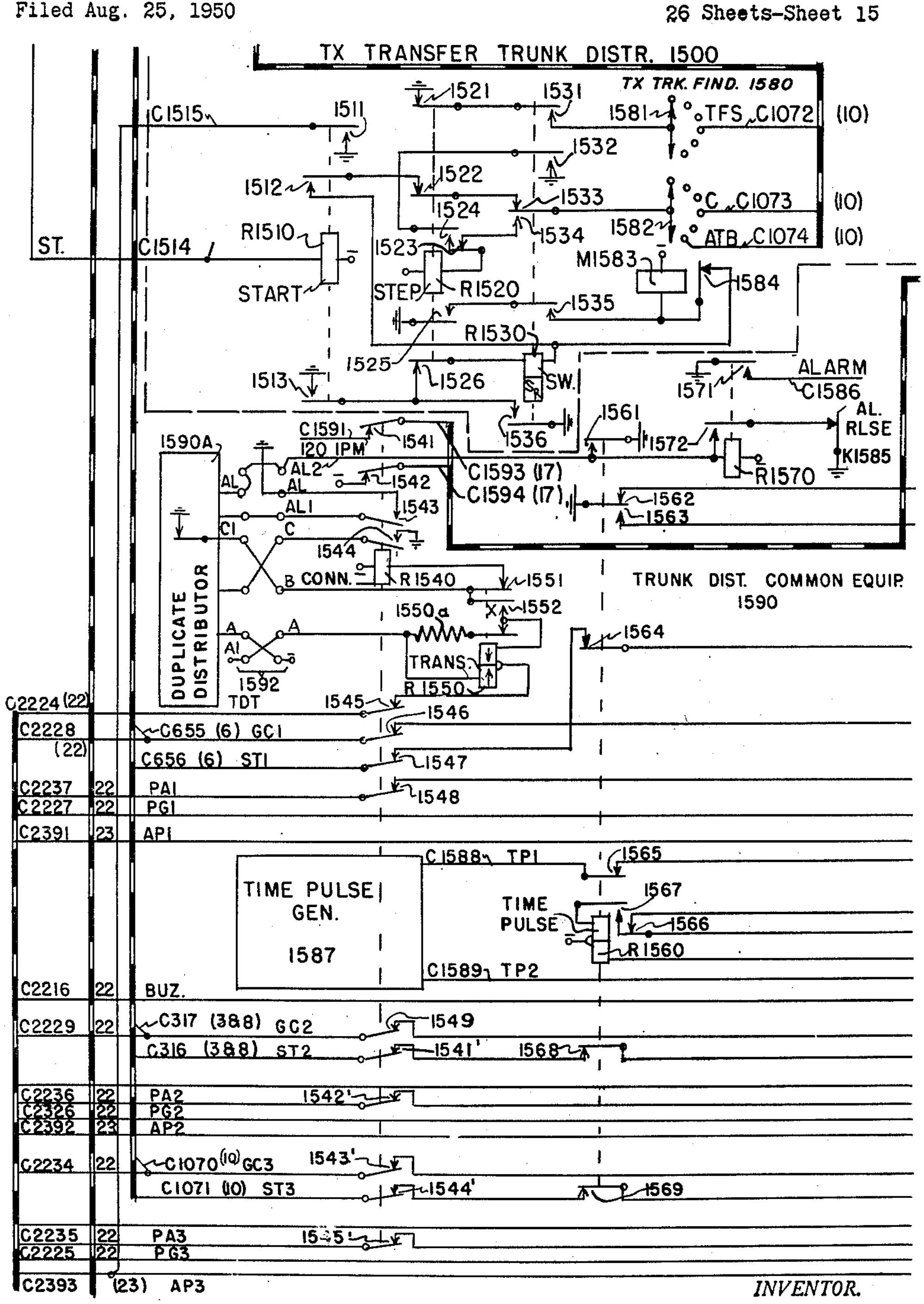

Fig. 15 discloses the TX transfer trunk distributor 1500 which is utilized in transferring and distributing calls received on the toll ring-down trunk circuit 800 to an idle TX trunk circuit, such as the TX trunk 1000. Fig. 15 also discloses the trunk distributor common equipment 1590 and the duplicate trunk distributor 1590A.

Figure 16:
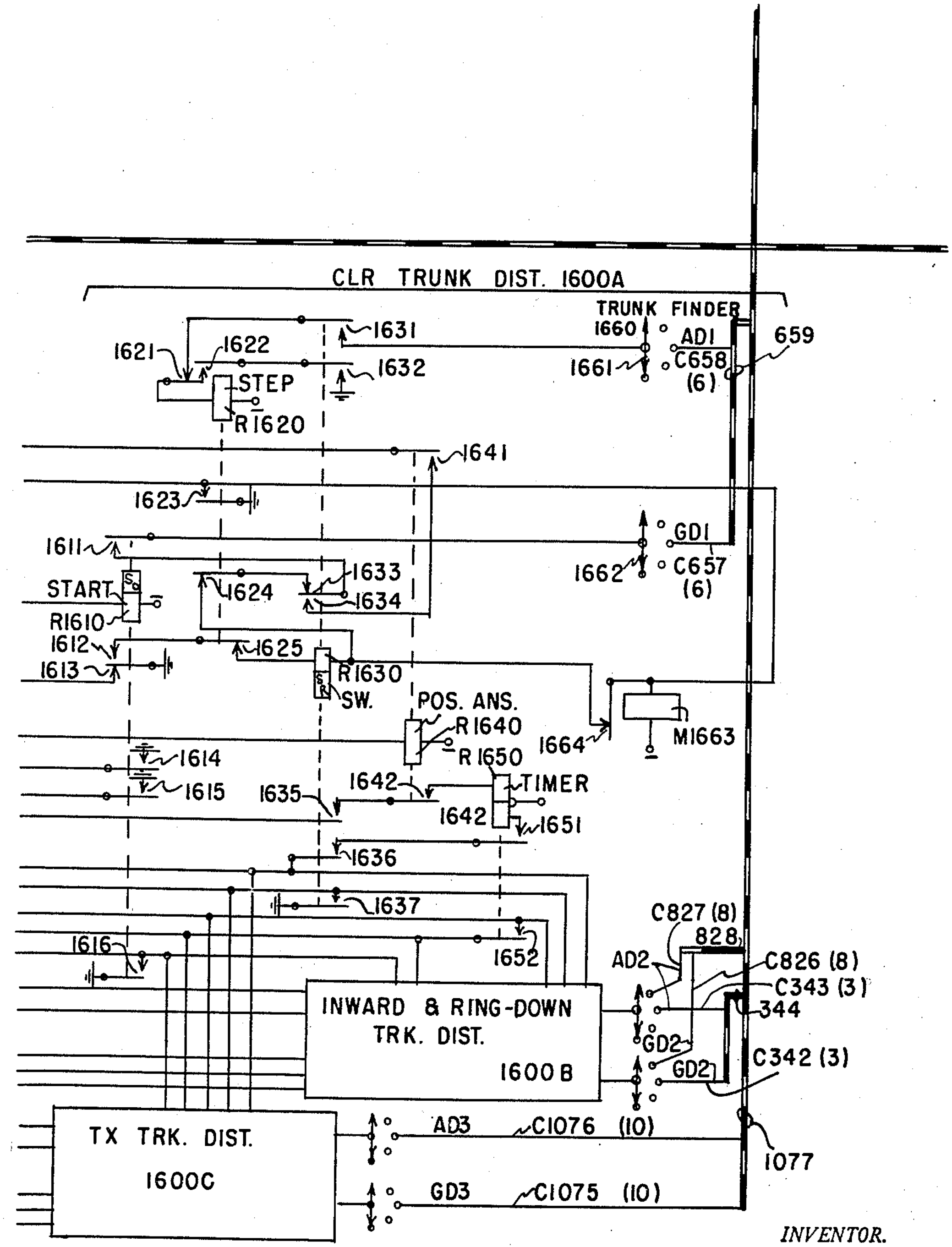

Fig. 16 discloses the CLR trunk distributor 1600A which controls the distribution of CLR trunk calls to the links at the CLR operator position 2200A. In addition to the foregoing, Fig. 16 also schematically illustrates the trunk distributors 1600B and 1600C for respectively distributing inward and toll ring-down calls to the inward operator position 2200B and TX trunk calls to the TX operator position 2200C.

Figures 17, 27:
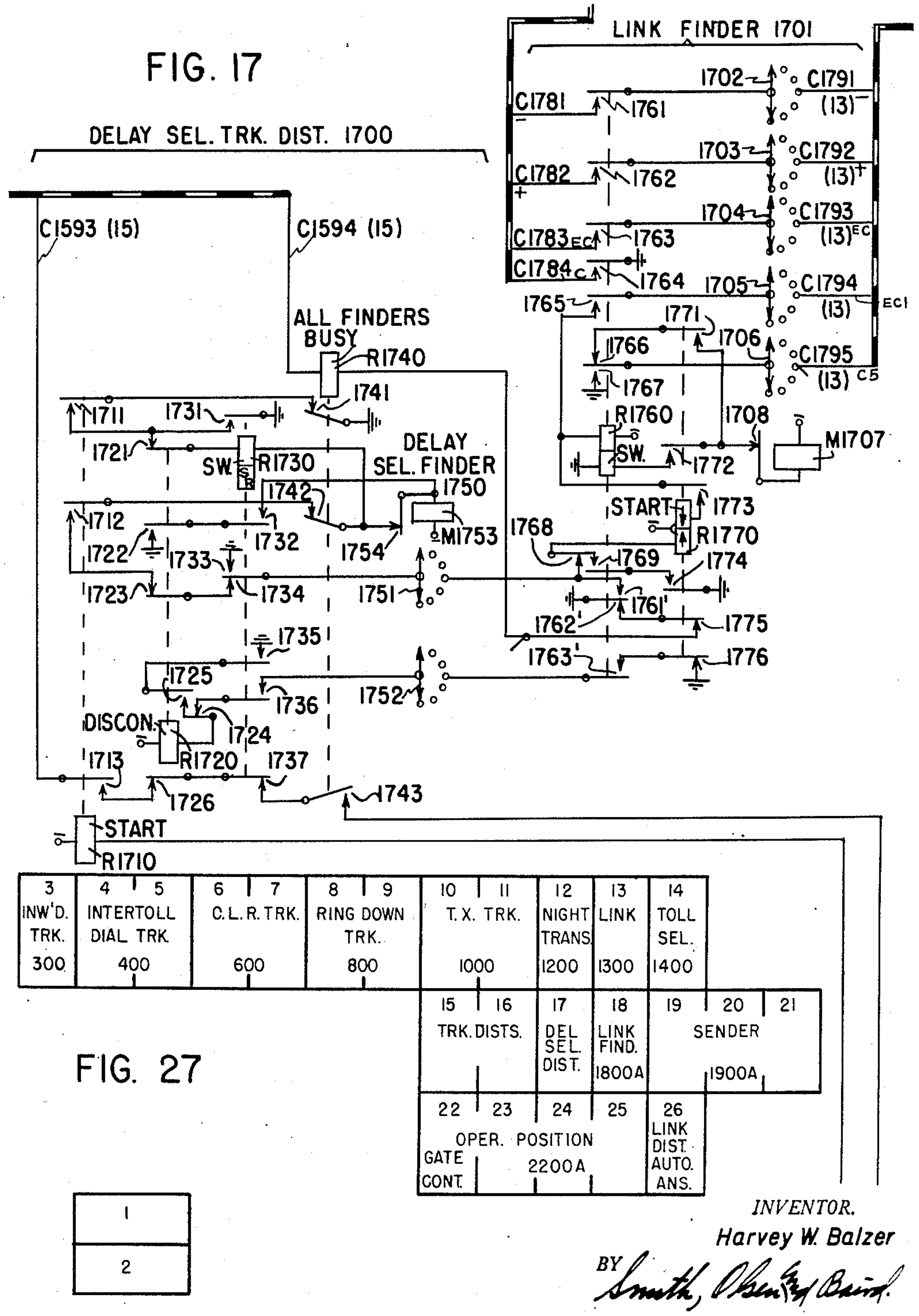

Fig. 17 discloses the delay selector trunk distributor 1700 and the associated delay selector link finder 1701 which are selectively controllable to associate an idle delay call selector, such as the delay call selector 113 with the rear of an idle link at an operator position.

Figure 18:
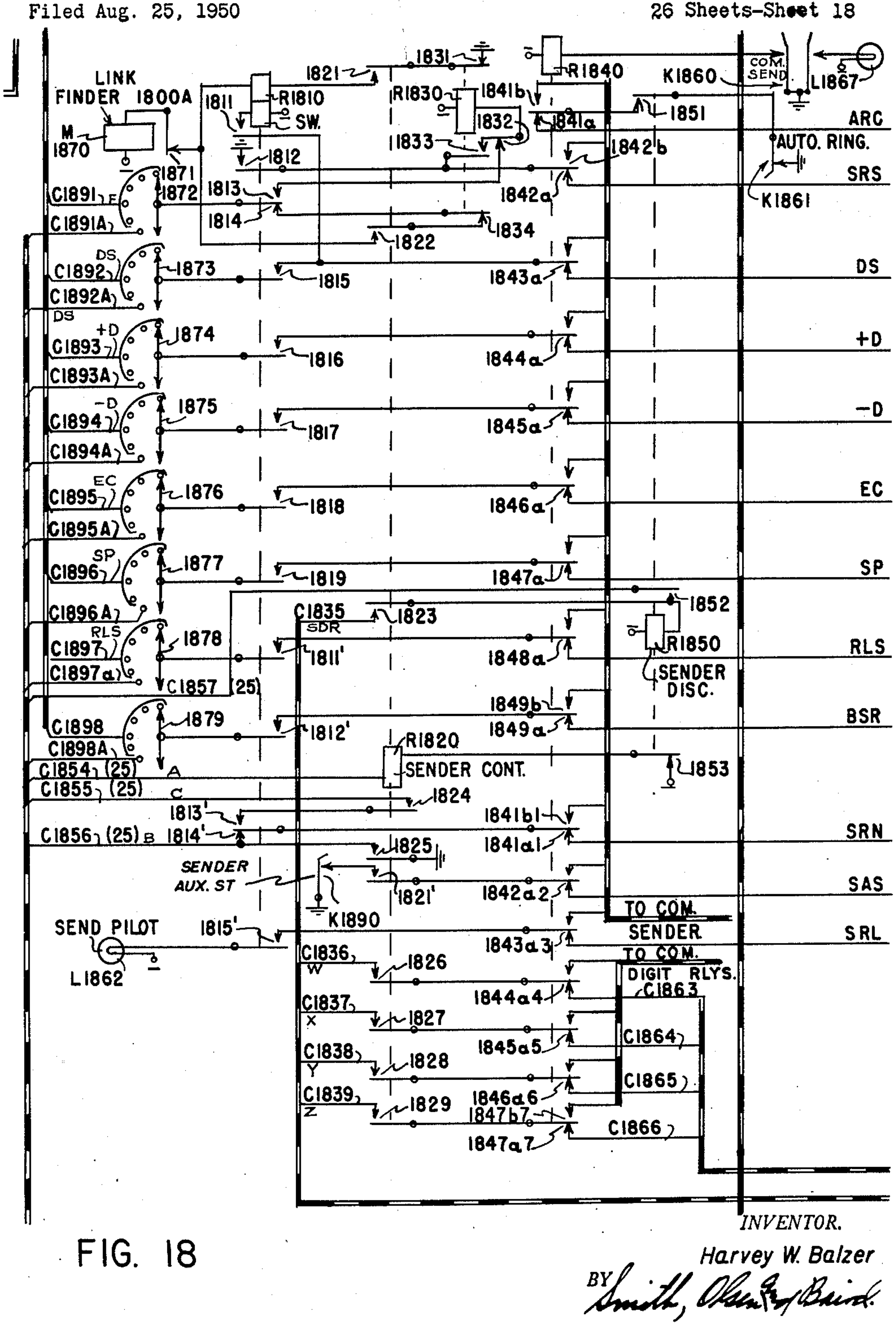

Fig. 18 discloses the link finder 1800A associated with the CLR operator position 2200A which automatically connects the impulse sender 1900A with the front of any one of the link circuits, such as the link 1300A, or with the rear of any one of the link circuits via the CLR operator position equipment 2200A. The link finders 1800B and 1800C (Fig. 1) associated with the inward operator position 2200B and the TX operator position 2200C are exactly the same as the link finder 1800A, Fig. 18, and are provided to associate the link at those positions with the associated operator position equipment.

Figure 19:
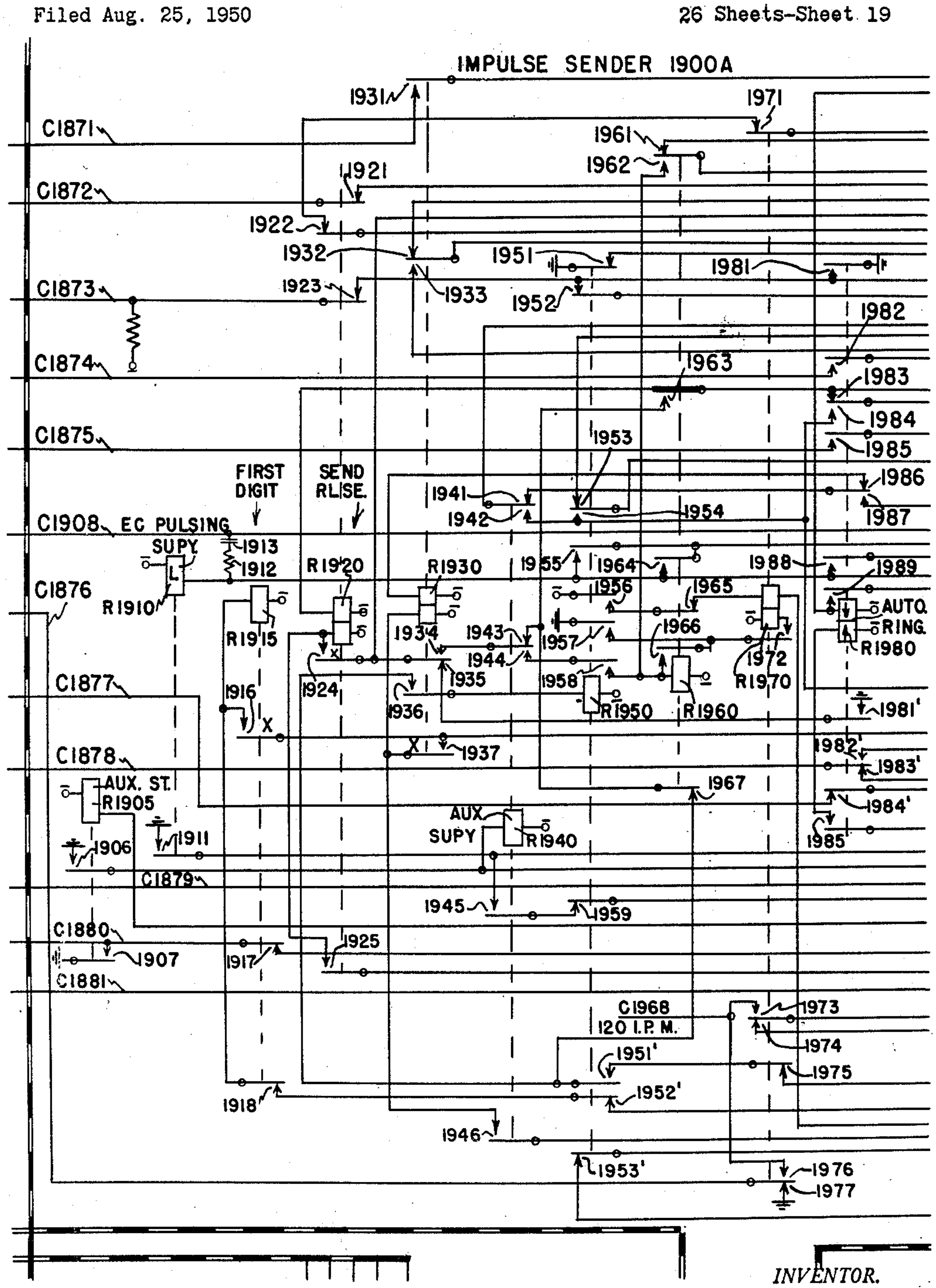
Figure 20:
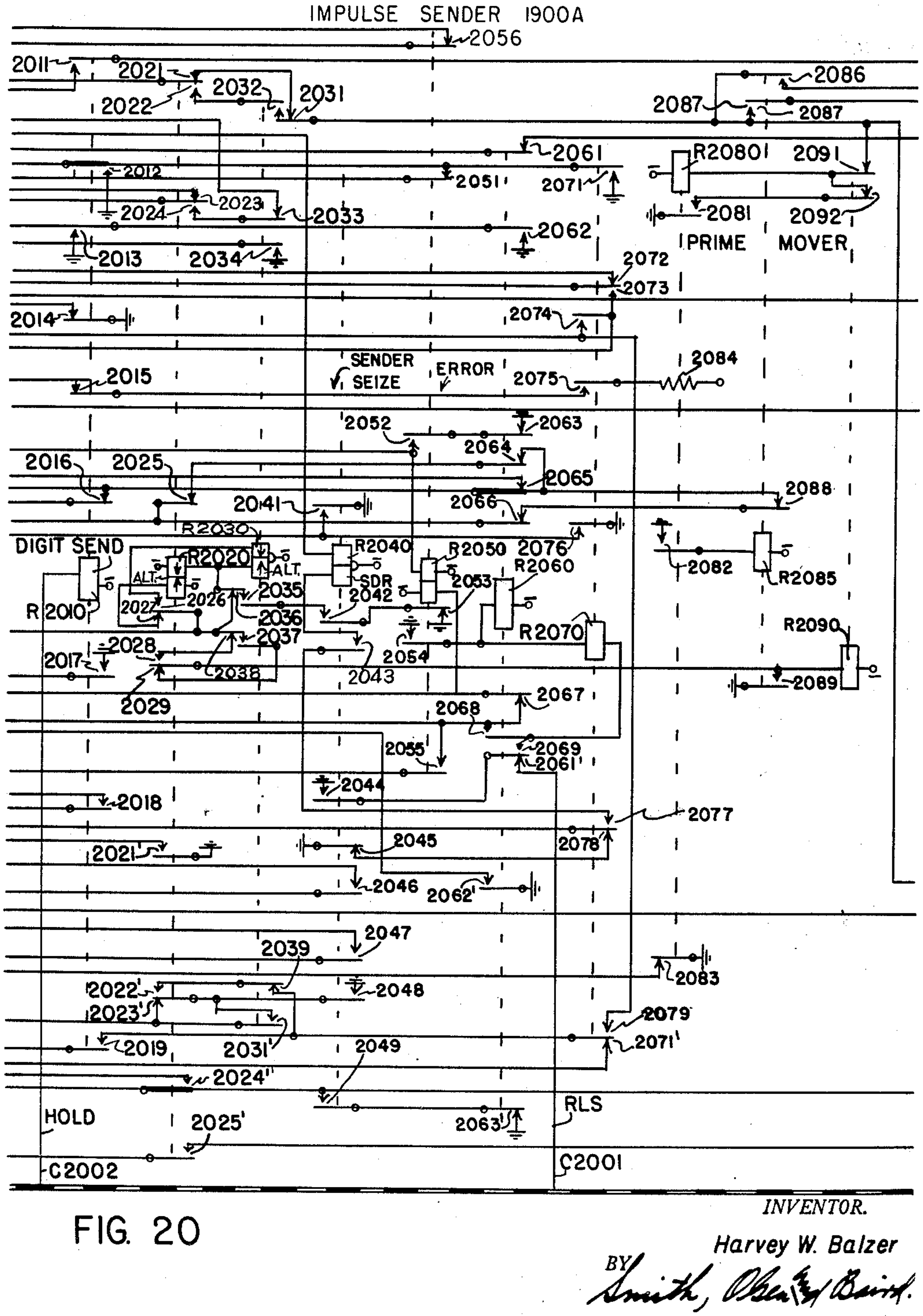
Figure 21:
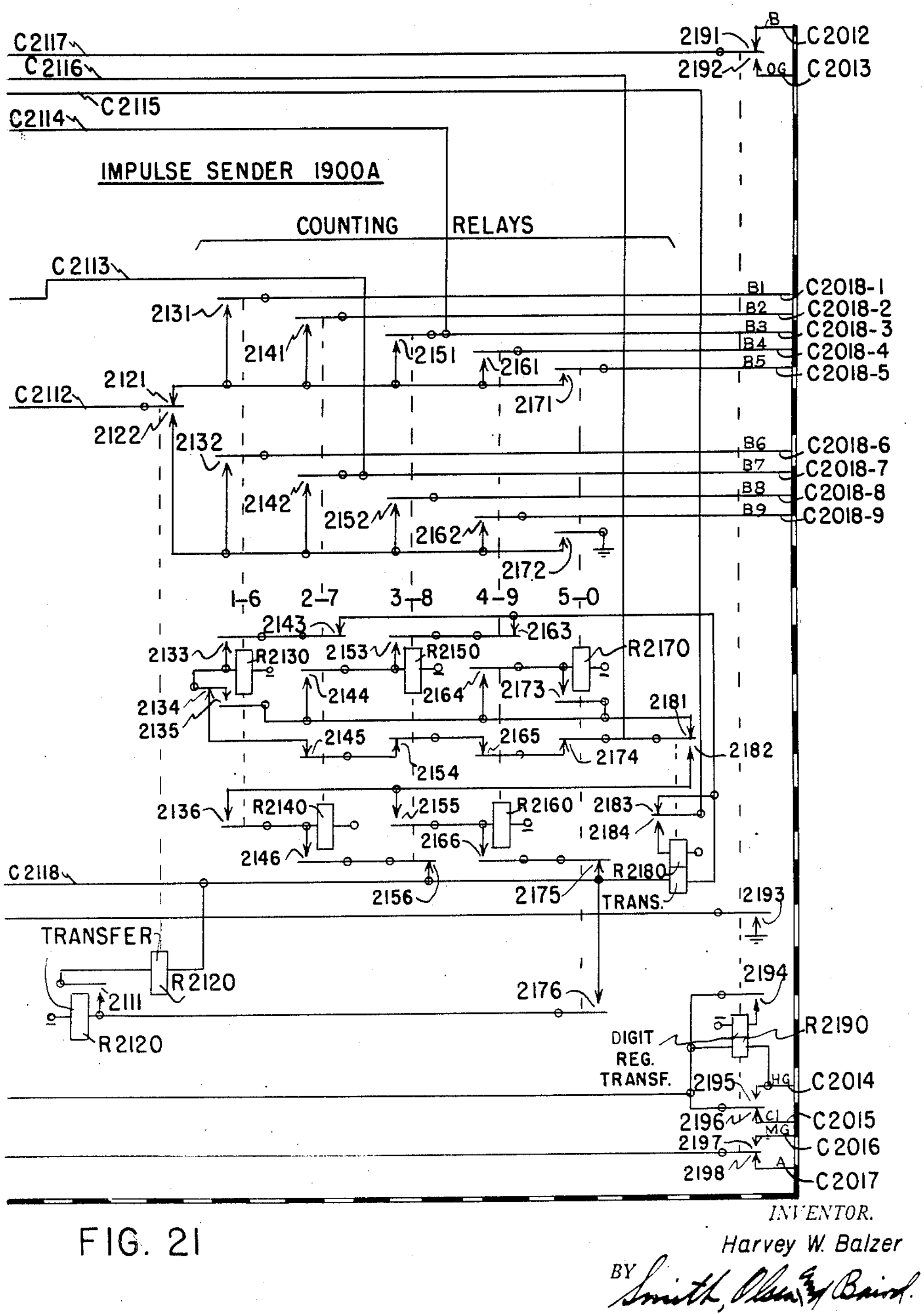

Figs. 19, 20 and 21 disclose the impulse sender 1900A which is common to all of the links at the CLR operator position 2200A. The impulse senders 1900B and 1900C are common to the links at the respective inward and ring-down operator position 2200B and the TX operator position 2200C. The impulse sender may be automatically associated with the front of the connected link or, in the case of a delay call, may be automatically connected with the rear end of the link. The impulse sender is utilized in controlling the automatic switching apparatus to set up connections in accordance with the digits registered by the toll operator.

Figs. 22 to 26, inclusive, disclose the operator position equipment 2200A including the relays and apparatus common to all of the link circuits at an operator position, and certain other apparatus to be described hereinafter, for controlling the answering of calls one after another even though a number of calls may be locked-in for answering. The operator position equipment also includes a keyset K2647 for controlling the registration of the various digits to be transmitted by the impulse sender; an automatic answering control circuit 2601 which permits calls automatically to be brought into the operator position by preselecting an idle link thereat; and a schematically illustrated digit register 2600A for registering the various digits which are keyed up on the keyset by the operator. The digit registers 2600B and 2600C provided respectively at the inward and ring-down operator position 2200B and the TX operator position 2200C are the same as the digit register 2600A. The digit register 2600A may be, for example, of the type disclosed in Fig. 18 of the Crocker Patent No. 2,167,710, or in Figs. 33 and 34 of the Molnar Patent No. 2,361,313.

Fig. 27 is a layout drawing showing the manner in which Figs. 3 to 26, inclusive, of the drawings should be arranged to illustrate the toll switching telephone system.

A detailed description of the operation of the toll switching telephone system briefly described above will now be given.

*Preparing an operator position to receive calls*

As previously noted, each toll operator position in the central office 100 is arranged to handle any one or more of the three classes of toll calls, such as CLR toll calls, inward and ring-down toll calls, and TX toll calls. Referring now to the operator position equipment 2200A, Figs. 22 to 26, inclusive, it will be assumed that this equipment is provided at the CLR operator position 2200A (Fig. 2) and that the position is conditioned to handle only CLR calls.

The operator position equipment 2200A may be arranged to automatically answer calls when they are distributed to preselected links associated with the position or the automatic answering facility may be disconnected so that calls will only be brought into the link at the position that has been selected by the actuation of the talk key individual to the link. For this purpose, the operator position equipment is provided with an automatic answering key K2301 (Fig. 3) which is left in its normal position, as is shown on the drawing, when automatic answering facilities are to be utilized and it is actuated to open the associated key contacts when manual key answering facilities are to be utilized. For the purpose of the present description, it will be assumed that automatic answering facilities are to be utilized and consequently the key K2301 will be left in the normal position shown on the drawing.

The operator position equipment 2200A is arranged to handle the three classes of toll calls. In the present discussion it will be assumed that the operator position equipment 2200A is to exclusively answer CLR calls and that the other classes of service are to be barred from the CLR position. Accordingly, the operator at the CLR position 2200A will actuate the inward key K2280 and the TX key K2275 in order to disconnect the conductors, including the contacts of the above mentioned keys, from the operator position. The CLR key K2285 is left in the normal closed position shown in the drawing and thus the operator position equipment 2200A is conditioned to control the CLR trunk distributor 1600A to distribute CLR calls to the position. In view of the foregoing, it will be understood that the operator position 2200A is now conditioned for automatic answering of CLR calls exclusively.

The operator now inserts the plug of the operator headset into the associated jack of the operator position circuit in the well known manner in order to connect her telephone equipment to the position. The operator telephone equipment 2300 (Fig. 23) schematically illustrates the operator headset, transmitter and associated plug and jack equipment. In response to the connection of the operator telephone equipment 2300 to the position equipment 2200A, the operator connect relay R2310 is operated. In response to the operation of relay R2310, at its contacts 2311, it connects ground via contacts 2351 and 2361 to the OG conductor C1398 extending to all of the link circuits, such as the link 1300A shown in Fig. 13. At its contacts 2313, the relay R2310 completes a circuit including the contacts of the busy key K2303, the contacts 2241, 2231 and 2221 and the winding of the gate control relay R2210, to battery. The operation of the gate control relay R2210 in effect opens the gate so that waiting calls of the selected class may be distributed to the operator position. At its contacts 2317, the relay R2310 connects the A1 conductor C2659 via the contacts 2301*a*, 2317 and 2363 to the ALB conductor C1393 in order to operate the all links busy relay R2630 in the automatic answer control circuit 2601 (Fig. 26) if a link is available in the manner described hereinafter. Finally, at its contacts 2312, the relay R2310 prepares a circuit, including the F conductor C2657, for the position disconnect relay R2620 in the automatic answer control circuit 2601.

From the foregoing, it will be seen that the operator position equipment 2200A is placed into operation when the operator thereat connects her telephone equipment 2300 and operates the operator connect relay R2310. Subsequent operations, controlled in response to the operation of relay R2310, depend upon whether the automatic answer key K2301 is left in its normal position or whether the automatic answer key is actuated. If the automatic answer key K2301 is left in its unoperated position, the automatic answer control circuit 2601 will preselect an idle link, such as the link 1300A, and cause the same to be connected to the operator position 2200A. However, if the automatic answer key is actuated to open the associated contacts, the automatic answer control circuit 2601 will be disconnected. With the automatic control circuit 2601 disconnected, the operator must operate a talk key, such as the key K1377, associated with an idle link, in order to connect the particular link to her position equipment.

Before describing the operation of the circuits when automatic answering is used, a brief description will first be given of operations when key answering is utilized.

As previously mentioned, when key answering is to be provided, the automatic answering key K2301 will be actuated to interrupt the circuits including the contacts thereof and when the operator connect relay R2310 is operated, it completes, at its contacts 2311, the previously mentioned circuit for applying ground potential to the OG conductor C1398. The ground potential on the conductor C1398 is connected to one of the contacts of a talk key, such as the key K1377, individually associated with each of the links available to the CLR operator. If the operator selects the link 1300A and actuates the talk key K1377, the ground potential on the OG conductor C1398 will be extended via the contacts 3 of the key K1377 and the lower winding of the talk relay R1340, to battery. The relay R1340 now operates and, at its contacts 1349, completes a circuit from battery through its upper winding and then via the contacts 1349, the contacts 2 of the key K1377, the HG conductor C1397 extending to Fig. 25, the contacts 2369 and 2333 and the lower winding of the manual answer relay R2330, to ground. It should be noted that the lower winding of the class control relay R1350, in the link 1300A, is multiply connected over the above traced circuit and consequently, the relays R2330 and R1350 operate and the relay R1340 is retained in its operated position over the circuit including its upper winding. At its contacts 2331, the manual answering relay R2330 completes a locking circuit for its upper winding which includes the contacts 2364′, the MA conductor C1396 and ground at contacts 1 of the operated talk key K1377. Accordingly, the relay R2330 in the operator position will now be retained in its operated position under control of the talk key K1377. As a further result of the operation of relay R2330, at its contacts 2333, it interrupts its initial operating circuit and, at its contacts 2332, it completes the circuit for the talk relay R2350 which now operates in multiple with the upper winding of the talk relay R1340 and the lower winding of the class control relay R1350 in the link 1300A. Finally, at its contacts 2334, the relay R2330 connects ground via the contacts 2312, the F conductor C2657 extending to Fig. 26 and the lower winding of the position disconnect relay R2620 in the automatic answer control circuit 2601, to battery. The relay R2620 is operated at the present time to disconnect, at its contacts 2623, the 60IPM conductor C2628 from the BL1 conductor C2656 and to connect, at its contacts 2624, a direct ground potential to the conductor C2656. In other words, the relay R2620 is operated at the present time to prepare a circuit for the link busy lamp L1372 in the link 1300A so that it will be continuously illuminated when a call is received. The steadily illuminated lamp L1372 will indicate to the operator that key answering has been employed whereas a flashing lamp L1372 will indicate that the automatic answering facilities have been employed.

The operation of the talk relay R1350 in the operator position, at its contacts 2355 and 2357, connects the operator telephone equipment 2300 to the selected link over circuits to be traced hereinafter. Finally, at its contacts 2352, the relay R2350 completes a circuit for operating the distributor connect relay R2320. This circuit may be traced from ground by way of the contacts 2311, 2352, 2412', 2512, 2379, 2472, 2492, the upper winding of relay R2320, the contacts of the busy key K2302, to battery. The operation of the distributor connect relay R2320 completes circuits whereby the trunk distributors, shown in Figs. 15 and 16, may be operated to cause incoming calls of the selected class to be distributed to the link 1300A which has been selected by the manual operation of the talk key K1397 individually associated therewith.

In this manner, the operator position 2200A is conditioned to accept a call which may be distributed to the preselected link 1300A.

In the foregoing description, it was assumed that the operator, at position 2200A, had actuated the automatic answer key K2301 to disconnect the automatic answering facilities and that a talk key of an idle link was manually operated to connect the link to the operator position. The manner in which the circuits function when automatic answering is employed will now be described.

*Marking a link at the operator position for answering a call*

The manner in which an idle link, such as the link 1300A, at the CLR operator position 2200A is selected and prepared for seizure by a link finder, such as the link finder 700, of a CLR trunk, such as the CLR trunk 600, will now be described. As previously noted, the CLR operator position is provided with a plurality of link cricuits, any one of which may be utilized in accepting a call to be answered by the CLR operator. These links may be selected for use automatically under control of the automatic control circuit 2601 or they may be selected for use by the operation of a talk key, such as the talk key K1377, individual to the desired link circuit as previously described.

Figure 25:
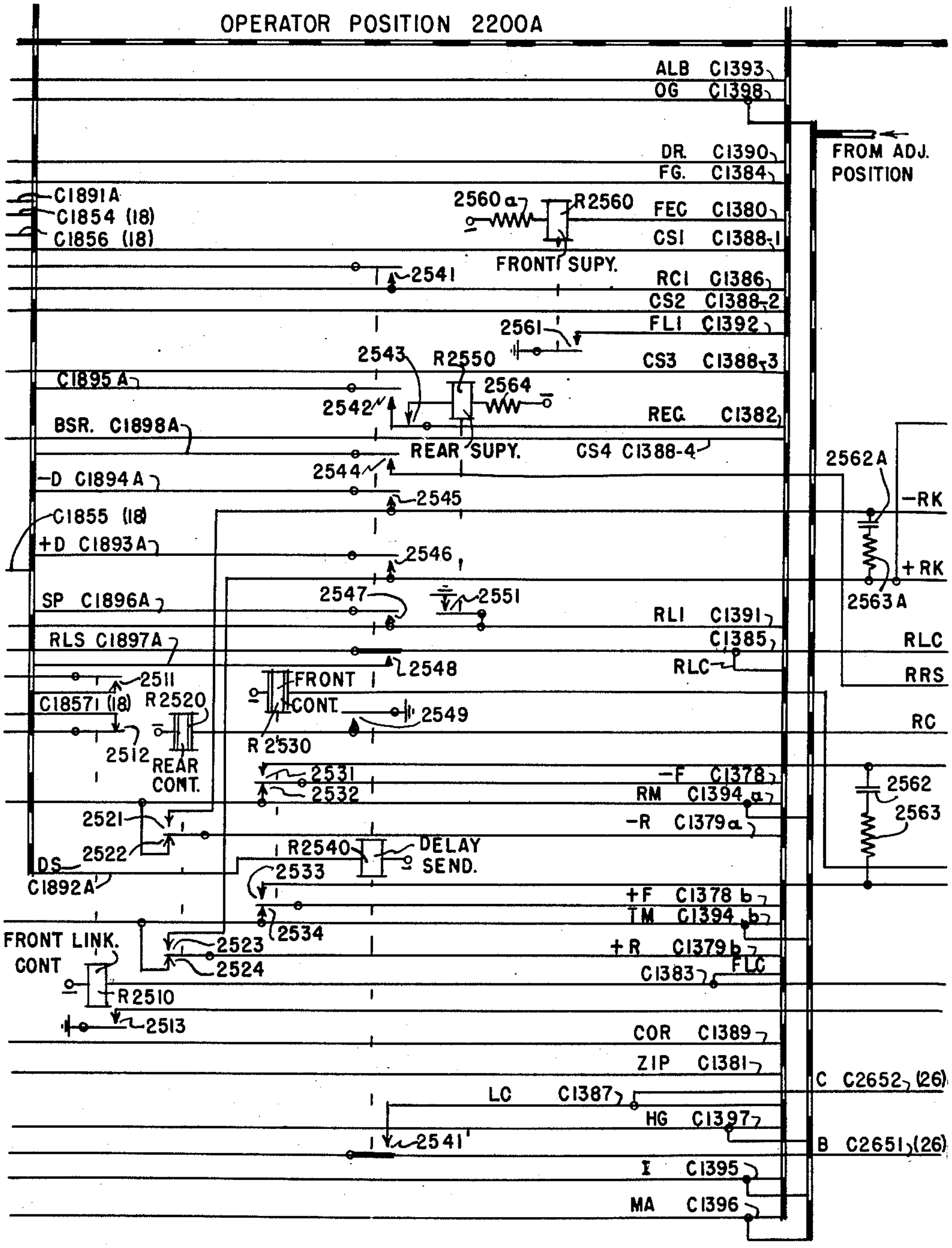

It will now be assumed that the operator position is arranged for automatic answering and under this condition, the automatic answer key K2301 (Fig. 23) is left in the position illustrated in the drawings. Referring now to the link 1300A, it will be noted that ground potential is applied via the normally closed contacts of the busy key K1313B, the contacts 1328, 1335' and 1368 to the ALB conductor C1393 extending to the operator position equipment (Fig. 25). This conductor is multiply connected to all of the links provided for use by the CLR operator. As long as any link, such as the link 1300A, is in an idle condition, the ground potential applied to the conductor C1393 is connected via the contacts 2363 and 2317, the contacts **2301*a* of the automatic answer key K2301 and then via the A1 conductor C2659 extending to Fig. 26, the contacts 2627 and the winding of the all links busy relay R2630, to battery. The last mentioned relay is provided to prevent the link distributor 2602 from searching for idle links when all of the links are busy. The operation of the relay R2630 over the above described circuit, at its contacts 2632, completes a circuit via the winding of the switching relay R2610, the interrupter contacts 2603 and the winding of the magnet M2603 of the link distributor 2602, to battery. The switching relay R2610 is arranged to operate in series with the magnet M2603 but the magnet will not operate in series with the switching relay. If the wipers 2604 and 2605 of the link distributor 2602, are standing in engagement with contacts terminating an idle link, the switching relay R2610 will immediately operate. However, if the wipers are engaging contacts terminating a busy link, the switching relay R2610 will be short-circuited and the magnet M2603 will be operated and released to advance the wipers into engagement with the next set of bank contacts. More specifically, if the wiper 2605 is in engagement with the grounded conductor, such as C2658, of a busy link, the ground potential is extended via the contacts 2617, 2631 and 2603 and the winding of the magnet M2603, to battery. In this circuit, the switching relay R2610 is short-circuited and the magnet operates and restores to advance the wipers 2604 and 2605 into engagement with the next set of bank contacts which terminates, for the purpose of this description, the conductors C2654 and 2658 extending to the link 1300A. In this position, the LDG conductor C2658 is not grounded and the magnet M2603 will not operate. However, the switching relay R2610 operates and completes a locking circuit for itself which may be traced from battery through the winding of the magnet M2603, the interrupter contacts 2603, the winding of the switching relay R2610, contacts 2613 and 2622, the E conductor C2653, extending to Fig. 23, and the contacts 2601*b* of the automatic answer key K2301, to ground. Also at its contacts 2614, the relay R2610 completes a circuit for seizing the link 1300A. This circuit may be traced from ground at contacts 2311 of the operated connect relay R2310 (Fig. 23) and then via contacts 2351, the A conductor C2655 extending to Fig. 26, contacts 2633 and 2614, the wiper 2604, the OG conductor C2654 extending to Fig. 13 and the lower winding of the talk relay R1340, to battery. The talk relay R1340 operates over the above circuit and marks the link 1300A** so that it will be selected by a link finder of a calling CLR trunk.

As a further result of the operation of relay R2610, at its contacts 2611, it completes a circuit for operating the talk relay R2350 in the operator position equipment 2200A in series with the multiply connected relays R1340 and R1350 in the link 1300A. This circuit may be traced from ground by way of the winding of the relay R2350 (Fig. 23), the B conductor C2651, the contacts 2611, the C conductor C2652, the LC conductor C1387 extending to Fig. 13, the contacts 1348 and the upper and lower windings of the relays R1340 and R1350 respectively, to battery. The relays R1350 and R2350 operate when the above mentioned circuit is completed and the relay R1340 is retained in its operated position over the circuit including its upper winding.

Referring now to the relay R2350, it will be noted that, at its contacts 2355 and 2357, it connects the operator telephone equipment 2300 to the connected link 1200A. At its contacts 2352, it completes a circuit for operating the distributor control relay R2320 and, at its contacts 2351, it removes ground potential from the conductor C2655 in order to interrupt the initial operating circuit for the lower winding of the talk relay R1340 in the connected link 1300A. The circuit over which the operator telephone equipment is connected to the link 1300A includes the conductors **C2300*a* and C2300*b*, the contacts 2355 and 2357, the contacts 2364 and 2366, the contacts 2473 and 2477, contacts 2522 and 2524, the −R and +R conductors C1379*a* and 1379*b* extending to Fig. 13, contacts 1342 and 1346 of the operated talk relay R1340 and then via the − and + conductors C761 and C762 to the bank contacts accessible to the link finders of the system. The above mentioned circuit connects the operator's headset and transmitter to the talking conductors of the link 1300A so that the operator may converse with the subscriber or operator that extends a call to the link 1300A**.

The circuit for operating the distributor control relay R2320, as a result of the operation of the talk relay R2350, may be traced from ground at contacts 2311 of the operated relay R2310 and then via the contacts 2352, 2412', 2512, 2379, 2472, and 2492, the upper winding of relay R2320 and the contacts of the busy key K2302, to battery. The distributor control relay R2320 operates over the above traced circuit and, at its contacts 2324, it completes a locking circuit for itself which is independent of the contacts 2472 and 2492 included in the original operating circuit for the relay. At its contacts 2322, 2325, 2326 and 2327, the relay R2320 prepares circuits for the gate control equipment, illustrated in Fig. 22, which circuits become effective to distribute an incoming call to the preselected link 1300A.

The operator position equipment is now in condition to respond when a call is distributed to the link 1300A in the manner to be described hereinafter. However, before describing the extension of a call to the link 1300A, the circuits prepared by the operations of the relays R1340 and R1350 will now be described.

Referring again to the relay R1340 in the link 1300A, it will be recalled that it actuated its contacts 1342 and 1346 in order to connect the incoming talking conductors C761 and C762 to the conductors **C1379*a* and C1379*b* extending to the operator position equipment 2200A. In addition to the foregoing, at its contacts 1342' and 1344', it disconnects the busy marking ground potential from the conductors C763–C1 and C1795; and, at its contacts 1341' and 1343', it connects the conductors C763–C1 and C1795 via the conductors C1388–1 and C1389** to the operator position equipment. Finally, at its contacts 1345', it prepares a point in a circuit, traced hereinafter, for illuminating the link busy lamp L1372. The remaining contacts, controlled in response to the operation of the relay R1340, are of no importance at the present time.

Referring now to the class control relay R1350, which is now operated in multiple with the relay R1340, it will be seen that this relay prepares various circuits in order to condition the link 1300A for subsequent operations. More specifically, at its contacts 1354, the relay R1350 connects the EC conductor C764 via the contacts 1322, the zip conductor C1381, the contacts 2416' and 2373' and the upper winding of the tone control relay R2470, to battery. This relay, however, will not operate until the calling trunk is connected to the link 1300A. At its contacts 1359, 1352' and 1354', the relay R1350 disconnects the busy marking ground potentials from the control conductors C763–C2, C763–C3 and C763–C4 and connects these control conductors, at its contacts 1358, 1351' and 1353', to the conductors C1388–2, C1388–3 and C1388–4 extending to the operator position equipment. At its contacts 1356' and 1357', the relay R1350 prepares points in the circuits for controlling respectively the rear supervisory lamp L1312 and the front supervisory lamp L1373. Finally, at its contacts 1357, the relay R1350 prepares a circuit for controlling the rear link relay R1320.

The link circuit 1300A is now in condition to be selected by any link finder associated with any trunk, such as the CLR trunk 600, the inward trunk 300, the ring-down trunk 800, and the TX trunk 1000. Consequently, the conductors C761, C762 and C764 are multiply connected to the bank contacts accessible to the link finders 301, 700, 700A, 900 and 1100. The C763–C1, C763–C2, C763–C3 and C763–C4 control conductors individual to the link 1300A are multiply connected to the different groups of link finder banks in the following manner. The control conductor C763–C1 is connected via the contacts 1211 of the night transfer relay R1210 and the conductor C763 to all of the link finders, such as the link finder 700, associated with the CLR trunks, that are accessible to local subscribers by way of the tenth level of the local first selector 103. The control conductor C763–C2 is connected by way of contacts 1213 of the night transfer relay R1210 and the conductor C765 to all of the link finders, such as the link finder 700A, associated with the CLR trunk circuits which are only accessible to calls originated by subscribers in the local CAX 208. The control conductor C763–C3 is connected via contacts 1215 of the night transfer relay R1210 and the conductor C974 to all of the link finders, such as the link finders 301 and 900, associated with the inward trunks and the toll ring-down trunks. Finally, the control conductor C763–C4 is connected via the contacts 1217 of the night transfer relay R1210 and the conductor C1174 to all of the link finders, such as the link finder 1100, associated with the TX trunks.

With this arrangement, any one of the aforementioned trunks has access via its associated link finder to the link 1300A. However, the control conductors C763–C1 to C763–C4 may be selectively marked when the link 1300A is made available so that the link finder of only a particular selected group or groups of trunks may select the link 1300A. The remaining control conducters will be marked with a direct ground potential in order to indicate to the unselected trunk groups that the link 1300A is busy. Furthermore, depending upon the trunk circuit that is connected to the link 1300A through the associated link finder, a circuit will be completed for controlling the operator position equipment so that a lamp thereat will be illuminated to indicate whether the call is a CLR call that originated at a local subscriber substation, is a CLR call that originated at the CAX 208, is an inward toll call, or is a TX trunk call. By this arrangement, the operator is informed as to the class of the toll call received at her position.

Figure 23:
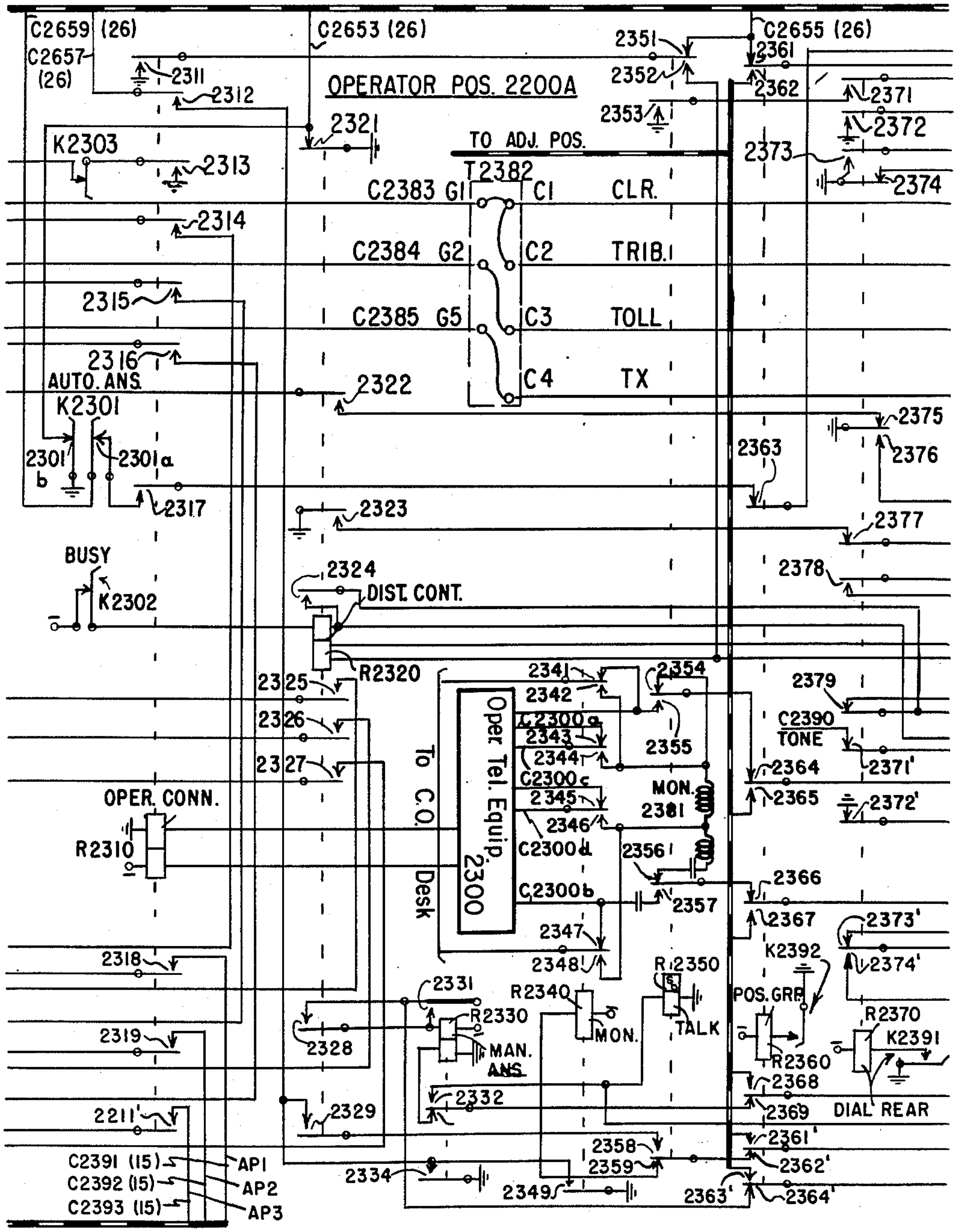
Figure 24:
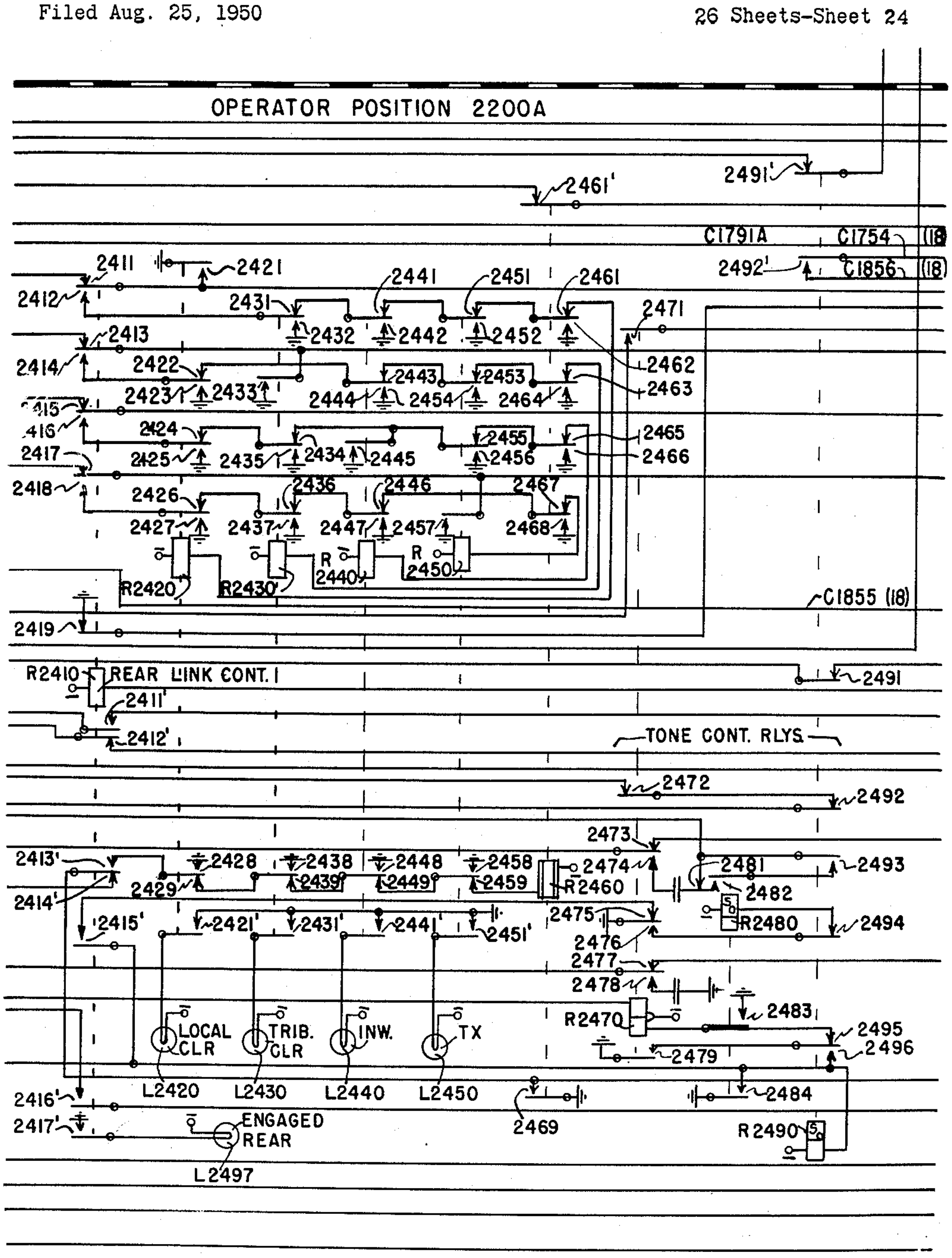

Referring now to Fig. 23 of the operator position equipment 2200A, it will be seen that the conductors C1388–C1 to C1388–C4 are normally connected to terminals C1 to C4 respectively on the terminal block T2382. These conductors are jumpered, as shown, to the left-hand terminals G1 to G3, inclusive, which respectively terminate the conductors C2383, C2384 and C2385. The last mentioned conductors are normally grounded, respectively, at contacts 2251 of the CLR control relay R2250, at contacts 2261 of the inward control relay R2260 and at contacts 2271 of the TX control relay R2270.

In the present system, the toll switchboard handles three main groups of toll calls, that is, CLR, inward and TX calls. The CLR group is subdivided into local CLR and tributary CLR groups. The local CLR group is provided for handling calls originated by local subscribers in exchange 100 and the tributary CLR group is provided for handling calls originated by subscribers in the CAX 208. The CLR trunks over which these calls are routed to the CLR operator position are separately grouped so that the CLR operator is selectively signalled to indicate whether a local or a tributary subscriber originated the call. The inward group includes inward trunks for handling toll calls originated at distant exchanges provided with dial equipment and ring-down trunks for handling toll calls originated at distant manual exchanges. The inward trunks and ring-down trunks are, however, grouped together so that calls received over these trunks are routed to the inward operator position and the operator thereat is selectively signalled to indicate that a toll call has been received from either a distant dial exchange or a distant manual exchange. The TX group includes the TX trunks over which calls are routed to the TX operator position and the operator thereat is selectively signalled to indicate that a TX call has been received.

The CLR, inward and TX control relays R2250, R2260 and R2270 are each selectively controlled, when the operator position is arranged to handle all three groups of calls, to remove a busy marking ground potential from the conductor C2383, C2384 or C2385 in accordance with the class of the trunk circuit that has been seized to extend the call to the operator position. When ground potential is removed from any one of the above mentioned conductors, the selected link at the operator position is simultaneously conditioned so that it can be selected only by the link finder of a trunk circuit of a corresponding toll class. With this arrangement the class indicator relays R2420, R2430, R2440 or R2450 will be selectively operated in order to illuminate the corresponding class indicator lamp so that the toll operator will receive a signal indicative of the particular class of the trunk connected to her link.

The link 1300A and the operator position equipment 2200A are now conditioned to receive CLR trunk calls from either a local subscriber in exchange 100 or from a subscriber in the CAX 208.

*Call from the subscriber at substation T1 in the central office 100 to the CLR toll operator*

In order to describe the manner in which calls originated in the central office 100 are extended to the CLR operator position 2200A, it will be assumed that the subscriber at substation T1 desires to extend a connection to the CLR operator position. Referring to Fig. 12, it will be seen that when the subscriber at substation T1 removes his receiver, the schematically illustrated line circuit 106 and the rotary line switch 107 cooperate in the well-known manner to associate the calling subscriber line with the local first selector 103. The selector will transmit the usual dial tone signal to the calling subscriber and the subscriber will thereafter dial the single digit 0 into the selector 103. In response to the dialing of the digit 0, the selector will raise its wipers in a vertical direction in the well-known manner to the tenth level of the associated contact banks. Thereafter, the wipers will automatically rotate over the contacts in the tenth level to search for an idle trunk line connected to an idle CLR trunk circuit.

In the present description, it will be assumed that the selector 103 selects the CLR trunk 600 (Fig. 6) over the cable 680. The CLR trunk 600 is marked idle by battery potential applied to the C conductor C683 in the cable 680 through the winding of the tone control relay R730 and by an absence of ground potential on the conductor C683. It should be understood, however, that the selector 103 is of the battery searching type in that an idle CLR trunk circuit is indicated by a battery potential applied to the conductor C683. Accordingly, when the selector 103 seizes the CLR trunk 600, a loop circuit including the calling subscriber line, the line circuit 106, the rotary line switch 107, the selector 103, the − and + conductors C681 and C682 of the cable 680, the contacts 615 and 617, the upper and lower left-hand windings of the repeating coil 645, and the upper and lower windings of the line relay R640, to battery and ground respectively, is completed for operating the relay R640. The tone control relay R730 also operates but it performs no function at this time. As soon as the line relay R640 operates, it returns ground potential via the contacts 642 and 713 to the C conductor C683 in order to retain the selector 103, the rotary line switch 107 and the line circuit 106 in their operated positions and to mark the CLR trunk 600 busy to other switching apparatus having access thereto. Also at its contacts 641, the relay R640 disconnects the line termination circuit including the condenser 638 and the resistor 637 from across the — and + conductors C681 and C682. At its contacts 643, the relay R640 completes a circuit from ground at contacts 752 for operating the hold relay R630.

In response to the operation of the hold relay R630, at its contacts 631, it connects the ring-back tone conductor C647 by way of the condenser 646 to the — conductor C681 in order to transmit a ring-back tone signal to the calling subscriber and thus indicate that the operator is being signalled. At its contacts 632, the relay R630 interrupts the circuit of the tone control relay R730 which now restores to normal and, at its contacts 633, it applies an additional ground potential to the conductor C683. At its contacts 636, the relay R630 completes a circuit for illuminating the call waiting lamp L628 to indicate to the CLR operator that a call has been received and is waiting to be answered. At its contacts 635, the relay R630 applies ground potential to the EGT1 conductor C654 extending to Fig. 22. The application of ground potential to the conductor C654 is only effective in the event that the operator has operated the emergency start key K2290 at her position to cause a waiting call to be connected to a link at her position, in the manner to be described hereinafter. Finally, the relay R630, at its contacts 634, connects the gate control relay R620 to the GC conductor C655 extending to Fig. 15. The conductor C655 will be grounded by the CLR trunk distributor 1600A, provided the latter circuit is in an idle condition.

It will be assumed that the CLR trunk distributor 1600A is idle. The circuit for operating the gate control relay R620 will now be completed over a path which may be traced from battery, the winding of the relay R620, the contacts 717, 634 and 622, the GC1 conductor C655 extending to Fig. 15, the contacts 1546 of the normally operated connect relay R1540 and the contact 1613, to ground. As soon as the gate control relay R620 operates, at its contacts 621 and 622, it completes an obvious locking circuit for itself and simultaneously opens its initial operating circuit including the grounded conductor C655. At its contacts 625 and 627, the relay R620 removes ground potential from the conductors C657 and C658 which terminate in the bank contacts of the trunk finder 1660 thereby to mark the particular CLR trunk circuit 600 as the calling trunk to the trunk distributor 1600A. Also at its contacts 624, the relay R620 connects the lower winding of the test relay R660 to the GD1 conductor C657 extending to Fig. 16 and, at its contacts 626, it applies ground potential to the ST1 conductor C656 extending to Fig. 15 in order to complete an operating circuit for the start relay R1610 in the CLR trunk distributor 1600A.

Before describing the circuit for operating the relay R1610, attention is directed to the trunk distributor common equipment 1590, Fig. 15, and the trunk distributors 1600A, 1600B and 1600C, Fig. 16. These circuits are provided in duplicate and, as is illustrated in Fig. 15, the connect relay R1540 is normally operated over a circuit including the contacts 1551, the terminals B and C1 on the terminal block 1592 and ground in the duplicate distributor equipment 1590A. Consequently, the connect relay R1540 actuates all of its armatures to connect the above mentioned trunk distributors to the operator position equipment 2200A, which in the present description is assumed to be the CLR position, and to the inward and TX operator positions 2200B and 2200C. If any fault should occur in the operation of the trunk distributor common equipment 1590 or the trunk distributors 1600A, 1600B and 1600C, an alarm will be sounded at the toll switchboard and the toll operator, by actuation of a key, may cause the duplicate distributor 1590A to be brought into operation and simultaneously therewith disconnect the trunk distributor common equipment 1590 and the trunk distributors 1600A to 1600C, inclusive.

However, in the present case, it will be assumed that the circuits are operating properly and that the connect relay R1540 is in its operated position. Accordingly, when the gate control relay R620 in the CLR trunk 600 operates and applies ground potential to the conductor C656 extending to Fig. 15, a circuit is completed via the operated contacts 1547 of the connect relay R1540, the contacts 1564 and the winding of the start relay R1610, to battery. The start relay R1610 now operates and, at its contacts 1613, disconnects ground potential from the conductor C655 extending to Fig. 6 thereby to interrupt the multiple circuits for controlling the gate control relays, such as the relay R620, provided in all of the other CLR trunks, to lock-out calls on such trunks and prevent them from connecting with the trunk distributor 1600A. If more than one CLR trunk has a waiting call, the gate control relays thereat will also operate to lock-in such calls for distribution by the distributor 1600A, one at a time. At its contacts 1616, the relay R1610 applies ground potential via the conductor C2216 extending to Fig. 22, the night alarm key K2217 and the winding of the night alarm buzzer B2215, to battery. During light load traffic periods, such as would occur during late evening hours, the night alarm key K2217 is in its operated position to complete the above described circuit for the buzzer B2215 so that an audible signal will be given to call the operator's attention to the fact that a call has been received. At its contacts 1615, the relay R1610 applies ground potential via the AP1 conductor C2391 extending to Fig. 23, the contacts 2318 of the operator connect relay R2310, the contacts 2285*b* of the CLR key K2285 and the CLR answer pilot lamp, to battery. The lamp L2285 will thereupon be illuminated to indicate to the CLR operator that a call has been received and must be answered in the manner to be described hereinafter. At its contacts 1614, the start relay R1610 applies ground potential via the PG1 conductor C2227 extending to Fig. 22, the contacts 2290*h* of the emergency start relay R2290, the contacts 2285*a* of the CLR key K2285, the contacts 2314 and 2211 and the winding of the CLR gate relay R2220, to battery.

The gate relay R2220 operates at the present time and locks itself, at its contacts 2222, over the above traced circuit in multiple with the contact 2211. At its contacts 2221, the relay R2220 interrupts a point in the circuit for the gate control relay R2210 which slowly restores to normal. At its contacts 2223, the relay R2220 completes a circuit for the CLR control relay R2250. Before tracing the latter circuit, it should be noted that when the slow-to-release gate control relay R2210 restores to normal, at its contacts 2211, 2212 and 2213, it interrupts the circuits for controlling the CLR gate relay R2220, the inward gate relay R2230 and the TX gate relay R2240. Accordingly, the relays R2230 and R2240 cannot be operated to prepare the operator position to receive calls of the corresponding classes of service until the circuit for the gate control relay R2210 is again completed. It should also be noted that the relays R2250, R2260 and R2270 are included as part of the gate control circuit to provide preferential answering in the three classes of service in accordance with the jumpering arrangements provided on the terminal block T2218.

In the present example, however, when the contacts 2223 are closed, a circuit is completed from ground at contacts 2375, contacts 2322 and 2223, the winding of the CLR control relay R2250, contacts 2254, terminals CC and CO3, contacts 2272, terminals CI3 and CO3, contacts 2262, terminals CI2 and CO1, contacts 2252, terminals CI1 and CB and the resistor 2214, to battery. The relay R2250 operates over the above described circuit and immediately closes its "X" contacts 2253 thereby to complete a locking circuit for itself which now includes the terminal CI1 and CB, the resistor 2214 and battery. At its contacts 2252 and 2254, the relay thereafter interrupts points in the previously described initial operating circuit. At its contacts 2255, the relay R2250 completes a circuit via the contacts 2325 and 2285*c*, the PA1 conductor C2237 extending to Fig. 15, the contacts 1548 and the winding of the position answer relay R1640, to battery. The relay R1640 now operates to prepare, at its contacts 1641, a circuit for controlling a test relay in the CLR trunk which is subsequently found by the trunk finder 1660 and it prepares, at its contacts 1642, a point in the circuit for the timer relay R1650. Finally, at its contacts 2251, the CLR control relay R2250 removes ground potential from circuits traced hereinafter for marking the pre-selected link 1300A, at the CLR operator position, so that it will be found by the link finder 700 of the CLR trunk 600.

Referring again to the start relay R1610 and the circuits controlled as a result of its operation, it will be seen that at its contacts 1612, it connects ground potential via the contacts 1625, the winding of the slow-to-release switching relay R1630, the interrupter contacts 1664 and the winding of the rotary magnet M1663, to battery. In the above traced circuit, the switching relay R1630 would normally operate in series with the magnet M1663 but the magnet M1663 would not operate due to the high resistance of the switching relay R1630. If the wiper 1662 of the trunk finder 1660 is in engagement with a contact terminating a ground conductor, such as the GD1 conductor C657, this ground potential will be connected via the contacts 1611, 1633, 1624 and 1664 and the winding of the magnet M1663, to battery. Accordingly, the relay R1630 will be short-circuited and will not operate. The magnet M1663, however, will operate and interrupt its initial circuit at its contacts 1664 and thus restore to normal. Upon restoring, the magnet advances its wipers 1661 and 1662 an additional step. This interaction continues until the wiper 1662 fails to find ground potential whereupon the switching relay R1630 will operate in series with the magnet M1663 over the previously traced circuit. In this manner, the trunk finder 1660 searches for the CLR trunk 600 which has been selected by the calling subscriber at substation T1.

It may be well to mention at this time, however, that several CLR trunk circuits, such as the trunk 600, may have been seized and these trunk circuits will be locked-in for answering under control of the associated gate control relays, such as the relay R620. However, after the start relay R1610 in the trunk distributor 1600A is operated, subsequently seized CLR trunk circuits are temporarily locked-out and thus prevented from being distributed to the CLR operator positions until all of the locked-in calls have been distributed and answered. This method of accepting calls for answering may be referred to as the group marking method in that the trunk circuits are marked for answering by the ground potential applied to the conductor C655 which operates the gate control relay R620. All trunk circuits that have the gate control relay, such as the relay R620, operated will be locked-in as a group and they will be allotted to the CLR operator posititions before any additional trunks can be marked for answering. In other words, calls received on the CLR trunks after ground potential is removed from the conductor C655 will be held in abeyance until the trunk distributor 1600A has allotted the CLR trunks already marked. After the locked-in CLR trunk calls have been answered, the gate will be opened to allow those trunks held in abeyance to be locked-in and marked for answering.

The trunk finder 1660 continues to advance its wipers over the associated bank contacts to search for a conductor, such as the conductor C657, which has battery potential applied thereto instead of ground potential. In this connection, attention is directed to the fact that ground potential is normally applied to the contacts accessible to the wiper 1662 by all of the CLR trunks and that as soon as a CLR trunk is locked-in for answering, battery potential is substituted for the normal ground potential in order to mark the associated bank contact as one that terminates a CLR trunk call that is to be answered. It will be assumed that the first CLR trunk that is found in a calling condition is the CLR trunk 600. Consequently, when the wiper 1662 engages the contact terminating the conductor C657, no ground potential will be encountered and the switching relay R1630 now operates in series with the magnet M1663, as previously noted. At its contacts 1631, the relay R1630 connects the step relay R1620 to the wiper 1661 which now stands in engagement with the contact terminating the AD1 conductor C658 extending to Fig. 6. The circuit is not completed for the relay R1620 until certain operations are performed in the CLR trunk 600 which is now connected to the trunk distributor 1600A via the conductors C657 and C658. At its contacts 1634, the relay R1630 completes a circuit which may be traced from ground via the contacts 1562, 1641, 1634 and 1611, the wiper 1662, the GD1 conductor C657 extending to Fig. 6, the contacts 624 and the lower winding of the test relay R660 in the CLR trunk 600, to battery. The relay R660 operates over the above traced circuit and completes circuits for controlling the link finder 700 to search for and find the preselected idle link 1300A at the CLR operator position 2200A. Finally, the relay R1630, at its contacts 1635, 1636 and 1637, prepares circuits for controlling the timer relay R1650 and the time pulse relay R1560 whereby an alarm signal is given if the call waiting on the CLR trunk 600 is not answered by the CLR operator within a predetermined elapsed time interval.

In view of the foregoing description of operation of the CLR trunk 600, the trunk distributor 1600A and the gate control circuit of Fig. 5 included in the operator position equipment 2200A, it should be understood that the link finder 700 associated with the CLR trunk 600 will not operate to search for an idle link at a CLR operator position until the gate control circuit has functioned to lock-in the call received on the CLR trunk 600 and the trunk distributor 1600A has found the calling CLR trunk.

Returning again to the test relay R660 in the CLR trunk 600, it will be noted that when the relay operates it completes, at its contacts 663, a circuit including the winding of the switching relay R710, the interrupter contacts 706 and the winding of the magnet M705, to battery. The relay R710 will normally operate over the traced circuit in series with the magnet M705 but the magnet M705 will not operate due to the high resistance of the relay R710. Also, at its contacts 662, the relay R660 connects the wiper 703 via the contacts 711′, 662 and 706 to the winding of the magnet M705. The last mentioned circuit is provided to directly control the magnet M705 and simultaneously to short-circuit the switching relay R710 as long as the wiper 703 encounters ground potential on one of the associated bank contacts. Accordingly, it will be understood that the magnet M705 of the link finder 700 will advance the wipers 701 to 703, inclusive, step-by-step over the associated contact banks until the wiper 703 engages a contact which is marked by an absence of ground potential. In other words, all of the links accessible to the link finder 700, except the one on which an idle CLR operator is waiting to answer the call, are marked busy by ground potential. The magnet M705, in conjunction with the interrupter contacts 706, will advance the above mentioned wipers step-by-step until the wiper 703 engages the contact terminating the conductor C763 of the preselected idle link 1300A. When this occurs, the short-circuit will be removed from the switching relay R710 and it will operate in series with the magnet M705 and thereby terminate the step-by-step operation of the link finder 700.

In response to the operation of the switching relay R710, at its contacts 711 and 712, it connects the right-hand windings of the repeating coil 645 to the wipers 701 and 702 of the link finder 700. At its contacts 713 and 714, the relay R710 disconnects the direct ground potential, at contacts 642, from the C conductor C683 and connects thereto the ground potential through the lower winding of the tone relay R740. With this transfer, the preceeding switches included in the connection to the calling subscriber line are now held in their operated positions by the resistance ground including the lower winding of relay R740. At its contacts 717, the relay R710 interrupts a point in the circuit for the gate control relay R670 which now restores to normal; at its contacts 719, it completes a locking circuit for the lower winding of the test relay R660; at its contacts 712′, it applies direct ground potential to the wiper 703; and, at its contacts 713′, it connects the windings of the supervisory relay R750 to the wiper 704.

Before proceeding with the operations which result from the circuits completed to the wipers 701 to 704, inclusive, the circuit controls which follow the restoration of the gate control relay R620 will first be described. The restoration of the relay R620, at its contacts 626, removes ground potential from the ST1 conductor C656 extended to Fig. 15 thereby to interrupt the circuit for the start relay R1610 at the trunk distributor 1600A. This relay will restore to normal if no other CLR trunk circuit is locked-in for answering. At its contacts 627, the relay R620 applies ground potential to the AD1 conductor C658 extending to Fig. 16 and then via the wiper 1661, the contacts 1631 and 1621 and the winding of the step relay R1620, to battery. At the same time, at its contacts 625, the relay R620 applies ground potential to the GD1 conductor C657 extending to Fig. 16 thereby to mark the bank contact, engaged by the wiper 1662 of the trunk finder 1600, busy. When the step relay R1620 operates, it completes a locking circuit for itself by way of its contacts 1622 and ground at contacts 1632. At its contacts 1623, it completes an obvious circuit for operating the magnet M1663 and, at its contacts 1625, it interrupts the circuit for the switching relay R1630 which slowly restores to normal. When the relay R1630 restores to normal it interrupts, at its contacts 1631 and 1632, the circuits for the step relay R1620 which also restores to normal and it interrupts, at its contacts 1635 to 1637, inclusive, the previously mentioned circuits for controlling the timer relay R1650 and the time pulse relay R1560. When the relay R1620 restores to normal, at its contacts 1623, it interrupts the circuit for the magnet M1663 which now restores to normal and advances the wipers 1661 and 1662 one step into engagement with the next set of bank contacts. At this point, it may be well to mention again that if the start relay R1610 is retained in its operated position by other CLR trunks that are locked-in for answering, the magnet M1663 will be controlled in the manner previously described to advance the wipers 1661 and 1662 to search for and find the next CLR trunk on which a call is waiting. The details of the circuit operations for finding the trunk upon which a call is to be answered is the same as has been previously described.

Referring again to the CLR trunk circuit 600, it will be recalled that when the wiper 703 of the link finder 700 engaged the contact terminating the conductor C763 extending to the idle link 1300A, the switching relay R710 operated and terminated the stepping action of the magnet M705. As soon as the relay R710 operates, at its contacts 713', it connects both windings of the supervisory relay R750 to the wiper 704 in order to control the transmission of a zip-zip tone signal to the CLR operator. The circuit for controlling the supervisory relay R750 may be traced from ground via the high resistance lower winding and the low resistance upper winding of the relay R750, contacts 713', the wiper 704, the EC conductor C764 in the cable 760 extending to Fig. 9, the cable 970 extending to Fig. 10, cable 1170 extending to Fig. 12, conductor C764 extending to Fig. 13, contacts 1354 of the operated class connect relay R1350, contacts 1322, the zip conductor C1381, contacts 2416' and 2373' and the upper winding of the tone control relay R2470, to battery. The relays R2470 and R750 operate in series over the above traced circuit.

Consideration will first be given to the operation of relay R2470 whereby a zip-zip tone signal is transmitted to the CLR operator. When the relay R2470 operates, it completes a locking circuit for itself which includes its lower winding, the contacts 2495 and ground at the "X" contacts 2479. At its contacts 2471, the relay R2470 completes a circuit traced hereinafter for operating the rear link relay R1320. At its contacts 2476, the relay R2470 completes a circuit via the contacts 2494 for operating the tone control relay R2480. Finally, at its contacts 2474, the relay R2470 completes a circuit for transmitting the tone signal to the operator's headset. The last mentioned circuit may be traced from the tone conductor C2390 and then via the contacts 2371', 2481, the condenser, contacts 2474, 2364 and 2355 and the conductor C2300a to the operator telephone equipment 2300. This tone signal is maintained on the above traced circuit until the slow-to-operate relay R2480 finally operates and interrupts the circuit at contacts 2481. As a further result of the operation of relay R2480, at its contacts 2483, it completes a holding circuit for the lower winding of relay R2470 and, at its contacts 2484, it completes an obvious circuit for operating the slow-to-operate tone control relay R2490. The relay R2490 upon operating, at its contacts 2396, locks itself to ground at contacts 2479. At its contacts 2493, the relay R2490 reconnects the tone conductor C2390 via the contacts 2482 to the operator telephone equipment 2300 thereby to give the operator a second tone signal. Finally, at its contacts 2494, the relay R2490 interrupts the circuit for the relay R2480 which now restores to normal. The relay R2480 restores to normal and, at its contacts 2482, interrupts the tone signal circuit in order to terminate the second tone signal transmitted to the operator telephone equipment 2300. At its contacts 2483, the relay R2480 opens the holding circuit for the relay R2470 and, at its contacts 2484, it interrupts the holding circuit for the relay R2490. However, the relay R2490 is now retained in its operated position over a circuit including the contacts 2415' of the now operated rear link control relay R2410 and ground at contacts 2475 of the now restored relay R2470. In other words, between the time that the relay R2470 first operated and the ultimate operation of relay R2490, the rear link control relay R2410 has been operated under control of the rear link relay R1320 in the link 1300A.

The foregoing operations of the relays R2470, R2480 and R2490 cause two pulses of the tone signal on the conductor C2390 to be transmitted to the operator telephone equipment 2300 to indicate that a calling trunk has been connected to the link 1300A. During the operated period of the relay R2470, the contacts 2473 and 2477 disconnect the —R and +R conductors C1379*a* and C1379*b* so that the two pulses of the tone signal, that is the zip-zip tone, will not be heard by the calling subscriber.

When the tone control relay R2470 initially operates, it completes, at its contacts 2471, a circuit which may be traced from ground at the contacts 2323 and then via the contacts 2377 and 2471, the RC1 conductor C1386, the contacts 1357 and the lower winding of the rear link relay R1320, to battery. The rear link relay R1320 operates, as soon as the above traced circuit is completed and, at its contacts 1324, completes a locking circuit for itself which includes its upper winding and the resistor 1329. As a further result of the operation of relay R1320, at its contacts 1323, it transfers the conductor C764 from the zip conductor C1381 to the REC conductor C1382. The conductor C1382 is included in the circuit of the rear supervisory relay R2550 at the operator position equipment 2200A but due to the high resistance of the upper and lower windings of the supervisory relay R750 in the calling CLR trunk 600, which is connected to the conductor C764, the relay R2550 does not operate at the present time. At its contacts 1326, the relay R1320 completes a circuit for the link busy lamp L1372 which may be traced from battery via the lamp L1372, the contacts 1326 and 1345', the BL1 conductor C2656 extending to Fig. 26, the contacts 2323 to the 60IPM conductor C2628. This conductor transmits ground pulses at the rate of 60 per minute and thereby causes the link busy lamp L1372 to flash during the period that the link 1300A is connected to the operator position equipment 2200A. At its contacts 1328, the relay R1320 removes ground potential from the ALB conductor C1393 extending to the all links busy relay R2630 thereby to provide the automatic control circuit 2601 with an indication that at least one of the links at the CLR operator position is not available for use. Finally, at its contacts 1327, the relay R1320 applies ground potential at the busy key K1313B to the LGD conductor C2658 extending to Fig. 26 thereby to mark the link 1300A as busy in the banks of the link distributor 2602.

When the relay R1320 operated and locked itself over the circuit including its contacts 1324, it also completed a circuit which may be traced from ground via the contacts 1324, the upper winding of relay R1320, the contacts 1356, the RLC conductor C1385 and the winding of the rear link control relay R2410, to battery. The relay R2410 now operates and it completes, at its contacts 2415', the previously described circuit for holding the tone control relay R2490 in its operated position. From the foregoing, it will be understood that between the initial operation of the tone control relay R2470 and the subsequent operation of the tone control relay R2490, the rear link relay R1320 in the link 1300A is operated and the rear link control relay R2410, in the operator position 2200A, is operated. As a further result of the operation of relay R2410, at its contacts 2412, 2414, 2416 and 2418, it connects the class indicating relays R2420, R2430, R2440 and R2450 to the respective class conductors C1388-1, C1388-2, C1388-3 and C1388-4. At its contacts 2412', the relay R2410 interrupts the circuit for the distributor connect relay R2320 which now restores to normal and, at its contacts 2417', it completes a circuit for illuminating the engaged rear lamp L2497 thereby to indicate to the CLR operator that the operator position equipment 2200A is now connected to the rear of the link 1300A. This lamp will remain in its illuminated condition as long as the operator position is connected to the rear of the link 1300A.

The foregoing operations have all resulted from the connection of the supervisory relay R750 in the CLR trunk 600 to the conductor C764 of the preselected link 1300A by the operation of the switching relay R710.

Returning again to the CLR trunk circuit 600, it will be noted that when the relay R710 operates, as previously explained, it completes a circuit which may be traced from ground via the contacts 712', the wiper 703, the conductor C763 in the cable 760 extending to Fig. 9, the cable 970 extending to Fig. 10, the cable 1170 extending to Fig. 12, the contacts 1211, the conductor C763–C1, the contacts 1341' of the operated relay R1340, the conductor C1388–1, the contacts 2412, 2431, 2441, 2451, 2461 and the winding of the class indicator relay R2420, to battery. The relay R2420 operates over this circuit and completes a locking circuit for itself from ground at contacts 2421 and simultaneously therewith the ground is applied by the conductor C1388–1 back over the previously traced circuit to the contact engaged by the wiper 703 of the link finder 700, thereby to mark the link 1300A busy to all CLR trunk circuits, such as the trunk 600. In addition to the foregoing, the relay R2420, at its contacts 2422, 2424 and 2426, disconnects the class indicator relays R2430, R2440 and R3450 from the class conductors C1388–2, C1388–3 and C1388–4. At its contacts 2423, 2425 and 2427, the relay R2420 applies ground potential to the above mentioned class conductors extending to the link 1300A. These conductors are connected via contacts of the operated class control relay R1350 to the conductors C763–C2, C763–C3 and C763–C4 extending to Fig. 12 and then via the contacts 1213, 1215 and 1217 to the conductors C765, C974 and C1174 respectively. The conductor C765 is extended via the cable 1170, the cable 970 and the cable 760 to the link finder 700A associated with the CLR trunk 600A. All of the CLR trunks, such as the trunk 600A, are accessible to subscribers in the CAX 208 and are classified as tributary CLR trunks. These trunks are grouped together and the control conductor C765, individual to the link 1300A, is multiply connected to all of the CLR trunks in this group. Accordingly, at the present time, the tributary group of CLR trunks cannot select the busy link 1300A. The conductor C974 is extended via the cable 1170, and the cable 970 to the bank contacts of the link finder 900 individual to the toll ring-down trunk 800 and then via the cable 760, and the cable 395 to the bank contact of the link finder 301 individual to the inward trunk 300. This conductor is multiply connected to corresponding contacts of the link finders associated with all ring-down trunks, such as the trunk 800, and all inward trunks, such as the trunk 300. Accordingly, the ground potential applied to the conductor C974 busies the link 1300A to the link finders associated with both ring-down and inward trunks. The conductor C1174 is extended via the cable 1170 to the bank contact of the link finder 1100 associated with the TX trunk 1000 and it is multiply connected to corresponding bank contacts of all of the other TX trunks in the group. Accordingly, the ground potential applied to the conductor C1174 busies the link 1300A to all link finders associated with TX trunks.

As a further result of the operation of the class indicator relay R2420, at its contacts 2428, it applies ground potential via the contacts 2413', the CDR conductor C1389, the contacts 1343', the conductor C1795 extending to Fig. 17 and the bank contact accessible to the wiper 1706 of the link finder 1701 and to all similar link finders associated with the delay selector link finders. Accordingly, the link 1300A is also marked busy to all link finders associated with delay call selectors, such as the selector 113. Finally, at its contacts 2421', the class indicator relay R2420 completes an obvious circuit for illuminating the local CLR lamp L2420 thereby to indicate to the CLR operator that the call connected to the link 1300A is one that originated at a local subscriber substation in the central office 100.

Returning again to the CLR trunk circuit 600, it will be recalled that the supervisory relay R750 operated when the initial circuit was completed for controlling the tone control relay R2470 to transmit the zip-zip tone signal to the CLR operator. As soon as the relay R750 operates, it completes, at its contacts 753, a circuit for retaining the switching relay R710 operated in series with the magnet M705. At its contacts 752, the relay R750 interrupts a circuit for the hold relay R630 which restores to normal as previously explained, and, at its contacts 751, it completes a circuit including the contacts 716, 652 and 727 for operating the tone control relay R730. The relay R730 now operates and, at its contacts 731, connects the upper winding of the tone relay R740 across the — and + conductors C761 and C762. Finally, the relay R730 actuates its weighted spring contacts 732 which start vibrating to intermittently close and open its contacts. The first time the contacts 732 are closed, a circuit is completed from ground at contacts 751 and via the contacts 716, 652, 732 and 718 and the winding of the tone control relay R720, to battery. Due to the slow-to-operate characteristics of the relay R720, it will not operate until the vibrating spring contacts 732 finally come to rest in a closed position. When this occurs, the relay R720 operates and, at its contacts 725, disconnects the upper winding of the tone relay R740 from the — and + conductors C761 and C762. During the time that the tone control relay R730 is operated but before its vibrating weighted contacts 732 have come to rest in a closed position to cause the operation of relay R720, a class of service tone signal may be transmitted over the conductor C683 from the calling subscriber line. This tone signal is connected via the contacts 714 to the lower winding of the tone relay R740. The tone signal will be induced into the upper winding and transmitted over the — and + conductors C761 and C762 to the operator telephone equipment 2300. The class of service tone signal will indicate to the CLR operator the class of service of the calling subscriber. However, as soon as the vibrating contacts 732 come to rest, the relay R720 is operated and disconnects the tone relay R740 from the — and + conductors C761 and C762. At its contacts 726, the relay R720 reapplies a direct ground holding potential to the conductor C683. Finally, at its contacts 728, the relay R720 locks itself over the previously described circuit to ground at contacts 751 and, at its contacts 727, it interrupts the circuit of relay R730 which now restores to normal. From the foregoing, it will be understood that during the sequential operation of the tone control relay R730 and the tone control relay R720 the calling subscriber class of service tone signal is momentarily transmitted to the CLR operator. One example of a calling subscriber line that may transmit a class of service signal would be a paystation line. The signal would inform the operator that she must collect or refund any coins deposited by the paystation subscriber.

Since the class of service tone signal is transmitted to the operator shortly after the zip-zip tone is transmitted, it may be necessary for the operator to recheck the tone signal to be certain of the class of service of the calling subscriber. For this purpose, the operator is provided with a tone check key K2680. By actuating the key K2680, a circuit will be completed from the contacts 1 thereof for operating the rear control relay R2520. This relay upon operating, at its contacts 2521 to 2524, inclusive, transfers the —R and +R conductors C1379*a* and C1379*b* from the operator telephone equipment 2300 to the contacts 2 and 3 of the tone check key K2680. Accordingly, ground potential will be connected via the contacts 2 of the key K2680, the contacts 2521, the —R conductor C1379*a*, the contacts 1342, the — conductor C761 extending to Fig. 7, the wiper 701 of the link finder 700, the contacts 711, the upper right-hand winding of the repeating coil 645, the contacts 651 and the winding of the rering relay R610, to battery. In this circuit the rering relay R610 is short-circuited. At the contacts 3, the tone signal key K2680 connects battery potential via the resistor 2646, the contacts 2523, the +R conductor C1379*b*, the contacts 1346, the + conductor C762 extending to Fig. 7, the wiper 702 of the link finder 700, the contacts 712, the lower right-hand winding of the repeating coil 645, the winding of the check relay R650 and the contact 619, to ground. In view of the foregoing, it will be seen that the operation of the tone check key K2680 causes the operation of the check relay R650 in the CLR trunk 600. The relay R650, at its contacts 652, interrupts the locking circuit of the tone control relay R720 which now restores to normal. The operator may now restore the tone check key K2680 to normal whereupon the rear control relay R2520 restores to normal and reconnects, at its contacts 2522 and 2524, the —R and +R conductors C1379*a* and C1379*b* to the operator telephone equipment 2300. In addition to the foregoing, at its contacts 2521 and 2523, the relay R2520 interrupts the above mentioned circuits for the relays R610 and R650 in the CLR trunk 600. The relay R650 now restores and, at its contacts 652, recompletes the previously traced circuit for operating the tone control relay R730. The previously described cycle of operation whereby the relays R730, R740 and R720 cooperate to transmit the calling subscriber class of service signal, is now repeated.

At this time the calling subscriber at substation T1 in the central office 100 is connected to the operator telephone equipment 2300 over a talking path which includes the line circuit 106, the rotary line switch 107, the selector 103 and the cable 680 extending to the CLR trunk 600. In this circuit the talking path includes the — and + conductors C681 and C682, the contacts 615 and 617, the left-hand windings of the repeating coil 645, the right-hand windings of the repeating coil 645, the contacts 711 and 712, the wiper 701 and 702, the — and + conductors C761 and C762 extending to the link 1300A, the contacts 1342 and 1346, the —R and +R conductors C1379*a* and C1379*b*, the contacts 2522 and 2524, 2473 and 2477, 2364 and 2366 and 2355 and 2357, the conductors C2300*a* and C2300*b* and the operator telephone equipment 2300. The calling subscriber at substation T1 and the toll operator at the CLR position 2200B may now converse over the above described talking circuit to obtain the information as to the destination of the call being extended. However, before the operator can extend the desired connection, the impulse sender 1900A (Figs. 19 to 21, inclusive) must first be associated with the link 1300A.

*Connecting the impulse sender 1900A with the link 1300A*

The manner in which the impulses sender 1900A is connected to the link 1300A will now be described. During the operation of the equipment at the operator position 2200A, the impulse sender 1900A is automatically associated with the selected link 1300A at the time that the zip-zip tone signal is transmitted to the operator under control of the tone control relays R2470, R2480 and R2490. Referring to the relay R2490, it will be noted that when it first operates, it completes, at its contacts 2492′, a circuit for operating the sender control relay R1820 (Fig. 18). This circuit may be traced from battery by way of the contacts 1853, the winding of the sender control relay R1820, conductor C1854 extending to Fig. 25, contacts 2492′, conductor C1856 extending to Fig. 18, contacts 1814′ and 1841*a*1, the SRN conductor C1879 and contacts 2078 and 2045, to ground.

The sender control relay R1820 upon operating, at its contacts 1821, completes a circuit which may be traced from ground at contacts 1831, the upper winding of the switching relay R1810, the interrupting contacts 1871 and the winding of the magnet M1870 of the link finder 1800A, to battery. The switching relay R1810 operates over this circuit in series with the magnet M1870 but the magnet will not operate due to the high resistance of the upper winding of relay R1810. However, at its contacts 1822, the relay R1820 connects the wiper 1872 of the link finder 1800A to the magnet M1870. At this time it should be noted that the wipers 1872 to 1879, inclusive, of the link finder 1800A have access to the various links, such as the link 1300A and to the operator position equipment 2200A. All of the links at the position, however, apply ground potential to the F conductors, such as the F conductor C1891, accessible to the wiper 1872, except the link 1300A that has been connected to the calling CLR trunk 600. Therefore, the ground potential on any one of the F conductors, such as C1891, of the remaining links engaged by the wiper 1872, is connected via the contacts 1814, 1834, 1822 and 1871 to the winding of the magnet M1870 in order to short-circuit the upper winding of the switching relay R1810 and to complete an operating circuit for the magnet M1870. The magnet is self-interruptedly operated under control of the contacts 1871 thereby to advance the wipers step-by-step until the wiper 1872 engages the contact terminating the F conductor C1891 individual to the link 1300A. This conductor is ungrounded and consequently, the short-circuit is removed from the switching relay R1810 and the relay operates. Upon operating, the relay R1810, at its contacts 1814, disconnects the circuit including the wiper 1872 from the magnet M1870 thereby to terminate further stepping of the wipers of the link finder 1800A. Also, at its contacts 1812, the relay R1810 extends ground potential via the contacts 1842*a*, the SRS conductor C1872, the contacts 1921 and the upper winding of the sender relay R2040, to battery. The relay R2040 now operates in order to transmit a signal to the operator that the impulse sender 1900A is now connected to the link 1300A and is ready to transmit dial impulses in accordance with the digits of the called number.

When the sender relay R2040 operates, it completes, at its contacts 2047, a circuit for illuminating the sender pilot lamp L1862 which may be traced from ground at contacts 2083 and then via the contacts 1974, 2047, the SRL conductor C1881, the contacts 1843*a*3 and 1815′ and the lamp L1862, to battery. The illuminated condition of the sender pilot lamp L1862 informs the operator that the impulse sender 1900A is conditioned for further operation and that she may begin to set up the digits of the called number on the operator keyset K2647. At its contacts 2044, the relay R2040 extends ground via the contacts 2061′ to the RLS conductor C2091 extending to the digit register 2600A at the operator position. The grounding of the above mentioned conductor prepares circuits for the various digit register relays in the digit register 2600A so that such relays will operate and lock under control of the operator keyset K2647. Also, at its contacts 2049, the relay R2040 applies ground potential via the contacts 2063′, 2049 and 2196 to the C conductor C2015 extending to the digit register 2600A thereby to condition other relays in the digit register circuit for operation. A multiple of the above mentioned circuit also includes the lower winding of the relay R2190 and the HG conductor C2014 extending to the digit register circuit 2600A.

As soon as the operator actuates one of the keys in the keyset K2647 in accordance with the first digit to be transmitted by the impulse sender, the WXYZ conductors C1836 to C1839, inclusive, are grounded in accordance with a particular code in order to register the corresponding digit in the digit register 2600A. The code is marked on the WXYZ conductors C1836 to C1839, inclusive, in accordance with the following table:

| Digit key: | Conductors grounded |
|---|---|
| 1 | C1836—C1837 |
| 2 | C1836—C1838 |
| 3 | C1836—C1839 |
| 4 | C1837—C1838 |
| 5 | C1837—C1839 |
| 6 | C1838—C1839 |
| 7 | C1836 |
| 8 | C1837 |
| 9 | C1838 |
| 0 | C1839 |

In view of the foregoing table, it will be understood that when any one of the above ten keys is actuated in accordance with a particular digit, the WXYZ conductors, C1836 to C1839, inclusive, will be grounded to register the corresponding digit in the digit register 2600A. The digit register 2600A is arranged to register the successive digits as they are keyed by the operator on the keyset K2647.

When any one of the ten digit keys 1 to 0, inclusive, is operated in the keyset K2647, one or two of the four WXYZ conductors C1836 to C1839, inclusive, will be connected to ground in order to operate one or two of the code relays in the digit register 2600A. The four conductors C1836 to C1839, inclusive, are connected to the digit register 2600A via the contacts 1826 to 1829, inclusive, of the sender control relay R1820 and then via the contacts 1844*a*4, 1845*a*5, 1846*a*6 and 1847*a*7 to the four WXYZ conductors C1863 to C1866 extending to the digit register 2600A. As each digit key is operated in the keyset K2647, the relays in the digit register 2600A are successively operated to register the corresponding digits. The number of groups of digit register relays in the digit register 2600A will be governed in accordance with the maximum number of digits which are necessary to set up desired connections. However, if, for example, six groups of digit register relays are provided to handle six digits, a digit register of the type illustrated in Figs.

33 and 34 of the Molnar Patent No. 2,361,313 will permit the seventh to the twelfth digits to be registered in the first to the sixth groups of digit register relays. In this connection, it is pointed out that the impulse sender 1900A operates to start transmitting the impulses of the first digit immediately after this digit is registered in the first group of digit register relays and normally the transmission of the first digit will be completed before the operator has had sufficient time to register the sixth digit in the sixth group of digit register relays. Incident to the transmission of the first digit registered in the first digit register relays this register is released and the second digit register relays become effective so that the second digit may then be transmitted. The relays of the first, second, etc., digit registers may be reoperated to register the seventh, eighth, etc., digits after the registration of the sixth digit in the sixth digit register. The detail operations of the digit register 2600A is fully described and illustrated in the above mentioned Molnar patent. In this patent, however, nine groups of digit register relays are provided instead of the six groups suggested herein.

As soon as the operator actuates the first digit key, the digit register 2600A operates to apply ground potential to the hold conductor C2002 in order to operate the digit send relay R2010 in the impulse sender 1900A. The relay R2010 upon operating, at its contacts 2013, extends ground potential via the contacts 1923, the DS conductor C1873, the contacts 1843*a*, 1811 and the lower winding of the switching relay R1810, to battery. This circuit retains the switching relay R1810 in its operated position thereby to maintain the impulse sender 1900A associated with the selected link 1300A. The ground potential applied to the DS conductor C1873 is also connected via the contacts 1815, and the wiper 1873, to the DS conductor C1892 extending to the link 1300A.

When the DS conductor C1892 is grounded, a circuit is completed via the contacts 1331′ and the lower winding of the front link relay R1360, to battery. The relay R1360 operates over this circuit and completes a locking circuit for itself from ground at its contacts 1363, its upper winding and battery through the resistor 1369. The locking ground potential for the upper winding of the relay R1360 is also connected by way of the contacts 1355, the FLC conductor C1383 and the winding of the front link control relay R2510, to battery. The relay R2510 operates over this circuit and, at its contacts 2513, completes a circuit for illuminating the engaged front lamp L2644 thereby to indicate to the operator that the impulse sender 1900A is connected to the front of the link 1300A.

As a further result of the operation of relay R1360, at its contacts 1364, it completes a circuit for operating the digit send relay R1330 from the grounded DS conductor C1892. At its contacts 1361, the relay R1360 applies ground potential to the C conductor C1404 extending to the toll preselector 1400 thereby to prepare the selector for subsequent operation. Finally, at its contacts 1366 and 1367, the relay R1360 prepares multiple circuits for controlling the link busy lamp L1372 and for retaining the busy marking condition of the link 1300A on the LGD conductor C2658.

When the digit send relay R1330 operates, as noted above, it completes, at its contacts 1339, a locking circuit for itself which includes the grounded DS conductor C1892. At its contacts 1333′, the relay R1330 connects the front supervisory lamp L1373 of the link via the SP conductor C1896, the wiper 1877, the contacts 1819 and 1847*a*, the SP conductor C1876, and the contacts 1977, to ground. The lamp L1373 is now illuminated to indicate to the operator that the impulse sender 1900A is ready to transmit impulses over the front end of the link 1300A. At its contacts 1337, the digit send relay R1330 connects the EC conductor C1403 from the toll preselector 1400 to the EC conductor C1895 and then via the wiper 1876, the contacts 1818 and 1846*a*, the EC pulsing conductor C1908, the contacts 2065, 2088 and 2066 and the low resistance winding of the supervisory relay R1910, to battery. In the toll preselector 1400, the EC conductor C1403 is connected via the contacts 1462, the low resistance upper winding of the pulse relay R1420 and the contacts 1432, to ground.

The relay R1420 in the toll preselector 1400 operates over the above traced circuit in series with the supervisory relay R1910 in the impulse sender 1900A. The relay R1420, upon operating, conditions the selector 1400 to respond to the subsequent pulses transmitted over the above traced circuit in order to set up the connection to the desired destination in accordance with the digits that are keyed up on the keyset K2647 by the toll operator.

As a further result of the operation of relay R1330, at its contacts 1332 and 1335, it connects the − and + talking conductors C1401 and C1402 of the selector 1400 to the −D and +D conductors C1894 and C1893 extending to the contacts engaged by the wipers 1874 and 1875. Finally, at its contacts 1333, the relay R1330 connects the incoming line termination network, including the condenser 1333*a* and the resistor 1333*b*, across the − and + conductors C761 and C762 in order to prevent the calling end of the connection from being disconnected in the event that the operator desires to restore from the link 1300A prior to the completion of the connection over the front of the link.

When the pulse relay R1420, in the toll preselector 1400, is operated in series with the supervisory relay R1910 in the impulse sender 1900A, as previously noted, at its contacts 1421, it completes a circuit, including the contacts 1469 for operating the hold relay R1450. As soon as the relay R1450 operates, at the contacts 1451, it also applies ground potential to the previously grounded C conductor C1404. When the C conductor C1404 was initially grounded at contacts 1361 in the link 1300A, a circuit was completed via the vertical-off-normal contacts VON1459A, the contacts 1434′ and the upper winding of the transfer relay R1480, to battery. Accordingly, the transfer relay R1480 may operate either as a result of the application of ground potential to the C conductor C1404 by the relay R1360 in the link 1300A or as a result of the grounding of the C conductor C1404 at contacts 1451. Upon operating, at its contacts 1486, the relay R1480 prepares a point in the circuit for controlling the vertical magnet VM1459 and, at its contacts 1482, it completes a circuit for operating the control relay R1410 which may be traced from ground at contacts 1451 and then via the contacts 1452, 1482 and 1444 and the winding of relay R1410, to battery. Upon operating, the relay R1410, at its contacts 1417, prepares a point in the circuit traced hereinafter for controlling the stepping relay R1490. The above operations all occur as a result of the seizure of the toll preselector 1400 and prepare the selector to respond to the first series of impulses transmitted by the impulse sender 1900A.

*Operation of the impulse sender 1900A*

Referring now to the supervisory relay R1910 in the impulse sender 1900A, it will be seen that when the relay operates it completes, at its contacts 1911, a circuit, including the contacts 2018, for operating the auxiliary supervisory relay R1940. The relay R1940 prepares various circuits, to be described hereinafter, which are completed after a plurality of spacer pulses have been counted by the counting relays of the impulse sender for the purpose of allowing the toll preselector 1400 to become fully prepared to receive the impulses of the digit.

The manner in which the spacer pulses are counted by the impulse sender 1900A, prior to the transmission of switch controlling impulses, will now be described. In this connection, it will be recalled that when the digit send relay R2010 operated in response to the registration of the first digit in the digit register 2600A, at its contacts 2013, it applied ground potential to the DS conductor C1873 in order to connect the impulse sender through the link 1300A to the selector 1400. As a further result of the operation of relay R2010, at its contacts 2012, it completes a circuit including the contacts 2051, 1922, 1971, 2021 and 2031, the conductor C2118, the contacts 2091, and the winding of the prime mover relay R2080, to battery. The relay R2080 operates and, at its contacts 2081, completes a locking circuit for itself which includes the contacts 2092. At its contacts 2082, the relay R2080 completes an obvious circuit for operating the prime mover relay R2085. The relay R2085, upon operating, at its contacts 2088, interrupts a point in the previously traced series EC pulsing circuit of the supervisory relay R1910 and the pulse relay R1420 but this interruption is of no importance at this time due to the fact that the circuit for these relays is retained over a multiple path including the contacts 2025 and 2064. As a further result of the operation of the relay R2085, at its contacts 2086, it completes a circuit for operating the counting relay R2130. The circuit for operating the counting relay R2130 may be traced from the grounded conductor C2118, the contacts 2086, the conductor C2116, the contacts 2174, 2165, 2154, 2145 and 2134 and the winding of relay R2130 to battery. The relay R2130 upon operating, at its contacts 2135, completes a locking circuit for itself by way of the contacts 2181 and the grounded conductor C2116. Finally, the relay R2085, at its contacts 2089, completes an obvious circuit for operating the prime mover relay R2090. The relay R2090, upon operating, at its contacts 2091 and 2092, interrupts the circuit for relay R2080 which now restores to normal.

Before describing the operations which occur as a result of the restoration of the relay R2080, attention is directed to the fact that when the first counting relay R2130 operates, it prepares, at its contacts 2136, a point in the circuit for the second counting relay R2140. As a further result of the operation of the first counting relay R2130, at its contacts 2131, it connects the marking conductor C2018-1 from the digit register 2600A to the test conductor C2112. Finally, at its contacts 2133, the relay R2130 connects its winding via the contacts 2143 to the lower winding of the counting relay R2180. The last mentioned relay, however, is short-circuited at this time by the ground potential applied to the conductors C2115 and C2118. It may be well to mention at this time that the marking leads C2018-1 to C2018-9, inclusive, from the digit register 2600A have no ground potentials applied thereto during the spacer pulse counting period and they perform no function at this time.

As soon as the relay R2080 restores to normal, as previously noted, it interrupts, at its contacts 2082, the circuit for the relay R2085 which also restores and interrupts, at its contacts 2089, the circuit for the relay R2090. As a further result of the restoration of the relay R2085, at its contacts 2087, it removes the short-circuit from the lower winding of the transfer relay R2180. The relay R2180 now operates in series with the counting relay R2130 over a circuit which includes the grounded conductor C2118, the lower winding of relay R2138, the contacts 2143 and 2133 and the winding of relay R2130, to battery. Upon operating, the relay R2180, at its contacts 2182, prepares a point in the circuit for operating the second counting relay R2140 and, at its contacts 2184, it prepares a locking circuit for its upper winding.

The relay R2090 restores when its circuit is opened at contacts 2089 and, at its contacts 2091 and 2092, it recompletes the circuits for operating and locking the relay R2080. As soon as the relay R2080 reoperates, it completes the operating circuit for relay R2085 and the latter relay, at its contacts 2086, now completes a circuit via the contacts 2182 and 2136 for operating the second counting relay R2140. At its contacts 2087, the relay R2085 completes a circuit including the contacts 2184 for holding the transfer relay R2180 in its operated position. As soon as the second counting relay R2140 operates, it interrupts, at its contacts 2143 and 2145, the previously traced operating and locking circuits for the first counting relay R2130 which now restores to normal.

As soon as the relay R2185 reoperates, it also recompletes the operating circuit for the relay R2090. The operation of the relay R2090 again interrupts the circuit for the relay R2080 which now restores to normal. The relays R2080, R2085 and R2090 are the prime mover relays for controlling impulse transmission to the link 1300A and for controlling the operation of the counting relays R2130, R2140 etc. to count the number of cycles of operation of the prime mover relays.

The prime mover relays R2080, R2085 and R2090 continue to operate and restore, in the manner described above, as long as ground potential is retained on the conductor C2118. When the prime mover relay R2085 restores during the second cycle, it interrupts, at its contacts 2087, the locking circuit for the transfer relay R2180 which now restores and prepares the circuit, at its contacts 2181, for operating the third counting relay R2150.

During the third cycle of operation of the prime mover relays, the relay R2085, upon operating, completes, at its contacts 2086, a circuit including the contacts 2181 and 2144 for operating the third counting relay R2150. Upon operating, the relay R2150 interrupts, at its contacts 2156, the circuit for the second counting relay R2140 which now restores to normal. As a further result of the operation of the third counting relay R2150, it prepares, at its contacts 2155, a point in the circuit for controlling the fourth counting relay R2160 and, at its contacts 2151, it completes a circuit including the test conductor C2112 in order to terminate the spacer pulse counting period and in order to signal the digit register 2600A to mark the marking conductors C2018-1 to C2018-9 in accordance with the first digit registered therein by the operator.

The circuit including the contacts 2151 of the operated third counting relay R2150 may be traced from ground at the contacts 1951 and then via the contacts 2023, 1932 and 2061, the conductor C2114, the contacts 2151 and 2121, the test conductor C2112, the contacts 1953, 2072, 1942 and 2027 and the lower winding of the alternator relay R2020, to battery. In multiple with the above traced circuit, an additional circuit is completed which includes the contacts 2036 and the upper and lower windings, respectively, of the alternator relays R2020 and R2030, to battery. The upper and lower windings of the relay R2020 are both energized over the above circuits but, due to the fact that the relay is of the differential type, it does not operate at this time. However, the circuit for the lower winding of relay R2030 causes the last mentioned relay to operate and, at its contacts 2035, it locks itself via the contacts 2042 to ground at contacts 2053. As a further result of the operation of the relay R2030, at its contacts 2037, it connects a point in the circuit over which it was originally operated via the contacts 2029 and the winding of the relay R2090, to battery. The last mentioned circuit retains the prime mover relay R2090 in its operated position. At its contacts 2031, the relay R2030 disconnects ground potential from the conductor C2118 thereby to interrupt the circuit for the third counting relay R2150 which now restores to normal.

When the third counting relay R2150 restores to normal, it interrupts, at its contacts 2151, the previously traced circuit for energizing the lower winding of the relay R2020. At this instant, a circuit is retained for the upper winding of the relay R2020, via the contacts 2035, 2042 and 2053, and the circuit for the lower winding of the relay is interrupted. The relay R2020 now operates over the circuit including its upper winding and, at its contacts 2025, it removes the short-circuit from the impulsing contacts 2088 so that subsequent operations of the prime mover relay R2085 will transmit impulses over the EC pulsing conductor C1908 to the pulsing relay R1420 of the selector 1400. At its contacts 2026, the relay R2020 prepares a circuit for energizing the upper winding of the differentially wound relay R2030 and causes the relay to restore to normal. At its contacts 2021′, the relay R2020 completes a circuit including the contacts 1959, 1945 and 2018 for locking the auxiliary supervisory relay R1940 in its operated position. At its contacts 2024′, the relay R2020 completes a circuit from ground at contacts 2063′ via the contacts 2049, 2024′ and 1946 and the lower winding of the send digit relay R1930, to battery. The relay R1930 operates over this circuit and, at its "X" contacts 1937, completes an independent locking circuit for itself which includes ground at contacts 2017. At its contacts 2025′, the relay R2020 connects ground potential via the contacts 2063′, 2049, 1953′, 2025′ and 2198 to the A conductor C2017 extending to the digit register 2600A. At its contacts 2022, the relay R2020 completes an alternate circuit for reconnecting ground potential to the conductor C2118 in order to reinitiate the cyclic operations of the prime mover relays R2080, R2085 and R2090. The last mentioned circuit for grounding the conductor C2118 includes the contacts 2012, 2051, 1922, 1971, 2022 and 2032 and the conductor C2118.

When the send digit relay R1930 operates, as previously noted, at its contacts 1933, it prepares a point in the circuit for subsequently grounding the digit space test conductor C2113; and, at its contact 1931, it connects the upper winding of the automatic ring control relay R1980 via the contacts 2056 and 1931 to the ARC conductor C1871. If the automatic ring key K1861 is left in the normal position illustrated in the drawings, the impulse sender will be conditioned to give an automatic ring signal after the impulses of the last registered digit have been transmitted.

When ground potential is applied to the conductor C2017, as previously noted, the digit register 2600A operates to mark one of the conductors C2018–1 to C2018–9 in accordance with the first digit registered in the first group of digit register relays. The counting relays will connect one of the marking conductors C2018–1 to C2018–9, inclusive, to the test conductor C2112 each time an impulse is transmitted over the EC pulse conductor C1808 by the prime mover relay R2085.

It may be well to mention at this time that during the time that the prime mover relays R2080, R2085 and R2090 cyclically operate, the relay R2080, at its contacts 2083, intermittently removes ground potential from the circuit to the sender pilot lamp L1862. The sender pilot lamp L1862 is thereby flashed at the pulsing rate of relay R2080 to indicate to the operator that the impulse sender is generating impulses.

As soon as the ground potential is reapplied to the conductor C2118 by the relay R2020, the cyclic operation of the prime mover relays R2080, R2085 and R2090 and the counting operations of the relays R2130 to R2170, inclusive, are restarted. During each cycle of operation of the three prime mover relays, the relay R2085, at its contacts 2088, interrupts the EC pulsing circuit, including the supervisory relay R1910 in the impulse sender 1900A and the pulse relay R1420 in the selector 1400, in order to selectively control the operation of the selector 1400. The supervisory relay R1910 and the pulse relay R1420 restore and reoperate each time the contacts 2088 are opened and closed and the relay R1420 controls the selector 1400 to raise its wipers in a vertical direction a number of steps corresponding to the number of pulses transmitted. The supervisory relay R1910 also follows the pulses but since the auxiliary supervisory relay R1940 is now locked to ground at contacts 2021′, the last mentioned relay remains in its operated position during pulsing.

The prime mover relays R2080, R2085 and R2090, during each cycle of operation, also transmit a pulse to the counting relays whereby the first counting relay R2130 is operated in response to the first pulse; the second counting relay R2140 is operated in response to the second pulse and restores the first counting relay R2130; the third counting relay R2150 responds to the third pulse and restores the second counting relay R2140; the fourth counting relay R2160 responds to the fourth pulse and restores the third counting relay R2150; and the fifth counting relay R2170 responds to the fifth pulse and restores the fourth counting relay R2160. At the contacts 2131, 2141, 2151, 2161 and 2171, the five counting relays, noted above, successively connect the marking conductors C2018–1 to C2018–5 to the test conductor C2112. If the first digit registered in the digit register 2600A is greater than the digit 5, no ground potential will be found on the marking conductors C2018–1 to C2018–5 to terminate the impulse transmission and counting. Therefore, when the fifth counting relay R2170 operates, at its contacts 2176, it connects the grounded conductor C2118 to the transfer relay R2110. The relay R2110 now operates and, at its contacts 2111, prepares a locking circuit for itself which is in series with the transfer relay R2120. The locking circuit, however, does not become effective until the prime mover relay R2085 restores at the end of the fifth cycle to cause the fifth counting relay R2170 to restore to normal. The relay R2170, at its contacts 2174, again prepares a point in the circuit for the first counting relay R2130. Also, at its contacts 2176, the relay R2170 interrupts the initial operating circuit for the transfer relay R2110 whereupon the last mentioned relay locks in its operated position in series with the transfer relay R2120 and the grounded conductor C2118. When this circuit is completed, the transfer relay R2120 operates and, at its contacts 2121, disconnects the test conductor C2112 from the various marking conductors C2018–1 to C2018–5. At its contacts 2122, the relay R2120 prepares the circuit for sequentially connecting the marking conductors C2018–6 to C2018–9 to the test conductor C2112. The last mentioned group of marking conductors will be sequentially connected to the test conductor C2112 as the counting relays R2130 to R2170 are operated through a second counting cycle to count the pulses 6 to 0, inclusive. The fifth counting relay R2170 operates when the tenth pulse is transmitted and will connect ground, at its contacts 2172, to the test conductor C2112 and thus stop the pulsing of the prime mover relays after ten impulses have been counted. From the foregoing description of the operation of the counting relays R2130 to R2170, inclusive, it will be understood that they count through a second cycle of five pulses (that is pulses 6 to 10) to test the marking conductors C2018–6 to C2018–9.

When the counting relay connects the conductors C2018–1 to C2018–9, which have been grounded in accordance with the digit registered in the digit register 2600A, the ground potential will be connected by way of the contacts of the operated counting relay to the test conductor C2112. As soon as ground potential is applied to the conductor C2112, a circuit will be completed via the contacts 1953, 2072, 1942 and 2026 for energizing the upper winding of the relay R2030. At this time the lower winding of the relay is also energized from ground at contacts 2053 and, since the relay is differentially wound, the circuits completed through both of the windings of the relay will cause it to restore to normal. As soon as the relay R2030 restores to normal and closes its contacts 2038, the operating ground potential for its upper winding is connected via the contacts 2038 and 2028 to hold the prime mover relay R2090 in its operated position. As a further result of the restoration of relay R2030, it removes ground potential from the conductor C2118, at its contacts 2032, thereby to cause the restoration of the prime mover relay R2080. As a further result of the removal of ground from the conductor C2118, the operated ones of the counting relays R2130 to R2170 and the relays R2110, R2120 and R2180, if operated, will now restore to normal to prepare the counting relays to count the interdigital pause between the counting of impulses of successive registered digits. As a further result of the restoration of relay R2030, at its contacts 2039, it completes a circuit which may be traced from ground at contacts 2048 via the contacts 2022′, 2039, 2019, 1952′ and 1918 and the winding of the first digit relay R1915, to battery. The relay R1915, upon operating, at its "X" contacts 1916, completes a locking circuit for itself from ground at contacts 2017; it interrupts its initial operating circuit, at its contacts 1918; and, at its contacts 1917, it disconnects the auxiliary start relay R1905 from the SAS conductor C1880. Accordingly, it will be understood that the prime mover relay R2085 will interrupt the EC pulsing conductor C1908 a number of times corresponding to the number of pulses counted by the counting relays and when the counting relays find the conductor C2018–1 to C2018–9 which is marked in accordance with the digit registered, the cyclic operation of the prime mover relays R2080, R2085 and R2090 will be arrested.

As soon as ground potential is removed from the conductor C2118, in response to the restoration of the relay R2030, ground potential will be removed from the test conductor C2112 in order to interrupt the energizing circuit for the upper winding of the relay R2020. Since this relay has been retained in its operated position over a circuit including only its upper winding, the relay now restores to normal. Furthermore, the removal of ground potential from the conductor C2112 also interrupts the holding circuit for the relay R2090 which now restores to normal.

As soon as the relay R2020 restores, at its contacts 2025′, it removes ground potential from the conductor C2017 in order to control the digit register 2600A to remove the marking ground potential from the marking conductor C2018–1 to C2018–9, which has been marked in accordance with the first registered digit.

After the restoration of the relay R2030 and before the restoration of the relay R2020, ground potential, at the contacts 1951, is connected via the contacts 2024, 2033, 1961 and 2011, the conductor C2117 and the contacts 2191 to the B conductor C2012 extending to the digit register 2600A. As soon as the relay R2020 restores following the restoration of the relay R2030, at its contacts 2024, it removes the ground potential from the conductor C2012. The pulse of ground potential thus applied to the conductor C2012 controls certain relays in the digit register 2600A so that a battery potential is returned to the impulse sender 1900A over the HG conductor C2014 to the winding of the relay R2190 in order to operate the digit register transfer relay R2190 as soon as the first registered digit has been transmitted by the impulse sender 1900A. Upon operating, the relay R2190 completes a locking circuit for itself which includes its upper winding, the contacts 2194, 2049 and 2063′. At its contacts 2191 and 2192, the relay R2190 transfers the conductor C2117 from the B conductor C2012 to the OG conductor C2013 extending to the digit register 2600A and, at its contacts 2197 and 2198, it disconnects the A conductor C2017 and connects the MG conductor C2016 extending to the digit register 2600A thereby to complete a circuit for sequentially controlling the second, third, etc., digit register relays in the digit register 2600A.

It may be well to mention at this time that the impulse sender 1900A and the digit register 2600A cooperate in the manner described above to transmit the pulses, over the EC pulsing conductor C1908 corresponding to each of the digits registered in the digit register 2600A. In order to provide an interdigital pause between the transmission of pulses of successive registered digits, the impulse sender 1900A is arranged to count a predetermined number of cycles of operations of the prime mover relays before it transmits pulses corresponding to the following registered digit. Accordingly, a description will now be given of the operation of the impulse sender 1900A to provide an interdigital pause between the transmission of each of the registered digits.

Accordingly, when the relays R2030 and R2020 restore to normal at the end of the transmission of pulses corresponding to each digit, at the contacts 2031 and 2021, ground potential is reapplied to the conductor C2118 to reinitiate the cyclic operation of the prime mover relays R2080, R2085 and R2090. The relay R2080 normally interrupts the circuit of the EC pulsing conductor C1908 each time it is operated but, during the interdigital pause, the contacts 2088 are short-circuited over a circuit including the contacts 2064 and 2025 to render the impulsing contacts 2088 ineffective. However, the cyclic operation of the prime mover relays transmits pulses to the counting relays R2130 to R2170, inclusive, in the manner previously described. At the present time the digit space test conductor C2113 is grounded over a circuit which includes the contacts 1951, 2023 and 1933 and, as illustrated in the drawings, the conductor C2113 grounds the armature of the contacts 2142 on the second counting relay R2140. It may be well to mention at this time that the digit space test conductor C2113 may be connected to any one of the contacts on the counting relays so that the digit spacing interval can be arbitrarily varied in accordance with any number of pulses from 1 to 10. In the present case, the conductor C2113 is connected so that the second counting relay R2140 will complete the circuit for terminating the interdigital pause only after seven pulses have been counted. It should be understood that the second counting relay R2140 responds during the first cycle of operation to the second pulse transmitted to the counting relays and it again responds to the seventh pulse transmitted thereto. During the counting of the pulses, 6 to 10, the transfer relays R2110 and R2120 are in their operated positions so that the circuit including the contacts 2142 of the second counting relay R2140 will be completed when the seventh pulse is counted. At this time the ground potential applied to the conductor C2113 is connected via the contacts 2142 and 2122 to the test conductor C2112 thereby to recomplete the previously described circuits for energizing certain of the windings of the differential relays R2020 and R2030. The relay R2030, however, operates whereas the relay R2020 remains in its restored position, as previously noted. The relay R2030, upon operating, again removes ground potential from the conductor C2118 thereby to restore any of the operated counting relays and to remove the ground potential from the test conductor C2112. The differential relay R2020 now operates and, at its contacts 2022, reapplies ground potential to the conductor C2118 thereby to reinitiate operation of the prime mover relays to transmit pulses over the EC pulsing conductor C1908 and to the counting relays. Also, at its contacts 2025′, the relay R2020 connects ground potential via the contacts 2197 to the conductor C2016 extending to the digit register 2600A thereby to cause the digit register to apply a marking potential to the conductor C2018-1 to C2018-9 corresponding to the second digit registered in the digit register by the operator.

The counting relays reoperate in the manner previously described and when the marked conductor C2018-1 to C2018-9 is found, the transmission of pulses over the EC pulsing conductor C1908, corresponding to the second digit, is terminated and the differential relay R2030 is restored to stop the cyclic operation of prime mover relays R2080, R2085 and R2090. Also the relay R2030, upon restoring, at its contacts 2033, reapplies ground potential via the conductor C2117 and the contacts 2192 to the OG conductor C2013 extending to the digit register 2600A thereby to prepare the digit register to mark the third registered digit on the above noted marking conductors. Also after the second digit has been transmitted by the impulse sender 1900A and the counting relays have been restored to normal, the differential relay R2020 restores and reinitiates the operation of the prime mover relays as previously described. This time, however, the prime mover relays, during the cyclic operation again control the counting relays to count the interdigital pause between the transmission of the second and third digits in the manner previously described. The impulse sender 1900A and the digit register 2600A continue to operate in order to transmit pulses corresponding to each of the digits registered.

When the last digit stored in the digit register 2600A has been transmitted, the digit register relays therein remove ground potential from the hold conductor C2002 in order to restore the digit send relay R2010 in the impulse sender 1900A. When the relay R2010 restores, it interrupts, at its contacts 2018, the previously described circuit for the auxiliary supervisory relay R1940. It may be well to mention at this time, however, that the differential relay R2020 is also in its restored condition and interrupts, at its contacts 2021′, the previously mentioned alternate holding circuit for the relay R1940. As a further result of the restoration of the digit send relay R2010, it interrupts, at its contacts 2012, the circuit for applying the operating ground potential to the conductor C2118 thereby to terminate further operation of the prime mover relays R2080, R2085 and R2090. At its contacts 2017, the relay R2010 interrupts the holding circuit for the lower winding of the send digit relay R1930 and the relay R1915. Accordingly, in response to the restoration of the digit send relay R2010, the relays R1915, R1930 and R1940 restore to normal.

On certain types of connections, the operator may desire to retain the impulse sender 1900A connected to the link 1300A after the last digit has been transmitted so that she may reoperate the keyset and thereby cause the impulse sender to transmit one or more additional digits. In order to retain the impulse sender 1900A connected to the link 1300A after the last digit has been transmitted, the operator refrains from actuating the sender disconnect key K2648 on the keyset K2647 after she has keyed up the last digit. By refraining from actuating the key K2648, the operator prevents a circuit from being completed to the sender disconnect relay R1850 and thereby retains the sender control relay R1820 in its operated position. Consequently, when the send relay R2010, in the impulse sender 1900A, restores to normal in response to the transmission of the last digit registered in the digit register 2600A, at its contacts 2013, it removes the holding ground potential from the DS conductor C1873. However, the switching relay R1810 does not restore to normal at this time due to the fact that its upper winding is energized in series with the magnet M1870 over a circuit including the contacts 1821 of the operate sender control relay R1820. Accordingly, the relay R1810, at its contacts 1812, retains ground potential on the SRS conductor C1872 in order to prevent the sender relay R2040 from restoring after the impulse sender has transmitted the last registered digit. The relay R2040, at its contacts 2044, holds the digit register relays in the digit register 2600A in readiness to respond to additional keyed digits over the conductor C2001 and, at its contacts 2049, it retains the relay R2190 in its operated position in order to retain the impulse sender 1900A connected to the digit register 2600A.

As a further result of the removal of ground from the DS conductor C1873 by the restoration of the relay R2010, ground potential is removed from the DS conductor C1892 extending to the link 1300A thereby to interrupt the circuit for the digit send relay R1330. The relay R1330, upon restoring, at its contacts 1331, 1332, 1334 and 1335, disconnects the front of the link 1300A from the impulse sender 1900A and connects it via the −F and +F conductors C1378*a* and C1378*b* to the operator telephone equipment 2300. As a further result of the restoration of the relay R1330, at its contacts 1336, it connects the EC conductor C1404 from the link to the toll selector 1400 via the contacts 1362 and 1351 to the FEC conductor C1380 which is connected through the winding of the front supervisory relay R2560 and the resistor 2560*a*, to battery. The relay R2560 in the operator equipment operates over this circuit and, at its contacts 2561, connects ground potential via the FL1 conductor C1392, the contacts 1357′ and the front supervisory lamp L1373, to battery. The front supervisory lamp L1373 associated with the link 1300A is now illuminated to indicate to the operator that a connection has been established but not answered. As a further indication to the operator that the impulse sender has completed the transmission of the last registered digit, the sender relay R2040, at its contacts 2047, now steadily illuminates the send pilot lamp L1862. It should be noted that during the sending out of the impulses corresponding to the registered digits and during the interdigital pauses between successive digit transmission, the prime mover relay R2080, at its contacts 2083, flashes the send pilot lamp L1862 approximately ten times per second.

The operator telephone equipment 2300 is now connected over the front of the link to the called point that has been reached in response to the transmission of the registered digits. The operator may now actuate the keys of the keyset K2647 in accordance with one or more additional digits which may be required to control the automatic switch or switches to cut in on the called subscriber line. As a result of the keying up of the first of the additional digit or digits, the digit send relay R2010 in the impulse sender 1900A is reoperated by the digit register 2600A over the holding conductor C2002 in the manner previously described. Reoperation of the digit send relay R2010 controls the prime mover relays R2080, R2085 and R2090 and the counting relays of Fig. 21 in the manner previously described whereby pulses corresponding to the first of the additional digits registered in the digit register 2600A are transmitted over the EC pulsing conductor C1908, the front end of the link 1300A, the toll preselector 1400 and subsequent switches in the switch train in order further to control the setting up of the connection to the called subscriber line. If more than one additional digit is keyed up on the keyset K2647, the impulse sender 1900A will count pulses corresponding to the interdigital pauses in the manner previously described and it will transmit impulses over the EC pulsing conductor C1908 in accordance with the additional digits.

It should be noted, however, that when the operator has keyed up all of the additional digits necessary to complete the connection and wishes to disconnect her position equipment 2200A from the link 1300A and also to disconnect the impulse sender 1900A from the associated link 1300A, she must actuate the operator disconnect key K2649 in the keyset K2647. If the key K2649 is actuated immediately after the registration of the last digit in the digit register 2600A, a circuit is completed via the contacts 2615 for operating the position disconnect relay R2620 in the automatic answer control circuit 2601. The relay R2620, upon operating, at its contacts 2621, completes a circuit including the contacts 2612 for operating the magnet M2603 of the link distributor 2602 and simultaneously therewith it short-circuits the upper winding of the relay R2610 which restores to normal. Also, at its contacts 2627, the relay R2620 interrupts the circuit for the all-links-busy relay R2630 which now restores to normal. As soon as the switch relay R2610 restores to normal, it interrupts, at its contacts 2612, the circuit for the magnet M2603 which now restores to normal and advances the wipers 2604 and 2605 an additional step into engagement with the next set of bank contacts. Finally, at its contacts 2611, the relay R2610 interrupts the circuit including the conductors C2651 and C2652 thereby to cause the restoration of the talk relay R2350 in the operator position equipment 2200A and the restoration of both the talk relay R1340 and the class control relay R1350 in the link 1300A.

Referring now to the relay R2350 in the operator position equipment 2200A, it will be seen that upon restoring, at its contacts 2352, it opens a point in the locking circuit for the sender disconnect relay R1850 thereby to restore the latter relay in the event that it is locked in its operated position. As a further result of the restoration of the relay R2350, at its contacts 2355 and 2357, it disconnects the operator telephone equipment 2300 from the talking conductors extending to the link 1300A and, at its contacts 2354 and 2356, it bridges the monitoring coil 2381 across the talking conductors thereby to provide facilities in the operator's position 2200A whereby the operator may monitor the connection including the link 1300A at will without disturbing the connected subscribers.

Referring now to the link 1300A, it will be seen that when the relays R1340 and R1350, therein, are restored to normal, the various connections including contacts of these relays which are utilized in coupling the operator position to the link 1300A, are disconnected and direct circuits are completed within the link for providing all necessary supervision, such as front and rear link supervision and link busy supervision. More specifically, at its contacts 1355, the relay R1350 interrupts a point in the circuit including the FLC conductor C1383 thereby to restore the front link connect relay R2510 in the operator position 2200A to normal. The latter relay, upon restoring, at its contacts 2513, interrupts the circuit for illuminating the engaged front lamp L2644. At its contacts 1356, the relay R1350 interrupts a point in the circuit including the RLC conductor C1385 in order to restore the rear link control relay R2410 in the operator position 2200A. The latter relay, at its contacts 2417′, interrupts the circuit for the engaged rear lamp L2497; at its contacts 2412, it interrupts the circuit for the relay R2420 which restores and extinguishes the local CLR lamp L2420; and finally, at its contacts 2415′, it interrupts the circuit for the relay R2490 which also restores to normal. At its contacts 1351, 1352, 1353 and 1354, the relay R1350 prepares points in the circuits for subsequently controlling the front supervisory relay R1370 and the rear supervisory relay R1310. The relay R1340, upon restoring as previously noted, at its contacts 1341 to 1346, inclusive, interrupts points in the talking circuits including conductors C1378*a* and C1378*b* and C1379*a* and C1379*b* extending to the operator position equipment 2200A and it prepares points in the circuits for interconnecting the — and + talking conductors C761 and C762 at the rear of the link to the — and + talking conductors C1401 and C1402 at the front of the link. At its contacts 1348′, the relay R1340 completes a circuit including the conductor C1891, the wiper 1872, the contacts 1813, 1832 and the winding of the sender control relay R1830, to battery. Before describing the circuits controlled by the operation of relay R1830, it should be noted that at its contacts 1348 and 1349 and 1341′ to 1346′, the relay R1340 controls various circuits for indicating the busy condition of the link 1300A.

Referring now to the relay R1830, it will be noted that when this relay operates, it interrupts a point in its initial operating circuit at its contacts 1832 and simultaneously therewith, at its contacts 1833, it locks itself to the grounded SRS conductor C1872. The relay R1810 is held locked in its operated position over a circuit including its lower winding, the DS conductor C1873, and ground at contacts 2013 of the digit send relay R2010. The operator position equipment 2200A is now restored to normal and disconnected from the link 1300A so that the automatic answer control circuit 2601 may select another link and associate the same with the operator position equipment 2200A.

The above described operations for disconnecting the operator position equipment 2200A from the link 1300A, are governed by the operation of the operator disconnect key K2649 after the last digit has been keyed up by the operator. The impulse sender 1900A will disconnect itself from the link 1300A after the last digit is transmitted. In the above connection the signalling of the desired called party or operator is automatically controlled as a result of the completion of the connection. If the operator desires to have the impulse sender 1900A control the transmission of an automatic ringing signal after the impulses of the last digit have been sent, she also operates the sender disconnect automatic ring key K2648 in the keyset K2647 at the time she actuates the operator disconnect key K2649. When the key K2648 is actuated, ground potential is applied via the conductor C1835 and the contacts 1823 for operating the sender disconnect relay R1850. The relay R1850, at its contacts 1852, locks itself temporarily to the grounded conductor C1857 extending to Fig. 25 and, at its contacts 1853, it interrupts the locking circuit for the sender control relay R1820. Finally, at its contacts 1851, the relay R1850 connects ground potential from the automatic ring key K1861 via the contacts 1851 and 1841*a*, the ARC conductor C1871, the contacts 1931 and 2056 and the upper winding of the automatic ring control relay R1980, to battery. The relay R1980 immediately locks itself via its contacts 1987 to ground at contacts 2041. It will be recalled that during the disconnecting operations performed at the operator position 2200A, the ground potential is also subsequently removed from the conductor C1857 thereby to interrupt the locking circuit for the relay R1850 which accordingly restores to normal. This relay, however, is not restored until the above mentioned circuit including its contacts 1851 is completed for operating the automatic ring control relay R1980. When the relay R1820 restores it opens the circuit for the upper winding of relay R1810 and at its contacts 1826 to 1829, inclusive, it disconnects the operator keyset K2647 from the digit register 2600A.

The automatic ring relay R1980 is operated in the manner described above to prepare the impulse sender 1900A to transmit an automatic ring signal of a predetermined duration after the transmission of the impulses corresponding to the last digit registered in the digit register 2600A. The relay R1980 may be operated at any time prior to the transmission of the last digit and when it is operated, as previously described, it connects, at its contacts 1981, a multiple holding ground to the DS conductor C1873 to retain the switching relay R1810 and the digit send relay R1330 in their operated positions. It also prepares, at its contacts 1982, a point in the circuit traced hereinafter for applying ground potential via the +D conductors C1874 and C1893 to the + talking conductor C1402 and, at its contacts 1985, it prepares a point in the circuit for applying battery potential via the −D conductors C1875 and C1894 to the − talking conductor C1401 thereby to control automatic ringing. Finally, at its contacts 1982′, the relay R1980 prepares a point in a circuit for subsequently controlling the relay R2050.

When the impulse sender 1900A has transmitted the last digit registered by the operator in the digit register 2600A, ground potential is removed from the conductor C2002 in order to restore the digit send relay R2010. This relay, upon restoring, at its contacts 2016, connects the winding of the supervisory relay R1910 via the contacts 1988 of the operated relay R1980, contacts 2016 and 2065 to the EC pulsing conductor C1908. The relay R1910 therefore remains in its operated position over a circuit which includes the EC conductor C1895, the EC conductor C1403 and the corresponding conductors of the various operated switches to the last switch in the switch train. As a further result of the restoration of the relay R2010, at its contacts 2018, it interrupts the circuit for the auxiliary supervisory relay R1940 which now restores to normal; and, at its contacts 2012, it removes the ground potential from the conductor C2118 thereby to prevent further operation of the prime mover relays R2080, R2085 and R2090 at this time. Finally, at its contacts 2017, the relay R2010 interrupts the locking circuit for the lower winding of the send digit relay R1930 which also restores to normal.

As soon as the auxiliary supervisory relay R1940 restores to normal in the manner described above, it prepares, at its contacts 1941, a point in the circuit for the upper winding of the relay R2050. Finally, the relay R1930, upon restoring to normal, at its contacts 1935, completes a circuit which may be traced from ground, contacts 1981′, 1935, 2051, 1922, 1971, 2021 and 2031 and the conductor C2118 for reinitiating the cyclic operations of the prime mover relays R2080, R2085 and R2090.

The above mentioned prime mover relays cyclically operate in the manner previously described and when the counting relays R2130, R2140 and R2150 operate to count three impulses the operation of the relays is terminated. When the counting relays count the third pulse, the contacts 2151 of the relay R2150 are closed to complete a circuit for operating the first error relay R2050. The circuit for operating the relay R2050 may be traced from ground at contacts 1951 and then via the contacts 2023, 1932 and 2061, the conductor C2114, contacts 2151 and 2121, the test conductor C2112, the contacts 1953, 2072, 1941 and 1987 and the upper winding of relay R2050, to battery. From the foregoing, it will be noted that after the impulse sender transmits the last digit registered in the digit register 2600A with the automatic ring control relay R1980 operated, the counting relays, in conjunction with the prime mover relays, will count the spacing interval of three pulses and then operate the first error relay R2050. It is also to be noted that the counting of the three pulses to provide the time interval after the transmission of the last digit is exactly the same as the counting of the preliminary time spacing before the transmission of the first digit by the impulse sender except that the relay R2050 is operated instead of the alternator relays R2020 and R2030.

As soon as the relay R2050 operates it completes, at its contacts 2052, a locking circuit for its upper winding which includes ground at contacts 2063. Also, at its contacts 2054, the relay R2050 completes an obvious circuit for operating the second error relay R2060 and, at its contacts 2151, it interrupts the circuit for applying ground potential to the conductor C2118 and thereby terminates the cyclic operation of the prime mover relays. As soon as the second error relay R2060 operates, it completes a locking circuit for itself which includes the winding of the third error relay R2070, the contacts 2069 and ground at contacts 2044. However, this holding circuit does not become effective to operate a third error relay R2070 until the short-circuiting ground, at contacts 2054, is removed by the restoration of the first error relay R2050. Finally, at its contacts 2063, the relay R2060 interrupts the locking circuit for the upper winding of the first error relay R2050 which now restores to normal. It may be well to mention at this time, however, that the initial operating circuit for the upper winding of the relay R2050 is interrupted at the contacts 2151 of the third counting relay R2150 either by the removal of ground from the conductor C2118 or by the opening of contacts 2061. As soon as the first error relay R2050 restores to normal, it removes, at its contacts 2053, the short-circuit from the third error relay R2070. Consequently, the third error relay R2070 now operates in series with the second error relay R2060 over the previously traced circuit. As a further result of the restoration of the first error relay R2050, it recompletes, at its contacts 2051, the previously traced circuit for applying ground potential to the conductor C2118 thereby to reinitiate the cyclic operation of the prime mover relays. When the third error relay R2070 operates, at its contacts 2071, it connects an additional ground potential to the conductor C2118. Also, at its contacts 2075, the relay R2070 connects battery potential via the resistor 2084, contacts 2075, 2015 and 1985, the −D conductor C1875, contacts 1845*a* and 1817, the wiper 1875 and the −D conductor C1894 extending to the link 1300A.

It should be recalled at this time that when the digit send relay R2010 restored to normal, it connected ground potential via the contacts 2014 and 1982, the +D conductor C1874, contacts 1844*a* and 1816, the wiper 1874 and the +D conductor C1893 extending to the link 1300A. Accordingly, at this time resistance battery and ground are applied respectively to the − and + talking conductors C1401 and C1402 via the contacts 1332 and 1335 of the operated relay R1330 of the link 1300A to control the automatic switch or trunk circuit in the switch train to automatically signal the called subscriber substation or the called operator depending upon the ultimate destination of the particular call.

As a further result of the operation of the third error relay R2070, it prepares, at its contacts 2073 and 2074 points in the circuits for operating the sender release relay R1920 after the counting relays have counted ten additional pulses. With this arrangement, the impulse sender 1900A will maintain the ring control signal upon the conductors C1893 and C1894 extending to the link 1300A for the time interval that the counting relays require to count ten pulses, that is approximately one second. As an alternative arrangement, the contacts 2074, on the relay R2070, may be omitted from the circuit, in order to control the counting relays to count through two ten pulse counts before a circuit is completed for the sender release relay R1920. In this manner a two second automatic ring control signal is maintained upon the conductors C1893 and C1894.

In addition to preparing the circuit for the sender release relay R1920, the relay R2070, at its contacts 2071, applies ground potential via the contacts 2051, 1922, 1971, 2021 and 2031 to the conductor C2118 thereby to reinitiate the cyclic operation of the prime mover relays. At its contacts 2076, the relay R2070 applies an additional holding circuit for retaining the automatic ring control relay R1980 in its operated position and, at its contacts 2077, it completes a circuit for the lower winding of the sender relay R2040. The last mentioned circuit, however, is only effective to hold the sender relay R2040 over its lower winding when the operator has controlled her position equipment to connect the impulse sender 1900A to the rear of the link 1300A. At the present time, the operator has released her position equipment from the impulse sender and, consequently, the holding circuit is not completed for the lower winding of the relay R2040.

The prime mover relays R2080, R2085 and R2090 cyclically operate, in the manner previously described, and transmit pulses to the counting relays R2130 to R2170, inclusive. These pulses are counted in the manner previously described and after five pulses have been counted, the transfer relays R2110 and R2120 are operated in order to transfer the test conductor C2112 from circuits including the contacts 2131, 2141, 2151, 2161 and 2171 to the circuits including the contacts 2132, 2142, 2152, 2162 and 2172 of the counting relays. During the counting of the second five pulses transmitted to the counting relays, the relays R2130 to R2170 are reoperated in the manner previously described. When the fifth counting relay R2170 operates the second time, that is at the end of ten pulses ground potential is applied at the contacts 2172 via the contacts 2122, the test conductor C2112, the contacts 1953, 2073 and 2074 and the upper winding of the sender release relay R1920, to battery. The relay R1920 now operates and, at its contacts 1924, locks itself over a circuit including its lower winding to ground at contacts 1981′ of the operated automatic ring control relay R1980.

During the time that the prime mover relays are transmitting the ten pulses to the counting relays, the pulsing contacts 2088 of the prime mover relay R2085 are short-circuited by way of the contacts 1988 and 2016 in order to prevent pulses from being transmitted to the switch train over the EC pulsing conductor C1908.

In the above described operations of the prime mover relays and the counting relays, the counting of ten pulses takes approximately one second and therefore the ring control signal is maintained on the conductors C1893 and C1894 for a corresponding time interval. Shortly after the send release relay R1920 operates, the error relays R2060 and R2070 will restore to normal to disconnect the ring control signal.

Referring again to the sender release relay R1920, it will be seen that when the relay operates it interrupts, at its contacts 1922, the previously traced circuit for grounding the conductor C2118 thereby to cause the prime mover relays and the counting relays to restore to normal in the manner previously explained. At its contacts 1921, the relay R1920 interrupts the circuit for the upper winding of the sender relay R2040 which now restores to normal and, at its contacts 1923, it disconnects the holding ground potential DS conductor C1873. When the sender relay R2040 restores to normal, at its contacts 2141, it removes the first holding ground potential from the upper winding of the automatic ring control relay R1980. As a further result of the restoration of the relay R2040, at its contacts 2044, it interrupts the previously traced locking circuit for the relays R2060 and R2070 which now restore to normal. The relay R2070, upon restoring, at its contacts 2076, removes the final holding ground potential from the automatic ring control relay R1980 which now restores to normal and interrupts, at its contacts 1981′, the holding circuit for the lower winding of the sender release relay R1920. As a further result of the restoration of relay R1980, at its contacts 1982 and 1985 it disconnects the battery and ground potentials from the −D and +D conductors C1875 and C1874 in order to terminate the automatic ring control signal. The sender release relay R1920 now restores to normal to place the impulse sender 1900A in an idle condition and thereby render it available for use in an additional call.

During the release of the impulse sender 1900A, the holding ground for the lower winding of the switching relay R1810 is removed from the DS conductor C1873 and the relay restores to normal. Upon restoring, the relay R1810, at its various contacts, disconnects the impulse sender 1900A from the link 1300A. The send pilot lamp L1862 is extinguished as soon as the sender relay R2040 in the impulse sender restores to normal and thereby signals the operator that the impulse sender has been disconnected from the link 1300A.

Referring to the link 1300A, it will be noted that when ground potential is removed from the DS conductor C1892, upon the release of the sender 1900A, the relay R1330 restores to normal. Upon restoring, the relay R1330, at its contacts 1332 and 1335, disconnect the conductors C1893 and C1894 from the − and + talking conductors C1401 and C1402 extending to the toll preselector 1400 and, at its contacts 1331 and 1334, it connects the conductors C1401 and C1402 via the contacts 1343 and C1345 to the calling end of the connection via the − and + conductors C761 and C762. As a further result of the restoration of the relay R1330, at its contacts 1336, it connects the EC pulsing lead C1403 via the contacts 1362 and 1352 to the winding of the front supervisory relay R1370. A low resistance ground potential is returned over the conductor C1403, until the called subscriber answers, and operates the front supervisory relay R1370. This relay, at its contacts 1371, completes a circuit for illuminating the front supervisory lamp L1373 associated with the link 1300A to give the toll operator an "on hook" supervisory signal. It may be well to mention at this time that the rear supervisory relay R1310 is connected via the contacts 1321 and 1353 to the EC conductor C764 extending to the CLR trunk 600. A high resistance ground potential is applied to the conductor C764 from the CLR trunk 600 and prevents the relay R1310 from operating. Consequently, the contacts 1311 of this relay are opened and the rear supervisory lamp L1312 remains dark to give the toll operator an "off hook" supervisory signal. Accordingly, the rear supervisory lamp L1312 and the front supervisory lamp L1373 individually associated with the link 1300A are not illuminated when a subscriber or operator is connected to the rear and front of the link 1300A. When either the calling or the called party or operator involved in the connection replaces his receiver or flashes the switch hook, the corresponding supervisory lamp or lamps will be illuminated to indicate to the toll operator that the connection needs her attention or that the connection is to be released.

During the period that the front of the link 1300A is connected to the selector 1400, the relay R1360, at its contacts 1361, applies ground potential to the C conductor C1404 in order to retain any operated automatic switches included in the front connection in their operated positions until the link is released.

In the foregoing description it was assumed that the impulse sender 1900A was arranged to retain the automatic ring control signal on the +D and −D conductors C1874 and C1875 for approximately one second. As previously noted, the fact that the automatic ring control is applied to the above mentioned conductors for one second is determined by the circuit, including the contacts 2074, for controlling the operation of the send release relay R1920 after the counting relays have counted ten pulses. If desired, the ring control signal may be maintained for approximately two seconds by omitting the contacts 2074 and the circuit completed therethrough. If it is assumed that the contacts 2074 are omitted, then at the end of the counting of ten pulses, the counting relay R2170 upon operating, will apply ground potential via its contacts 2172, the contacts 2122, the test conductor C2112, the contacts 1953, 2973 and 1984 in order to simultaneously energize the upper and lower windings of the relay R2020 and to energize the lower winding of the relay R2030. The relay R2020 remains in its restored position but the relay R2030 now operates and locks itself in its operated position. Furthermore, the relay R2030, at its contacts 2031, removes ground potential from the conductor C2118 thereby to restore the operated counting relays to their normal positions and to terminate the cyclic operations of the prime mover relays. As soon as the counting relay R2170 restores to normal, ground potential is removed from the test conductor C2112 thereby to cause the relay R2020 to operate. The relay R2020, upon operating, at its contacts 2022, reapplies ground potential to the conductor C2118 thereby to control the prime mover relays and the counting relays to count ten additional pulses. Accordingly, when the counting relay R2170 counts the tenth pulse of the second group of ten pulses it again applies ground potential via its contacts 2172 to the test conductor C2112. Inasmuch as both relays R2020 and R2030 are now in their operated positions, the grounding of the test conductor C2112 causes the relay R2030 to restore to normal in the manner previously described. With the relay R2030 restored and the relay R2020 oeprated, a circuit will now be completed for operating the send release relay R1920. This circuit may be traced from ground at contacts 2048 of the operated sender relay R2040 and then via the contacts 2022′, 2039 and 2079 and the upper winding of the send release relay R1920, to battery. The send release relay R1920 now operates and controls the release of the impulse sender 1900A and the disconnection thereof from the connected link 1300A in the manner described previously.

In view of the foregoing description, it will be understood that the third error relay R2070, at its contacts 2075, will maintain resistance battery potential upon the —D conductor C1875 and the automatic ring control relay R1980 will maintain ground potential at its contacts 1982 upon the +D conductor C1874 for approximately two seconds.

*Stop dialing control of the impulse sender 1900A*

During the setting up of a connection from the link 1300A through the toll preselector 1400 and succeeding switches of a toll or local switch trains, under control of EC impulses transmitted by the impulse sender 1900A, a switching stage may be reached at which the interdigital pause between the transmission of pulses of successive digits is insufficient to permit the following switching stage to be conditioned to receive the pulses. In other words, if a delay between successive digits is required which is greater than the normal interdigital space pause, the impulse sender 1900A must be controlled so that it will not transmit impulses of the next digit until it is given a go-ahead signal. A stop dial signal is transmitted to the impulse sender 1900A by a return of a high resistance ground potential over the EC pulse conductor C1908. When a high resistance ground potential is applied to the EC pulsing conductor C1908 in place of the normal low resistance ground potential, the supervisory relay R1910 will restore to normal. The supervisory relay R1910 is provided with a low resistance winding having, for example, a resistance of 27 ohms. Normally, the resistance ground potential applied to the EC pulsing conductor C1908 from the switch train may be, for example, 250 ohms. With these resistances in series, the supervisory relay R1910 will operate, but if an additional resistance, for example 3000 ohms, is included in series with the 250 ohms, the supervisory relay R1910 will restore to normal. The restoration of the supervisory relay R1910 constitutes a signal to the impulse sender 1900A to stop dialing until the relay R1910 is again operated.

The manner in which the stop dial control functions in the impulse sender 1900A will now be described. When the supervisory relay R1910 restores it interrupts, at its contacts 1911, the circuit for the auxiliary supervisory relay R1940. The last mentioned relay, upon restoring, at its contacts 1943, completes a circuit for operating the first hold back relay R1950 which may be traced from battery, then via the winding of the relay R1950, contacts 1936, 1967, 1943, 1934 and 2012, to ground. It should be noted that during the transmission of impulses by the impulse sender 1900A, the relays R1930 and R2010 are in their operated positions. The relay R1950, upon operating, at its contacts 1955, completes a circuit including the contacts 2065 for short-circuiting the impulsing contacts 2088 of the prime mover relay R2085 thereby to prevent the prime mover relay R2085 from transmitting subsequent pulses over the EC pulsing conductor C1908. As a further result of the operation of the relay R1950, it completes a locking circuit for itself which includes the contacts 1936, 1951′, 1975, 2023′ and ground at contacts 2048. At its contacts 1954, the relay R1950 connects the test conductor C2112 from the counting relays to the multiple circuits for controlling the alternator relays R2020 and R2030. At its contacts 1951, the relay R1950 disconnects ground potential from the conductor C2113 thereby to prevent the counting relays from stopping the counting of the interdigital pause at the end of the seventh pulse transmitted thereto by the prime mover relays. Finally, at its contacts 1953′, the relay R1950 interrupts the circuit for applying ground potential to the MG conductor C2016 extending to the digit register 2600A thereby to prevent the next digit stored in the digit register from being marked on any one of the marking conductors C2018-1 to C2018-9, inclusive.

From the foregoing description, it will be understood that when a stop dial condition is indicated to the impulse sender 1900A by the high resistance ground potential applied to the EC pulsing conductor C1908, the interdigital spacing pause normally inserted between the transmission of successive digits will be extended from a seven pulse count to a maximum count of twenty pulses. The extension of the digit spacing interval is provided to permit the stop dial condition to be removed and thus enable the impulse sender 1900A to again transmit pulses corresponding to succeeding registered digits. The stop dial condition may be automatically removed either during the first cycle of ten impulse counts by the counting relays or during the second ten impulse counts. If the stop dial condition is not removed during the twenty pulse count by the counting relays, a signal is automatically transmitted to the operator to indicate that the impulse sender cannot complete the connection due to the fact that one of the automatic switches included in the switch train cannot extend the connection to the next switching point. The manner in which the impulse sender functions after the stop dial condition is encountered will now be described.

As pointed out above, when the high resistance ground potential is applied to the EC pulsing conductor C1908, the supervisory relay R1910 and the auxiliary supervisory relay R1940 restore in the order named followed by the operation of the hold back relay R1950. At the end of the pulsing of the preceding digit transmitted over the EC pulsing conductor C1908, the alternator relay R2020 restores to normal and causes ground potential to be reapplied to the conductor C2118. The application of ground potential to the conductor C2118 controls the cyclic operation of the prime mover relays R2080, R2085 and R2090, the sequential operation of the counting relays R2130 to R2170, inclusive, and, if necessary, the operation of the transfer relays R2110 and R2120, all in the manner previously described. Inasmuch as the hold back relay R1950 is now operated, it removes ground potential from the digit space test conductor C2113, at its contacts 1951, thereby to prevent the termination of the interdigital pause at the end of seven pulses transmitted by the prime mover relays. Therefore, the counting relays count through the first five impulses transmitted by the prime mover relays and to count through pulses 6 to 10 before ground potential is reapplied to the test conductor C2112. At the end of the tenth impulse count the relay R2170 operates and, at its contacts 2172, connects ground potential via the contacts 2122, the test conductor C2112, and the contacts 1954 to the upper and lower windings of the alternator relay R2020 and the lower winding of the alternator relay R2030. The relay R2030 operates as previously explained but relay R2020 remains in its restored position. The relay R2030, upon operating, at this time removes ground potential from the conductor C2118 thereby to terminate the cyclic operation of the prime mover relays and to restore the counting relays to their unoperated positions. As a further result of the operation of the relay R2030, at its contacts 2031′, it connects ground potential from the contacts 2048 via the contacts 1975, 1951′ and 1936 and the winding of relay R1950, to battery, thereby to provide an additional holding circuit for retaining the relay R1950 in its operated position.

When ground potential is removed from the conductor C2118 to terminate further operation of the prime mover relays and the counting relays, the alternator relay R2020 operates over a circuit including only its upper winding, as previously described, and, at its contacts 2022′, it prepares a point in the circuit, traced hereinafter, for operating the third hold back relay R1970. As a further result of the operation of the relay R2020, at its contacts 2022, it reapplies ground potential to the conductor C2118 thereby to again initiate the cyclic operation of the prime mover relays and the counting operation of the counting relays. At the end of the second pulse counting period of ten pulses, the counting relay R2170 again operates and, at its contacts 2172 applies ground potential to the test conductor C2112 thereby to complete a circuit for energizing the upper winding of the alternator relay R2030. Since the lower winding of the last mentioned relay is energized at this time and the upper and lower windings are in opposition to each other the relay now restores to terminate the cyclic operation of the prime mover relays and to restore any operated counting relays. As soon as the relay R2030 restores and before the relay R2020 has restored, a circuit is completed from ground at contacts 2048 via the contacts 2022′, 2039 and 2071′, the upper winding of the third hold back relay R1970, contacts 1965 and 1956, to battery. The relay R1970 operates as soon as the above mentioned circuit is completed and, at its contacts 1972, locks itself in its operated position over a circuit including its lower winding and ground at contacts 1957. As a further result of the operation of the relay R1970, at its contacts 1971, it interrupts a point in the circuit over which ground potential is applied to the conductor C2118 thereby to terminate further operations of the prime mover relays and the counting relays regardless of the positions of the alternator relays R2020 and R2030. At its contacts 1973, the relay R1970 connects the 120 IPM conductor C1968 via the contacts 2047, the SRL conductor C1881, the contacts 1843*a*3 and 1815′ to the send pilot lamp L1862. Ground pulses are applied to this circuit 120 times per minute to flash the send pilot lamp L1862 and thus indicate to the operator that a stop dialing condition has been encountered by the impulse sender 1900A. Also, at its contacts 1976, the conductor C1968 is connected via the SP conductor C1876, the contacts 1847*a* and 1819, the wiper 1877, the SP conductor C1396 extending to the link 1300A, the contacts 1333′ and the front supervisory lamp L1373, to battery. Accordingly, the front supervisory lamp L1373 flashes to indicate to the operator that the particular link 1300A is included in the connection over which the stop dial condition has been encountered.

The stop dial flashing signal of the send pilot lamp L1862 and the front supervisory lamp L1373 will be continued until the stop dial condition is automatically removed by the return of a low resistance ground potential over the EC pulsing conductor C1908, or until the operator releases the link 1300A and the switches in the switch train that have been controlled by the impulse sender.

It may be well to mention at this time that the stop dial condition may be removed from the EC pulsing conductor C1908 any time before the third hold back relay R1970 is operated and it may be removed any time after the third hold back relay R1970 has been operated but before the operator has released the connection. Therefore, if the stop dial condition is removed before the operator releases the connection, the flashing condition of the lamps will be terminated and the impulse sender will continue to transmit the impulses corresponding to the remaining digits registered in the digit register 2600A.

If the stop dial condition encountered by one of the switches in the switch train is removed by the substitution of a low resistance ground instead of the high resistance ground on the EC pulsing conductor C1908 before the third hold back relay R1970 is operated, that is during the time the prime mover relays and the counting relays are counting the twenty impulses, the supervisory relay R1910 is reoperated. The relay R1910, reoperates the auxiliary supervisory relay R1940 and the latter relay, at its contacts 1944, completes a circuit for operating the second hold back relay R1960. The circuit for operating the second hold back relay R1960 may be traced from battery via the winding of the relay, the contacts 1958, 1944, 1934 and 2012 to ground. As soon as the relay R1960 operates, it locks itself in its operated position via its contacts 1966 and ground, at contacts 1957. Also, at its contacts 1965, the relay R1960 interrupts a point in the circuit for the upper winding of the third hold back relay R1970 thereby to prevent the operation of the last mentioned relay at the end of the counting of twenty pulses by the counting relays as previously described.

When the twenty pulses have been counted by the counting relays, as previously described, the previously traced circuit including the contacts 2172 of the operated counting relay R2170 is completed in order to restore the alternator relay R2030 to normal. Upon restoring, the relay R2030, at its contacts 2031′, interrupts the locking circuit for the first hold back relay R1950. The relay R1950 now restores to normal and, at its contacts 1957 and 1958, opens points in the original circuit and the locking circuit for the second hold back relay R1960 thereby to restore the last mentioned relay. As a result of the restoration of both relays R1950 and R1960, at their contacts 1955 and 1964, they respectively remove the short-circuit from across the pulsing contacts 2088. At its contacts 1953′, the relay R1950 prepares a point in the circuit for reapplying ground potential to the conductor C2016 extending to the digit register 2600A. Finally, at its contacts 1951, the relay R1950 prepares a point in the previously traced circuit for applying ground potential to the digit space test conductor C2113 so that the prime mover relays and the counting relays may now count the seven pulse interdigital pause.

At the end of the counting of the interdigital pause, the alternator relays R2030 and R2020 will reoperate in the manner previously described to begin the transmission and counting of pulses corresponding to the next registered digits. Also, at its contacts 2025′, the relay R2020 applies ground potential to the conductor C2016 thereby to control the digit register 2600A to mark the marking conductors C2018–1 to C2018–9 in accordance with the registered digit which is now to be transmitted by the impulse sender.

In the above description, it was assumed that the stop dial condition was automatically removed before the third hold back relay R1970 was operated at the end of the counting of twenty pulses. It will now be assumed that the stop dial condition is removed by substituting the low resistance ground for the high resistance ground potential on the EC pulsing conductor C1908 after the third hold back relay R1970 has been operated but before the toll operator has released the connection. When this occurs, the supervisory relay R1910 and the auxiliary supervisory relay R1940 reoperate in the order named, as previously described. The relay R1940, upon operating, at its contacts 1943, interrupts a point in the circuit for the first hold back relay R1950 which restores to normal. The relay R1950, upon restoring, at its contacts 1956 and 1957, interrupts the circuit for the third hold back relay R1970 which also restores to normal. As a further result of the restoration of the relay R1950, it applies ground potential to the digit space conductor C2113 at its contacts 1951; it removes the short-circuit from the impulsing contacts 2088 at its contacts 1955; and it prepares a circuit for reapplying ground potential to the conductor C2016 at its contacts 1953′, in the manner previously described. As soon as the third hold back relay R1970 restores to normal, at its contacts 1973 and 1976, it disconnects the 120 IPM conductor C1968 from the circuits for the front supervisory lamp L1373 and the send pilot lamp L1862 thereby to terminate the flashing condition of these lamps. Finally, at its contacts 1971, the relay R1970 reapplies ground potential to the conductor C2118 thereby to reinitiate the cyclic operation of the prime mover relays to count the interdigital pause of seven pulses and then to transmit the impulses corresponding to the next registered digit. The impulse sender 1900A will now continue to transmit impulses corresponding to the remaining digits registered in the digit register 2600A.

In the foregoing description, it has been assumed that the impulse sender 1900A encountered a stop dial condition during the setting up of the connection by the substitution of a high resistance ground potential on the EC pulsing conductor C1908 for the normal low resistance ground potential. Since a stop dial condition is given by the switch train during a period when one switch is attempting to establish a connection with a succeeding switch or trunk, a steady high resistance potential is applied to the pulsing conductor C1908 and it is automatically removed when a succeeding idle switch or trunk is found. However, under certain conditions, all of the available succeeding switches or trunks, at any one switching stage, may be busy when a search is made to find an idle trunk. When an all-trunks-busy condition of this character is encountered at any particular switching stage during the setting up of the connection, alternate high and low resistance ground potential will be returned to the impulse sender 1900A over the EC pulsing conductor C1908. The alternate high and low resistance ground potentials will be applied to the conductor C1908 at the rate of 60 or 120 impulses per minute depending upon whether the busy condition is encountered respectively in a local switch train or a toll switch train. In any event, when this condition is encountered, the impulse sender 1900A may be automatically released inasmuch as it cannot complete the connection to the called destination. Accordingly, a description will now be given of the operation of the impulse sender 1900A when a flashing all-trunks-busy condition is returned over the EC pulsing conductor C1908. The alternate application of high and low resistance ground potential on the conductor C1908 will cause the supervisory relay R1910 to restore and reoperate at the same rate at which the high and low resistance ground potentials are applied. The relay R1910 restores in response to the first high resistance pulse and, at its contacts 1911, it opens the circuit for the auxiliary supervisory relay R1940 which also restores to normal. The relay R1940, upon restoring, at its contacts 1943, completes the previously traced circuit for operating the fist hold back relay R1950. As previously noted, the relay R1950, upon operating, at its contacts 1955, short-circuits the pulsing contacts 2088 and, at its contacts 1953′, it removes ground potential from the conductor C2016 in order to prevent the digit register 2600A from applying a marking ground potential on any one of the marking conductors C2018–1 to C2018–9.

Shortly after the first hold back relay R1950 operates, the high resistance ground potential on the EC pulsing conductor C1908 is replaced by a low resistance ground potential thereby to cause the supervisory relay R1910 to reoperate. At its contacts 1911, the relay R1910 again completes the circuit for operating the relay R1940 and the relay R1940, at its contacts 1944, completes a circuit for operating the second hold back relay R1960. The circuit for operating the second hold back relay R1960 may be traced from battery via the winding of the relay, the contacts 1958, 1944, 1934 and 2012, to ground. As soon as the relay R1960 operates it locks itself in its operated position via its contacts 1966 to ground at contacts 1957. The relay R1950 is now held in its operated position over a circuit including its winding, the contacts 1936, 1951′, 1975 and 2023′ and ground at contacts 2048. As a further result of the operation of relay R1960, at its contacts 1963, it prepares a point in the circuit for operating the send release relay R1920.

When the second pulse of high resistance ground replaces the low resistance ground potential on the conductor C1908, the supervisory relay R1910 restores to normal and again opens the circuit for the auxiliary supervisory relay R1940 which restores to normal. When the relay R1940 restores the second time, it completes, at its contacts 1943, the circuit for operating the sender release relay R1920. This circuit may be traced from ground at contacts 2012 then via the contacts 1934, 1943 and 1963 and the upper winding of the relay R1920, to battery. The relay R1920, upon operating, completes a locking circuit for itself which includes its lower winding, the "X" contacts 1924 and ground at contacts 2012. As a further result of the operation of the relay R1920, at its contacts 1922, it interrupts a point in the previously traced circuit for applying ground potential to the conductor C2118 and thus terminates further cyclic operation of the prime mover relays and the counting relays. The prime mover relays and the counting relays have been operating during the period of time that the alternate high and low resistance ground potential pulses have been applied to the EC pulsing conductor C1908. However, when the ground potential is removed from the conductor C2118, the prime mover relays and any operated counting relays are restored to normal. Also, at its contacts 1921, the relay R1920 interrupts the circuit for the upper winding of the sender relay R2040 which restores to normal and, at its contacts 1923, it disconnects the holding ground potential in the impulse sender 1900A from the DS conductor C1873.

The sender relay R2040 now restores and, at its contacts 2044, removes ground potential from the RLS conductor C2001 in order to control the digit register 2600A to release the remainder of the digits registered therein and remove the holding ground potential from the conductor C2002. The removal of ground potential from the hold conductor C2002 causes the digit send relay R2010 in the impulse sender 1900A to restore to normal.

When the sender release relay R1920 removes the holding ground potential from the DS conductor C1873, the switching relay R1810 restores to normal and disconnects the impulse sender 1900A from the link 1300A in the manner previously described. Referring to the link 1300A, it will be seen that when the holding ground potential is removed from the DS conductor C1873 and the DS conductor C1892, the digit send relay R1330 restores to normal. At its contacts 1337, the relay R1330 disconnects the EC pulsing conductor C1403 extending to the toll preselector 1400 from the EC conductor C1895 which has been connected to the EC pulsing conductor C1908 in the impulse sender; and, at its contacts 1336, it connects the EC conductor C1403 via the contacts 1362 and 1352 to the winding of the front supervisory relay R1370. The front supervisory relay will alternately operate and restore under control of the low and high resistance ground potentials transmitted thereto over the EC conductor C1403 from the switch train and, at its contacts 1371, it correspondingly flashes the front supervisory lamp L1373. The flashing condition of the lamp L1373 indicates to the toll operator that the link 1300A is the particular link involved in a connection having the all-trunks-busy condition. If the operator is connected to the link 1300A the EC conductor C1403 is connected via contacts 1336, 1362 and 1351, the FEC conductor C1380, the relay R2560, and the resistor 2560*a*, to battery. Relay R2560 follows the low and high resistance ground pulses and, at its contacts 2561, flashes the lamp L1373 to indicate the all-trunks-busy condition.

After the sender release relay R1920 and the sender relay R1940, in the impulse sender 1900A, restore to normal, any other operated relays are also restored in order to render the impulse sender available to control the setting up of other calls.

*Busy verification and dial back operation of the impulse sender 1900A*

In the foregoing description it was pointed out that an all-trunks-busy condition, encountered by the switch train during the setting up of a connection, transmitted alternate low and high resistance pulses, at the rate of 120 impulses per minute, back to the impulse sender 1900A in order to restore the sender to normal. When a connection is completed to the terminals of the desired called subscriber line and the called line is busy, alternate low and high resistance pulses, at the rate of 60 impulses per minute, are transmitted back to the impulse sender. The impulse sender 1900A will operate in the manner previously explained and release itself from the link 1300A. After the impulse sender is released, the front supervisory lamp L1373 in the link 1300A will be controlled by the front supervisory relay R1370 to flash at the rate of 60 impulses per minute over a circuit including the EC conductor C1403 to indicate to the toll operator that the called line has been reached but that the line is busy. If the final switches, that is the connectors, of the telephone system are provided with busy verification facilities they may be controlled to cut-in on the busy called line. In the present system the toll operator controls the impulse sender 1900A to transmit an additional digit in order to cut-in on the busy called line.

In the previous description of the operation of the impulse sender 1900A, it was assumed that after the operator keyed up all of the digits of the called subscriber number on the keyset K2647, she thereafter operated both the operator disconnect key K2649 and the sender disconnect automatic ring key K2648. The key K2649, as previously described, controls the automatic answer control circuit 2601 to disconnect the operator position equipment 2200A from the link 1300A. The operation of the key K2648, however, controls the impulse sender to transmit a one second automatic ring control signal after the last digit of the called subscriber number has been transmitted.

In order to describe the operation of the busy verification feature it will be assumed that the operator does not actuate the key K2649 and remains connected to the link 1300A. It will also be assumed that the operator does not actuate the key K2648 and thereby prevents the automatic ring control signal from being transmitted by the impulse sender. With the circuits conditioned in the manner noted above, the switching relay R1810 and the sender control relay R1820 in the link finder 1800A remain in their operated positions in order to retain the impulse sender 1900A connected to the link 1300A and the talk relay R1340 and the class control relay R1350 in the link 1300A remain in their operated positions in order to retain the operator equipment 2200A connected to the link 1300A.

The impulse sender 1900A having transmitted all of the digits registered in the digit register 2600A, remains connected to the link 1300A over the wipers of the link finder 1800A and the contacts of the operated switching relay R1810. The impulse sender 1900A is not released at this time due to the fact that ground potential is returned via the contacts 1812 of the operated switching relay R1810, the contacts 1842*a* and 1921 and the upper winding of the sender relay R2040, to battery. The relay R2040 in its operated position, at its contacts 2044, holds ground potential on the conductor C2001 in order to retain the digit register 2600A connected to the impulse sender and, at its contacts 2047, it maintains the circuit for illuminating the send pilot lamp L1862. As a further result of the transmission of the last digit, the impulse sender 1900A removes ground potential from the EC conductor C1873 thereby to cause the restoration of the relay R1330. The switching relay R1810 is locked in its operated position over a circuit including its upper winding. As soon as the relay R1330 restores to normal it connects the front of the link 1300A to the operator position so that the operator telephone equipment 2300 is connected over the — and + talking conductors C1401 and C1402. The EC conductor C1403 is now connected to the winding of the front supervisory relay R2560 in the manner previously described.

If the called line is busy, the 60 IPM high-low resistance flashing signal will be returned over the EC conductor C1403 and cause the relay R2560 to periodically operate and restore. At its contacts 2561, the relay R2560 applies ground potential to the conductor C1392 each time the relay is operated thereby to flash the front supervisory lamp L1373 and thus indicate to the operator that the called line is busy.

If the operator desires to cut-in on the busy called line she may now actuate the sender auxiliary start key K1890 to again prepare the impulse sender 1900A to transmit another digit over the EC pulsing conductor C1908 in order to control the final switch in the switch train to override the busy condition of the called line and establish a connection therewith. In the present description, it will be assumed that the single digit 1, when transmitted by the impulse sender, is sufficient to cause the connector to cut-in on the busy called line. Having operated the sender auxiliary start key K1890, the operator may then actuate the keyset K2647 to register the digit 1 in the digit register 2600A and she may then operate the sender disconnect key K2648 and the automatic ring key K1861. By actuating the automatic ring key K1861 the operator prevents the impulse sender 1900A from transmitting the one second automatic ring control signal after the registered digit has been transmitted. By actuating the key K2648 the operator controls the circuit for the sender disconnect relay R1850 and the last mentioned relay locks itself in its operated position and restores the sender control relay R1820. With the relay R1820 in its restored position, the impulse sender 1900A will automatically disconnect itself from the link 1300A after it has transmitted the single impulse corresponding to the digit 1 registered in the digit register 2600A.

When the sender auxiliary start key K1890 is momentarily operated in the manner described above, it applies ground potential via the contacts 1821′ and 1842*a*2, the SAS conductor C1880, the contacts 1917 and 2046 in order to operate the auxiliary start relay R1905. The relay R1905, upon operating, at its contacts 1907, completes a locking circuit for itself which is independent of the sender auxiliary start key K1890. As a further result of the operation of relay R1905, at its contacts 1906, it completes an obvious circuit for operating the auxiliary supervisory relay R1940.

As soon as the digit 1 has been registered in the digit register 2600A, a ground potential is applied to the conductor C2002 in order to operate the digit send relay R2010. The digit send relay, in turn, at its contacts 2013, reapplies ground potential via the contacts 1923, the DS conductor C1873 and the contacts 1843*a* for retaining the switching relay R1810 operated and via the contacts 1815, the wiper 1873 and the DS conductor C1892 for reoperating the disconnect sender relay R1330 in the link 1300A. When the relay R1330 reoperates, it disconnects the front of the link 1300A from the position equipment and connects it, over the previously traced circuits, to the impulse sender 1900A. At this time the 60 IPM high-low resistance flashing signal, returned over the EC conductor C1403, is connected via the EC conductor C1895 and the EC pulsing conductor C1908 to intermittently operate and restore the supervisory relay R1910 in the manner previously explained. The pulsing condition of the relay R1910, however, is of no importance at this time inasmuch as the auxiliary supervisory relay R1940 is locked in its operated position under control of the auxiliary start relay R1905.

The sender 1900A is now conditioned to send the digit 1 registered in the digit register 2600A and, as far as the impulse sender is concerned, it is the first digit of a number. In other words, the prime mover relays and the counting relays will operate through a preliminary three pulse count in the manner previously described before operations take place to ground the marking conductor C2018–1 in accordance with the digit 1 registered in the digit register. These operations are the same as has been described hereinbefore and need not be repeated at this time.

Accordingly, it will be assumed that when the counting relays operate, after the preliminary three pulse count, the first pulse will cause the counting relay R2130 to operate and connect the grounded conductor C2018–1 via the contacts 2131 and 2121, the test conductor C2112, the contacts 1953, 2072 and 1942 to control the alternator relays R2020 and R2030. These relays terminate the transmission of the single pulse in the manner previously described. It may be well to mention at this time, however, that the single interruption of the contacts 2088 to transmit the single pulse over the EC pulsing conductor C1908 may occur when either a high resistance or a low resistance ground potential is applied thereto over the EC conductor C1403 connected to the front of the link 1300A. The fact that the EC pulsing conductors C1403 and C1908 have alternate high and low ground potentials applied thereto does not prevent the single impulse transmitted by the impulse sender 1900A from controlling the final switch in the switch train because the line relay in the connector only responds to opening of the circuit therefor at contacts 2088. In response to the single impulse the final switch in the switch train will automatically cut-in on the busy line.

Since only one digit has been registered by the operator the digit send relay R2010 will restore to normal after the registered digit has been transmitted and when this relay restores, the impulse sender releases and it will be disconnected from the link 1300A. Accordingly, when the relay R2010 restores, at its contacts 2013, it removes ground potential from the DS conductor C1873. The relay R1810 now restores to normal and, at its contacts 1812, interrupts the circuit for the sender relay R2040. At its remaining contacts, the relay R1810 disconnects the wipers 1872 to 1879, inclusive, from the conductors extending to the impulse sender 1900A. When the ground potential is removed from the DS conductor C1873, the disconnect send relay R1330 in the link 1300A also restores to normal and reconnects the front of the link 1300A to the operator position equipment 2200A in the manner previously explained. At this time, the operator telephone equipment 2300 is connected to the front of the link over a circuit which includes the conductors C2300*a* and C2300*b*, the contacts 2355 and 2357, 2364 and 2366, 2473 and 2477 and 2532 and 2534, conductors C1378*a* and 1378*b*, contacts 134 and 1344, 1331 and 1334 and the — and + conductors C1401 and 1402 which are now connected through the various switches in the switch train to the called subscriber line. The operator may now determine whether or not the particular called subscriber line is involved in a connection with another subscriber by listening to the conversation thereover and if she desires she may converse with the called subscriber.

If the toll operator now desires to disconnect her position equipment 2200A from the link 1300A she may momentarily operate the disconnect key K2649 and thus cause the previously described operation of the position disconnect relay R2620 and the automatic answer control circuit 2601. The relay R2620 will lock itself in its operated position until the switching relay R2610 restores to normal. The relays R1340 and R1350 in the link 1300A restore to normal in the manner previously described to interconnect the rear and front of the link 1300A. The toll operator is now free to handle the next incoming call received at her position.

When a connection is completed over the link 1300A, in the manner described above, the supervisory signals to the operator are supplied by the rear supervisory lamp L1312 and the front supervisory lamp L1373 associated with the link 1300A. In order to inform the operator that the link 1300A is included in a connection, the link busy lamp L1372 remains illuminated. The EC conductor C764, connected to the rear of the link, and the EC conductor C1403, connected to the front of the link, are respectively connected to the rear and front supervisory relays R1310 and R1370. During the time the calling and called parties are interconnected via the link 1300A, these EC conductors have a high resistance ground potential applied thereto to prevent the relays R1310 and R1370 from operating and consequently, the associated supervisory lamps remain dark to indicate an "off hook" condition. The toll operator at position 2200A may be signalled over the rear or front of the link 1300A by alternate high and low resistance ground potential applied to the EC conductors C764 or C1403 to cause the supervisory relays R1310 or R1370 to operate and restore a number of times. At the contacts 1311 and 1371, these relays respectively complete circuits for illuminating the lamps L1312 and L1373. A flashing condition of either of these lamps notifies the operator that the party connected to the corresponding end of the link requires further service. If the operator is free to answer this signal, she will actuate the talk key K1377 and connect her telephone equipment 2300 to both the front and rear of the link so that the calling and called parties and the toll operator at position 2200A will be connected in a three-way conversational circuit. If the subscribers involved in the connection have disconnected, the supervisory lamps L1312 and L1373 will be steadily illuminated and the operator upon connecting her telephone equipment 2300 with the link may check the connection to determine that it has been released.

In order to release the link 1300A, the operator may actuate the front release key K1374 and the rear release key K1375. These keys are shown separately in the link 1300A but it should be understood that the contacts of these keys may be included as a single key to permit the operator to simultaneously release the front and rear of the link by actuating the single key. The rear release key K1375 short-circuits the upper winding of the rear link relay R1320 thereby to restore the relay to normal and disconnect the rear of the link from the calling end of the connection. The front release key K1378 short-circuits the upper winding of the relay R1360 and the latter relay, upon restoring, disconnects the front of the link from the called end of the connection. The operator may then restore the talk key K1377 to disconnect her position equipment 2200 from the link 1300A either before or after the keys K1374 and K1375 are actuated. When the key K1377 is restored to normal, the operated relays R1340 and R1350 will restore in the manner previously described and thereby place the link 1300A in an idle condition and available to accept additional calls.

If the operator desires to monitor an established connection including the link 1300A at a time when her position is connected to another link, she may actuate the monitor key K1376 associated with the link 1300A. It should be noted, however, that when the operator position equipment 2200A is connected to a second idle link, the relay R2350 in the position equipment will be operated in series with the multiply connected relays R1340 and R1350 in the second link.

Figure 26:
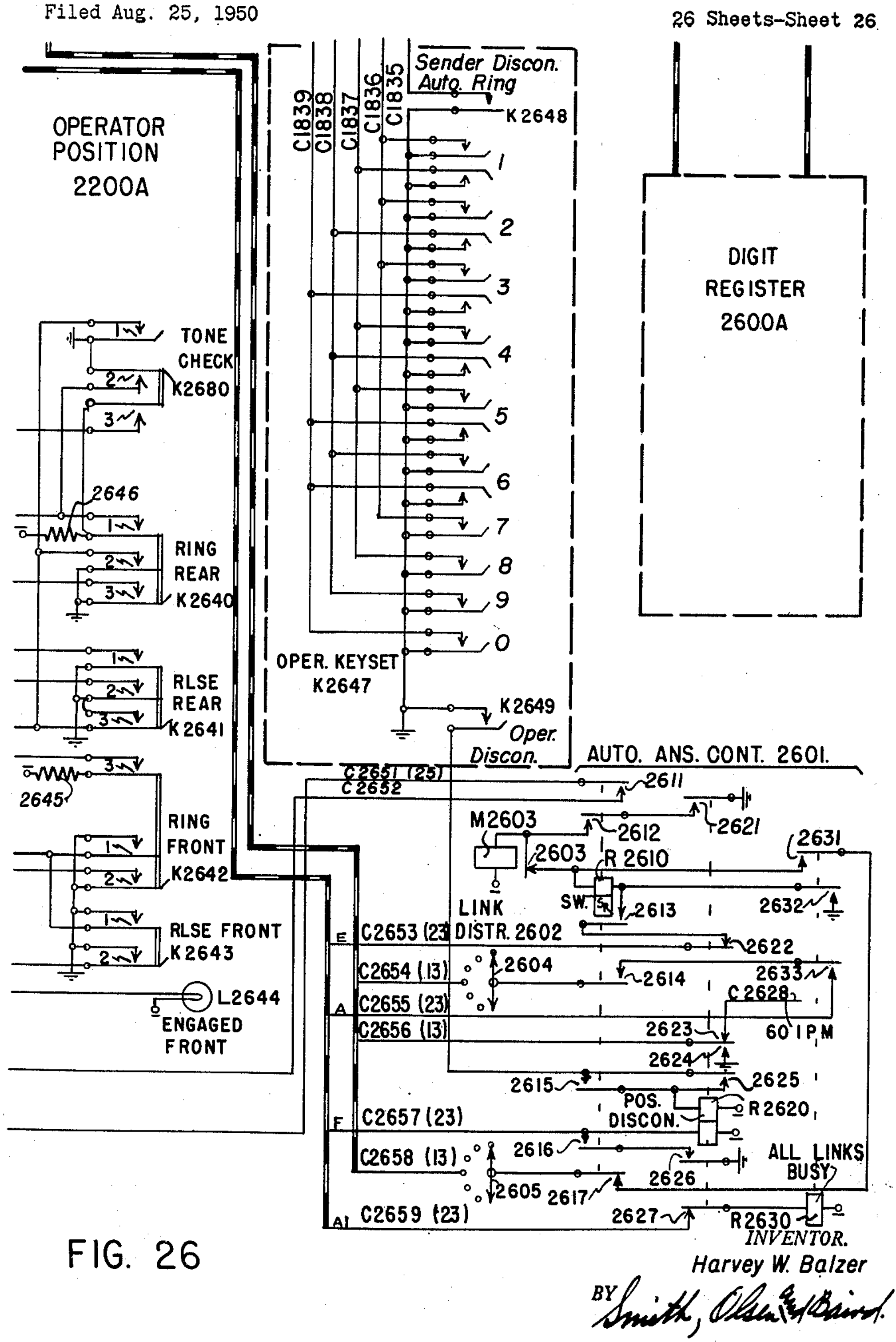

Actuation of the monitor key K1376 closes the contacts 3 thereof to apply ground potential via the conductor C1395 extending to the position equipment 2200A, the contacts 2362', the contacts 2358 of the operated talk relay R2350, the contacts 2329, the contacts 2312, the conductor C2657 extending to Fig. 26 and the lower winding of the position disconnect relay R2620, to battery. The relay R2620 will operate at this time to disconnect the position equipment 2200A from a second idle link, such as the link 1300A. At this time the relays R2350 and R2320 in the position equipment restore to normal. The relay R2350, upon restoring, at its contacts 2359, connects the grounded conductor C1395 to the winding of the monitor relay R2340 in order to operate the last mentioned relay. As a further result of the operation of the relay R2340, at its contacts 2349, it connects ground potential to the conductor C2647 in order to retain the position disconnect relay R2620 in its operated position. At its contacts 2344 and 2346, the relay R2340 connects the conductors **C2300*c* and C2300*d* from the operator telephone equipment 2300 via the monitor coil 2381 and the contacts 2354 and 2356 to the conductors C1394*a* and C1394*b* extending to the link 1300A. The above mentioned conductors C2300*c* and C2300*d* are connected to the receiver circuit of the operator telephone equipment 2300** in the usual manner.

Referring now to the link 1300A, it will be seen that the conductors **C1394*a* and C1394*b* are connected via the contacts 1 and 2 respectively of the monitor key K1376 to an intermediate point in the — and + talking conductors connected to the rear and front of the link 1300A. Consequently, the toll operator may now listen to the conversation between the calling and called parties involved in the connection. When the operator has determined by monitoring the connection that it is satisfactory she may again restore the monitoring key K1376. Restoration of the monitoring key K1376 disconnects operator from the talking connection and it removes ground potential from the conductor C1395. The removal of ground potential from the conductor C1395 causes the monitor relay R2340 to restore to normal and interrupt, at its contacts 2349, the previously described circuit for the position disconnect relay R2620. The position disconnect relay R2620 now restores to normal thereby to permit the operator position equipment 2200A to automatically accept new calls received over idle links selected by the automatic answer control circuit 2601**.

*Operation of the toll preselector 1400*

The setting up of the connection responsive to the transmission of impulses corresponding to the digits registered in the digit register 2600A by the impulse sender 1900A, will now be described in further detail. It will be recalled, however, that in describing the operation of the impulse sender 1900A it was pointed out that the impulses of the digits are transmitted to the toll preselector 1400 over the EC conductor C1403. When the selector 1400 is initially seized over the front of the link 1300A, the pulse relay R1420 is operated over a circuit including its low resistance upper winding and the EC conductor C1403 and ground potential is applied to the C conductor C1404. The ground potential applied to the C conductor C1404 is extended via the vertical-off-normal contacts VON1459A, the contacts 1434' and the upper winding of the transfer relay R1480, to battery. The transfer relay R1480 operates over this circuit. The pulse relay R1420, in turn, operates the hold relay R1450 over a circuit including its contacts 1421. When the relay R1450 operates, it completes, at its contacts 1451, an additional circuit for grounding the C conductor C1404. When the transfer relay R1480 operates it completes a circuit for operating the control relay R1410 which may be traced from grounded conductor C1404 via the contacts 1452, 1482, 1444 and the winding of the relay R1410, to battery. As a further result of the operation of relay R1480, at its contacts 1486, it prepares a pulsing circuit for controlling the vertical magnet VM1459 in multiple with its lower winding. The relay R1410, upon operating, as noted above, at its contacts 1417, prepares a point in the circuit for controlling the operation of the stepping relay R1490. Accordingly, prior to the time that impulses are transmitted over the EC pulsing conductor C1403, the relays R1410, R1420, R1450 and R1480 in the toll preselector 1400 are in their operated positions.

The pulses received over the conductor C1403 control the pulse relay R1420 to restore and reoperate a number of times corresponding to the number of impulses in the digit transmitted. Each time the relay R1420 restores, it completes a circuit from ground, contacts 1469, 1422, 1455 and 1486, the lower winding of relay R1480 and battery and in multiple therewith the contacts 1447, the winding of the vertical magnet VM1459 and battery. The vertical magnet operates and restores under control of the contacts 1422 and raises the wipers 1493 to 1497, inclusive, step-by-step in a vertical direction to a level corresponding to the number of impulses in the digit transmitted to the relay R1420. In response to the first vertical step of the above named wipers, the vertical-off-normal contacts VON1459A are opened and the vertical-off-normal contacts VON1459B, VON1459C and VON1459D are closed. The contacts VON1459A interrupt the previously traced circuit for the upper winding of the transfer relay R1480 but, due to its slow-to-release characteristics, the relay R1480 remains in its operated position under control of the impulses transmitted to its lower winding and the vertical magnet. The contacts VON1459B upon closing, connect the ground potential at the contacts 1451 via the contacts 1465, 1453, 1438, 1474 and 1444 for retaining the relay R1410 in its operated position after contacts 1482 are opened by relay R1480. Finally, the contacts VON1459C complete an operating circuit for the step relay R1490 which may be traced from battery via the winding of the relay, the contacts 1499, VON1459C, 1454, 1449, 1417 and 1485 and ground at contacts 1451. The relay R1490 operates over the above described circuit and, at its contacts 1492, it completes a locking circuit for itself which may be traced from battery via the winding of the relay, contacts 1499, VON1459C, 1454, 1449, 1492 and 1469, to ground.

The toll preselector 1400 is arranged to be used as both a single digit selector on certain specified levels and as a two digit trunk hunting selector on other specified levels. Accordingly, the selector 1400 is provided with both right and left normal post springs designated respectively RNP1489 and LNP1488A and LNP1488B. The right normal post springs RNP1489 are closed on those levels of the selector that are selectably in response to a single digit. The left normal post springs LNP1488A and LNP1488B are closed only on those levels of the selector which are selectable in response to two digits.

In the present case, it will be assumed that the single digit dialed is one that raises the wipers of the switch to a single digit level and consequently, the right normal post springs RNP1489 are closed. When the springs RNP1489 are closed, a circuit is completed from the grounded conductor C1404 for operating the relay R1470. The relay R1470, in turn, at its contacts 1474, opens a point in the previously described holding circuit for the relay R1410. Shortly after the last impulse of the vertical series has been transmitted the transfer relay R1480 restores to normal and, at its contacts 1482, interrupts a further point in the holding circuit for the relay R1410. The relay R1410 now restores to normal and, at its contacts 1416, completes a circuit from battery via the winding of the rotary magnet RM1498, the contacts 1448, 1416, 1491 and 1484 and the grounded conductor C1404. The magnet RM1498 operates over this circuit and interrupts, at its contacts 1499, the circuit for the step relay R1490 and it simultaneously rotates the wipers 1493 to 1497, inclusive, one step into engagement with the first set of bank contacts in the selected level. The step relay R1490 now restores to normal and, at its contacts 1491, it interrupts the circuit for the rotary magnet RM1498 which also restores to normal.

If the first trunk connected to the first set of bank contacts in the selected level is busy, ground potential is encountered by the C wiper 1497 thereby to short-circuit the switching relay R1460 and prevent its operation at this time. However, the ground potential encountered by the wiper 1497 is connected via the contacts 1467, 1449, 1454, VON1459C and 1499 and the winding of the step relay R1490, to battery. The step relay R1490 reoperates and, it its contacts 1491, recompletes the previously described circuit for operating the rotary magnet RM1498. The rotary magnet again operates to advance the wipers one additional step in the rotary direction and interrupts, at its contacts 1499, the above traced circuit for the relay R1490 which again restores to normal. In this manner, the step relay R1490 and the rotary magnet RM1498 interact to automatically rotate the wipers of the switch step-by-step until the C wiper 1497 fails to encounter a busy marking ground potential or until the wipers have rotated eleven steps to indicate that all of the trunks in the selected level are busy.

As soon as the C wiper 1497 engages an ungrounded contact in the selected level, indicating that an idle trunk line has been found, the short-circuit is removed from the switching relay R1460 and it now operates in series with the step relay R1490. The circuit for operating the relay R1460 may be traced from battery via the winding of relay R1490, contacts 1499, VON1459C, 1454 and 1449, the winding of relay R1460, contacts 1442′, CAM1408, and the grounded conductor C1404. Due to the high resistance of the winding of the switching relay R1460, the step relay R1490 does not operate. The switching relay R1460, upon operating, at its contacts **1461*a* and 1461*b*, connects the − and + talking conductors C1401 and C1402, via the wipers 1493 and 1494 to the − 2 + conductors of the selected trunk line. As a further result of the operation of the switching relay R1460, at its contacts 1462*a*, it disconnects the EC conductor C1403 from the upper winding of the pulse relay R1420 and, at its contacts 1462*b*, it transfers the EC conductor C1403 via the wiper 1495 to the EC conductor of the selected trunk line. At its contacts 1469, the relay R1460 interrupts the circuit for the hold relay R1450 which slowly restores to normal; at its contacts 1468, it connects a holding ground potential via the C wiper 1497 to the C conductor of the selected trunk line; and finally, at its contacts 1466, it completes a locking circuit for itself. This locking circuit may be traced from the grounded conductor C1404 via the eleventh rotary step cam contacts CAM1408, the contacts 1442′, the winding of the switching relay R1460, the contacts 1466, VON1459C and 1499 and the winding of the step relay R1490, to battery. The switching relay R1460 and the relay R1470 are now retained in their operated positions over the C conductor C1404 under control of the grounded C conductor C1404 from the link 1300A. The relays R1420 and R1450, upon restoring, as noted above, prepare points in the circuit, at their respective contacts 1422 and 1456 for controlling the release magnet M1487** when the connection is subsequently released.

The subsequent digits transmitted over the EC conductor C1403 by the impulse sender 1900A control the subsequent switches in the switch train over the selected idle trunk line to extend the connection to the desired called subscriber or the desired toll operator in the next switching center.

By referring to Figs. 1, 2 and 14 of the drawings, it will be seen that the toll preselector 1400 has access via its associated bank contacts to various switching points. It may be well to mention, however, that the bank contacts of the toll preselector 1400, the delay call selector 113 and the intertoll selector 112 are multiply connected so that each of these switches have access to the same switching points. Accordingly, the toll operator at the operator position 2200A may register digits in the digit register 2600A that will control the toll preselector 1400A to select a two-way trunk 210 in order to extend the connection via the toll line 212 and the two-way trunk 204 to the dial toll board 205 or to a desired called subscriber via the automatic switch train in the distant automatic exchange 203. The operator may also register digits which will cause the toll preselector 1400 to select an intertoll trunk 400 over the cable 580 in over to extend the connection over the toll line 213 to the toll board 207 or to a desired called subscriber via the automatic switch train in the distant toll center 206. The toll operator may also register digits to control the toll preselector 1400 to select the toll ring-down trunk 800 over the cable 960 in order to extend the connection over the toll line 211 to the toll switchboard 201 in the distant manual office 200. Also, the toll operator may register digits ot control the toll preselector 1400 to select the incoming trunk 209 in order to extend a connection over the trunk line 214 to a subscriber in the CAX 208. Finally, the toll operator may register digits to control the toll preselector 1400 to select the outgoing trunk 108 associated with the toll intermediate selector 109 in order to extend a connection via the local second selector 104 and the local connector 105 to a called subscriber in the central office 100.

In the last mentioned connection, which includes the outgoing trunk 108, it is necessary to convert certain of the switch controlling EC impulses transmitted over the EC conductor C1403 by the impulse sender 1900A into loop impulses in order to complete the connection. This converting of pulsing, of course, would not be necessary if all of the above named switching apparatus is designed to respond to EC impulses in the same manner as the toll preselector 1400. However, if the switches are designed ot respond to loop pulses then the EC pulsing must be converted. Accordingly, the outgoing trunk 108 is arranged to receive the EC pulses transmitted over the EC conductor C1404 to the EC wiper 1495 of the toll preselector 1400, convert them into loop pulses, and repeat the loop pulses to the toll intermediate selector 109. Also subsequent EC pulses are converted into loop pulses and repeated by the trunk 108 to control subsequent switches in the switch train and set up connections to the called line. When the called subscriber answers the call, the connector 105 will normally reverse the direction of current flow over the loop circuit back to the outgoing trunk 108 in order to return answering or off-hook supervision. The outgoing trunk 108, in turn, is arranged to convert the reversal of current flow over the loop circuit into a high resistance pulse and transmit the same back over the EC conductor to the link 1300A in order to give an "off hook" supervisory signal to the toll operator. An outgoing trunk circuit and a connector of the type described above are disclosed and claimed in the copending application of Balzer and Bakker, Serial No. 181,511, filed August 25, 1950.

At this time it may be well to mention that in certain systems the connector circuits, such as the connector 105, are arranged to transmit an answering supervisory signal by including a high resistance in series with the loop circuit for the connector. Since the outgoing trunk 108 is arranged to respond only to reverse battery answering supervisory signals, an adapter circuit 104A may be also included in the connection for the purpose of converting the high resistance answering supervisory signal applied to the loop circuit of the connector into a reverse battery supervisory signal. The reverse battery signal will control the outgoing trunk 108 to transmit the EC control "off-hook" supervisory signal back to the toll operator. An adapter circuit and a connector of the type noted above are also disclosed and claimed in the above mentioned copending Bakker and Balzer application.

In order to describe the release of the toll preselector 1400, it will now be assumed that the connection has been established between the calling and called subscribers. When the called subscriber releases the connection, an "on hook" supervisory signal will be transmitted back over the connection via the EC conductor C1403 to the link 1300A to signal to the toll operator that the called subscriber has disconnected. The toll operator may now actuate the front release key K1375 to restore the relay R1360 and thereby remove ground potential from the C conductor C1404 and battery potential from the EC conductor C1403. The removal of the holding ground potential from the C conductor C1404 causes the switching relay R1460 and the relay R1470 in the toll preselector 1400, to restore to normal. The above mentioned relays are the only relays operated during the time that the connection is completed through the selector 1400. As soon as the relay R1460 restores to normal, it completes a circuit including the grounded contacts 1469, the contacts 1422, 1456 and VON1459D for operating the release magnet M1487. The release magnet M1487, upon operating, controls the switch mechanism to restore the wipers 1493 to 1497, inclusive, to their normal resting positions, in a conventional manner. As soon as the wipers return to normal, the vertical-off-normal contacts VON1459A, VON1459B, VON1459C and VON1459D assume the positions illustrated in the drawings. The contacts VON1459D interrupt the above traced circuit for the release magnet M1487 which also restores to normal. It should be noted that as soon as the wipers leave the selected level as they restore to the normal resting positions, the right normal post springs RNP1489 are opened to interrupt a further point in the circuit of relay R1470. The toll preselector 1400 is now fully restored to normal and rendered available to the associated link 1300A for another call.

In order to describe the operation of the toll preselector 1400 whereby an all-trunks-busy signal is returned to the impulse sender 1900A, it will now be assumed that the wipers 1493 to 1497, inclusive, fail to encounter an idle trunk during the automatic rotary stepping of the switch. When the wipers are rotated to the eleventh rotary step position, the cam contacts CAM1406, CAM1407 and CAM1409 are closed and the cam contacts CAM1408 are opened. It should be noted, however, that during the rotary stepping of the selector 1400 the step relay R1490 and the rotray magnet RM1498 interact in the manner previously described and the pulse relay R1420, the hold relay R1450 and the relay R1470 are in their operated positions. When the cam contacts CAM1408 are opened, the test circuit for the switching relay R1460 is interrupted in order to prevent this relay from operating and when the cam contacts CAM1409 are closed an operating circuit is completed for the relay R1430. The circuit for operating the relay R1430 may be traced from the grounded C conductor C1404 and then via the cam contacts CAM1409 and the upper winding of relay R1430, to battery. The cam contacts CAM1407 connect the grounded C conductor C1404 to the winding of the control relay R1410 in order to reoperate the last mentioned relay. The relay R1430, upon operating, at its contacts 1431', locks itself to the grounded conductor C1404. Also, the relay R1430, at its contacts 1437, completes an operating circuit for the relay R1440 which includes the cam contacts CAM1406 and the grounded C conductor C1404. Consequently, the relays R1410, R1430, R1440 and R1470 are now retained operated over circuits including the grounded conductor C1404. Accordingly, a circuit is now completed from ground via the high resistance lower winding of the pulse relay R1420, the contacts 1413, 1442 and 1433, the low resistance upper winding of the relay R1420, the contacts 1462 and the EC conductor C1403. The high resistance lower winding of the relay R1420, now included in the EC pulsing circuit, controls the supervisory relay R1910 in the impulse sender 1900A, in the manner previously described. In addition to the foregoing, the relay R1410, at its contacts 1411, connects the 1201MP conductor via the contacts 1431 to the high resistance lower winding of the pulse relay R1420. Ground pulses at the rate of 120 per minute intermittently short-circuit the high resistance lower winding of the relay R1420. With this arrangement, low and high resistance pulses are alternately returned over the EC conductor C1403 in order alternately to operate and restore the supervisory relay R1910 in the impulse sender 1900A. The impulse sender now responds in the manner previously described to cause both the send pilot lamp L1862 and the front supervisory lamp L1373 to flash 120 times per minute. Accordingly, the toll operator is informed that an all-trunks-busy condition has been encountered by the toll preselector 1400.

In order to describe the release of the toll preselector 1400 after an all-trunks-busy condition has been encountered, in the manner described above, it will be assumed that the operator upon receiving the all-trunks-busy condition, actuates the front release key K1374 in order to remove battery and ground potential respectively from the EC conductor C1403 and the C conductor C1404. During an all-trunks-busy condition in the toll preselector 1400, the relays R1410, R1420, R1430, R1440, R1450 and R1470 are in their operated positions. When the battery potential is removed from the EC conductor C1403 the circuit for the pulse relay R1420 is interrupted and the relay restores to normal. At its contacts 1421, the relay R1420 interrupts the circuit for the slow-to-release hold relay R1450 which slowly restores to normal. As soon as the relay R1450 restores, it completes, a circuit including the grounded contacts 1469, the contacts 1422, 1456, and VON1459D for operating the release magnet M1487. As a further result of the restoration of the hold relay R1450, at its contacts 1451, it removes the final holding ground potential from the C conductor C1404 thereby to interrupt the circuits for the relays R1410, R1430, R1440 and R1470 and these relays now restore to normal. The release magnet M1487 operates over the above mentioned circuit and controls the switch mechanism to restore the wipers 1493 to 1497, inclusive, to their normal resting positions, in a conventional manner. Accordingly, the right normal post springs RNP1489, the eleventh rotary step cam contacts CAM1406, CAM1407, CAM1408 and CAM1409 and the vertical-off-normal contacts VON1459A, VON1459B, VON1459C and VON1459D all assume the positions illustrated in the drawings. The contacts VON1459D interrupt the circuit for the release magnet M1487 which now restores to normal. The toll preselector 1400 is now fully released and rendered available to complete calls received over the front of the associated link 1300A.

The foregoing description of the operation and the release of the toll preselector 1400 was based on the assumption that the single digit transmitted to the selector raised its wipers to a predetermined level that caused the actuation of the right normal post springs RNP1489. Accordingly, the selector 1400 automatically rotates its wipers over the selected level to search for an idle trunk line. As previously noted, the toll preselector 1400 is also arranged for two digit operation when the wipers of the switch are raised to other predetermined levels. The levels of the selector which are arranged for two digit operation are provided with the left normal post springs LNP1488A and LNP1488B. The seizure and and vertical stepping of the toll preselector 1400 for two digit operation is exactly the same as has been described hereinbefore for single digit operation except that it will be assumed that the left normal post springs LNP1488A and LNP1488B are operated and that the right normal post springs RNP1489 remain in their unoperated positions. During the vertical st.pping of the selector 1400, the relay R1420 follows the impulses transmitted over the EC conductor C1403, the hold relay R1450 remains in its operated position, and the slow-to-release transfer relay R1480 remains in its operated position as the vertical magnet VM1459 is intermittently operated to advance the wipers step-by-step in the vertical direction. The control relay R1410 is operated as soon as the wipers take the first vertical step and its remains in its operated position until the transfer relay R1480 restores at the end of the first digit.

At the end of the transmission of the first digit, the wipers 1493 to 1497, inclusive, are raised to the two digit level and close the left normal post springs LNP1488A and LNP1488B. The springs LNP1488B, upon closing, complete an alternate circuit for holding the relay R1910 in its operated position which may be traced from the ground at contacts 1451 and then via the vertical-off-normal contacts VON1459B, the contacts 1465, 1453 and 1438, the springs LNP1488B, the contacts 1444 and the winding of the control relay R1410, to battery. Shortly after the last impulse has been transmitted to the vertical magnet VM1459 and the transfer relay R1480, the relay R1480 restores to normal, as previously described, and, at its contacts 1482, interrupts a point in the initial operating circuit for the relay R1410. However, the relay R1410 remains operated, as previously noted. As a further result of the restoration of the relay R1480, at its contacts 1485, it interrupts a point in the circuit for the stepping relay R1490. This relay, it will be recalled, operated as soon as the vertical-off-normal contacts VON1459C closed in response to the first vertical step of the switch wipers. The relay R1490 now restores to normal. Inasmuch as the control relay R1410 is retained in its operated position after the transmission of the first series of impulses to the vertical magnet VM1459, it disconnects, at its contacts 1416, the circuit for the rotary magnet RM1498 and thus prevents the automatic rotary stepping of the wipers on two digit levels. As a further result of the restoration of the relay R1480, at its contacts 1481, it completes a circuit for operating the relay R1440 which may be traced from battery via the winding of the relay, the contacts 1436 and 1481, the springs LNP1488B, the contacts 1438, 1453, 1465 and VON1459B and the grounded conductor C1404. The relay R1440, upon operating, at its contacts 1445, completes a locking circuit for itself which is independent of the contacts 1436 and 1486 included in the original operating circuit. As a further result of the operation of the relay R1440, at its contacts 1444, it interrupts the circuit for the control relay R1410 which now restores to normal and, at its contacts 1441′, it completes a circuit for reoperating the transfer relay R1480 from battery via the upper winding of the relay R1480, the contacts 1434′ and 1441′, the cam contacts CAM1408 and the grounded conductor C1404.

When the transfer relay R1480 operates a second time, as described above, at its contacts 1482, it completes a multiple circuit, including the grounded conductor C1404, the contacts 1452 and 1445, for holding the relay R1440 in its operated position. Also, at its contacts 1483, the relay R1480 now prepares a pulsing circuit for the rotary magnet RM1498 whereby the rotary magnet may be directively controlled by pulses, corresponding to the second digit, transmitted over the EC conductor C1403 to the pulse relay R1420. The toll preselector 140 is now conditioned to respond to the second digit to rotate the wipers 1493 to 1497, inclusive, over the contacts of the selected level into engagement with a particular set of contacts. At this time, the relays R1420, R1440, R1450 and R1480, in the selector 1400, are in their operated positions.

The second series of impulses transmitted over the EC conductor C1403 control the pulse relay R1420 in the manner previously described. The first time the pulse relay R1420 restores to normal, it completes, at its contacts 1422, a circuit which may be traced from ground at contacts 1469 and then via the contacts 1422, 1455 and 1486 to the lower winding of the transfer relay R1480 and also via the contacts 1446 and 1483 and the winding of the rotary magnet RM1498, to battery. A third branch of the pulsing circuit described above, includes the contacts 1469, 1422, 1455, 1486, 1446 and 1432′ and the winding of the relay R1430, and battery. The relay R1430 operates in response to the first pulse transmitted to the rotary magnet. The rotary magnet RM1498 follows each of the pulses and the lower winding of the transfer relay R1480 is energized in response to each pulse in order to maintain the relay operated during the transmission of pulses to the rotary magnet.

As soon as the relay R1430 operates, it completes, at its contacts 1431′, a locking circuit for itself which includes its upper winding and the grounded C conductor C1404. Also, at its contacts 1432′, the relay R1430 interrupts its original operating circuit for its lower winding and, at its contacts 1434′, it interrupts the original operating circuit for the upper winding of the transfer relay R1480. The slow-to-release transfer relay R1480 is now maintained in its operated position under control of the impulses transmitted to the rotary magnet RM1498. The rotary magnet RM1498 operates and restores in response to the impulses transmitted by the pulse relay R1420 in order to rotate the wipers 1493 to 1497, inclusive, step-by-step into engagement with a set of contacts corresponding to the number of impulses of the second digit.

After the last impulse has been transmitted to the pulse relay R1420, it remains in its operated position and, at its contacts 1422, interrupts the previously traced circuit for the transfer relay R1480 and the rotary magnet RM1498. The relay R1480 slowly restores to normal and when it is fully restored, it interrupts, at its contacts 1482, the previously traced circuit for the relay R1440 and, at its contacts 1483, it interrupts a point in the previously traced pulsing circuit for the magnet RM1498. The relay R1440 now restores to normal and, at its contacts 1443, connects the EC1 wiper 1496 to the control relay R1410 over a circuit including the contacts 1435, 1443 and 1464. As a further result of the restoration of the relay R1440, at its contacts 1442′, it connects ground potential applied to the conductor C1404 via the cam contacts CAM1408 and the contacts 1442′, to one terminal of the winding of the switching relay R1460. Also, at its contacts 1449, it connects battery through the winding of the step relay R1490 via the contacts 1499, VON1459C, 1454 and 1449 to the other terminal of the winding of the switching relay R1460 and, in multiple therewith, via the contacts 1467 to the C wiper 1497.

The trunk lines accessible over the two digit levels of the selector 1400 may, for example, be toll ring-down trunks, such as the toll ring-down trunk 800, terminating toll lines extending from the toll switchboard 201 in the manual office 200. The second digit received by the selector 1400 has rotated the wipers thereof over the bank contacts of the selected level one or more steps depending upon the value of the digit received. By utilizing two digits to select a set of contacts and also providing automatic stepping of the wipers if the trunk line terminating in the selected contacts is busy, one or more groups of trunks may be connected to the two digit levels. Accordingly it will be assumed that the wipers of the selector 1400 have been rotated one step into engagement with the first set of contacts in a two digit level. If at the time the relay R1440 restores to normal, as noted above, the C wiper 1497 encounters a busy marking ground potential, the switching relay R1460 will be short-circuited and the step relay R1490 will operate. In response to the operation of the step relay R1490, a circuit is completed at its contacts 1491, for operating the rotary magnet RM1498. This circuit includes the grounded conductor C1404, the contacts 1484, 1491, 1416 and 1448, the winding of the magnet RM1498, and battery. Upon operating, the magnet RM1498 steps the wipers an additional step and, at its contacts 1499, it interrupts a circuit for the step relay R1490 which restores to normal and opens a circuit of the magnet, at its contacts 1491. The magnet now restores to normal to recomplete, at its contacts 1499, the circuit for the step relay R1490. If a busy marking ground potential is again encountered by the C wiper 1497, the cyclic operation of the step relay for the rotary magnet RM1498 will be recompleted to advance the wipers an additional rotary step.

If all of the trunks in the group connected to the selected level are busy, the EC1 wiper 1496 will encounter a ground potential on the EC1 contact of the last trunk in the group. If the last trunk is also busy, the ground potential applied to the C conductor C1497 will operate of the step relay R1490 and the ground potential encountered by the EC1 wiper 1496 will complete the previously traced circuit for operating the control relay R1410. Accordingly, both the step relay R1490 and the control relay R1410 simultaneously operate. At its contacts 1416, the relay R1410 interrupts the circuit for the rotary magnet RM1498 before the step relay R1490 completes the circuit therefor, at its contacts 1491. In this manner, the relay R1410 prevents further rotary stepping of the switch wipers when all of the trunks in the selected group, including the last trunk, are busy at the time the wipers are stepped over the associated bank contacts. The step relay R1490 is now locked in its operated position over a multiple circuit including the grounded contacts 1469, the contacts 1492, 1449, 1454, VON1459C and 1499. Accordingly, the subsequent removal of ground potential from the C wiper 1497, should the associated trunk now become idle, will not remove the short-circuit from the winding of the switching relay R1460. As a further result of the operation of the relay R1410 at its contacts 1415, it transfers the previously traced circuit for operating the magnet RM1498 via the contacts 1437 to the winding of the relay R1440 in order to operate the last mentioned relay. At its contacts 1414, the relay R1410 locks itself via the contacts 1439, 1453, 1465, and VON1459B to the grounded conductor C1404.

As soon as the relay R1440 operates, as described above, it completes, as its contacts 1442, a circuit for connecting the high resistance lower winding in series with the low resistance upper winding of the relay R1420 to the EC conductor C1403. At this time, the 120IPM ground pulses are connected via the contacts 1431 and 1411 to the high resistance lower winding of the relay R1420 thereby short-circuiting the high resistance winding 120 times per minutes. The alternate high and low resistance ground potential is now applied to the EC conductor C1403 in order to give the toll operator a flashing signal indicative of the fact that an all-trunks-busy conditions has been encountered. The operator may now release the toll preselector 1400, in the manner previously described, by operating her front release key K1374.

If the toll preselector 1400, in responding to the second digit in the manner described above, finds an idle trunk during the rotary stepping, the marking ground potential will not be encountered by the C wiper 1497 and the short-circuit will be removed from the switching relay R1460. At this time, the relays R1420, R1430 and R1450 in the toll preselector 1400 are in their operated positions. Accordingly, the switching relay R1460 operates over a previously traced circuit in series with the step relay R1490 but due to the resistance of the relay R1460, the relay R1490 does not operate. In response to the operation of the switching relay R1460, the — and + talking conductors C1401 and C1402 and the EC conductor C1403 are connected to the selected ring-down trunk over the wipers 1493, 1494 and 1495. Also, at its contacts 1468, the relay R1460 connects ground potential to the C wiper 1497 to mark the seized ring-down trunk busy to other selectors having access thereto. Finally, the switching relay R1460 connects the grounded C conductor C1404 via the normal post springs LNP1488A and the contacts 1473 and 1463 to the EC1 conductor C1405. The EC1 conductor is not used when the toll preselector 1400 is connected directly to the front of the link 1300A as is illustrated in the drawings. However, when the toll preselector 1400 is utilized, for example, as an intertoll selector, such as the intertoll selector 112, the EC1 conductor C1405 is connected to an intertoll ring control circuit, such as the intertoll ring control circuit 111 illustrated in Fig. 1. In the last mentioned arrangement, the application of ground potential to the conductor C1405 will control the intertoll ring control circuit 111 to transmit a timed pulse of battery and ground respectively over the talking conductors C1401 and C1402 to the connected toll ring-down trunk and thus cause the latter circuit to transmit a splash of ringing current over a called toll line to a distant manual exchange. Also the ground potential applied to the EC1 conductor C1405 will control the intertoll ring control circuit 111 to give the calling operator an "off hook" supervisory signal.

The manner in which the toll preselector 1400 is released in response to the termination of a connection is the same as has been described hereinbefore and it should be understood that the release is under control of the calling toll operator by interrupting the circuits including the EC conductor C1403 and the C conductor C1404.

In the foregoing description of the two digit operation of the toll preselector 1400, it was assumed that the level selected was one which caused the operation of the left normal post springs LNP1488A and LNP1488B. These normal post springs control the selector to operate as a two digit switch and also to control the EC1 conductor C1405 (if used) for the purpose of automatically controlling a preceding intertoll ring control circuit to transmit a ring-down signal to a selected ring-down trunk. It should be noted, however, that on certain other two digit levels it may be necessary to extend connections to dial trunks, such as the two-way trunk 210 and the intertoll trunk 400. The stop dial feature, it will be recalled, is provided to permit the selectors and other trunk hunting type apparatus to search for and find an idle subsequent switching stage before the stop dial condition is removed and permit dialing to be continued by the impulse sender 1900A or a similar type impulse sender in a distant automatic exchange. In order to provide facilities for stop dialing, the toll preselector 1400 is arranged so that the dial trunks are accessible over two digit levels which are different from the two digit levels over which connections are extended to ring-down trunks. On two digit dial trunk levels, the left and right normal post springs LNP1488A and LNP1488B and RNP1489 are operated when the wipers reach the selected level in response to the first digit transmitted to the selector 1400A. The further operations of the selector 1400 in response to the second dialed digit is substantially the same as has been described hereinbefore except that the relay R1470 is operated and retained operated from the time the wipers are raised to the selected level until the connection is subsequently released. The operated condition of the relay R1470 prepares a circuit, at its contacts 1472, for connecting the high resistance lower winding and the low resistance upper winding of the pulse relay R1420 in series to the EC conductor C1403 in order to transmit a stop dial signal to the impulse sender 1900A. The normal post spring LNP1488B completes a holding circuit for the relay R1410 in order to prevent the restoration of the last mentioned relay at the end of the first digit, as previously described.

During the rotary stepping of the switch on any two digit level, the relays R1420, R1440, R1450 and R1480 are normally operated and, in the present case, the relay R1470 is also operated since the level selected is one having access to dial trunks. Upon the first rotary step of the wipers the relay R1430 operates, as previously described, and, at its contacts 1436, it opens a point in the circuit for the relay R1440 and at the end of the normal. When relay R1440 restores, the high resistance pulsing of the second digit the relay R1440 restores to lower winding of the pulse relay R1410 is connected in series with the low resistance upper winding over a circuit including the contacts 1472, 1441, 1433 and 1462 to the EC conductor C1403 in order to transmit the stop dial signal to the preceding toll switch train or to the impulse sender 1900A depending upon whether the selector is utilized as an intertoll selector 112 or as a toll preselector 1400. The toll preselector 1400 now automatically rotates its wipers to search for an idle dialed trunk, in the manner previously described, and the stop dial condition is retained on the EC conductor C1403 until the switching relay R1460 operates and extends the connection to the selected idle dial trunk. In conclusion, it should be noted that if the selector 1400 is used as an intertoll selector 112 the relay R1470 in its operated position, at its contacts 1473, opens the circuit for returning ground potential over the EC1 conductor C1405 when the switch through operation takes place in order to prevent the preceding intertoll ring control circuit 111 from transmitting an automatic ring-down signal over the selected dial trunk. The release of the toll preselector 1400 is the same as has been described previously.

In view of the foregoing description of the mode of operation of the toll preselector 1400 it will be understood that this selector is automatically controlled for one digit or two digit operation in accordance with the level selected.

*Operation of the toll ring-down trunk 800 in response to a call originated by the toll operator in the distant manual office 200*

In order to describe the operation of the telephone system in response to a call received over the ring-down trunk 800, it will be assumed that the operator position equipment 2200A, Figs. 22 to 26 inclusive, is the inward and ring-down position 2200B schematically illustrated in Fig. 2 of the trunking diagram, and that the position 2200B is conditioned to handle inward and ring-down toll calls. However, the operation of the various circuits will be described by utilizing the operator position equipment 2200A (Figs. 22 to 26, inclusive), the link 1300A (Fig. 13), the link finder 1800A (Fig. 18) and the impulse sender 1900A (Figs. 19 to 21, inclusive). The operator at this position will actuate the CLR class key K2285 in order to prevent the position from receiving any CLR calls and she will operate the TX class key K2275 in order to prevent the position from receiving any TX calls. However, the inward class key K2280 will be left in its unoperated position thereby to render the position available for calls received over the inward and ring-down toll trunks. It will also be assumed that the operator position is available and that the automatic answer control circuit 2601 has selected the link 1300A and marked the same to receive a call received on the ring-down trunk 800.

The operations involved in completing a toll call from the toll switchboard 201 via the toll ring-down trunk 800 to the inward toll operator in the central office 100 will now be described. For this purpose, it will be assumed that a subscriber in the distant manual office 200 has extended a call to the toll switchboard 201 and that the toll operator thereat has selected the toll line 211 terminating in the toll ring-down trunk 800 (Fig. 8).

When the toll line 211 is seized by the distant manual operator ringing current is projected thereover to the toll test panel 890, the ringing current is further extended via the conductors C816 and C817 and the contacts 811 and 814 to the ringdown relay R940. The relay R940 operates and, at its contacts 941, it interrupts the circuit for the signal relay R930. The relay R930 now restores to normal and, at its contacts 931, completes a circuit via the contacts 843 and the lower winding of the call waiting relay R870, to battery. The relay R870 now operates and, at its contacts 873, completes a locking circuit for energizing both the upper and lower windings of the relay R870 as soon as the initial operating circuit is opened at contacts 931. Accordingly, it will be understood that the operation of the ring-down relay R940 will cause the signal relay R930 to complete a circuit for operating the relay R870 and the relay R870 will lock itself in its operated position.

The call waiting relay R870, upon operating, at its contacts 872, applies ground potential via the contacts 861 to ground both the conductor C818 extending to the toll test panel 890 and the C conductor C963 in the cable 960 in order to mark the toll ring-down trunk 800 busy to selectors, such as the selectors 112, 113 and 1400 having access thereto over the cable 690. At its contacts 875, the relay R870 completes a circuit via the contacts 867 for illuminating the call waiting lamp L823 thereby to indicate the operators at the toll switchboard in the central office 100 that a call is waiting to be answered on one of the toll ring-down trunks. And, at its contacts 876, the relay R870 connects the gate control relay R880 to the GC2 conductor C317 extending to Fig. 15.

In Figs. 15 and 16, the GC2 conductor C317 is connected to the schematically illustrated inward and ring-down trunk distributor 1600B. The trunk distributor 1600B operates in precisely the same manner as the CLR trunk distributor 1600A previously described. Accordingly, it will be assumed that the GC2 conductor C317 has ground potential applied thereto to complete a circuit via the contacts 888, 868 and 876, the winding of the gate control relay R880 and contacts 952', to battery. The last mentioned circuit causes the gate control relay R880 in the toll ring-down trunk 800 to operate and lock itself in its operated position from ground at its contacts 889. As a further result of the operation of the relay R880, at its contacts 887, it applies ground potential via the ST2 conductor C315 extending to Fig. 15 thereby to control a start relay, such as the relay R1610, in the trunk distributor 1600B.

Figure 22:
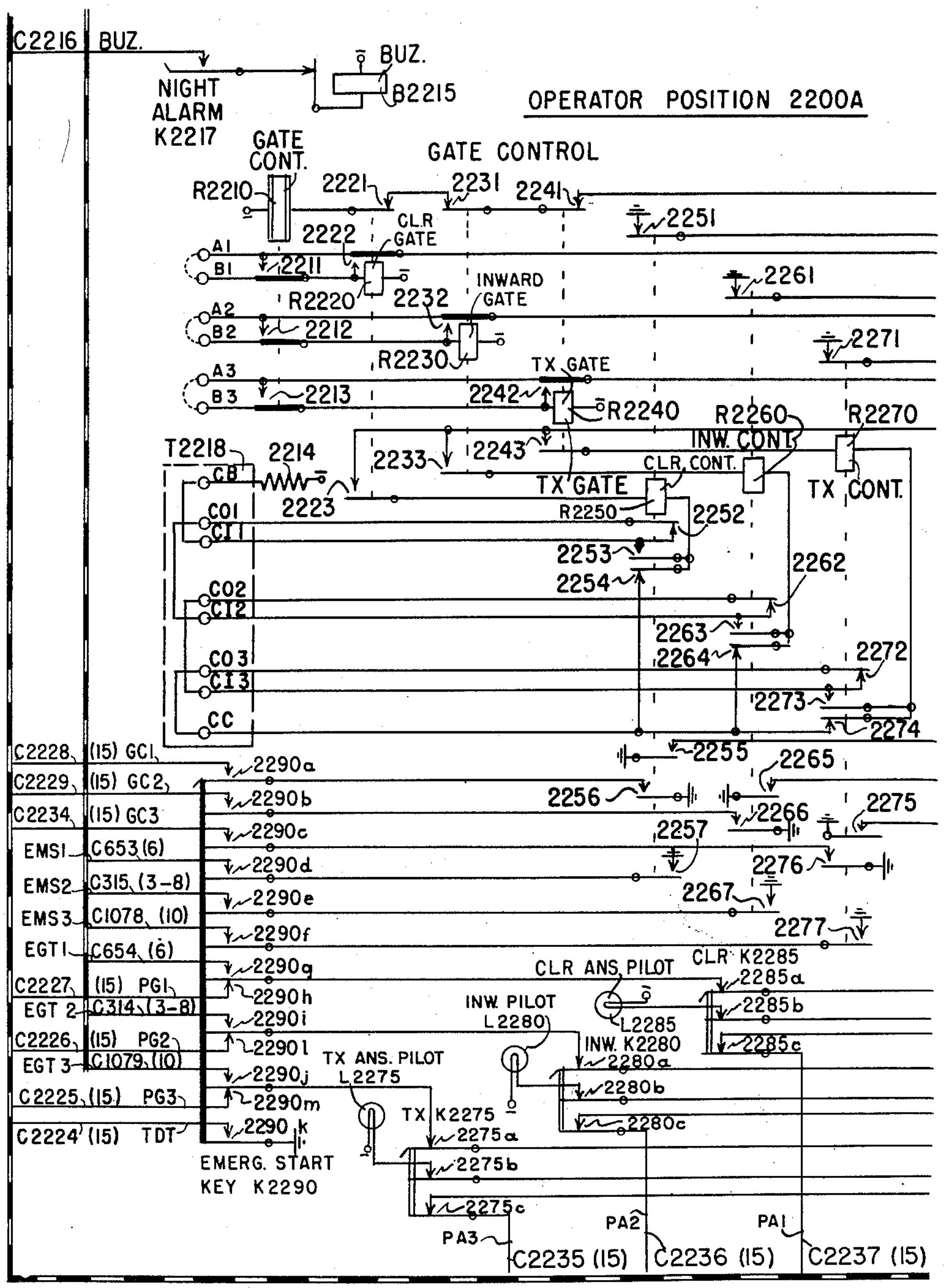

When the start relay in the trunk distributor 1600B is operated over the ST2 conductor C316, it applies ground potential to the PG2 and AP2 conductors C2326 and C2392 extending to Fig. 22. In Fig. 22 it will be seen that when ground potential is applied to the PG2 conductor C2226, a circuit is completed via the contacts 2290L of the emergency start key K2290, the contacts **2280*a* of the inward class 2 key K2280, the contacts 2315 of the operated relay R2310, the contacts 2212 of the operated relay R2210 and the winding of the inward gate relay R2230, to battery. Also, the ground potential applied to the AP2 conductor C2392 is extended via the contacts 2319 and the contacts 2280*b* of the key K2280 for illuminating the inward answer pilot lamp L2280. The illuminated condition of the answer pilot lamp indicates to the toll operator that the distributor is about to distribute a call to her position. The gate control relay R2230 operates over the above described circuit and, at its contacts 2232, it completes a locking circuit which is independent of the contacts 2212 included in the original circuit. Also, at its contacts 2231, it interrupts the circuit for the relay R2210 which restores to normal in order to close the gate, in the manner previously described. At its contacts 2233, the relay R2230 completes a circuit for operating the inward control relay R2260. The last mentioned circuit may be traced from ground at contacts 2375 then via the contacts 2322 and 2233, the winding of the relay R2260, the contacts 2264, the terminals CC and CO3, the contacts 2272, the terminals CI3 and CO2, the contacts 2262, the terminals CI2 and CO1, the contacts 2252, the terminals CI1 and CB and the resistor 2214, to battery. The relay R2260 operates over this circuit and, at its "X" contacts 2263, locks itself in its operated position to battery through the resistor 2214. As a further result of the operation of the relay R2260, at its contacts 2265, it extends ground potential via the contacts 2326, the contacts 2280*c* of the key K2280, the PA2 conductor C2236 extending to Fig. 15 and the contacts 1542' to the trunk distributor 1600B. The ground potential applied to the conductor C2236 operates a position answer relay, such as the relay R1640, to prepare the trunk distributor 1600B to search for and find the calling ring-down trunk 800**.

The operated start relay in the trunk distributor 1600B now controls the trunk finder associated therewith to rotate its wipers to search for the toll ring-down trunk 800. In order to mark the trunk 800 as a calling trunk, the relay R880, at its contacts 886, removes the busy marking ground potential from the AD2 conductor C827 and, at its contacts 884 and 885 it substitutes battery potential for the ground potential applied to the GD2 conductor C826. The conductors C826 and C827 terminate in the banks of the trunk finder associated with the trunk distributor 1600B and when the potentials thereon are changed in the manner described above, the wipers of the trunk finder will find and engage the contacts terminating the conductors C826 and C827. When the above mentioned conductors are engaged by the wipers of the trunk finder, ground potential is applied to the GD2 conductor C826 by the trunk distributor 1600B in order to complete a circuit via the contacts 885 and the lower winding of the test relay R910, to battery. The test relay R910 operates over the above traced circuit and, at its contacts 911, it connects the wiper 904 of the link finder 900 via the contacts 957, 911, 883 and 906 to the winding of the magnet M905 of the link finder 900. As a further result of the operation of the relay R910, at its contacts 914, it connects the ground at contacts 881 via the upper winding of the switching relay R950, the contacts 906 and the winding of the magnet M905, to battery.

When the operator at the distant manual office 200 removes the ringing current from the toll line 211, the ring-down relay R940 restores to normal and, at its contacts 941, completes a circuit for reoperating the signal relay R930. The last mentioned relay, at its contacts 931, interrupts the previously traced operating circuit for the relay R870 but the relay R870 remains in its operated position over its locking circuit. It should be noted that the signal relay R930 is of the slow-to-release type so that it will not cause a false seizure of the toll ring-down trunk 800 in the event that the ring-down relay R940 is rapidly operated and released due to faulty conditions of the toll line 211.

The previously traced circuit for connecting the wiper 904 and also the upper winding of the switching relay R950 to the magnet M905, now determine whether or not the wipers 901 to 904 of the link finder 900 are to be advanced step-by-step to search for an idle link, or are to be placed in engagement with contacts terminating an idle line. If the wiper 904 is standing in engagement with a contact terminating a conductor, such as the C3 conductor C974, which is grounded to indicate that the associated link is not in condition to receive this call, the ground potential applied to the wiper 904 causes the magnet M905 to be self-interruptedly operated and it simultaneously short-circuits the upper winding of the switching relay R950. The magnet M905 accordingly advances the wipers of the link finder 900 step-by-step until the wiper 904 engages the conductor C974 extending to the link 1300A which has been conditioned to accept the call on the toll ring-down trunk 800. As soon as the wiper 904 engages the ungrounded contact in the associated bank terminating the conductor C974, the short-circuit is removed from the upper winding of the switching relay R950. The switching relay R950 now operates over the previously traced circuit in series with the magnet M905. The magnet M905, however, does not operate due to the high resistance of the upper winding of the relay R950.

As soon as the switching relay R950 operates, it completes a locking circuit for itself which may be traced from ground at its contacts 954 and then via the contacts 914, its upper winding, the contacts 906 and the winding of the magnet M905, to battery. As a further result of the operation of the relay R950, it connects a busy marking ground potential via its contacts 956, the wiper 904, the C3 conductor C974, the cable 970 extending to Fig. 10, the cable 1170 extending to Fig. 12, the contacts 1215 and the conductor C763–C3 connected to the rear of the link 1300A. The busy marking ground potential applied to the C3 conductor C974 also marks the link 1300A busy to all link finders.

As a further result of the operation of the switching relay R950, it connects the — and + talking conductors C816 and C817 of the toll ring-down trunk 800 via the contacts 951 and 952, the wipers 901 and 902, the — and + conductors C761 and C762, the cable 970 extending to Fig. 10, the cable 1170 extending to Fig. 12, and the — and + conductors C761 and C762 connected to the rear of the link 1300A. At its contacts 953, the relay R950 connects the grounded high resistance upper winding of the supervisory relay R920 via the wiper 903, the EC conductor C764, the cable 970 extending to Fig. 10, the cable 1170 extending to Fig. 12, and the EC conductor C764 connected to the rear of the link 1300A.

In the link 1300A the high resistance ground potential connected to the EC conductor C764 is extended via the contacts 1354 and 1322, and the ZIP conductor C1381 to the operator position equipment 2200A. The tone control relays R2470, R2480 and R2490 now operate in the manner previously described to transmit the zip-zip tone signal to the toll operator to indicate that she has been connected to the calling ring-down trunk 800 and the supervisory relay R920 in the toll ring-down trunk 800 operates.

Finally, at its contacts 952′, the relay R950 interrupts the circuit for the gate control relay R880 which now restores to normal. The relay R880, upon restoring, at its contacts 887, removes ground potential from the ST2 conductor C316 extending to the trunk distributor 1600B and, at its contacts 884 and 886, it applies ground potential respectively to the GD2 and AD2 conductors C826 and C827 terminating in the banks of the trunk finder associated with the distributor 1600B. The trunk distributor 1600B now releases in the same manner as the trunk distributor 1600A and causes the wipers of the associated trunk finder to be advanced one step. If another call has been locked-in by the gate control equipment shown in Fig. 22 of the operator position equipment 2200A, the trunk distributor 1600B will search for the next trunk.

When the relay R2470 in the operator position equipment 2200A, is operated in the manner described above, to transmit the zip-zip tone signal to the toll operator, the contacts 2471 are closed in order to ground the RC1 conductors C1386 extending to the link 1300A. The ground potential applied to the RC1 conductor C1386 operates the rear link relay R1320 as described hereinbefore, and, at its contacts 1324, applies ground potential to the RLC conductor C1385 in order to operate the rear link control relay R2410. The relay R2410, upon operating, prepares circuits for operating one of the class indicator relays R2420, R2430, R2440 or R2450, depending upon the class of the calling trunk, and it illuminates the engaged rear lamp L2497 to indicate to the operator that her position equipment is now connected to the rear of the link 1300A. As a further result of the operation of the rear link relay R1320, at its contacts 1322 and 1323, it transfers the high resistance ground potential applied to the EC conductor C764 from the ZIP conductor C1381 to the REC conductor C1382. In the operator position equipment 2200A, the REC conductor C1382 is connected to battery via the winding of the rear supervisory relay R2550, in order to maintain the supervisory relay R920 in the toll ring-down trunk 800 in its operated position.

As soon as the rear link control relay R2410 in the operator position operates, the ground potential applied to the conductor C763–C3 at the rear of the link 1300A is further extended via the contacts 1351′, the conductors C1388–3, the contacts 2416 of the operated relay R2410, the contacts 2424, 2434, 2455 and 2465 and the winding of the class indicator relay R2440, to battery. The relay R2440 now operates and, at its contacts 2444′, completes a circuit for illuminating the inward lamp L2440 to indicate to the operator that the call being received over the link 1300A is an inward call. As previously noted, both ring-down toll calls and inward toll calls are handled by the inward toll operator.

When the battery potential is returned from the position equipment to the EC conductor C764 connected to the rear of the link 1300A, it causes the supervisory relay R920 in the toll ring-down trunk 800 to operate as previously noted. The relay R920, at its contacts 921, disconnects the line termination circuit including the condenser 924 and the resistor 925, from across the — and + talking conductors C816 and C817. At its contacts 922, the relay R920 completes a locking circuit for the lower winding of the switching relay R950. This ground potential is also connected to battery through the lower winding of the relay R860 thereby to operate the last mentioned relay. Finally, at its contacts 923, the relay R920 interrupts the circuit for the lower winding of the test relay R910 which now restores to normal.

When the relay R860 operates, as noted above, it opens the locking circuit for the call waiting relay R870, at its contacts 863. At its contacts 861 and 862, the relay R860 transfers the busy marking ground potential for the C conductor C963 from the contacts 872 to the contacts 852. The ground potential on the C conductor C963 prevents the toll ring-down trunk 800 from being selected over the cable 960 by the intertoll selector 112, the delay call selector 113 or the toll preselector 1400. As a further result of the operation of the relay R860, at its contacts 867, it interrupts a circuit for the call waiting lamp L823 and, at its contacts 869, it interrupts a point in the incomplete circuit for controlling the TX transfer trunk distributor 1500.

In the toll ring-down trunk circuit 800, the relays R860, R920, R930 and R950 are in their operated positions and the remaining relays are in their restored positions. Accordingly, the toll ring-down trunk circuit 800 is now under control of the toll operator over the EC conductor C764 from the rear supervisory relay R2550 in the position equipment 2200A. The relay R2550, at its contacts 2551, completes a circuit including the RL1 conductor C1391 and the contacts 1356′ for illuminating the rear supervisory lamp L1312 to give the toll operator "off hook" supervision. The inward operator at position 2200A may now converse with the distant toll operator at the distant manual office 200 and obtain the directory number of the desired called subscriber. The inward operator at position 2200A will thereafter actuate the keyset K2647 in the manner previously described and thus control the impulse sender 1900A to transmit impulses corresponding to the digits of the called destination to set up the connection in the manner previously described. In this manner, the connection between the calling subscriber in the distant manual office 200 and the desired called subscriber is completed by the inward toll operator through the link 1300A. After the connection is established, the inward operator is automatically disconnected from the link 1300A, in the manner previously described, and may then answer and complete new connections over other links at her position.

If, during the setting up of the connection, the toll operator finds that she is unable to reach the desired called subscriber she may signal the manual operator at the toll switchboard 201 in the office 200 by momentarily operating the ring rear key K2640 associated with her position. When the ring rear key K2640 is operated, a circuit is completed from ground via the contacts 2 of the key K2640 and the winding of the rear control relay R2520, to battery. The relay R2520, upon operating, at its contacts 2522 and 2524, disconnects the operator telephone equipment 2300 from the −R and +R conductors C1379*a* and 1379*b* extending to the link 1300A. At its contacts 2521 and 2523, the relay R2520 connects battery through the resistor 2646 and contact 1 of key K2640 to the −R conductor C1379*a* and it connects ground via the contact 3 of the key K2640 to the +R conductor C1379*b*. The resistance battery potential applied to the conductor C1379*a* and the ground potential applied to the conductor C1379*b* is thereby extended through the link 1300A to the − and + conductors C761 and C762 over the rear of the link to the wipers 901 and 902 of the link finder 900. In the toll ring-down trunk 800, the resistance battery potential applied to the wiper 901 is further extended via the contacts 951, the upper winding of the retard coil R820 and the winding of the rering relay R810, to battery. The ground potential applied to the wiper 902 is further extended via the contacts 952, the lower winding of the retard coil R820 and the upper winding of the transfer relay R840, to ground. The transfer relay R840 is short-circuited at this time and does not operate, but the rering relay R810 now operates and, at its contacts 812, connects the ringing current conductor C815 to the − conductor C816 and, at its contacts 813, it connects ground potential to the + conductor C817. In this manner the ringing current is transmitted back over the toll line 211 to signal the manual operator at the toll switchboard 201. The toll operator at position 2200A may now restore the ring rear key K2640 to terminate the transmission of the ringing current over the toll line 211. Restoration of the key K2640 interrupts the circuit of the rear control relay which now restores to normal and reconnects the operator telephone equipment 2300 to the talking conductors of the toll ring-down trunk 800. As soon as the manual operator at the toll switchboard 201 answers the call, the toll operator informs her that the connection cannot be complete.

If a connection has been established between the calling and called subscriber, the toll operator at position 2200A is disconnected from the link 1300A in the manner previously described. If the manual operator at the toll switchboard 201 desires to recall the toll operator at position 2200A she may transmit ringing current over the toll line 211 and thereby reoperate the ring-down relay R940 in the manner previously described. The signal relay R930 will accordingly restore to normal and, at its contacts 931, it completes a circuit via the contacts 843 and the lower winding of the relay R870, to battery. The relay R870 now operates and, at its contacts 873, completes a circuit via its low resistance upper winding, the contacts 864, and the low resistance lower winding of the supervisory relay R920 in order to replace the high resistance ground potential applied to the EC conductor C764 extending to the link 1300A, with a low resistance ground potential. The low resistance ground potential applied to the EC conductor C764 controls the operation of the rear supervisory relay R1310 in the link 1300A. Upon operating, the relay R1310, at its contacts 1311, illuminates the rear supervisory lamp L1312 individual to the link 1200A thereby to indicate to the toll operator that the connection established over the rear of the link 1300A requires attention.

The toll operator may now operate the talk key K1377 individual to the link 1300A and thereby reconnect her telephone equipment 2300 to the link 1300A in the manner previously described. The distant manual operator may now inform the toll operator at position 2200A that the called subscriber has inadvertently released the connection prior to the completion of the conversation. The toll operator at position 2200A may now release the connection established over the front of the link 1300A by momentarily operating the release front key K2643 and then complete a new connection over the link 1300A or she may actuate her ring front key K2642 to rering the called subscriber.

If the toll operator decides to rering the disconnected called party, she may temporarily actuate the ring front key K2642. In response to the operation of the key K2642, ground potential is extended via contacts 1 thereof for operating the front control relay R2530. The relay R2530, upon operating, at its contacts 2532 and 2534, disconnects the −F and +F conductors C1378*a* and C1378*b* from the operator telephone equipment 2300 and, at its contacts 2531 and 2533, it connects these conductors respectively to battery and ground via contacts 3 and 2 of the ring front key K2642. Consequently, resistance battery and ground potential are respectively connected to the − and + talking conductors C1401 and C1402 terminating at the front of the link 1300A in order to control the final automatic switch in the connection to ring the disconnected called subscriber in the same manner as has been described hereinbefore in connection with the description of the operation of the impulse sender 1900A. When the called subscriber answers, the toll operator may reestablish the connection between the calling and called subscribers by restoring the talk key K1377.

If the toll operator should decide to release the connection established over the front of the link 1300A, she may momentarily operate her release front key K2643. At its contacts 2, the release front key K2643 completes a circuit for operating the front link control relay R2510 and, simultaneously therewith, it applies ground potential to the FLC conductor C1383. The relay R2510, upon operating, at its contacts 2513, completes a circuit for illuminating the engaged front lamp L2644. The ground potential applied to the conductor C1383 short-circuits the upper winding of the front link relay R1360 which now restores to normal and, at its contacts 1361 and 1362, interrupts the circuits including the EC conductor C1403 and the C conductor C1404. When these circuits are interrupted, the toll preselector 1400 and the subsequent switches included in the connection are automatically restored to normal in the manner previously explained.

The toll operator may now reoperate the talk key K1377 and thereby control the association of the impulse sender 1900A with the link 1300A to enable the operator to control the toll preselector 1400 and the subsequent switch train in accordance with the digits registered by operating the keyset K2647. Further operations in establishing a new connection over the front of the link 1300A are the same as have been described previously.

When the inward toll operator reconnects her telephone equipment with the link 1300A to answer the recall signal from the manual operator, a high resistance battery potential is returned over the EC conductor C764 in order to restore the relay R870 in the ring-down trunk 800. More specifically, the high resistance battery potential connected through the winding of the relay R2550 in series with the low resistance lower winding of the relay R920 and the low resistance upper winding of relay R870 provides insufficient current to retain the relay R870 in its operated position and it restores to normal. However, sufficient current flows over EC conductor C764 to retain the supervisory relay R920 operated over a circuit including its high resistance upper winding.

In the toll ring-down trunk 800, the relays R860, R920, R930 and R950 remain in their operated positions as long as the trunk is held from the link 1300A.

When the distant manual operator releases the connection, a pulse of ringing current is transmitted over the toll line 211 in order to reoperate the ring-down relay R940 in the manner previously described. The operator at position 2200A is thereby given the "on hook" supervisory signal in the manner described above and she reconnects her telephone equipment 2300 to the talking conductors to the link 1300A in order to challenge the toll line 211. When the toll operator learns that the calling party has restored from the connection, she may operate the release rear key K2641 and then the release front key K2643 at her position or she may operate the front and rear release keys K1374 and K1375 in the link 1300A. If the release rear key K2641 is operated, ground potential through the contacts 3 of the key K2641 causes the operation of the rear control relay R2520, as previouly described. Also, ground potential is extended via the contacts 1 of the key K2641 for holding the rear link control relay R2410 in its operated position and for grounding the RLC conductor C1385 extending to the link 1300A. In the link 1300A the ground potential applied to the RLC conductor C1385 short-circuits the upper winding of the rear link relay R1320 which now restores to normal and, at its contacts 1321 and 1323, disconnects battery potential from the EC conductor C764 extending to the ring-down trunk 800. If the operator has decided to operate both the release front and release rear keys K1374 and K1375 in the link 1300A, the rear link relay R1320 and the front link relay R1360 are restored to normal in the same manner as has been described above.

When the battery potential is removed from the EC conductor C764, the supervisory relay R920 in the toll ring-down trunk 800 restores to normal. Upon restoring the relay R920, at its contacts 922, interrupts the holding circuit for the switching relay R950 and the relay R860 thereby to cause these relays to restore to normal. The signal relay R930, however, normally remains in its operated position to condition the toll ring-down trunk 800 to respond to a subsequent call from the distant manual office 200.

*Transferring a ring-down trunk call from the inward operator position to the TX operator position*

In a toll switching network of the type disclosed, the inward operator normally attempts to complete the toll connection to the desired destination while the calling subscriber remains on the connection. If the connection cannot be completed, it is normally abandoned until a subsequent attempt is made to complete the connection. Under certain conditions, the operator at the distant manual office 200 may request the inward toll operator to transfer the toll call to the TX operator position for completion. This request, however, is not normally made until several attempts have been made to complete the connection via the inward operator position in the manner described above. The TX operator position is arranged so that calls may be extended in both directions over the associated links. In other words, when the TX operator has been requested to locate a particular called party, she may make several attempts before the desired called party is found but as soon as the called party is located she then sets up a new connection to the originating or calling subscriber and thus completes the connection.

In the present system, the TX operators may receive calls transferred to their positions from the inward operator positions. In order to describe the transfer of an inward toll call received at the inward operator position, it will be assumed that the call extended from the distant manual office 200 has been received by an inward operator in the central office 100 in the manner described above. The manual operator at the toll switchboard 201 in the manual office 200, now informs the inward operator that the call should be transferred to a TX operator in the central office 100. Upon receipt of this information, the inward operator operates her tone check key K2680. At contacts 1 of the key K2680, ground potential is extended via the winding of the rear control relay R2520, to battery. The relay R2520 now operates and at its contacts 2521 and 2523, connects the −R and +R talking conductors C1379*a* and C1379*b*, to ground and resistance battery respectively via the contacts 2 and 3 of key K2680. The resistance battery applied to the +R conductor C1379*b* is extended via the contacts 1346 to the + conductor C762 engaged by the wiper 902 of the link finder 900. The ground potential applied to the −R conductor C1379*a*, is extended via the contacts 1342 to the − conductor C761 engaged by the wiper 901 of the link finder 900.

Referring now to the toll ring-down trunk 800, it should be noted that at this time the relays R860, R920, R930 and R950 are in their operated positions. Consequently, the resistance battery potential applied to the wiper 902 by the toll operator at the inward operator position is extended via the contacts 952, the lower winding of the retard coil R820 and the upper winding of the transfer relay R840, to ground. At this instant, the ground potential applied to the wiper 901 is extended via the contacts 951, the upper winding of retard coil R820 and the upper winding of the rering relay R810. Accordingly, the rering relay R810 is short-circuited and prevented from operating. The transfer relay R840, however, operates over the above traced circuit and completes a locking circuit for itself from ground via its lower winding, the contacts 844 and 832 and the resistor 849, to battery. As a further result of the operation of the relay R840, at its contacts 843, it disconnects the upper winding of the call waiting relay R870 from the contacts 931 of the signal relay R930. This prevents the relay R870 from responding to a ring-down signal during the time that the toll ring-down trunk 800 is being transferred from a link at an inward operator position to the TX operator position.

Inasmuch as the inward operator has now transmitted the transfer signal to the toll ring-down trunk 800 and has operated and locked the transfer relay R840, the inward operator may now operate the front and rear release keys K1374 and K1375 individual to the link 1300A. The operation of these keys restores the link 1300A to normal, as previously described, so that it is again available to accept another inward toll call.

The toll ring-down trunk circuit 800 will now control the TX transfer trunk distributor 1500 and the TX trunk 1000 to find and connect with the toll ring-down trunk 800. The TX trunk 1000 will also control the link finder 1100 to search for and find an idle link at a TX operator position. Accordingly, the release of the link 1300A at the inward operator position removes the holding battery potential from the EC conductor C764 which is connected via the wiper 903, the contacts 953 to the upper high resistance winding of the relay R920. The relay R920 now restores to normal and, at its contacts 922, interrupts the holding circuit for the relays R950 and R860 which also restore to normal. As soon as the relay R950 restores, it connects the lower winding of the test relay R910 via the contacts 959 and 846 to the C conductor C995 in the cable 990 to the bank contact accessible to the wiper 1065 of the toll ring-down trunk finder 1060. At its contacts 951, 952 and 953, the relay R950 disconnects the toll ring-down trunk 800 from the wipers 901, 902 and 903 of the link finder 900. When the relay R860 restores, as noted above, it connects ground at contacts 841 via the contacts 871 and 861 to the conductors C818 and C962. The ground potential on the conductor C818 marks the toll ring-down trunk busy at the toll test panel 890 and the ground potential on the conductor C963 maintains the toll ring-down trunk busy to all selectors in the central office 100 that have access thereto. At its contacts 865, the relay R860 prepares a point in the circuit for subsequently operating the auxiliary transfer relay R830. Finally, at its contacts 869, the relay R860 completes a circuit which may be traced from ground at contacts 848, via the contacts 913 and the ST conductor C1514 for operating the start relay R1510 in the TX transfer trunk distributor 1500.

Before proceeding further with the description of the operation of the circuits, it will be assumed that the operator position equipment 2200A, the link 1300A, the toll preselector 1400 and the impulse sender 1900A disclosed in Figs. 13, 14, 18 to 21, and 22 to 26 are the circuits provided at the TX operator position designated 2200C in Fig. 2 of the trunking diagram. It will also be assumed that the TX operator is ready to handle any TX call that may be distributed to her position and that the link 1300A (Fig. 13) has been assigned to receive the TX trunk call routed to the TX operator position. Finally, it will be assumed that the TX operator has operated the inward key K2280 and the CLR key K2285 in order to block the distribution of CLR and inward toll calls to the TX operator position. The TX key, K2275, however, is left in its unoperated position.

Returning now to the TX transfer trunk distributor 1500, it will be seen that when the start relay R1510 is operated, it connects ground potential via its contacts 1511, the conductor C1515, which is multiply connected to the AP3 conductor C2393, and then via the conductor C2393, the contacts 2311′ and 2275*b* in order to illuminate the TX answer pilot lamp L2275. The illuminated condition of the lamp L2275 signals the TX operator that a TX call is being distributed to her position.

As a further result of the operation of the relay R1510, at its contacts 1512, it connects the wiper 1582 of the TX trunk finder 1580 via the contacts 1533, 1522, 1512 and 1584 and the winding of the magnet M1583, to battery.

Finally, at its contacts 1513, the relay R1510 connects ground potential via the contacts 1526, the winding of the switching relay R1530, the contacts 1584 and the winding of the magnet M1583, to battery. The wiper 1582 has access via its associated bank contacts to the TX trunks, such as the TX trunk 1000, and as long as a TX trunk is idle, no ground potential will be applied to the C conductor, such as the C conductor C1073. All busy TX trunks, however, will have ground potential applied to the contact accessible to the wiper 1582 in order to short-circuit the switching relay R1530 and to complete a self-interrupting circuit for the magnet M1583. The magnet M1583 will now advance the wipers 1581 and 1582 step-by-step until the wiper 1582 engages the first contact terminating an idle TX trunk. When this occurs, the ground potential will be removed from the wiper 1582 and the switching relay R1530 will operate in series with the magnet M1583 but, due to the high resistance of the relay R1530, the magnet M1582 does not operate. The relay R1530, upon operating, at its contacts 1536, completes a locking circuit for itself which is independent of ground at contacts 1513. At its contacts 1534, the relay R1530 connects the winding of the step relay R1520 to the wiper 1582 and, at its contacts 1531, it connects ground potential via the contacts 1521 and 1531 to the wiper 1581.

It may be well to mention at this time that if all of the TX trunk circuits, such as the TX trunk 1000, are busy at the time the wipers 1581 and 1582 are being advanced step-by-step to search for an idle TX trunk, ground potential will be removed from the ATB conductor C1074 which is connected to the last contact accessible to the wiper 1582. The conductor C1074 is multiply connected to all of the TX trunk circuits which are accessible to the transfer trunk finder 1580 and, as long as at least one TX trunk is idle, ground potential will be retained on the conductor C1074 to automatically step the wipers off of the associated set of contacts. When all trunks are busy, however, the ground is removed from conductor C1074 in order to stop the stepping of the wipers until a TX trunk becomes idle. In this manner, the wipers of the transfer TX trunk finder 1580 will be prevented from continuously stepping to search for an idle trunk when all TX trunks are busy.

It will be assumed that the first idle trunk found by the wipers 1581 and 1582 is the TX trunk 1000 and, consequently, when the wiper 1581 engages the TFS conductor C1072, ground potential will be extended thereover in order to operate the start relay R1020 in the TX trunk 1000 (Fig. 10). In response to the operation of relay R1020, at its contacts 1024, it locks itself to ground at contacts 1114 so that the subsequent removal of ground from the TFS conductor C1072 does not cause the relay R1020 to restore. As a further result of the operation of the relay R1020, at its contacts 1021, it completes an obvious circuit for operating the relay R1120; at its contacts 1022, it connects the wiper 1065 of the toll ring-down trunk finder 1060 to the winding of the magnet M1066 and the winding of the relay R1010; and, at its contacts 1023, it connects the winding of the switching relay R1010 in series with the winding of the magnet M1066.

When the relay R1120 operates, as noted above, it connects ground potential via its contacts 1122 and the contacts 1051 to the C conductor C1083 in the cable 1080 thereby to mark the TX trunk 1000 busy to all selectors, such as the intertoll selector 112, the delay call selector 113 and the toll preselector 1400, having access thereto. At its contacts 1123, the relay R1120 completes an obvious circuit for illuminating the call waiting lamp L1048 thereby to indicate to the TX operator that a call has been received on the TX trunk 1000. As a further result of the operation of the relay R1120, at its contacts 1124, it prepares a point in the circuit for subsequently operating the gate control relay R1040; at its contacts 1125, it prepares a point in the circuit for subsequently grounding the C conductor C1073 to mark the TX trunk 1000 busy to the transfer trunk finder 1580; at its contacts 1126, it removes ground potential from ATB conductor C1074; and, at its contacts 1127, it applies ground potential to the EGT3 conductor C1079 in order to prepare a point in the circuit for forceably controlling the link finder 1100 to bring the call into the TX operator position in the event that the TX distributor 1600C fails to operate.

The toll ring-down trunk finder 1060 associated with the TX trunk 1000 has access via the contacts accessible to the wipers 1061 to 1065, inclusive, to toll ring-down trunks, such as the toll ring-down trunk 800. When the wiper 1065 is connected to the circuit including the winding of the magnet M1066, the magnet will be self-interruptedly operated in the manner previously described as long as the wiper encounters grounded contacts in the associated contact bank. At the present time, the toll ring-down trunk 800 is marked as the trunk to be found by the toll ring-down trunk finder 1060 by the removal of ground potential from the C conductor C995. All other toll ring-down trunks are marked busy by the application of direct ground potential to the C conductors corresponding to the C conductor C995. Consequently, the magnet M1066 will be self-interruptedly operated to advance the wipers 1061 to 1065, inclusive, step-by-step over the associated bank contacts until the wiper 1065 engages the contact terminating the ungrounded conductor C995. At this instant, the switching relay R1010 will have the short-circuit removed from its winding and the relay will operate in series with the magnet M1066. However, due to the high resistance of the winding of the relay R1010, the magnet M1066 does not operate. The switching relay R1010, upon operating, at its contacts 1017, returns ground potential over the wiper 1065, the C conductor C995 in the cable 990, the contacts 846 and 959 and the winding of the test relay R910, to battery. The test relay R910 operates over the above traced circuit and, at its contacts 913, removes ground potential from the ST conductor C1514 thereby to restore the start relay R1510 in the TX transfer trunk distributor 1500. It should be noted, however, that if another toll ring-down trunk, such as the trunk 800, is also in an operated position to connect with a TX trunk, such as the TX trunk 1000, the start relay R1510 will not be restored at this time.

As a further result of the operation of the switching relay R1010 in the TX trunk 1000, at its contacts 1011′, the ground potential at contacts 1125 is extended via the C conductor C1073, the wiper 1582, the contacts 1534 and 1523, and the winding of the step relay R1520, to battery. The step relay R1520 operates over this circuit and, at its contacts 1524, locks itself to ground at the contacts 1532 and, simltaneously therewith, it interrupts its initial operating circuit including its contacts 1523. Also, at its contacts 1525, the relay R1520 completes a circuit via the contacts 1535 for operating the magnet M1583. At its contacts 1521, the relay R1520 removes ground potential from the TFS conductor C1072 and, at its contacts 1526, it interrupts the locking circuit for the switching relay R1530. As soon as the relay R1530 restores, it interrupts, at its contacts 1535, the circuit for the magnet M1583. The magnet M1583 now restores to normal and advances the wipers 1581 and 1582 one step to the next set of bank contacts. As a further result of the restoration of the relay R1530, at its contacts 1532, it interrupts the circuit for the step relay R1520 and also restores to normal. If at this time the start relay R1510 is in its restored position, the TX transfer trunk distributor 1500 will be fully restored to normal. However, if there are other calls waiting to be transferred to an idle TX trunk, the start relay R1510 will be in its operated position and, when the relay R1520 restores, circuits will again be completed for operating the magnet M1583 to find another idle TX trunk or for operating the switching relay R1530 if the wipers 1581 and 1582 stand in engagement with an idle TX trunk. From the foregoing, it will be understood that when the switching relay R1010 operates as an indication that the TX trunk 1000 is now connected to the toll ring-down trunk 800, the TX transfer trunk distributor 1500 is released and rendered available to select another idle TX trunk. As a further result of the operation of the relay R1010, at its contacts 1011, 1012, 1014 and 1015, it connects the —, +, EC and EC1 conductors C991 to C994, inclusive, from the toll ring-down trunk 800 to the TX trunk 1000. Finally, at its contacts 1018, the relay R1010 connects the gate control relay R1040 to the GC3 conductor C1070 extending to the TX trunk distributor 1600C.

Referring now to Figs. 15 and 16, it will be seen that the GC3 conductor C1070 is connected via the contacts 1543′ to the schematically illustrated TX trunk distributor 1600C. It should be understood that this trunk distributor is exactly the same as the CLR trunk distributor 1600A and that the GC3 conductor C1070 normally has ground potential applied thereto. The ground potential on the GC3 conductor C1070 is extended via the contacts 1018, 1041, 1124 and 1055 and the winding of the gate control relay R1040, to battery. The relay R1040 now operates and, at its contacts 1042, locks itself in its operated position over a circuit which is independent of the grounded GC3 conductor C1070. As a further result of the operation of the relay R1040, at its contacts 1046, it applies ground potential to the ST3 conductor C1071 connected to the TX trunk distributor 1600C. In the trunk distributor 1600C a start relay, such as the relay R1610, is operated thereby to remove the ground potential from the GC3 conductor C1070 and to apply ground potential to the PG3 and AP3 conductors C2225 and C2393 extending to the TX operator position equipment. As a further result of the operation of the relay R1040, at its contacts 1044 and 1047, it removes ground potential from the GD3 and AD3 conductors C1075 and C1076 which terminate respectively in bank contacts accessible to the trunk finder associated with the trunk distributor 1600C. At its contacts 1043, the relay R1040 connects battery potential via the upper winding of the test relay R1160 to the GD3 conductor C1075 thereby to prepare a circuit for controlling the last mentioned relay when the trunk distributor 1600C connects with the TX trunk 1000.

Referring now to the operator position equipment 2200A, shown in Figs. 22 to 26, inclusive, of the drawings, which is now assumed to be the operator position equipment at the TX operator position 2200C, it will be noted that when the AP3 conductor C2393 is grounded by the TX trunk distributor 1600C, a circuit is again completed via the contacts 2311′ and 2275*b* for illuminating the TX answer pilot lamp L2275. As a further result of the operation of the TX trunk distributor 1600C, the PG3 conductor C2225 is grounded thereby to complete a circuit via the contacts 2290*m* of the emergency start key K2290, contacts 2275*a* of the TX key K2275, the contacts 2316 and 2213, and the winding of the TX gate relay R2240, to battery. The relay R2240 operates and, at its various contacts, completes circuits in substantially the same manner as has been described before in connection with the operation of the relays R2220 and R2230. Consequently, the TX control relay R2270 is operated and, at its contacts 2271, removes ground potential from the conductor C2385. The removal of ground potential from the conductor C2385 marks the available link, such as the link 1300A at the TX operator position, available to the link finder 1100 of the TX trunk 1000 over the conductor C763–C4 terminating at the rear of the link 1300A. The remaining class conductors C763–C1, C763–C2 and C763–C3 are marked with ground potential to prevent trunk finders associated with trunks of the corresponding classes from connecting with the rear of the links, such as the link 1300A, at the TX operator position. As a further result of the operation of the relay R2270, at its contacts 2275, it applies ground potential via the contacts 2327 and the contacts 2275*d* of the TX key K2275 to the PA3 conductor C2235 extending to the trunk distributor 1600C. In the trunk distributor 1600C, the application of ground potential to the PA3 conductor C2235 causes the operation of a position answer relay, such as the relay R1640, thereby to cause the trunk distributor 1600C to advance the wipers of the associated trunk finder to search for and find the GD3 and AD3 conductors C1075 and C1076 which are now marked by an absence of ground potential.

When the trunk distributor 1600C finds the TX trunk 1000, ground potential is applied to the GD3 conductor C1075 in order to complete the previously traced circuit for operating the test relay R1160. The test relay R1160, upon operating, at its contacts 1161, connects the winding of the magnet M1105 of the link finder 1100 to the wiper 1104 and, at its contacts 1162, it completes a circuit including the winding of the switching relay R1150 and the winding of the magnet M1105. The wipers 1101 to 1104, inclusive, of the link finder 1100 will now advance step-by-step over the associated bank contacts until the wiper 1104 engages a conductor, such as the C4 conductor C1174 which has been ungrounded in the position equipment at the TX operator position through the link 1300A. All of the other links accessible to the link finder 1100, are marked with a direct ground potential at this time in order to prevent the wiper 1104 from selecting the associated links. However, as soon as the wiper 1104 engages the ungrounded C4 conductor C1174, the short-circuit is removed from the relay R1150 and it now operates in series with the magnet M1105. The magnet M1105, however, does not operate due to the high resistance of the winding of the relay R1150.

The relay R1150, upon operating, at its contacts 1151, 1152 and 1154, interconnects the —, +, and EC conductors C991, C992 and C993 from the toll ring-down trunk 800 to the —, +, and EC conductors C761, C762 and C764 terminating at the rear of the link 1300A. At its contacts 1155, the relay R1150 interrupts the circuit for the call waiting lamp L1048; at its contacts 1156, it prepares a point in the circuit for the low resistance upper winding of relay R1110; at its contacts 1151′, it applies ground potential to the C4 conductor C1174 in the cable 1170 and; at its contacts 1152′, it completes a locking circuit for the upper winding of the test relay R1160 from ground at contacts 1033. At its contacts 1153′, the relay R1150 completes an obvious circuit for operating the relay R1050; and, at its contacts 1157, it completes a circuit, including ground at contacts 1131, for operating the relay R1110 over its high resistance lower winding. When the relay R1050 operates, at its contacts 1051, it disconnects the C conductor C1083 from ground at contacts 1122 and, at its contacts 1052, it reapplies ground potential to the C conductor C1083 in order to retain the busy marking condition thereon. Finally, at its contacts 1055, the relay R1050 interrupts the circuit for the gate control relay R1040 which now restores to normal. At its contacts 1044 and 1047, the relay R1040 replaces the busy marking ground potential on the GD3 and AD3 conductors C1075 and C1076.

When the relay R1110 operates, as described above, it completes, at its contacts 1113, a circuit including the contacts 1019 for holding the switching relay R1010 in its operated position and, simultaneously therewith, it interrupts, at its contacts 1114, the locking circuit for the start relay R1020 which restores to normal. As a further result of the operation of the relay R1110, at its contacts 1111 and 1112, it prepares points in the circuit whereby the supervisory relay R1030 is operated from the toll ring-down trunk 800. When the relay R1020 restores to normal, it interrupts, at its contacts 1021, the circuit for the relay R1120 which also restores to normal. At the present time, the relays R1010, R1050, R1110, R1150 and R1160 in the TX trunk circuit 1000, are in their operated positions. The remaining relays are in their restored positions.

When the link finder 1100 finds the idle link 1300A and the switching relay R1150 in the TX trunk 1000 switches through, the upper winding of the supervisory relay R920, in the toll ring-down trunk 800, is connected through the TX operator position equipment in order to control the transmission of the zip-zip tone signal to the operator. This circuit may be traced from ground via the high resistance upper winding of the supervisory relay R920, the EC conductor C993 in the cable 990, the wiper 1063, the contacts 1014 and 1154, the wiper 1103, the EC conductor C764 in the cable 1170 extending to Fig. 12, the rear of the link 1300A, the contacts 1354 and 1322, the ZIP conductor C1381 extending to the operator position 2200A, contacts 2416 and 2373′ and the upper winding of the relay R2470, to battery. The tone control relays R2470, R2480 and R2490 operate in the manner previously described to transmit the zip-zip tone signal to the operator and thereby indicate that the called subscriber is now connected to the link 1300A. As a further result of the completion of the above mentioned circuit, the supervisory relay R920 in the toll ring-down trunk 800 operates and removes, at its contacts 921, the line termination including the condenser 924 and the resistor 925 from the — and + conductors C999 and C992. As a further result of the operation of the relay R920, at its contacts 922, it completes a circuit including the contacts 865 and 845 for operating the auxiliary transfer relay R830. The relay R830, upon operating, at its contacts 833, locks itself to ground at contacts 922; at its contacts 832, it interrupts the circuit for the transfer relay R840 which now restores to normal; at its contacts 831, it completes an operating circuit for the relay R860; and, at its contacts 834, it connects battery potential via the resistor 849 to the EC1 conductor C994 in the cable 990 in order to control the supervisory relay R1030 in the TX trunk 1000.

When the transfer relay R840 restores to normal, it prepares a point in the circuit for the call waiting relay R870, at its contacts 843, and, at its contacts 847, it applies ground potential to the C conductor C995 in the cable 990 in order to mark the ring-down trunk 800 busy to the toll ring-down trunk finders, such as the trunk finder 1060. When the relay R860 operates, it prepares a point in the circuit for the low resistance lower winding of the supervisory relay R920, at its contacts 864, and, at its contacts 865, it interrupts a point in the initial operating circuit for the auxiliary transfer relay R830. At this time the relays R830, R860, R920 and R930 in the toll ring-down trunk 800 are in their operated positions and the remaining relays are in their restored positions. Accordingly, the toll ring-down trunk 800 is now held under control of the TX toll operator by means of the relay R920 and battery supplied thereto over the EC conductor C993. The toll ring-down trunk 800, in turn, now holds the TX trunk 1000 over a circuit which may be traced from battery via the resistor 849, the contacts 834, the EC1 conductor C994 in the cable 990, the wiper 1064, the contacts 1015 and 1112, the low resistance upper winding of the supervisory relay R1030, the low resistance upper winding of the relay R1110 and the contacts 1111 and 1156, and ground. The relay R1030 operates when the above traced circuit is completed and the relay R1110 remains in its operated position over the holding circuit including its lower winding. As soon as the relay R1030 operates, it interrupts, at its contacts 1033, the holding circuit for the test relay R1160 which now restores to normal and, at its contacts 1032, it completes an alternate holding circuit for the relay R1150. As soon as the test relay R1160 restores to normal, it interrupts, at its contacts 1162, a point in the previously described holding circuit for the relay R1150 and it opens, at its contacts 1163, a point in the previously traced locking circuit for its upper winding. At this time, the TX trunk 1000 is held from the toll ring-down trunk 800 over the EC1 conductor C994.

Referring again to the operator position equipment 2200A, it will be seen that when the tone control relay R2470 is operated to initiate the zip-zip tone signal, it closes its contacts 2471 thereby to ground the RC1 conductor C1386 and cause the operation of the rear link relay R1320 in the link 1300A. The rear link relay, at its contacts 1324, applies ground potential to the RLC conductor C1385 thereby to operate the rear link control relay R2410. The latter relay, at its contacts 2412, 2414, 2416 and 2418, connects the four class indicator relays R2420, R2430, R2440 and R2450 to the four class conductors C1388–1, C1388–2, C1388–3 and C1388–4 extending to the link 1300A. In the present call the connection includes the toll ring-down trunk 800 and the TX trunk 1000 and the latter circuit applies ground potential to the C4 conductor C1174 extending to Fig. 12 and then via the contacts 1217 to the conductor C763–C4 terminating in the rear of the link 1300A. Accordingly, at this time the grounded conductor C763–C4 is connected via the contacts 1353′ to the conductor C1388–4 thereby to complete the operating circuit for the class indicator relay R2450. The latter relay locks itself in its operated position, at its contacts 2457, and, at its contact 2451′, it completes a circuit for illuminating the TX lamp L2450 thereby to indicate to the TX toll operator that a TX toll call has been extended to the link 1300A.

When the supervisory relay R920 was connected via the EC conductors C993 and C764 to the ZIP conductor C1381, the zip-zip tone was transmitted, and when the rear link relay R1320 subsequently operated, it connected the high resistance ground potential on the EC conductor C764 via the contacts 1323, the REC conductor C1382, the winding of the rear supervisory relay R2550 and the resistor 2564, to battery. The rear supervisory relay R2550 does not operate over this circuit due to the high resistance of the upper winding of the supervisory relay R920. If, however, the distant toll operator should thereafter ring-down the trunk 800, a low resistance ground potential would be connected to the conductor C764 in order to operate the relay R2550. The relay R2550, at its contacts 2551, controls the application of ground potential to the RL1 conductor C1391 thereby to illuminate the rear supervisory lamp L1312 each time the operator or subscriber connected to the rear of the link 1300A requires the attention of the toll operator.

After the distant toll operator has given the TX operator the directory numbers of the calling and called subscribers, the connection may be released or, before releasing the connection, the TX operator may attempt to complete the connection to the desired called subscriber over the front of the link 1300A, all in the manner previously described.

If the TX operator completes the connection to the desired called subscriber she may then release the operator position equipment 2200A from the link 1300A in order to render her position equipment available to handle other calls. The connection between the calling subscriber and the called subscriber includes, as is shown schematically in Figs. 1 and 2, the toll switchboard 201 in the distant manual office 201, the toll line 211, the toll ring-down trunk 800, the toll ring-down trunk finder 1060, the TX trunk 1000, the link finder 1100, the link 1300C at the TX operator position 2200C, the toll preselector 1400 and the subsequent switching apparatus over which the connection was completed to the called subscriber. From the foregoing description of the switching apparatus included in the connection, it will be seen that the link at the inward and ring-down operator position is not included in the connection although it was originally selected to extend the connection to the inward operator position.

If the operator at the toll switchboard 201 desires to re-signal the TX operator, she may do so by transmitting a splash of ringing current over the toll line 211 thereby to operate the ring-down relay R940 in the toll ring-down trunk 800. The ring-down relay R940 causes the restoration of the signal relay R930 and the latter relay, at its contacts 931, completes an operating circuit for the call waiting relay R870. The relay R870, upon operating, at its contacts 873, connects its low resistance upper winding via the contacts 864 and the low resistance lower winding of the supervisory relay R920 to the EC conductor C993 thereby to change the high resistance ground potential on the EC conductor C993 to a low resistance ground potential. This low resistance ground potential on the conductor C993 is returned via the wiper 1063, the contacts 1014 and 1154, the wiper 1103, the EC conductor C764, the contacts 1353 and 1321, and the winding of the low resistance winding of the rear supervisory relay R1310, to battery. The relay R1310 is connected in series with the high resistance upper winding of the supervisory relay R920 as soon as the TX operator disconnects from the link 1300A, but the relay R1310 does not operate. When the ground potential is changed from high to low, the relay R1310 operates and illuminates the rear supervisory lamp L1312 in order to give the TX operator an "on hook" supervisory signal. As soon as the TX operator connects her position equipment to the link 1300A, a high resistance potential is returned over the EC conductor C764 thereby to cause the call waiting relay R870 to again restore to normal.

If the TX operator is informed that the connection has been released, she may actuate the link release keys K1374 and K1375 in the manner previously described thereby to interrupt the circuit for the supervisory relay R920 in the toll ring-down trunk 800 over the rear of the link 1300 and also to remove the holding ground potential on the C conductor C1404 over the front of the link 1300A. The switching apparatus included in the connection extended over the front of the link, is now restored to normal in the manner previously explained. In the toll ring-down trunk 800, the restoration of the supervisory relay R920 interrupts the locking circuit, at its contacts 922, for the auxiliary transfer relay R830 which now restores to normal. As soon as the relay R830 restores to normal, it interrupts, at its contacts 831, the circuit for the relay R860 in order to restore the last mentioned relay and, at its contacts 834, it disconnects the resistance battery potential from the EC1 conductor C994 extending to the TX trunk 1000.

Referring to the TX trunk 1000, it will be seen that when the resistance battery potential is removed from the EC1 conductor C994, the circuit including the upper and lower windings of the supervisory relay R1030 and the upper winding of the relay R1110 is interrupted thereby to cause the relay R1030 to restore to normal. The relay R1110, however, remains in its operated position over the circuit including its lower winding. As soon as the relay R1030 restores, it interrupts, at its contacts 1032, the circuit for the switching relay R1150 which now restores to normal and interrupts, at its contacts 1157, the circuit for the lower winding of the relay R1110. Upon restoring, the relay R1110 interrupts, at its contacts 1113, the holding circuit for the switching relay R1010 which also restores to normal. The TX trunk 1000 and the toll ring-down trunk 800 are accordingly fully restored to normal and rendered available for the additional calls.

*Call originated by the TX operator*

If the TX operator is unable to immediately establish the connection with the desired called subscriber, she informs the operator at the distant manual office 200 and then makes out a toll ticket containing the directory numbers of both the calling and called subscribers. The partially established connection is then released in the manner described above.

Since the TX operator must establish a connection with both the calling and called subscribers over the rear and front of a link at her position, facilities have been provided in the operator position equipment for connecting the register sender 1900A first with the rear of the link to establish a connection thereover to either the calling or the called subscriber and for then connecting the register sender to the front of the link to establish a connection with the other subscriber. In order to connect the register sender 1900A with the rear of the link 1300A, the TX operator position 2200A is equipped with a dial rear key. When this key is operated, the register sender is connected to the rear of a selected link through the operator position equipment and an idle delay selector is associated with the rear of the link. During the establishment of delay calls, it is recommended that the TX operator position be conditioned for key answering instead of automatic answering by operating the automatic answer key K2301. When the automatic answering key K2301 is actuated by the TX operator, the automatic answer control circuit 2601 is disconnected in order to prevent the automatic assignment of an idle link at the TX operator position.

The TX operator now operates the dial rear key K2391 at her position thereby to operate the dial rear relay R2370. Upon operating, the dial rear relay R2370, at its contacts 2375, interrupts a point in the circuit for controlling the relays R2250, R2260 and R2270 and, at its contacts 2379, it interrupts a point in the circuit of the distributor connect relay R2320. In this manner the operator position is prevented from receiving an incoming call when she subsequently operates a talk key, such as the key K1377, associated with an idle link, such as the link 1300A. The TX operator now actuates, for example, the key K1377 associated with the link 1300A. At contacts 3 of the key K1377, the lower winding of the talk relay R1340 is connected to the grounded OG conductor C1398 extending to the operator position equipment. In the operator position equipment the OG conductor C1398 is grounded via the contacts 2361, 2351 and 2311 of the operated relay R2310. The relay R1340 now operates and, at its contacts 1349, connects its upper winding and the winding of the class connect relay R1350 via the contacts 2 of the key K1377, the HG conductor C1397, the contacts 2369 and 2333, to the lower winding of the manual answer relay R2330. In this circuit the talk relay R1340 is retained in its operated position and the relays R1350 and R2330 are operated.

As soon as the relay R2330 operates, it completes, at its contacts 2331, a locking circuit for its upper winding which includes the contacts 2364′, the MA conductor C1396 and ground at contacts 1 of the key K1377. Accordingly, the relay R2330 remains in its operated position under control of the talk key K1377. As a further result of the operation of the relay R2330, at its contacts 2332, it connects the winding of the talk relay R2350 to the previously traced circuit including the upper winding of the relay R1340 and the winding of the relay R1350. The talk relay R2350 now operates and, at its contacts 2353, applies ground potential via the contacts 2371 and 2491′, to the winding of the start relay R1710 associated with the delay selector trunk distributor 1700. Before describing the operation of the delay selector trunk distributor 1700, it should be noted that the relay R2330, at its contacts 2334, applies ground potential via the contacts 2312 to the F conductor C2657 thereby to control the automatic answer control circuit 2601 to find the next idle link associated with the TX operator position.

Referring now to the delay selector trunk distributor 1700, it will be noted that the start relay R1710 is operated in response to the operation of the dial rear key K2391 at the TX operator position equipment 2200A. The start relay R1710 controls the delay selector trunk distributor 1700 to find and select a delay selector link finder, such as the delay selector link finder 1701, and the delay selector link finder, in turn, will connect the associated delay call selector, such as the selector 113, to the rear of the link 1300A.

When the start relay R1710 is operated, it connects the wiper 1751 of the delay selector finder 1750 via the contacts 1734, 1723, 1712, 1742 and 1754 to the winding of the magnet M1753. It also connects, at its contacts 1711, ground potential from the contacts 1741 via the contacts 1721, the winding of the switching relay R1730 and the contacts 1754 to the winding of the magnet M1753. The wipers 1751 and 1752 have access via the associated bank contacts to idle delay selector link finders, such as the finder 1701. Idle finders are marked available by an absence of ground potential on the contacts accessible to the wipers 1751 and 1752. The switching relay R1730 is short-circuited in the manner previously described if the wiper 1751 is in engagement with a grounded contact and the ground potential controls a self-interrupting circuit for the magnet M1703 to advance the wipers into engagement with the next set of bank contacts. When an idle delay selector link finder is found, the short-circuit will be removed from the relay R1730 and it will operate and lock in series with the magnet M1753 from ground at contacts 1731. The magnet M1753, however, does not operate due to the high resistance of the winding of the switching relay R1730.

It will be assumed that the wipers 1751 and 1752 are in engagement with the contacts terminating the conductors extending to the illustrated delay selector link finder 1701. Accordingly, the switching relay R1730 operates and, at its contacts 1733, it completes a circuit including the wiper 1751 and the contacts 1768 for operating the start relay R1770. As soon as the start relay R1770 operates, it interrupts, at its contacts 1775, the circuit for applying ground potential to the all-finders-busy relay R1740. As long as an idle selector link finder, such as the selector link finder 1701, is available to the delay selector trunk distributor 1700, the relay R1740 is retained in its operated position. The conductor C1594, connected to the relay R1740, normally has battery potential applied thereto via the contacts 1542 of the operated connect relay R1540.

When all the delay selector link finders are busy, the ground potential is removed and the normally operated relay R1740 restores to normal. The relay R1740 interrupts points in the previously traced circuits for automatically advancing the wipers 1751 and 1752 of the delay selector finder 1750. Accordingly, the wipers will not continue to slip when no idle delay selector link finder is available. If all the delay selectors are busy and the relay R1740 restores, at its contacts 1743, it connects the 1201PM conductor C1591 in the trunk distributor common equipment 1590 via the contacts 1541, the conductor C1593, the contacts 1713, 1726, 1737, 1743, 2378 and 2491, the RL1 conductor C1391, the contacts 1356′ and the rear supervisory lamp L1312, to battery. The rear supervisory lamp L1312 will flash 120 times per minute when the above traced circuit is completed to indicate to the TX operator that all of the delay selectors are busy and that a call cannot be completed over the rear of the link 1300A at the present time. However, it will be assumed that other delay selectors are available and that the relay R1740 does not restore to normal at this time.

As a further result of the operation of the start relay R1770, at its contacts 1771, it connects the wiper 1706 to the self-interrupting circuit for the magnet M1707 and, at its contacts 1772, it connects the lower winding of the switching relay R1760 to the circuit including the magnet M1707. The wiper 1706 has access via its associated bank contacts to conductors, such as the C5 conductor C1795, extending to the rear of the links at the TX operator position. The link 1300A is marked as the one to be connected to the delay selector 113 by an absence of ground potential on the C5 conductor C1795. All of the other links are marked with a ground potential in order to prevent the selector link finder 1701 from selecting such links. Accordingly, the magnet M1707 is self-interruptedly operated to advance the wipers 1702 to 1706, inclusive, step-by-step until the wiper 1706 engages an ungrounded contact. When this occurs, the short-circuit is removed from the lower winding of the switching relay R1760 and the relay operates over the series circuit including its lower winding and the winding of the magnet M1707. However, due to the high resistance of the lower winding of the switching relay R1760, the magnet M1707 does not operate.

When the switching relay R1760 operates, it completes, at its contacts 1769, a locking circuit for the lower winding of the start relay R1770. At its contacts 1762', the relay R1760 applies ground potential to the contact engaged by the wiper 1751 in order to mark the delay selector link finder 1701 busy to the delay selector trunk distributor 1700. At its contacts 1761, 1762 and 1763, the relay R1760 connects the —, + and EC conductors C1781, C1782 and C1783 to the wipers 1702, 1703 and 1704 respectively. At its contacts 1764, the relay R1760 applies ground potential to the C conductor C1784. At this time, it should be noted that the delay call selector 113, which is connected to the delay selector link finder 1701 over the conductors C1781 to C1784, inclusive, may be exactly the same as the toll preselector 1400 (Fig. 14). Accordingly, the —, +, EC and C conductors C1781 to C1784, inclusive, correspond respectively to the —, +, EC and C conductors C1401 to C1404, inclusive, connected to the toll preselector 1400.

As a further result of the operation of relay R1760, at its contacts 1765, it connects the EC1 conductor C1794 to the upper winding of the switching relay R1760. Finally, at its contacts 1767, the relay R1760 connects ground potential via the wiper 1706, the C5 conductor C1795, the contacts 1343', the CDR conductor C1389, the contacts 2413' of the now operated rear link control relay R2410, the contacts 2429, 2439, 2449 and 2459 and the winding of the class dial rear relay R2460, to battery.

As soon as the switching relay R1760 connects the delay call selector 113 to the —, + and EC conductors C1791, C1792 and C1793 extending to the rear of the link 1300A, a low resistance ground potential from the pulsing relay in the delay call selector 113, such as the pulsing relay R1420 in the selector 1400, is applied via the EC conductor C1783, the contacts 1763, the wiper 1704, the EC conductor C1793, the contacts 1354 and 1322, the ZIP conductor C1381, the contacts 2416' and 2374' and the winding of relay R2490, to battery. The relay R2490 operates and, at its contacts 2492', completes a circuit including the conductors C1854 and C1856 for operating the sender control relay R1820. The manner in which the sender control relay R1820 controls the link finder 1800A to associate the impulse sender 1900A with the front of a link in order to set up a connection has been described previously.

On a delay call of the type being described all of the links, such as the link 1300A, associated with the TX operator position, are made busy to the link finder 1800A over a circuit including ground at contacts 2373 of the operated dial rear relay R2370, the FG conductor C1384, the contacts 1347 and the F conductor C1891. Those links which do not have the talk relay R1340 in its operated position, apply ground potential via contacts corresponding to the contacts 1348', to the F conductors, corresponding to the F conductor C1891. Accordingly, all of the links, including the link 1300A selected for the delay call, are marked busy to the link finder 1800A. The conductor C1891A which is individual to the operator position equipment, is ungrounded at this time at the contacts 2374 in response to the operation of the dial rear relay R2370.

In view of the above description whereby all of the links associated with the TX operator position are marked busy, it will be understood that when the sender control relay R1820 is operated, as described above, the wipers 1872 to 1879, inclusive, of the link finder 1800A are advanced step-by-step until they engage the contacts terminating the conductors C1891A to C1898A, inclusive, extending to the operator position equipment 2200A. The link finder 1800A operates in the manner previously described to connect the impulse sender 1900A to the operator position equipment 2200A and then, as will be described, over the rear of the link 1300A to the delay call selector 113. As soon as the impulse sender 1900A is connected to the operator position equipment, the send pilot lamp L1862 will be illuminated to indicate to the TX operator that the sender is associated with her position and is ready to transmit the digits registered in the digit register 2600A.

The TX operator now actuates the keyset K2647 in the manner previously described to register the digits necessary to extend a call to one of the subscribers, in the digit register 2600A. As soon as the first digit is registered in the digit register 2600A, the digit send relay R2010 is operated in the manner previously described and, at its contacts 2013, it applies ground potential to the wiper 1873 and the lower winding of the switching relay R1810. This ground potential holds the switching relay in its operated position and it completes a circuit via the conductor C1892A for operating the delay send relay R2540 in the operator position equipment 2200A.

As soon as the delay send relay R2540 operates, it completes, at its contacts 2541, a circuit for operating the rear link relay R1320 in the link 1300A. Referring to the link 1300A, it will be seen that the circuit for controlling the rear link relay R1320 may be traced from battery through the lower winding of relay R1320, the contacts 1357, the RC1 conductor C1386, the contacts 2541 and 2419, and ground. When this circuit is completed, the relay R1320 operates and, at its contacts 1323, connects the EC conductor C1793 at the rear of the link 1300A to the REC conductor C1382 thereby to prepare a point in the EC pulse circuit. At its contacts 1326, the relay R1320 connects the link busy lamp L1372 to the grounded conductor C2656 thereby to illuminate the lamp to indicate to the operator that the link 1300A is busy. As a further result of the operation of the relay R1320, at its contacts 1325, it applies ground potential to the EC1 conductor C1794 thereby to complete a holding circuit for the upper winding of the switching relay R1760 in the delay selector link finder 1701. This ground potential is also extended via the contacts 1773 and the upper winding of the start relay R1770, to battery. The start relay R1770 is of the differential type and at this time, the circuits including the upper and lower windings are in opposition to each other and the relay restores to normal. The switching relay R1760 is held from the link 1300A.

The start relay R1770, upon restoring, at its contacts 1776, applies ground potential via the contacts 1763', the wiper 1752, the contacts 1736 and 1724, and the winding of the disconnect relay R1720, to battery. The relay R1720 now operates and locks itself via its contacts 1725 to ground at contacts 1735. At its contacts 1722, the relay R1720 completes an obvious circuit for operating the magnet M1753 and, at its contacts 1721 it interrupts the circuit of the switching relay R1730. The switching relay R1730 now restores to normal and, at its contacts 1732, interrupts the circuit for the magnet M1753 which also restores to normal and advances its wipers 1751 and 1752 one step into engagement with the next set of bank contacts. As a further result of the restoration of the relay R1730, at its contacts 1735, it interrupts the locking circuit for the relay R1720 which also restores to normal. At this time, the delay selector trunk distributor 1700 has been fully restored to normal. However, if other toll operators are waiting to be connected to a delay call selector, the start relay R1710 will remain in its operated position and the distributor 1700 will reoperate to search for and connect an idle delay selector to a link at one of the waiting operator positions.

As a further result of the operation of the relay R1320, at its contacts 1324, it locks itself over its upper winding to battery through the resistor 1329. The ground potential through the upper winding of the relay R1320 is also extended via the contacts 1356, and the RLC conductor C1385 in order to operate the rear link control relay R2410. The relay R2410, upon operating, at its contacts 2413', completes the previously traced circuit for operating the class dial rear relay R2460; at its contacts 2417', it completes the circuit for illuminating the engaged rear lamp L2497; and, at its contacts 2415', it completes a locking circuit for retaining the relay R2490 in its operated position. At its contacts 2412, 2414, 2416 and 2418, the relay R2410 connects the class indicating conductors C1388–1 to C1388–4 respectively to ground at the contacts 2462, 2464, 2466 and 2468 of the operated relay R2460. The ground potential connected to the above mentioned class conductors is extended through the rear of the link 1300A to the bank contacts of the various link finders associated with trunk circuits over which connections may be extended to the link 1300A at the TX operator position. The ground potential thus applied to the bank contacts of the various link finders marks the link 1300A busy and prevents its seizure by such link finders.

From the foregoing description, it will be understood that when the delay send relay R2540 operates to indicate that the impulse sender 1900A is connected to the operator position equipment, the link 1300A is controlled to cause the release of the delay selector trunk distributor 1700 by operating the rear link relay R1320 and to signal the operator by illuminating the engaged rear lamp L2497.

As a further result of the operation of the delay send relay R2540, it completes, at its contacts 2542, a circuit for connecting the EC pulsing conductor C1908 in the impulse sender 1900A through the operator position equipment 2200A, the link 1300A, and the delay selector finder 1701, to the low resistance winding of the pulse relay in the delay call selector 113. This circuit may be traced from battery through the low resistance winding of the supervisory relay R1910 in the impulse sender 1900A and then by way of the contacts 2066, 2088 and 2065, the EC pulsing conductor C1908, the contacts 1846_a_ and 1818, the wiper 1876, the EC conductor C1895A extending to the operator position equipment 2200A, the contacts 2542, the REC conductor C1382 extending to the link 1300A, the contacts 1323 and 1354, the EC conductor C1793, the wiper 1704, contacts 1763, the EC conductor C1783 extending to the delay call selector 113 and the low resistance winding of a pulse relay, such as the relay R1420, to ground. Accordingly, the pulses corresponding to the first digit registered in the digit register 2600A may now be transmitted over the above described circuit by the impulse sender 1900A to control the pulse relay in the delay call selector 113.

As a further result of the operation of the delay send relay R2540, at its contacts 2541′, it connects the winding of the talk relay R2350 via the LC conductor C1387 and the contacts 1348 to provide a multiple holding circuit for the talk relay R1340 and the class control relay R1350 in the link 1300A. At its contacts 2547, the relay R2540 completes a circuit for illuminating the rear supervisory lamp L1312 individual to the link 1300A. This circuit may be traced from battery by way of the lamp L1312, the contacts 1356′, the RL1 conductor C1391, the contacts 2547, the SP conductor C1896A, the wiper 1877 of the link finder 1800A, the contacts 1819 and 1847_a_, the SP conductor C1876, and ground at contacts 1977 in the impulse sender 1900A. Finally, at its contacts 2549, the relay R2540 completes an obvious operating circuit for the rear control relay R2520.

The relay R2520, upon operating, at its contacts 2522 and 2524, disconnects the operator telephone equipment 2300 from the −R and +R talking conductors C1379_a_ and C1379_b_ and, at its contacts 2521 and 2523, it connects the last mentioned conductors to the impulse sender 1900A. Accordingly, during the time that the impulse sender 1900A is connected to the delay selector 113, the − and + conductors C1781 and C1782 are connected to the impulse sender 1900A via the contacts 1761 and 1762, the wipers 1702 and 1703, the − and + conductors C1791 and C1792, the contacts 1342 and 1346, the −R and +R conductors C1379_a_ and C1379_b_, the contacts 2521 and 2523, the contacts 2545 and 2546, the −D and +D conductors C1894A and C1893A, the wipers 1875 and 1874, the contacts 1817 and 1816, and the contacts 1845_a_ and 1844_a_, the −D and +D conductors C1875 and C1874, and to the contacts 1985 and 1982 respectively of the unoperated relay R1980 in the impulse sender 1900A.

All of the various operations of the impulse sender 1900A whereby a call is extended over the front of the link 1300A, as previously described, also apply to the extension of a call over the rear of the link 1300A. Accordingly, it will be understood that the delay call selector 113 is controlled in response to the first registered digit to select any one of the levels terminating trunks from the distant automatic exchange 203, the distant toll center 206, the manual office 200, the CAX208 and finally, the outgoing trunk 108 over which connections are completed to local subscribers in the central office 100. When the call is completed over any one of the above mentioned paths circuits to the called subscriber or operator and answered, a high resistance ground potential is returned through the delay call selector 113 to the EC conductor C1783 in order to give the "off hook" supervision to the TX operator.

*Error in keying up the digits*

If the TX operator should make a mistake in keying up the digits of the called subscriber directory number on the keyset K2647 and desires to release the partially completed connection which has been set up by impulses transmitted by the impulse sender 1900A, she may do so by momentarily operating the release rear key K2641 at her position. When the key K2641 is operated, ground potential is connected via the contacts 2 of the key K2641, the contacts 2544, the BSR, conductor C1898A, the wiper 1879, the contacts 1812′ and 1849_a_, the BSR conductor C1878, the contacts 1983′ and 2067 and the lower winding of the error relay R2050, to battery. The error relay R2050, upon operating, at its contacts 2052, locks itself to ground at contacts 2063. The contacts 3 of the key K2641 applies ground potential to the winding of the rear control relay R2520 in order to retain the last mentioned relay in its operated position. Finally, at the contacts 1 of the key K2641, ground potential is connected via the RLC conductor C1385 and the contacts 1356 in order to short-circuit the upper winding of the rear link relay R1320 which now restores to normal. The relay R1320, upon restoring, at its contacts 1323, disconnects the EC conductor C1793 from the REC conductor C1382 thereby to interrupt the circuit for the pulsing relay in the delay call selector 113 or in any of the subsequent switches in the incomplete connection. Also, at its contacts 1325, the rear link relay R1320 removes ground potential from the EC1 conductor C1794 thereby to interrupt the holding circuit for the switching relay R1760 in the delay selector link finder 1701 which now restores to normal. At its various contacts, the relay R1760 disconnects the delay call selector 113 and the subsequent operated switches from the rear of the link 1300A and these switches all restore to normal.

In the impulse sender 1900A the error relay R2050, at its contacts 2051, interrupts the circuit for the prime mover relays R2080, R2085 and R2090 and the circuits for any of the operated counting relays. Also, at its contacts 2054, the relay R2050 completes a circuit for operating the relay R2060. In response to the operation of the relay R2060, at its contacts 2066 and 2065, it disconnects the supervisory relay R1910 from the EC pulsing conductor C1908. At its contacts 2061′, the relay R2060 removes ground potential from the conductor C2001 thereby to cause any of the operated register relays in the digit register 2600A to restore to normal; at its contacts 2063′, it interrupts a circuit for the relay R2190 which restores to normal; and, at its contacts 2062′, it connects ground potential via the contacts 1984′, the RLS conductor C1877, the contacts 1848_a_ and 1811′, the wiper 1878, the RLS conductor C1897A, the contacts 2548 and the winding of the rear link control relay R2410, to battery. The relay R2410 is thereby retained in its operated position. Also the ground potential on the RLS conductor C1897A is connected via the contacts 2548 to the RLC conductor C1385 in order to maintain the short-circuit on the upper winding of the rear link relay R1320 after the release rear key K2641 is restored to normal and until the impulse sender 1900A has fully released. Also, at its contacts 2062, the relay R2060 applies a holding ground potential to the DS conductor C1873 in order to retain the relay R1810 operated and to retain the delay send relay R2540 in its operated position. Finally, the relay R2060, at its contacts 2063, interrupts the locking circuit for the relay R2050 which now restores to normal. At this time, the relay R2070 operates in series with the relay R2060 in the manner previously described. The restoration of the relay R2050 also completes, at its contacts 2051, the previously described circuit for the prime mover relays. Since the connection has been dialed over the rear of the link 1300A, the ground potential for retaining the relays R2060 and R2070 in their operated positions, is under control of the contacts 2 of the release rear key K2641. However, when the relay R2070 operates, it completes, at its contacts 2077, a circuit which may be traced from battery by way of the lower winding of the operated sender relay R2040, the contacts 2043 and 2077, the SRN conductor C1879, the contacts 1841*a*′, 1813′ and 1824, the conductor C1855 and ground at contacts 2376. This circuit retains the relay R2040 operated even though the circuit including its upper winding is subsequently interrupted. Also, at its contacts 2044, the relay R2040 connects ground via the contacts 2069 and the windings of the relay R2070 and R2060 in series, to battery. Accordingly, the last mentioned relays are retained operated even though the release rear key K2641 is now restored to normal.

If the release rear key K2641 is momentarily operated after the operator has controlled the impulse sender 1900A to transmit an automatic ring signal by operating relay R1980 over its upper winding, then when the ground potential is applied to the BSR conductors C1898A and C1878, the error relay R2050 will be operated over its lower winding via the contacts 1982′ of the operated relay R1980. In response to the operation of the relay R2050, the operating ground therefor will be connected via the contacts 2067, 2055 and 1985′ to the lower winding of the operated relay R1980. Since the upper and lower windings of the relay R1980 are in opposition to each other, the energizing circuits completed through both these windings causes the relay to restore to normal. The impulse sender 1900A will then complete the releasing operations of the partially dialed connection in the manner described.

During the release of the impulse sender 1900A under control of the release rear key K2641, the relay R2050 operated and restored in order to lock the relays R2060 and R2070 in their operated positions in the manner previously described. When the relay R2050 restores, it completes, at its contacts 2051, a circuit for grounding the conductor C2118 in order to start the cyclic operation of the prime mover relays and the counting operation of the counting relays. Accordingly, the counting relays R2130 to R2170, inclusive, count through five pulses, the transfer relays R2110 and R2120 are then operated and the counting relays R2130 to R2170, inclusive, count through five additional pulses. When the counting relay R2170 operates the second time, that is at the end of ten pulses transmitted to the counting relays, it completes, at its contacts 2172, a circuit including the contacts 2122, the test conductor C2112, the contacts 1953, 2073 and 2074 and the upper winding of the sender release relay R1920, to battery. The sender release relay R1920 operates over the above traced circuit and, at its contacts 1924, it locks itself to ground at contacts 2071. As a further result of the operation of the relay R1920, at its contacts 1922, it removes ground potential from the conductor C2118 thereby to terminate further cyclic operation of the prime mover relays and to cause operated ones of the counting relays to restore to normal. At its contacts 1921, the relay R1920 interrupts the circuit for the upper winding of the relay R2040 but the last mentioned relay does not restore at this time due to the fact that it is held in its operated position over the circuit including its lower winding and the grounded SRN conductor C1879. As a further result of the operation of the relay R1920, at its contacts 1923, it removes ground potential from the DS conductor C1873 thereby to interrupt the circuit for holding the switching relay R1810 in its operated position and the circuit for retaining the delay send relay R2540 in its operated position. These relays now restore to normal.

As soon as the relay R1810 restores to normal it disconnects the impulse sender 1900A from the operator position equipment 2200A. Accordingly, the holding ground applied to the lower winding of the relay R2040 is disconnected therefrom and the relay restores to normal. Upon restoring, the relay R2040 interrupts, at its contacts 2044, one point in the multiple holding circuit for the relays R2060 and R2070. Also if the operator has not as yet restored the release rear key K2641, the restoration of the relay R1810, at its contacts 1812′ disconnects the grounded BSR conductor C1898A from the circuit for holding the relays R2060 and R2070. These relays now restore to finally return the impulse sender 1900A to its released position.

In the operator position equipment 2200A, the restoration of the delay send relay R2540 interrupts the circuit for the relay R2520 which now restores to normal. As a further result of the restoration of the delay send relay R2540, at its contacts 2548, it interrupts the circuit for the rear link control relay R2410 which also restores to normal. The relay R2410, upon restoring, at its contacts 2415′, interrupts the circuit for the relay R2490 which also restores to normal. At this time, the operator position equipment 2200A is placed in substantially the same condition that it was at the time that the operator actuated the dial rear key K2391 to associate the rear of the link 1300A with the delay call selector 113.

As soon as the relay R2490 restores to normal as has been described above, it recompletes, at its contacts 2491′, the previously described circuit for grounding the start relay R1710 associated with the delay selector trunk distributor 1700. Accordingly, the trunk distributor 1700 selects an idle delay selector link finder, such as the finder 1701. The selected delay selector link finder searches for and finds the link 1300A at the TX operator position and connects the selected link to an idle delay call selector, such as the selector 113, all in the manner previously described. Furthermore, the link finder 1800A again controlled to connect the impulse sender 1900A to the operator position equipment 2200A and through the position equipment to the rear of the link 1300A, in the manner described previously. After the foregoing operations have been completed and the sender pilot lamp L1862 is again illuminated, the operator may then reoperate her keyset K2647 in accordance with the correct trunk route designation or the subscriber directory number.

After the TX operator has completed a connection to one of the subscribers over the rear of the link 1300A, in the manner described above, she restores her dial rear key K2391. It should be understood, however, that the operator may restore the dial rear key K2391 immediately after she has registered the last digit of the called party directory number in the digit register 2600A. In either event, the impulse sender 1900A will remain connected through the operator position equipment to the rear of the link 1300A until the last digit has been transmitted and then it will release itself.

*Connecting the impulse sender 1900A to the front end of the link 1300A*

When the TX operator restores the dial rear key K2391 after the registration of the last digit of the called number, the relay R2370 restores to normal and, at its contacts 2374, applies ground potential to the conductor C1891A engaged by a wiper 1872 of the link finder 1800A. The ground potential applied to the wiper 1872 is extended via the contacts 1813 and 1832 and the winding of the relay R1830, to battery. The relay R1830 now operates and, at its contacts 1833, locks itself to ground at contacts 1812. Accordingly, it will be understood that if the dial rear key K2391 is restored to normal prior to the disconnection of the impulse sender 1900A from the rear of the link 1300A, the relay R1830 will be operated and locked to the contacts 1812 on the operated switching relay R1810. With the relay R1830 in its operated position, the restoration of the relay R1810 and the delay send relay R2540 remains exclusively under control of the impulse sender 1900A, as previously noted. After the last digit has been transmitted over the rear of the link 1300A, the relay R1810 restores to normal to disconnect the impulse sender 1900A from the operator position 2200A and the delay send relay R2540 restores in the manner previously described. Upon restoring, the relay R2540 connects, at its contacts 2543, the rear supervisory relay R2550 via the REC conductor C1382 to the EC conductor C1793 over the rear of the link 1300A. A low resistance ground potential will be applied to the conductor C1793 in order to operate relay R2550. When the called party on the rear of the link answers the connection a high resistance ground potential is substituted for the low resistance ground in order to restore the rear supervisory relay R2550. The relay R2550 restores and, at its contacts 2551, removes ground potential from the RL1 conductor C1391 thereby to extinguish the rear supervisory lamp L1312 to indicate to the TX operator that the subscriber connected to the rear end of the link has answered the call. As a further result of the restoration of the delay send relay R2540, it disconnects the operator position equipment 2200A from the conductors engaged by the wipers of the link finder 1800A. At its contacts 2549, the relay R2540 interrupts the circuit for the relay R2520 which restores and at its contacts 2522 and 2524 connects the operator telephone equipment 2300 via the −R and +R conductors C1379*a* and C1379*b* to the called party.

As soon as the impulse sender 1900A fully restores to normal, it completes a circuit which may be traced from ground by way of the contacts 2045, 2078, 1841a1 and 1814', the conductor C1856, contacts 2492', the conductor C1854, the winding of the sender control relay R1820, to battery at contacts 1853. It should be noted that the rear link relay R2410 is now locked in series with the rear link relay R1320; the relay R2490 locked operated from ground at contacts 2475, and that the class dial relay R2460 locked over the CDR conductor C1389 to ground at contacts 1767 in the delay selector link finder 1701. The relay R1820 operates over the above traced circuit and, at its contacts 1821 and 1822, recompletes the previously traced circuits whereby the magnet M1870 of the link finder 1800A is self-interruptedly operated to search for and connect with the front end of the link 1300A. Accordingly, the wipers 1872 to 1879, inclusive, will be advanced step-by-step until the wiper 1872 engages the contact terminating the particular F conductor C1891 individual to the link 1300A. This conductor will be the only ungrounded F conductor accessible to the wiper 1872 inasmuch as the relay R1340 in the link 1300A is operated and the dial rear relay R2370 in the operator position 2200A is now restored. Accordingly, the switching relay R1810 will again be operated in the manner previously described in order to connect the impulse sender 1900A to the front of the link 1300A over the conductors C1891 to C1898, inclusive, in the manner previously described.

As soon as the impulse sender 1900A is connected to the front of the link, the send pilot lamp L1862 will be illuminated to indicate to the TX operator that she may reoperate her keyset K2647 in accordance with the number of the other subscriber which, in this case, may be the original calling subscriber. The impulse sender 1900A will now control the setting up of the connection over the front of the link 1300A via the toll preselector 1400, in the manner previously described, and it will disconnect itself from the link 1300A as soon as all of the digits of the called number have been transmitted.

When the called subscriber answers the connection, a high resistance ground potential will be substituted for the low resistance ground potential returned over the EC conductor C1403 to the front end of the link 1300A and then via the contacts 1336, 1362 and 1351, the FEC conductor C1380, the winding of the front supervisory relay R2560 and the resistor 2560a, to battery. The front supervisory relay R2560 is operated over the above traced circuit by the low resistance ground potential applied thereto and when the high resistance ground is substituted, as noted above, the relay restored to normal. At its contacts 2561, the relay R2560 interrupted the circuit including the FL1 conductor C1392 and the contacts 1357' in order to extinguish the front supervisory lamp L1373. The extinguished condition of the lamp L1373 indicates to the TX operator that the subscriber connected to the front of the link 1300A has answered the call.

A three-way talking connection is now established between the TX operator, the subscriber connected to the front of the link, and the subscriber connected to the rear of the link. This talking connection includes the operator telephone equipment 2300, the −R and +R conductors C1379a and C1379b, the contacts 1342 and 1346 in the link 1300A, the − and + conductors C1791 and C1792 and the subscriber selected over the delay call selector 113. The talking connection also includes the operator telephone equipment 2300, the −F and +F conductors C1378a and C1378b, the contacts 1341 and 1344, 1331 and 1334, the − and + conductors C1401 and C1402 and the subscriber selected over the toll preselector 1400. The TX operator may now restore the talk key K1377, associated with the link 1300A, to normal thereby to complete the connection between the subscribers connected respectively to the front and rear of the link 1300A and to disconnect her position equipment 2200A from the link 1300A. The operator must now indicate the starting time of the conversation between two subscribers on the toll ticket prepared for the particular call.

When the TX operator restores the talk key K1377 to normal, the talk relay R1340 and the class control relay R1350 restore to normal, in the manner previously described, and the operator position is released to enable the TX operator to respond to additional calls distributed to the links individual to her position. When the relay R1340 restores to normal, it completes, at its contacts 1343 and 1345, circuits for interconnecting the − and + conductors C1791 and C1792 at the rear of the link, to the − and + conductors C1401 and C1402 at the front of the link. The two subscribers involved in the connection are now interconnected and the TX operator position equipment 2200A is disconnected from the link 1300A. When the class control relay R1350 restores to normal, it connects the EC conductor C1793 via its contacts 1353 to the rear supervisory relay R1310 and it connects the EC conductor C1403 via its contacts 1352 to the front supervisory relay R1370. A high resistance ground potential is maintained on the EC conductors C1793 and C1403 as an "off-hook" supervisory signal, but the relays R1310 and R1370 do not operate. Consequently the supervisory lamps L1312 and L1373 are not illuminated.

When the connection between the subscribers is terminated by the replacement of the receivers upon the switch-hook of the associated telephone instruments, a low resistance ground potential is substituted for the high resistance ground potential on the EC conductors C1793 and C1403. The supervisory relays R1310 and R1370 now operate and complete circuits for illuminating the rear and front supervisory lamps L1312 and L1373 in the link 1300A as an indication to the TX operator that the conversation had been terminated. The TX operator now marks the terminating time of the conversation upon the toll ticket and then releases the link 1300A by momentarily actuating the front and rear release keys K1374 and K1375. It may be well to mention at this time that the charge for this call is made against subscriber that originally attempted to complete the connection.

*Call from the distant toll center 206 to the central office 100*

Referring to the trunking diagram illustrated in Figs. 1 and 2, it will be seen that the toll operator at the distant toll center 206 may extend connections via the toll board 207, the repeater 207A and the two-way toll line 213 to the intertoll trunk 400 provided at the central office 100. The intertoll trunk 400 is directly connected to an intertoll selector 110 which may be governed by impulses transmitted over the toll line to establish connections, via the automatic switch train, with local subscribers in the central office 100 and which may also be governed to establish connections, via the intertoll ring control circuit 111 with the intertoll selector 112. The last mentioned selector may also be controlled by impulses transmitted over the toll line 213 to further extend connections via the two-way trunk circuit 210 and interconnecting toll line 212 to the distant automatic exchange 203; it may also be controlled to extend connections via the incoming trunk circuit 209 and interconnecting trunk 214 to the CAX203; it may also be controlled to extend connections via the inward trunk 300 and the TX trunk 1000 to the inward and TX operator positions 2200B and 2200C in the central office 100; and it may also be controlled to extend connections via the toll ring-down trunk 800 and the interconnecting toll line 211 to the toll switchboard 201 in the distant manual office 200. The manner in which the intertoll trunk 400 is operated in response to a call initiated by the toll operator in the toll center 206 will now be described.

Referring to Figs. 4 and 5 of the drawings, it will be noted that the intertoll trunk circuit 400 may be seized over the toll line 213 from the switchboard 207 by the application of battery potential to the conductor C414 over the two conductors of the toll line 214. The battery potential applied to the conductor C414 is extended via the intermediate winding of the signal relay R410, the contacts 543, 552 and 553, to ground. The relay R410 operates over the above described circuit and, at its contacts 411, completes an obvious circuit for operating the pulse-in relay R440. It should be noted that the signal relay R410 is polarized by the circuit through its lower winding including the resistor 412. Accordingly, the relay R410 is exceedingly fast in responding to battery pulses transmitted over the conductor C414. The upper winding of the signal relay R410 is short-circuited at this time over the circuit including the contacts 533, 552 and 543, the upper winding of the relay and the resistor 413. It will be understood that various alterations may be made in the potentials applied to the windings of the relay R410 in order to transmit signals in both directions over the two-way toll line 213.

As soon as the pulse-in relay R440 operates, it completes, at its contacts 444, a circuit including the contacts 435 for operating the hold relay R450. The latter relay, upon operating, at its contacts 452, applies a busy marking ground potential to the C conductor C583 in order to mark the intertoll trunk circuit 400 busy to all selectors having access thereto. At its contacts 455, the relay R450 connects battery potential by way of the winding of the supervisory relay R520, the contacts 442 and 455, to the EC conductor C594 in the cable 590 extending to the intertoll selector 110. The battery potential applied to the conductor C594 seizes the associated intertoll selector 110 and prepares it for further operations. At its contacts 454, the relay R450 applies ground potential to the C conductor C593 in the cable 590 extending to the intertoll selector 110 in order to hold the last mentioned selector and any subsequently operated switches, in their operated positions under control of the intertoll trunk 400. For the purpose of this description, it will be assumed that the intertoll selector 110 is the same as the toll preselector 1400 illustrated in Fig. 14. Therefore, when the selector 110 is seized, a low resistance ground potential is returned over the EC conductor C594 in order to operate the supervisory relay R520 in the intertoll trunk circuit 400. The intertoll trunk 400 is now conditioned to respond to dialed impulses transmitted by the toll operator at the distant toll center 206.

When the toll operator actuates the dial or register sender at the switchboard 207, the repeater 207A causes alternate ground and battery pulses to be transmitted over the two conductors of the toll line 213 to the conductor C414. Each time the ground potential is applied to the conductor C414, the signal relay R410 restores to normal due to the fact that its upper and intermediate windings are short-circuited and each time the battery potential is applied to the conductor C414, the signal relay R410 reoperates. Accordingly, at its contacts 411, the relay R410 restores and reoperates the pulse-in relay R440 a number of times corresponding to the number of impulses in the digit transmitted by the distant toll operator. The relay R440, in turn, repeats these impulses via the contacts 443 and 456, the upper winding of the auxiliary supervisory relay R510, the contacts 523 and the winding of the supervisory relay R520, to battery. This circuit is completed each time the relay R440 restores in order to retain the supervisory relay R520 in its operated position during the interval of time that the impulses are transmitted, at the contacts 442, to the intertoll selector 110 over the EC conductor C594. At the contacts 442, the relay R440 interrupts the circuit including the EC conductor C594 in order to control the selector 110 to raise its wipers in a vertical direction in the same manner as has been described previously in connection with the description of the operation of the toll preselector 1400. Each time the relay R440 operates, during impulsing, it momentarily completes the circuit for the hold relay R450 which relay remains in its operated position during pulsing due to its slow-to-release characteristics. In view of the foregoing, it will be understood that the intertoll selector 110 raises its wipers step-by-step to the level corresponding to the digit dialed and then automatically selects an idle trunk to the next switching stage in the conventional manner.

The first restoration of the pulse-in relay R440 operates the auxiliary supervisory relay R510 over the previously traced circuit. The relay R510, upon operating, at its contacts 515, locks itself over a circuit including its lower winding and ground at contacts 457. At the end of the transmission of the first series of impulses, the relays R410, R440, R450, R510 and R520 remain in their operated positions.

Subsequent digits transmitted by the toll operator are repeated by the pulse-in relay R440 over the EC conductor C594 to the subsequent switches in the switch train in the same manner as has been described above. If during the setting up of the connection on all-trunks-busy condition is encountered, the succeeding switch train will return alternate high and low resistance ground pulses over the EC conductor C594 to the winding of the supervisory relay R520. As previously described, an all-trunks-busy signal is transmitted by applying alternate high and low resistance ground pulses to the EC conductor C594 at the rate of 120 pulses per minute. On the other hand, if the connection is extended to a busy called line, the high and low resistance ground pulses will return at the rate of 60 pulses per minute. Each time a high resistance ground pulse is returned over the EC conductor C594, the supervisory relay R520 restores to normal and each time the low resistance ground pulse is returned, the supervisory relay R520 reoperates. Each time the relay R520 restores to normal, it completes, at its contacts 522, a circuit which may be traced from battery via the resistor 445, the contacts 453, 514 and 522, the low resistance upper winding of the pulse-out relay R530, the contacts 513 and the high resistance lower winding of the pulse-out relay R530, to ground. Each time the supervisory relay R520 operates, it interrupts the above traced circuit, at its contacts 522. Accordingly, the pulse-out relay R530 operates and restores in synchronism with the supervisory relay R520. At its contacts 532 and 533, the pulse-out relay R530 alternately applies resistance battery potential via the resistor 516 and ground potential to the mid-point of the upper and intermediate windings of the signal relay R410. When resistance battery potential is applied to the mid-point of the windings of the relay R410, an energizing circuit is retained for the upper winding and the intermediate winding is short-circuited by the battery potential also applied to the conductor C414, and when the ground potential is applied to the mid-point of the upper windings of the relay R410, the upper winding thereof is short-circuited and the intermediate winding is energized by the battery potential on conductor C414. Consequently, the relay R410 remains in its operated position. The alternate battery and ground potentials applied to the mid-point of the upper windings of the relay R410, alters potentials over the conductor C414 thereby to control a relay, such as the relay R410, in the repeater 207A in the distant toll center 206 to transmit a flash busy signal to the toll operator at the switchboard 207.

If the connection is completed to a called subscriber line via the automatic switching apparatus in the central office 100, the answering of the call by the called subscriber changes the low resistance ground potential returned over the EC conductor C594 to a high resistance ground potential. Accordingly, the supervisory relay R520 restores to normal as previously noted and, at its contacts 521, removes the line termination circuit including the condenser 524 and the resistor 523 from across the − and + talking conductors C591 and C592. At its contacts 522, the supervisory relay R520 also completes the previously traced circuit for operating the pulse-out relay R530 and the latter relay, at its contacts 532, applies the resistance battery to the mid-point of the upper windings of the signal relay R410 in order to give the distant toll operator at the switchboard 207 an "off hook" supervisory signal, in the manner previously described. The calling toll operator at the toll switchboard 207 may now disconnect from the established connection and interconnect the original calling subscriber and the particular called subscriber. The established toll call is supervised by the operator at the distant toll center 206 and she makes out the necessary toll ticket for assessing the charge for the call against the calling subscriber.

Referring again to the trunking diagram shown in Figs. 1 and 2, it will be understood that the above toll connection is completed by the distant toll operator in response to the transmission of all of the digits necessary to complete the connection directly to a called subscriber line. Accordingly, it may be assumed that the distant toll operator transmits digits necessary to control the intertoll trunk 400, the intertoll selector 110 and the local switches 104 and 105 in the central office 100 to extend the connection, for example, to the local subscriber at substation T1. On the other hand, the toll operator may also transmit digits to extend the toll connection via the intertoll selector 110, the intertoll ring control circuit 111, the intertoll selector 112 and the incoming trunk circuit 209 to a local subscriber in the CAX 208. The distant toll operator may also transmit digits to extend the connection via the intertoll trunk 400, the intertoll selector 110, the intertoll ring control circuit 111, the intertoll selector 112, the two-way trunk circuit 210, the toll trunk 212, to the two-way trunk 204 in the distant automatic exchange 203 and then via the local switches in the exchange 203 directly to a called subscriber line. Accordingly, in each of the above mentioned connections, the toll operator at the distant toll center 206 controls the various switches in the switch train by means of dialed digits to complete the entire connection to a called subscriber. In certain types of calls, however, the toll operator at the distant toll center 206 may not have adequate information as to the directory number of a called subscriber in an automatic exchange and, consequently, must extend the connection to a toll operator in the central office 100. As is clearly illustrated in Figs. 1 and 2, in order to extend a connection to the toll operator at the central office 100, the toll operator in the distant toll center 206 may again extend the connection via the repeater 207A and the two-way toll line 213 to the intertoll trunk 400, in the manner described above. The distant toll operator may then dial the last two digits in order to control respectively the intertoll selector 110, the intertoll ring control circuit 111 and the intertoll selector 112. Ordinarily the digit that is dialed into the intertoll selector 112 is the digit 2, thereby to extend the connection over the cable 390 to the inward trunk 300 associated with the inward operator position 2200B. It should be noted, however, that if the digit is the digit 1, the intertoll selector 112 will extend the connection over the cable 1080 to the TX trunk 1000 associated with the TX operator position 2200C. In most cases, the last mentioned connection is only resorted to when the toll call cannot be completed directly under control of the toll operator at the distant toll center 206 and when it cannot be completed to the desired called destination under the joint control of the distant toll operator and the operator at the inward operator position 2200B.

Figure 3:
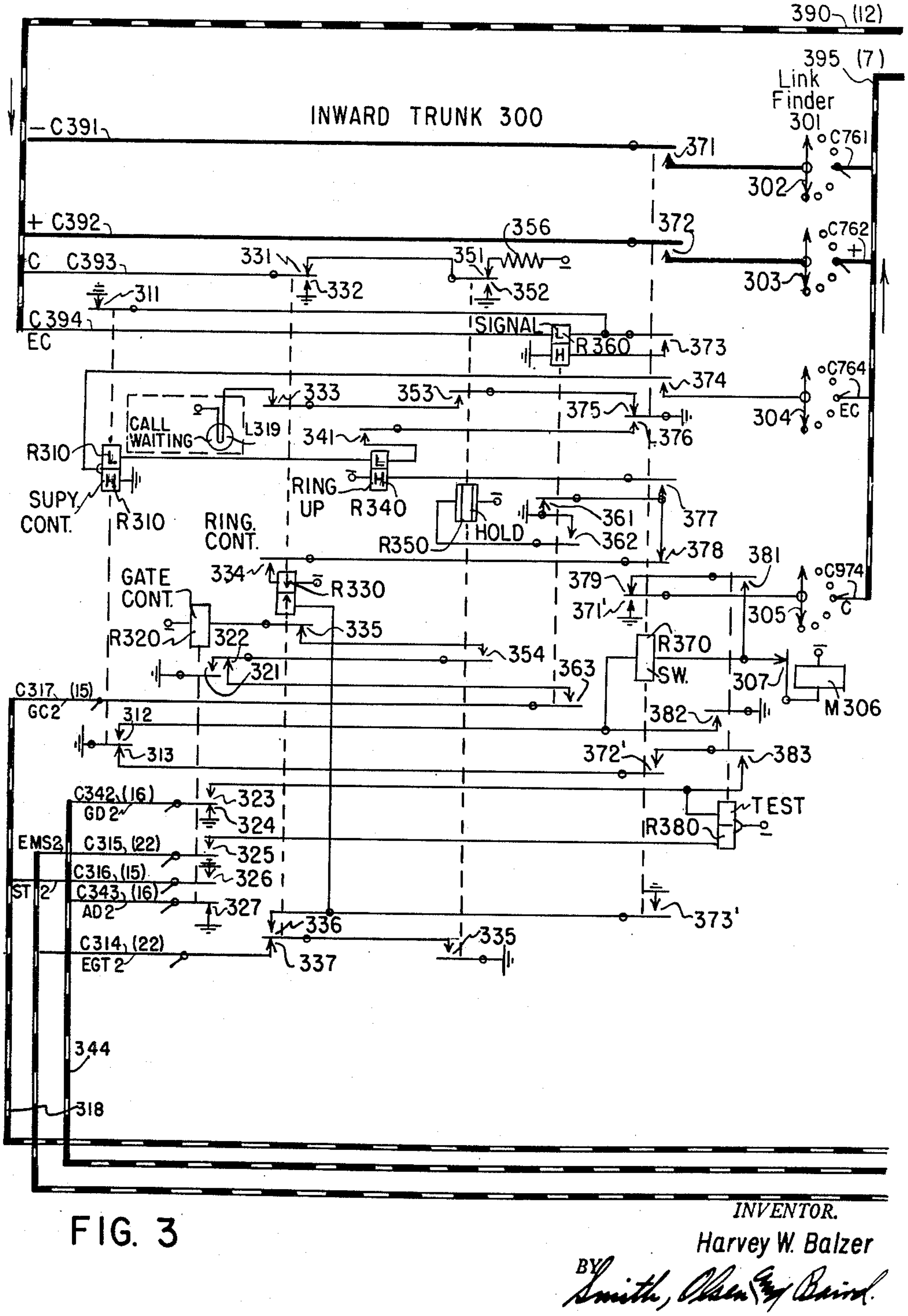

In order to describe the extension of the connection to the inward operator position 2200B, it will be assumed that the toll operator at the distant toll center 206 has controlled the intertoll trunk 400 (Figs. 4 and 5) in the manner previously explained to seize the intertoll selector 110 over the cable 590 and that she has dialed sufficient digits to control the intertoll selector 110, the intertoll ring control circuit 111 and the intertoll selector 112 to extend the connection over the cable 390 to the inward trunk 300 illustrated in Fig. 3. Referring now to Fig. 3, it will be seen that the cable 390 includes the —, +, C and EC conductors C391 to C394, inclusive. For the purpose of this description, it may be assumed that the —, +, C and EC conductors C591 to C594 of the intertoll trunk 400 are connected via the cable 590 through the previously named circuits 110, 111 and 112 to the —, +, C and EC conductors C391 to C394, inclusive, in the cable 390 connected to the inward trunk 300.

The inward trunk 300 is marked idle to the intertoll selector 112, when it searches over the trunks terminating in the second level, by the resistance battery connected to the C conductor C393 via the resistor 356 and the contacts 351 and 331 and by an absence of ground potential. When the inward trunk 300 is seized by the intertoll selector 112, battery potential is applied to the EC conductor C394 to complete a circuit via the low resistance upper winding of the signal relay R360 to ground at contacts 311. When the intertoll selector 112 switches through to complete the above traced circuit for the upper winding of the relay R360, the ground potential at the contacts 311 is returned through the low resistance upper winding of the relay R366 back over the EC conductor C394 to the intertoll trunk 400 and then via the EC conductor C594 to the winding of the supervisory relay R520, to battery. As previously noted, the low resistance ground potential applied to the EC conductor C594 retains the supervisory relay R520 in its operated position to transmit the "on hook" supervision to the distant toll operator. The signal relay R360 operates over the above described circuit and, at its contacts 362, completes an obvious circuit for operating the hold relay R350. The hold relay R350, at its contacts 352, substitutes a direct ground potential for the resistance battery potential applied to the C conductor C393 in order to mark the inward toll trunk 300 busy to other toll selectors having access thereto. As a further result of the operation of the relay R350, at its contacts 354, it completes a circuit for connecting battery potential via the winding of the gate control relay R320, the contacts 335, 354, 322 and 363 to the GC2 conductor C317 extending to the inward and ring-down trunk distributor 1600B. Finally, at its contacts 353, the hold relay R350 completes a circuit including the contacts 375 and 333 for illuminating the call waiting lamp L319. The illuminated condition of the call waiting lamp L319 indicates to the inward operator that a call is waiting to be answered on the inward trunk 300.

If the inward and ring-down trunk distributor 1600B is in condition to distribute the call on the inward trunk 300 to a link at the inward operator position, ground potential is applied to the conductor C317 to complete an operating circuit for the gate control relay R320. The gate control relay R320, upon operating, at its contacts 321, completes a locking circuit for itself which is independent of the grounded GC2 conductor C317. As a further result of the operation of the relay R320, at its contacts 323, it connects the upper winding of the test relay R380 to the GD2 conductor C342 which terminates in a contact accessible to the inward trunk distributor 1600B. Finally, at its contacts 326, the relay R320 applies ground potential to the ST2 conductor C316 in order to operate a start relay, such as the relay R1610, in the inward trunk distributor 1600B. The start relay in the inward trunk distributor 1600B now operates and applies ground potential to the PG2 and AP2 conductors C2326 and C2392 extending to the operator position equipment thereby to control the inward gate relay R2230 thereat and illuminate the inward answer pilot lamb L2280, in the manner previously described. The gate control equipment (Fig. 22) at the inward operator position operates in the manner previously described to prepare the selected link at the inward operator position to receive the call waiting on the inward trunk 300 and it applies ground potential to the PA2 conductor C2236 extending to the position answer relay, such as the relay R1640, in the inward trunk distributor 1600B. The operation of the position answer relay causes the trunk distributor 1600B to advance the associated wipers step-by-step to find the contacts terminating the GD2 and AD2 conductors C342 and C343 individual to the inward trunk 300. When these contacts are found, the stepping action of the wipers is terminated and the GD2 conductor C342 is grounded by the trunk distributor 1600B.

When the inward and ring-down trunk distributor 1600B finds the inward trunk 300 and applies ground potential to the GD2 conductor C342, the test relay R380 operates and, at its contacts 381, connects the wiper 305 of the link finder 301 via the contacts 379, 381 and 307, to the winding of the magnet M306 and it connects the wiper 305 via the contacts 379 and 381, the winding of the switching relay R370 and contacts 382, to ground. The circuit including ground at contacts 382, the winding of the switching relay R370, the contacts 307 and the winding of the magnet M306 and battery, will operate the relay R370 unless the relay is short-circuited by a ground potential encountered by the wiper 305. A ground potential on the wiper 305, however, causes the magnet M306 to be self-interruptedly operated to advance the wipers 302 to 305, inclusive, step-by-step to search for a contact terminating a C3 conductor, such as the C3 conductor C974, individual to a link, such as the link 1300A, at the inward operator position.

If the link 1300A at the inward operator position is the one that has been preselected to accept the call on the inward trunk 300, the C3 conductor C974 will be ungrounded. When the wiper 305 engages the contact terminating the C3 conductor C974, the stepping of the wires will be terminated. The short-circuit is removed from the switching relay R370 and it operates in series with the magnet M306. The magnet M306, however, does not operate due to the high resistance of the winding of the relay R370.

As soon as the switching relay R370 operates, it completes, at its contacts 374, a circuit which may be traced from ground via the high resistance lower winding of the supervisory control relay R310, contacts 374 and the wiper 304, for applying a high resistance ground potential to the EC conductor C764. This conductor at the present time, is connected via the link 1300A to the upper winding of the tone control relay R2470 at the inward operator position equipment 2200A. The relay R2470, R2480 and R2490 operate, in the manner previously described, to transmit the zip-zip tone signal to the inward operator to indicate that she is now connected to the calling inward trunk 300. As a further result of the operation of the switching relay R370, at its contacts 371', it applies ground potential via the wiper 305 to the C3 conductor C974.

The C3 conductor C974 is connected through the link 1300A to the operator position equipment 2200A and causes the class indicating relay R2440 thereat to operate, in the manner previously described, and illuminate the inward lamp L2440 to indicate the class of the toll call connected to the link 1300A. At its contacts 372', the relay R370 completes a circuit from ground at contacts 313, the contacts 372' and 383 and the upper winding of the test relay R380 thereby to retain the last mentioned relay operated after the initial circuit including its upper winding is interrupted upon the restoration of the gate control relay R320. At its contacts 375, the relay R370 interrupts a circuit for the call waiting lamp L319 to indicate to the inward operator that the call waiting on the inward trunk 300 has been answered. At its contacts 373', the relay R370 completes an obvious circuit for operating the ring control relay R330 over a circuit including its lower winding.

The relay R330, upon operating, completes a locking circuit for itself which includes its lower winding, the contacts 336 and ground at contacts 355. As a further result of the operation of the relay R330, it interrupts, at its contacts 335, the circuit for the gate control relay R320 thereby to restore the last mentioned relay to normal. As soon as the relay R320 restores, at its contacts 324 and 327, it again applies ground potential to the GD2 and AD2 conductors C342 and C343 extending to the inward trunk distributor 1600B in order to control the release of the trunk distributor 1600B and the advancement of its associated wipers one step. If other calls are waiting to be distributed to the inward operator position, the trunk distributor 1600B will reoperate and search for the next trunk to be marked for answering.

Immediately after the switching relay operated to connect the high resistance lower winding of the supervisory relay R310 to the EC conductor C764 to control the transmission of the zip-zip tone to the inward operator, a resistance battery potential was returned over the EC conductor C764 to operate the relay R310 over its high resistance lower winding. However, due to the high resistance of the lower winding of the relay R310, the rear supervisory relay R2550, in the operator position equipment 2200A, does not operate to illuminate the lamp L1312 and thus gives the inward toll operator an "off hook" supervisory signal. The operation of the supervisory control relay R310 in the inward trunk 300 alters the low resistance ground potential applied via the upper winding of the signal relay R360 to the EC conductor C394 to a high resistance ground potential by interrupting the circuit at contacts 311. At this time, ground potential is applied to the EC conductor C394 via the high resistance lower winding of the relay R360, the contacts 373, and the low resistance upper winding of the relay R360. Since the EC conductor C394 is connected through the switching apparatus 112, 111 and 110 in the order named, to the EC conductor C594 in the intertoll trunk 400, the substitution of the high resistance ground potential for the low resistance ground potential on the EC conductor C394 causes the supervisory relay R520 to restore to normal. As previously described, the relay R520, upon restoring, disconnects the line termination network including the resistor 523 and the condenser 524 from across the — and + conductors C591 and C592. As a further result of the restoration of the relay R520, at its contacts 522, it connects the pulse-out relay R530 over a circuit including both of its windings to battery via the resistor 445. The pulse-out relay R530 operates over this circuit and, at its contacts 532, substitutes battery potential via the resistor 516 to the mid-point of the upper windings of the signal relay R410 in place of the normal ground potential. The substitution of resistance battery potential for the direct ground potential over this circuit transmits an "off hook" supervisory signal over the conductor C414 to the toll operator at the distant toll center 206. The "off hook" supervisory signal indicates to the distant toll operator that the inward operator in the central office 100 has answered the call and conversation may commence. The distant toll operator may now inform the central office toll operator that the call extended to her position is to be extended therefrom to a particular called destination. The inward operator keys the digits of the desired called destination on the keyset K2647 at her position in order to control the impulse sender 1900A to set up the connection over the front of the link 1300A in the manner previously described. After the connection is established between the calling and called subscribers, the inward toll operator withdraws from the connection in the manner previously described.

At the time the supervisory relay R310 operated and changed the low resistance ground potential on the EC conductor C394 to a high resistance ground potential, it completed, at its contacts 312, a circuit for holding the switching relay R370 in its operated position and, at its contacts 313, it interrupted the circuit for the test relay R380. The test relay R380 now restores to normal. At this time the relays R310, R330, R350, R360 and R370 in the inward trunk 300 are in their operated positions to complete the talking and supervisory circuits between the intertoll trunk 400, the intervening switching apparatus 110, 111 and 112, the inward trunk 300 and the link 1300A at the inward operator position.

If the distant toll operator desires to resignal the inward operator at the central office 100, she controls the repeater 207A to momentarily substitute ground potential for battery potential on the conductor C414 and thereby restore the signal relay R410. The relay R410, in turn, at its contacts 411, interrupts the circuit for the pulse-in relay R440 and the latter relay, at its contacts 442, momentarily disconnects the low resistance battery potential through the winding of the relay R520 from the EC conductor C594. When the distant operator replaces the battery potential on the conductor C414, the signal relay R410 reoperates the pulse-in relay R440 and the latter relay reconnects battery potential through the low resistance winding of the relay R520 to the EC conductor C594. The momentary interruption of the low resistance battery potential on the EC conductor C594 causes the signal relay R360 in the inward trunk 300 to restore and reoperate. At its contacts 361, the relay R360 completes a circuit via the contacts 377 for operating the ring-up relay R340 over its lower winding. Upon operating, the relay R340, at its contacts 341, locks itself in its operated position in series with the upper winding of the relay R310 and the winding of the supervisory relay R1310 in the link 1300A. This circuit may be traced from ground via the contacts 376 and 341, the upper low resistance winding of the relay R340, the upper low resistance winding of the relay R310, the contacts 374, the wiper 304, the EC conductor C764 in the cable 395 and then via previously traced circuits to the link 1300A and the winding of the rear supervisory relay R1310, to battery. The relays R340 and R310 in the inward trunk 300 are retained in their operated positions over the above traced circuit and the rear supervisory relay R1310 in the link 1300A is operated to illuminate the rear supervisory lamp L1312 in the manner previously described. The illuminated condition of the rear supervisory lamp L1312 gives the toll operator an "on hook" supervisory signal to indicate that she has been recalled by the distant toll operator.

The inward toll operator may answer the recall signal, in the manner previously described, by actuating the talk key K1377 individual to the link 1300A and thus return a high resistance battery potential over the EC conductor C764 to the inward trunk 300. The replacement of the high resistance battery potential for the low resistance potential causes the ring-up relay R340 to restore to normal and the latter relay, at its contacts 341, disconnects the low resistance upper winding of the relay R310 from the EC conductor C764. The relay R310 now remains in its operated position over a circuit including its high resistance lower winding and the high resistance battery potential applied to the EC conductor C764 from the toll operator position equipment. As previously noted, the actuation of the talk key K1377 reconnects the inward operator telephone equipment 2300 to the — and + conductors C761 and C762 included in the connection established by the distant toll operator.

In the above description it was pointed out that the distant toll operator may recall the inward operator by momentarily restoring the signal relay R410 in the intertoll trunk circuit 400. However, it may also be necessary for the inward operator to recall the distant toll operator who has disconnected from the established connection to handle other calls. In order to recall the operator at the distant toll center 206, the inward toll operator must first reconnect her position equipment 2200A to the selected link 1300A by actuating the talk key K1377. The inward operator may thereafter actuate the ring rear key K2640. As previously described, the ring rear key K2640 applies resistance battery potential and direct ground potential respectively via the —R and +R conductors C1379*a* and C1379*b* to the — and + conductors C761 and C762 connected to the rear of the link 1300A. The resistance battery potential and the direct ground potential connected to the conductors C761 and C762 is returned over the connection including the inward trunk 300, the intervening switching apparatus 112, 111 and 110 to the — and + conductors C591 and C592 connected to the intertoll trunk 400. The resistance battery potential applied to the — conductor C591 is extended via the upper winding of the retard coil R570, the contacts 561 and the winding of the rering relay R540, to ground. The ground potential applied to the + conductor C592 is extended via the winding of the retard coil R570, the contacts 563 and the resistor 553, to battery. The rering relay R540 operates when the above mentioned circuit is completed and, at its contacts 541, it completes an obvious circuit for operating the rering slave relay R550. As a further result of the operation of the relay R540, at its contacts 542, it substitutes direct ground potential for the resistance battery potential applied to the mid-point of the upper windings of the relay R410 in order to transmit over the conductor C414 an "on hook" supervisory signal to the operator at the distant toll center 206. The signal relay R410 remains in its operated position during the time that the ground potential is substituted for the resistance battery potential at the mid-point of its upper windings in order to retain the pulse-in relay R440 in its operated position. The inward operator may now restore the ring rear key K2640 to normal and remove the resistance battery potential and the direct ground potential from the — and + conductors C591 and C592. The relay R540 now restores to normal and shortly thereafter the relay R550 restores to normal. As soon as the relay R550 restores, it recompletes, at its contacts 552, the circuit for again connecting the resistance battery potential to the mid-point of the upper windings of the signal relay R410 to remove the "on hook" supervisory signal from the conductor C414. At the toll switchboard 207 in the distant toll center 206, the "on hook" supervisory signal is locked-in until the operator thereat reconnects her telephone circuit to the toll line 213.

The release of the established connection, after the subscribers have disconnected, is under control of the calling toll operator at the distant toll center 206. Accordingly, if the call is extended via the intertoll trunk 400 to a called subscriber over the automatic switching apparatus, the release of the connection at the called end will substitute a high resistance ground potential for the low resistance ground potential on the EC conductor C594 thereby to restore the supervisory relay R520 to normal. The last mentioned relay, in turn, restores the pulse-out relay R530 in the manner previously described, and the latter relay, at its contacts 533, transmits the "on hook" supervisory signal over the conductor C414 to the distant toll operator in the toll center 206. As soon as the distant toll operator releases the connection, ground potential is returned over the conductor C414 to restore the signal relay R410 to normal. The relay R410 upon restoring interrupts the circuit for the relay R440 and the latter relay interrupts the circuit for the hold relay R450 which also restores to normal. At its contacts 457, the relay R450 interrupts the circuit for the relay R510 which restores to normal. As a further result of the restoration of the relay R450, at its contacts 454, it removes ground potential from the C conductor C593 in the cable 590. The succeeding switches in the switch train including the intertoll selector 110, the intertoll ring control circuit 111 and the intertoll selector 112, are held in their operated positions by the ground potential forwarded over the C conductor C593 and when this ground potential is removed therefrom the switches restore to normal.

The inward trunk 300 included in the connection is arranged to be held in its operated position until the last party releases, that is, it will be restored to normal either by the release of the calling operator or by the release of the called operator depending upon which operator is last to release. When the inward operator releases first, the circuit including the EC conductor C764 is interrupted in the link 1300A by the restoration of the rear link relay R1320. The supervisory control relay R310 in the inward trunk circuit 300 now restores to normal. At its contacts 311, the relay R310 short-circuits the high resistance lower winding of the relay R360 thereby to return a low resistance ground potential over the EC conductor C394 instead of the high resistance ground potential. As previously noted, this causes the intertoll trunk 400 to transmit an "on hook" signal over the conductor C414 to the distant toll operator. As a further result of the restoration of the relay R310, at its contacts 312, it interrupts the circuit for the relay R370 which now restores and disconnects the inward trunk 300 from the link 1300A. At this time, the relays R330, R350 and R360 are held in their operated positions under control of the operator at the distant toll center 206. Since the distant toll operator has not released the connection, she may now originate another call by momentarily releasing and reoperating the signal relay R360.

If it is assumed that the signal relay R360 is momentarily restored to originate another call before the intertoll trunk 400 is released, it will be seen that at its contacts 361, it completes a circuit via the contacts 378 and 374 for energizing the upper winding of the relay R330. The relay R330 is of the differential type and at this time, the circuits through the upper and lower windings cause the relay to restore to normal. The relay R330 at its contacts 335 reconnects the gate control relay R320 to the GC2 conductor C317. The inward trunk distributor 1600B operates in the manner previously described to distribute the call now waiting on the inward trunk 300 to another preselected link at the inward operator position. Further operations of the inward trunk 300 whereby the link finder 301 is automatically controlled to connect with the preselected link, are exactly the same as has been described previously.

Continuing now with the release of the connection, it will be noted that if the distant operator should release the connection after the restoration of the switching relay R370 in the inward trunk 300, the battery potential is removed from the EC conductor C394, by the restoration of the intertoll trunk 400, as previously described, and the signal relay R360 will restore to normal. The relay R360, upon restoring, interrupts the circuit for the hold relay R350 which slowly restores to normal and it completes, at its contacts 361, the previously mentioned circuit for energizing the upper winding of the differential relay R330. The relay R330 now restores to normal to render the inward trunk 300 available for another call.

*Link finder fails to find a preselected link*

In the foregoing description of the operation of the inward trunk circuit 300, the CLR trunk circuit 600, the toll ring-down circuit 800 and the TX trunk circuit 1000, it was pointed out that each of these circuits is provided with an associated link finder for fiinding a preselected link at an operator position that is conditioned to handle the corresponding class of trunk calls. A description was also given of the manner in which the CLR, inward and ring-down, and TX trunk distributors 1600A, 1600B and 1600C operated to lock-in waiting calls on the corresponding trunk circuits and to selectively control the link finders of the locked-in trunk circuits, one after another, to find and connect with preselected links at the operator positions until all of the locked-in calls were distributed. If a link finder selected by a trunk distributor fails to find a preselected link, the trunk distributor will automatically operate, after a predetermined elapsed time interval, to step to the next trunk circuit having a call waiting thereon and thus terminate the searching operation of the link finder that failed to find the preselected link.

In order to describe the above mentioned operations it will be assumed that the call waiting to be distributed to a preselected link has been received on the CLR trunk 600 and that the CLR operator position 2200A is associated with the preselected link thereby to apply ground potential to the PA1 conductor C2237, Fig. 15. The ground potential applied to the conductor C2237 operates the position answer relay R1640 in the CLR trunk distributor 1600A.

In the CLR trunk circuit 600 the hold relay R630 is operated upon seizure thereof and connects the winding of the gate control relay R620 to the GC1 conductor C655. This conductor is grounded by the start relay R1610 in the CLR trunk distributor 1600A to operate the gate control relay R620 and all other gate control relays of CLR trunk circuits having calls waiting thereon. In this manner, a group of calling CLR trunk circuits are locked-in to be answered, one after the other, by distributing the calls to preselected links at the CLR operator position. As soon as the gate control relay R620 operates, it applies ground potential to the ST1 conductor C656 thereby to operate the start relay R1610 and thus lock-out any subsequent calls that may be received by other CLR trunk circuits. As a further result of the operation of the start relay R1610, it completes the previously traced circuit for controlling the magnet M1663 to step the wipers 1661 and 1662 to search for one of the locked-in call waiting CLR trunk circuits It will be assumed that the wipers 1661 and 1662 engage the GD1 and AD1 conductors C657 and C658 individual to the CLR trunk 600 thereby to complete an operating circuit for the test relay R660. As soon as the test relay R660 operates, it completes, at its contacts 662, the previously described circuit for controlling the magnet M705 of the link finder 700. At this time, the magnet M705 is self-interruptedly operated to advance its wipers step-by-step to search for the preselected link at the CLR operator position.

In the CLR trunk distributor 1600A the switching relay R1630 is operated as soon as the wiper 1662 finds the CLR trunk circuit 600. Consequently, the relays R1630 and R1640 in the CLR trunk distributor 1600A remain in their operated positions during the time that the link finder 700 searches for the preselected link. At the contacts 1635 and 1642, the relays R1630 and R1640 connect the upper winding of the timer relay R1650 to the TP1 conductor C1588. It should be mentioned at this time that the TP1 conductor and the TP2 conductor C1588 and C1589 are connected to the schematically illustrated time pulse generator 1587. This generator may be continuously operating or it may be started in response to the operation of a position answer relay, such as the relay R1640 in any one of the trunk distributors 1600A, 1600B or 1600C. The time pulse generator 1587 is arranged to momentarily apply a ground pulse to the TP1 conductor C1588 approximately every four seconds. As soon as a ground pulse is applied to the conductor C1588, a circuit is completed for the upper winding of the timer relay R1650 which operates and, at its contacts 1651, locks itself over a circuit including its lower winding, the contacts 1651, 1636, 1566 and 1637. As a further result of the operation of the relay R1650, at its contacts 1652, it connects the lower winding of the time pulse relay R1560 to the TP2 conductor C1589. Four seconds after the ground pulse is applied to the TP1 conductor C1588 a momentary ground pulse is applied to the TP2 conductor C1589 by the time pulse generator 1587. In response to the ground pulse applied to the conductor C1589, the time pulse relay R1560 operates and locks itself over a circuit including its upper winding, the contacts 1567 and 1637. As a further result of the operation of the relay R1560, it interupts the locking circuit for the timer relay R1650, at its contacts 1566 and, at its contacts 1565, it disconnects the TP1 conductor C1588 from the relay R1650. At its contacts 1564, 1568 and 1569, the relay R1560 disconnects the ST1 conductor C656 from the start relay R1610 and it disconnects the ST2 and ST3 conductors C316 and C1071 from the start relays in the trunk distributors 1600B and 1600C. As a further result of the operation of the relay R1560, at its contacts 1563, it completes an obvious operating circuit for the magnet M1663 and, at its contacts 1561, it completes an obvious circuit for operating the alarm relay R1570. As soon as the start relay R1610 restores to normal, it interrupts the circuit for the switching relay R1630. The relay R1630 now restores to normal and, at its contacts 1635, 1636 and 1637, it interrupts the previously traced circuits for the timer relay R1650 and the time pulse relay R1560. The relay R1560, upon restoring, interrupts, at its contacts 1563, the above traced circuit for the magnet M1663 which now restores to normal and advances the wipers 1661 and 1662 to the next set of bank contacts. At its contacts 1564, the relay R1560 recompletes the circuit for the start relay R1610. The relay R1610, upon reoperating, controls the trunk distributor 1600A to search for the next calling CLR trunk.

When the alarm relay R1570 operates as described above, it completes, at its contacts 1572, a locking circuit for itself from ground at the alarm release key K1585. Also, at its contacts 1871, the alarm relay R1570 applies ground potential to the conductor C1586 thereby to sound an alarm in the exchange to indicate to the attendant that one of the link finders associated with one of the trunk circuits has failed to find a preselected link within a predetermined elapsed time interval.

Referring now to the CLR trunk circuit 600, it will be recalled that the test relay R660 operated to control the rotary stepping of the wipers of the link finder 700 under control of the magnet M705. If the link finder 700 does not find the preselected link at the CLR operator position, the switching relay R710 does not operate to complete the locking circuit for the test relay R660. Consequently, when the CLR trunk distributor 1600A is controlled, after the predetermined elapsed time interval, to advance its wipers 1661 and 1662 one step, the ground potential is removed from the GD1 conductor C657 to restore the test relay R660 to normal. The gate control relay R620, however, remains in its operated position over a local locking circuit including the contacts 621, 634 and 717. As soon as the test relay R660 restores to normal, it interrupts the circuit for the magnet M705 in order to terminate further stepping of the wipers of the link finder 700. The CLR trunk circuit 600 remains in the call waiting condition while the CLR trunk distributor 1600A distributes the waiting call on the remaning locked-in CLR trunk circuits to the preselected links at the CLR operator position. After all of the waiting calls have been distributed, the CLR trunk distributor 1600A will again pick up the CLR trunk circuit 600 and attempt to connect the same to a preselected link in the manner previously described. If the link finder 700 again fails to find a preselected link, the trunk distributor will again skip the CLR trunk circuit 600. The defective CLR trunk circuit 600 will be skipped by the CLR trunk distributor 1600A each time the associated link finder 700 fails to find the preselected link.

The time pulse generator 1587, the timer relay R1650 and the time pulse relay R1560 cooperate with the trunk distributors 1600B and 1600C in the same manner as has been described above in connection with the operation of the CLR trunk distributor 1600A.

*Emergency start key at the toll operator position*

Each operator position of the dial toll board in the central office 100 is provided with an emergency start key which, when operated, renders the trunk distributors ineffective to distribute calls to the positions and controls the link finders associated with the trunk circuits having calls waiting thereon to start searching for a preselected link at an idle operator position.

The emergency start key at a toll operator position is only operated to bring a call into a preselected link at the position when the trunk distributor fails to distribute calls to the position within a reasonable time. In the event that a call waiting lamp associated with one of the trunk circuits is illuminated for an abnormally long period, at a time when the operator is available and has preselected an idle link, the operator may actuate the emergency start key at her position to bypass the trunk distributor and control the link finders, associated with the trunk circuits having the illuminated call waiting lamps to search for the preselected link at the operator position.

Referring now to the emergency start key K2290 (Fig. 22), it will be seen that the circuits for controlling the gate control relays of the different trunk circuits also include contacts of the key K2290. If one of the trunk circuits, such as the inward trunk 300, has its call waiting lamp, such as the lamp L319, illuminated and the gate control relay therein fails to operate under control of the trunk distributor, the emergency start key K2290 may be actuated in order to operated the gate control relays of the individual trunk circuits, and thus forcibly control the associated link finders to search for a preselected link. When the key K2290 is actuated, it applies ground potential via its contacts 2290*k* to the TDT conductor C2224 and it connects, at its contacts 2290*a*, 2290*i* and 2290*j* and the EGT1, EGT2 and EGT3 conductors C654, C314 and C1079 to the CLR, inward and TX gate control relays R2220, R2230 and R2240 in the operator position. In the inward trunk 300, the hold relay R350 will be in its operated position and, at its contacts 355, it applies ground potential to the EGT2 conductor C314 extending to the contacts 2290*i* of the key K2290. This ground potential is further extended via the contacts 2280*a* in order to operate the inward gate relay R2230, in the manner previously described, and the latter relay operates the inward control relay R2260. As soon as the relay R2260 operates, it completes, at its contacts 2266, a circuit via the key contacts 2290*b*, the GC2 conductor C2229 extending to Fig. 15, the GC2 conductor C317 extending to Fig. 3, the contacts 354 and 335 and the winding of the gate control relay R320 in the inward trunk 300, to battery. As a further result of the operation of the inward control relay R2260, at its contacts 2267, it completes a circuit via the key contacts 2090*e* and the EMS2 conductor C315 extending to the inward trunk 300, the contacts 325 and the winding of the test relay R380, to battery. The EMS2 conductor C315 and the GC2 conductor C317 are multiply connected to all of the inward and ring-down trunk circuits, such as the inward trunk 300 and the ring-down trunk 800 included in the class of service group that the inward toll operator position is arranged to answer. Furthermore, since the above mentioned conductors are multiply connected to all of such trunk circuits, the trunks with waiting calls at the particular instant that the conductor C317 is grounded will all be operated under control of the associated gate control relays and test relays such as the relays R320 and R380. The test relay R380, upon operating as noted above, initiates the step-by-step hunting operation of the link finder 301 in the manner previously described. All of the link finders associated with trunks having a call waiting condition thereon will search for a preselected link at the inward operator position. The trunk circuit that is first to locate the preselected link will be connected through to the inward toll operator position in the manner previously described and the link finders associated with the other trunk circuits will cease searching for a preselected link.

The actuation of the emergency start key K2290 applied ground potential to the TDT conductor C2224, as previously noted, in order to control the transfer relay R1550 in the trunk distributor common equipment 1590 (Fig. 15). The transfer relay R1515 is of the differential type and when the ground potential is applied to the TDT conductor C2224, the relay is energized over circuits including both of the windings but the relay does not operate until the ground potential is subsequently removed. When the CLR operator restores the emergency start key K2290, the ground potential is removed from the conductor C2224 thereby to open the circuits for the two windings of relay R1550. The unbalanced condition of the collapsing fields in the upper and lower windings of the relay R1550, due to the inclusion of the resistor 1550*a* in the circuit for the upper winding, causes the relay to operate sufficiently to close its "X" contacts 1552. A circuit is now completed from ground in the duplicate distributor 1590A via the terminals C1 and B of the terminal block 1592, the contacts 1552, the upper and lower windings of the relay R1550 in series, and the terminals A and A1, to battery. The relay R1550 now operates fully and, at its contacts 1551, interrupts the circuit for the connect relay R1540. The relay R1540 restores to normal and, at its contacts 1541 to 1544, inclusive, renders the duplicate distributor 1590A effective to allot calls to the various toll positions. The restoration of the connect relay R1540 and the operation of the corresponding relay in the duplicate distributor 1590A now completes a circuit for operating the alarm relay R1570. The latter relay, at its contacts 1572, locks itself to the alarm release key K1585 and, at its contacts 1571, it applies ground potential to the conductor C1586 in order to sound an alarm in the central exchange. The attendant will now check the faulty trunk distributor common equipment 1590 and the faulty trunk distributor 1600B and condition them for further use. When the equipment is again in working order, the alarm release key K1585 may be actuated in order to interrupt the circuit for the relay R1570 which is restored to normal.

The gate control equipment illustrated in Fig. 22 of the operator position, is arranged to handle three classes of service, that is, the CLR class, inward class and TX class. However, these separate classes may be selectively connected at the operator position under control of the corresponding class keys K2285, K2280 and K2275, in the manner previously described. If the CLR key K2285 is in its restored position and the inward and TX class keys K2280 and K2275 are in their operated positions, the actuation of the emergency start key K2290 connects the GC1 conductor C2228 extending to the CLR trunk distributor 1600A and the EMS1 and EGT1 conductors C653 and C654 extending to the CLR trunk 600 to the appropriate relays in the gate control circuit of the CLR operator position equipment. The GC1 conductor C2228, noted above, is multipled in the CLR trunk distributor 1600A to the GC1 conductor C655 which also extends to the CLR trunk 600. The conductors C653, C654 and C655, noted above, are multiply connected to each of the CLR trunks in the exchange in the manner disclosed in the CLR trunk 600, Figs. 6 and 7. In view of the foregoing, it will be understood that the operation of the emergency start key K2290, at a time when the operator position is conditioned to receive only CLR calls, controls all of the CLR trunks in the exchange that have calls waiting thereon so that the associated individual link finders, such as the link finder 700, will all search for the preselected link at the CLR position. However, only the first CLR trunk that finds and connects with the preselected link will have the call thereon answered by the CLR operator. The link finders of the remaining CLR trunks will stop searching and the waiting calls thereon will be distributed under control of the now connected duplicate distributor 1590A to preselected links at the CLR operator position, in the manner previously described.

If the inward key K2280 is in its restored position and the CLR and TX keys K2285 and K2275 are in their operated positions, the actuation of the emergency start key K2290 connects the GC2 conductor C2229 extending to the inward trunk distributor 1600B, the EGT2 and EMS2 conductors C314 and C315 extending to the toll ring-down trunk 800 and the inward trunk 300 to appropriate relays in the gate control relays in the inward operator position equipment. The GC2 conductor C2229 is multipled in the inward trunk distributor 1600B to the GC2 conductor C317 which also extends to the toll ring-down trunk 800 and the inward trunk 300. The conductors C314, C315 and C317 are multiply connected to each of the ring-down trunks and to each of the inward trunks in the exchange in the manner disclosed in the ring-down trunk 800, Figs. 8 and 9, and the inward trunk 800, Fig. 3.

In view of the foregoing, it will be understood that the operation of the emergency start key K2290, at a time when the operator position is conditioned to receive only ring-down and inward calls, controls all of the ring-down and inward trunks in the exchange that have calls waiting thereon so that the associated individual link finders, such as the link finders 900 and 301, will all search for the preselected link at the inward position. However, only the first ring-down or inward trunk that finds and connects with the preselected link will have the call thereon answered by the inward operator. The link finders of the remaining toll ring-down and inward trunks will stop searching and the waiting calls thereon will be distributed under control of the now connected duplicate distributor 1590A to preselected links at the inward operator position, in the manner previously described.

The GC3 conductor C2234 is multipled in the TX trunk distributor 1600C to the GC3 conductor C1070 which also extends to the TX trunk 1000. The GC3, EMS3 and EGT3 conductors C1070, C1078 and C1079 are multiply connected to each of the TX trunks in the exchange in the manner disclosed in the TX trunk 1000, Figs. 10 and 11. In view of the foregoing, it will be understood that the operation of the emergency start key K2290, at a time when the operator position is conditioned to receive only TX calls, controls all of the TX trunks in the exchange that have calls waiting thereon so that the associated individual link finders, such as the link finder 1100, will all search for the preselected link at the TX position. However, only the first TX trunk that finds and connects with the preselected link will have the call thereon answered by the TX operator. The link finders of the remaining TX trunks will stop searching and the waiting calls thereon will be distributed under control of the now connected duplicate distributor 1590A to the preselected links at the TX operator position, in the manner previously described.

*Extending calls from the operator position*

In describing the operation of the telephone system, it was pointed out that the incoming calls received at the operator positions, whether CLR, inward or TX, could be extended therefrom via the toll preselectors, such as the toll preselector 1400, to various called destinations. The operation of the circuits in completing a connection from the operator positions to the local subscriber substation T1 and to a subscriber in the CAX 208, has been described. A description will now be given of the extension of a call from the central office toll board via the intertoll trunk 400 to the distant toll center 206 via the toll ring-down trunk 800 to the distant manual office 200.

For this purpose, it will be assumed that one of the operators at the toll switchboard in the central office 100 has received a call over the rear of one of the links associated with the position and has caused the impulse sender thereat to control the toll preselector over the front of the particular link to select the cable 580 connected to bank contacts in one of the upper five levels of the selector. Referring now to the intertoll trunk 400 illustrated in Figs. 4 and 5, it will be seen that the cable 580 includes the — conductor C581, the + conductor C582, the C conductor C583 and the EC conductor C584. This cable is accessible to either the intertoll selector 112, the delay call selector 113, or the toll preselector 1400 in one of the levels 6 to 0, inclusive. The intertoll trunk 400 is marked idle to a searching toll selector, such as the toll preselector 1400, by battery potential connected to the C conductor C583 via the winding of the control relay R430. As soon as the toll preselector 1400 finds the idle toll trunk 400, battery potential is forwarded over the EC conductor C584 in order to complete a circuit including the low resistance upper winding of the pulse-out relay R530 and ground at contacts 512. Simultaneously therewith, ground potential is forwarded over the C conductor C583 in order to complete a circuit via the contacts 451, 421 and 463 and the winding of the control relay R430, to battery. The relays R530 and R430 in the intertoll trunk 400 operate over the above described circuits. The relay R530, upon operating, at its contacts 531, interrupts a point in the incomplete circuit for the upper winding of the automatic ring control relay R560 and, at its contacts 532 and 533, it disconnects ground potential and connects battery potential via the resistor 516, contacts 532, 552 and 543 to the mid-point of the upper windings of the signal relay R410. The substitution of the resistance battery potential for the normal ground potential over this circuit controls the repeater 207A in the distant toll center 216 over a simplex circuit including the conductor C414 and the two conductors of the toll line 213 to seize the local automatic switch train in the distant toll center 206. The signal relay R410 included in the above circuit does not operate at this time. As soon as the control relay R430 operates, as described above, it locks itself in its operated position over a circuit including its contacts 433 to the grounded C conductor C583. Also, at its contacts 431, it disconnects the line termination circuit including the condenser 524 and the resistor 523 from across the — and + conductors C581 and C582. The intertoll trunk 400 is now held under control of the calling toll operator in the central office 100 by the ground potential forwarded over the C conductor C583 and the battery potential forwarded over the EC conductor C584. The inclusion of the low resistance upper winding of the relay R530 in the circuit including the EC conductor C584 returns an "on hook" supervisory signal to the impulse sender 1900 at the toll operator position so that the impulse sender will continue transmitting impulses corresponding to the digits registered by the calling toll operator.

The impulse sender 1900A, at the toll operator position, transmits the pulses of the next digit over the EC pulsing circuit including the front of the link 1300A, the toll preselector 1400 and the EC conductor C584 to the upper winding of the pulse-out relay R530, in the manner previously described. The relay R530 restores and reoperates a corresponding number of times and, at its contacts 532 and 533, alternately connects ground and resistance battery potential to the mid-point of the upper windings of the signal relay R410 in order to transmit a corresponding number of pulses over the conductor C414 to the repeater 207A in the distant toll center 206. A signal relay in the repeater 207A, similar to the relay R410, repeats the impulses to the automatic switch train in the distant toll center 206 in the usual manner. If any of the automatic switches in the distant toll center encounter a stop dial condition at a time when the relay R530 is in its operated position, a battery potential is returned over the conductor C414 to cause the operation of the signal relay R410. The relay R410, in turn, at its contacts 411, operates the pulse-in relay R440. At its contacts 444, the relay R440 connects ground via the contacts 446 and the lower winding of the auxiliary supervisory relay R510, to battery. The relay R510 operates and, at its contacts 513, connects the high resistance lower winding of the relay R530 in series with its low resistance upper winding to the EC conductor C584. The substitution of the high resistance ground potential for the low resistance ground potential on the EC conductor C584, controls the impulse sender 1900A, in the manner previously described, to withhold transmission of the impulses of the next registered digit. As soon as the stop-dial condition is removed from the switch train in the distant toll center 206, the battery potential is removed from the conductor C414 and a ground potential placed thereon thereby causes the signal relay R410 to restore to normal. The relay R410 restores the pulse-in relay R440 which, in turn, restores the auxiliary supervisory relay R510 and the latter relay, at its contacts 512 and 513, reapplies the low resistance ground potential via the upper winding of the relay R530 to the EC conductor C584. The replacement of the low resistance ground potential on the EC conductor C584 controls the impulse sender 1900A so that it may continue transmitting impulses corresponding to the registered digits.

If an all-trunks-busy or called line busy condition is encountered during the operation of the switch train in the distant toll center 206, the signal relay R410 will be operated respectively one hundred twenty or sixty times per minute. The relays R440 and R510 will also respond at the same rate as the signal relay R410 and the relay R510, in turn, will alternately apply high and low resistance ground potential to the EC conductor C584. This condition is thereby repeated to the impulse sender 1900A and the sender, in turn, transmits a flashing busy signal to a calling operator to indicate either an all-trunks-busy condition or a busy called line.

It will be recalled that the impulse sender 1900A is arranged so that it may control the transmission of an automatic ringing signal after the last series of impulses, by connecting resistance battery and direct ground potential respectively to the — and + conductors C1401 and C1402 of the toll preselector 1400. In the call being described, however, the switch train in the distant toll center 206 is arranged to automatically ring the called subscriber after the last digit has been transmitted by the impulse sender 1900A. The intertoll trunk 400 is therefore arranged to prevent the impulse sender 1900A from controlling the transmission of the automatic ring signal to the distant toll center after the transmission of the last digit of the number registered even though the sender has been conditioned to transmit the automatic ring signal.

In view of the foregoing, it will be noted that during the time that the impulse sender is transmitting impulses of each digit over the EC conductor C584, the pulse-out relay R530 intermittently completes, at its contacts 531, a circuit for operating the automatic ring control relay R560. The relay R560 is of the slow-to-release type and remains in its operated position during pulsing and delays restoring to normal for a short interval of time after the relay R530 is retained operated at the end of each series of impulses. If the impulse sender is controlled to transmit the automatic ring control signal after the transmission of the last digit, the battery potential is forwarded over the connection to the — conductor C581 and then via the upper winding of the retard coil R570, the contacts 562, the lower winding of the relay R560, the contacts 451, to the grounded conductor C583. The ground potential forwarded by the impulse sender to the + conductor C582 performs no function at the present time because the circuit for the lower winding of the retard coil R570, is open at the contacts 563. The automatic ring control relay R560 is now retained operated over the circuit including its lower winding until the impulse sender 1900A removes the battery potential from the — conductor C581. The relay R560 then restores to normal. In this manner, the automatic ring control signal transmitted by the impulse sender 1900A is prevented from operating the rering relay R540 and consequently cannot be repeated to the distant toll center 206.

After the impulse sender 1900A has completed its operations, it disconnects itself from the link included in the connection and reconnects the calling operator thereto. When the called party answers, the repeater 207A in the distant toll center, is controlled to apply battery potential to the conductor C414 in the intertoll trunk 400 thereby to operate the signal relay R410. The signal relay, in turn, operates the pulse-in relay R440 and the relay R440 operates the auxiliary supervisory relay R510, in the manner previously described. The relay R510, upon operating, at its contacts 512, and 513, replaces the low resistance ground potential on the EC conductor C584 with the high resistance ground potential to restore the first supervisory relay R2560 in the operator position equipment 2200A and thus give the "off hook" supervisory signal, in the manner previously described. If the operator has disconnected from the link, the connection will now be completed between the calling and called subscribers.

After the conversation has been completed between the calling and called subscribers, the called subscriber, upon replacing the receiver on the switchhook of the associated telephone instrument, causes the repeater 207A in the distant toll center 206, to apply ground potential to the conductor C414 to restore the signal relay R410 to normal. The relays R410, R440, and R510 restore in the order named and the relay R510, at its contacts 512 and 513, substitutes the low resistance ground potential for the high resistance ground potential returned over the EC conductor C584. The change in the resistance ground potential on the EC conductor C584 will operate the front supervisory relay R1370 in the link 1300A, in the manner previously described, to give an "on hook" supervisory signal to the central office toll operator by illuminating the front supervisory lamp L1373.

When the central office toll operator receives the "on hook" supervisory signal, she may either rering the disconnected called subscriber in the toll center 206 or she may release the connection by restoring the link 1300A to normal. In order to rering the disconnected called subscriber in the toll center 206, the operator in the central office 100 may actuate her ring front key K2642. The operation of the ring front key K2642 causes resistance battery potential and direct ground potential to be applied respectively via the — and + conductors C1401 and C1402 over the front of the link 1300A to the — and + conductors C581 and C582 in the intertoll trunk 400. The ground potential applied to the + conductor C582 is connected via the lower winding of the retard coil R570 and the contacts 563, to battery and performs no function at this time. The resistance battery potential applied to the — conductor C581 is extended via the upper winding of the retard coil R570, the contacts 561, and the winding of the rering relay R540, to ground. The relay R540 operates over this circuit and, at its contacts 541, completes an obvious circuit for operating the slow-to-release rering slave relay R550. As soon as the relay R540 operates, it completes, at its contacts 542, an alternative circuit including the contacts 437 for retaining the resistance battery potential applied to the mid-point of the upper windings of the signal relay R410. The relay R550, upon operating, at its contacts 551, prepares a point in the circuit for substituting a direct ground potential for the resistance battery potential applied to the mid-point of the upper windings of the relay R410. Consequently, when the toll operator restores the ring front key K2642 to normal, the rering relay R540 also restores and, at its contacts 542 and 543, substitutes the direct ground potential for the resistance battery potential on the upper windings of the relay R410. Due to the slow-to-release characteristics of the relay R550, the above traced circuit for applying ground potential to the signal relay R410 remains connected for a predetermined short interval of time. The relay R550 then restores to normal and, at its contacts 552, reconnects the resistance battery potential to the signal relay R410. This short transfer from battery to ground potential and back to battery potential over the circuit including the winding of the signal relay R410, controls the repeater 207A and the switch train in the distant toll center 206 to restart automatic ringing of the disconnected called subscriber. The answering of the call returns the "off hook" supervisory signal to the central office toll operator in the same manner as has been described previously.

In the above description, it was assumed that the toll operator found it necessary to rering the disconnected called subscriber in the distant toll center 206. However, if the toll operator releases the connection by restoring the link 1300A to normal by momentarily actuating the front release key K1374 and the rear release key K1375, the holding ground potential is removed from the C conductor C1404 connected to the front of the link 1300A and consequently, the holding ground potential is removed from the C conductor C583 in the intertoll trunk 400. Also, the release of the link 1300A removes battery potential from the EC conductor C1403 over the front of the link and consequently, battery potential is removed from the EC conductor C584 in the intertoll trunk 400. In response to the foregoing release of the link 1300A, the toll preselector 1400 is restored to normal in order to render both the link 1300A and the toll preselector 1400 available for an additional call.

Referring now to the intertoll trunk 400, it will be seen that when the ground potential is removed from the C conductor C583, the control relay R430 restores to normal. Also, when the battery potential is removed from the EC conductor C584, the pulse-out relay R530 restores to normal. The restoration of the relays R430 and R530 restores the intertoll trunk 400 to normal and renders the same available for additional calls. Furthermore, the restoration of the relay R530, at its contacts 532 and 533, substitutes direct ground potential for resistance battery potential applied to the mid-point of the upper windings of the relay R410 in order to permit the repeater 207A and the associated automatic switch train in the distant toll center 206 to restore to normal.

It will now be assumed that one of the operators at the toll switchboard at the central office has received a call over the rear of one of the links at her position that is to be extended to a subscriber in the distant manual office 200. It will also be assumed that the operator has keyed up the necessary digits for causing the impulse sender 1900A to control the toll preselector, such as the selector 1400, to search for and find an idle toll ring-down trunk, such as the trunk 800, over the cable 960 connected to contacts in one of the upper five levels of the associated contact bank. Referring now to the toll ring-down trunk 800, Figs. 8 and 9, it will be seen that the cable 960 includes the —, +, C and EC conductors C961 to C964, inclusive, which are accessible to the toll preselectors, such as the toll preselector 1400. The toll ring-down trunk 800 is marked idle to the selectors having access thereto by the absence of a ground potential and by a battery potential on the C conductor C963. For the purpose of this description, it will be assumed that the toll operator has selected the link 1300A and that the impulse sender 1900A has controlled the toll preselector 1400 over the front of the link to select the toll ring-down trunk 800 over conductors C961 and C964, inclusive.

When the toll preselector 1400 seizes the toll ring-down trunk 800 over the above conductors, ground potential is applied to the conductor C963 in order to operate the control relay R850 over a circuit including the contacts 861, 871 and 842 and the winding of the control relay R850, to battery. At this time, battery potential applied to the EC conductor C964 is connected via the upper high resistance winding of the supervisory relay R920, to ground. In response to the above traced circuit, the relays R850 and R920 operate. As soon as the relay R850 operates, it completes, at its contacts 851, a circuit for locking itself to the grounded conductor C963. At its contacts 853, the relay R850 completes a circuit including the upper winding of relay R860. The relay R860 operates and prepares, at its contacts 864, a point in the circuit for subsequently connecting low resistance upper winding of the relay R870 in series with the low resistance lower winding of the relay R920 to the EC conductor C964. When the supervisory relay R920 operates upon seizure of the toll ring-down trunk 800, it disconnects, at its contacts 921, the line termination circuit including the condenser 924 and the resistor 925 from across the — and + conductors C961 and C962.

Inasmuch as the operator has controlled the impulse sender 1900A to transmit a single digit to the toll preselector 1400 in order to select the toll ring-down trunk 800, the sender 1900A automatically disconnects itself from the front of the link 1300A and causes the link 1300A to connect the operator position equipment 2200A to the front of the link. At this time the high resistance ground potential applied to the EC conductor C964 through the high resistance upper winding of the supervisory relay R920 is returned to the operator position equipment 2200B but does not cause the operation of the rear supervisory relay R2550. Accordingly, the front supervisory lamp L1373 associated with the link 1300A remains dark to give the toll operator an "off hook" supervisory signal.

The central office toll operator must now control the toll ring-down trunk 800 to transmit a ring-down signal to the toll operator at the distant toll switchboard 201. In order to transmit the ring-down signal, the operator in the central office toll switchboard actuates the ring front key K2642, in the manner previously described, and thereby connects resistance battery potential and direct ground potential over the — and + conductor C1401 and C1402 at the front of the link 1300A to the toll ring-down trunk 800. The resistance battery potential and the direct ground potential are connected respectively via the — and + conductors C961 and C962 to the upper and lower windings of the retard coil R820. The resistance battery potential is further extended from the upper winding of the retard coil R820 via the winding of the rering relay R810, to ground. The ground potential from the lower winding of the retard coil R820 is further extended via the upper winding of the transfer relay R840, to ground. The rering relay R810 operates but the transfer relay R840 remains in its restored position when the above traced circuits are completed. At its contacts 812 and 813, the relay R810 connects the ringing conductor C815 and ground respectively to the — and + conductors C816 and C817 via the toll test panel 890 and the toll line 211, to the repeater 201A in the distant manual office 200 in order to signal the operator at the toll switchboard 201.

When the toll operator in the central office 100 restores the ring front key K2642 to normal, the resistance battery and ground potentials are removed from the — and + leads C961 and C962 thereby to restore the rering relay R810 to normal. Upon restoring, the relay R810 disconnects the ringing signal from the — and + conductors C816 and C817 thereby to terminate the transmission of the ring-down signal to the distant manual office 200.

When the distant operator at the toll switchboard 201 answers the call, the toll operator at the central office 100 informs her of the number of the called manual subscriber in the office 200. The distant operator then manually extends the connection to the desired called subscriber in the conventional manner and both operators disconnect from the established connection in order to interconnect the calling and called subscribers.

When the called subscriber in the manual office releases the connection, the operator at the manual switchboard 201 must transmit a disconnect signal to the toll operator at the central office 100. This is accomplished by the distant manual operator by transmitting a ring-down signal over the toll line 211, the conductors C816 and C817, the contacts 811 and 814, to the windings of the ring-down relay R940. The ring-down relay R940 operates and, at its contacts 941, interrupts the circuit of the normally operated signal relay R930 which now restores to normal. The relay R930, at its contacts 931, connects ground potential via the contacts 843 and the winding of the relay R870, to battery. The relay R870 now operates and, at its contacts 873, connects ground potential via the low resistance upper winding of the relay R870, the contacts 864 and the low resistance lower winding of the relay R920, to the EC conductor C964 extending to the front of the link 1300A via the toll preselector 1400. Accordingly, the high resistance ground potential applied to the EC conductor C964 is now changed to a low resistance ground potential and thereby causes the operation of the front supervisory relay R1370 in the link 1300A. The operated front supervisory relay R1370 illuminates the front supervisory lamp L1373 in order to give the central office toll operator an "on hook" supervisory signal. Upon receiving this signal, the central office toll operator reconnects her position 2200A with the link 1300A and challenges the connection over the front of the link 1300A. As soon as the operator connects her position 2200A to the link 1300A, the front supervisory relay R2560 is connected to the EC conductor C964 over the front of the link 1300A. The high resistance of the circuit including the relay R2560 causes the relay R870 in the ring-down trunk 800 to restore to normal but the supervisory relay R920 remains in its operated position over the circuit including its high resistance upper winding. The relay R870 may be reoperated by the distant manual operator in the manner described above in order to again signal the central office operator. When she learns that the called party has disconnected, she may release the connection over the front of the link by operating the front release key K1374. The toll preselector 1400 now restores to normal, in the manner previously described, thereby to interrupt the circuits including the conductor C961 to C964, inclusive. The relays R850, R860, R870 and R920 now restore to normal to render the toll ring-down trunk 800 available for an additional call. The connection over the rear of the link 1300A may be released by the central office toll operator in response to the momentary operation of the release rear key K1375, in the manner previously described.

*Night service*

In order to provide facilities for night service, the dial toll board at the central office 100 is arranged so that an operator at one position may clear out connections established via links at adjacent positions of the toll board. This is accomplished in the dial toll board illustrated in Figs. 22 to 26, inclusive, by actuating the position group key K2392. The key K2392, when actuated, operates the position group relay R2360 to transfer the conductors common to all of the links at that position to the position equipment at the adjacent operator position. With this arrangement, the adjacent operator may supervise existing connections established over links associated with the operator position 2200A and the operator at position 2200A, after actuating the key K2329, may vacate her position. The existing connections will now be supervised by the adjacent operator in the same manner as they are supervised by the operator at position 2200A. During night service, however, the operator that is attending the switchboard should restore her class keys to the normal positions so that she may accept calls for all three classes of service over the links at her position.

With the foregoing method for handling night service it is necessary to staff the dial toll board at the central office 100 with at least one toll operator to handle calls extended to the switchboard.

The present system is arranged so that the dial toll board in the central office 100 may be shut down during the light traffic hours. With this arrangement all calls which would normally be extended to the links at the central office toll board are automatically transferred to the dial toll board 205 in the distant automatic exchange 203 via the two-way trunk circuits, such as the two-way trunk circuit 210. This is accomplished in the present system by means of the night transfer relay R1210 schematically illustrated in Fig. 5 of the drawings. The relay R1210, when operated, transfers the C1 to C4 conductors in the cable 1170 from the rear of the link 1300A to the two-way trunk circuit 210 which terminates the toll line 212 extending to an automatic exchange 203. The — and + conductors C761 and C762 and the EC conductor C764 connected to the rear of the link 1300A, are multiply connected to the two-way trunk 210. The incoming conductors connected to the rear of the links at the control office toll board will also be transferred by means of contacts on the relay R1210, or by means of other similar relays, to other two-way trunk circuits, such as the two-way trunk circuit 210.

When the dial toll board in the central office 100 is closed down and unattended, the key K1201 (Fig. 12) is actuated in order to operate all the night transfer relays, such as the relay R1210. The relay R1210, at its contacts 1212, 1214, 1216 and 1218, connects the C1 to C4 conductors C763, C765, C974 and C1174 to the two-way trunk circuit 210 and, at its contacts 1211, 1213, 1215 and 1217, it disconnects these conductors from the rear of the link 1300A. It will be recalled that the — and + and EC conductors C761, C762 and C764 are multiply connected to the bank contacts of the link finders 700, 700A, 301, 900 and 1100 respectively associated with the CLR trunk 600, the CLR trunk 600A, the inward trunk 300, the toll ring-down trunk 800 and the TX trunk 1000. It will also be recalled that the C1 and C2 conductors C763 and C765 are connected respectively to the link finders 700, 700A, that the C3 conductor C974 is connected to the link finders 309 and 900 and that the C4 conductor C1174 is connected to the link finder 1100.

When a call is received on any one of the above mentioned CLR, inward, ring-down or TX trunk circuits after the key K1201 has been operated, a call allotter (not shown) controls the corresponding trunk distributor to find the calling trunk circuit and thereby operate the associated link finder to route the call to an idle dial two-way trunk circuit, such as 210. The class of the particular calling trunk will control the two-way trunk 210 to transmit a class of service identity signal over the interconnecting toll line 212 and the two-way trunk circuit 204 in the automatic exchange 203, to the toll operator at the dial toll board 205. All calls received on CLR, inward, ring-down or TX trunk circuits in the central office 100 and intended for the dial toll board thereat, are automatically routed by way of idle two-way trunk circuits, such as the trunk circuit 210, to the dial toll board in exchange 203. The two-way trunk circuits 210 and 204, schematically illustrated, are arranged so that the toll operator at the dial toll board 205 may, if necessary, dial back over the interconnecting toll line 212 to the central office 100 and thus complete a connection via the automatic switching apparatus thereat to either a local subscriber in the central office 100, a subscriber in the CAX 208 or to any one of the interconnected distant exchanges, such as the distant toll center 206, and the distant manual office 200. Also, the toll operator at the dial toll board 205 may complete the connection to subscribers located in the automatic exchange 203. The maner in which the switching apparatus in the central office 100 and the automatic exchange 203 is operated to complete connections after the dial toll board in the central office 100 is shut down is disclosed, described and claimed in the copending Balzer application, Serial No. 181,509, filed August 25, 1950.

*Information calls*

The central office 100 is also provided with an information operator position 114 which is normally accessible to local subscribers via the local connectors in the central office and to subscribers and operators at the distant exchanges via the banks of the intertoll selector, such as the intertoll selector 112. If any subscriber in the central office 100 or in the CAX 208 desires to call the information operator, the number of the information operator is dialed in the well-known manner to extend a connection via the local switching apparatus, including the local first selector 103, the local second selector 104, the connector 105 and the connector information trunk circuit 116 to the information operator position 114. If a subscriber or a toll operator in the distant toll center 206 desires to extend a connection to the information operator position 114, the connection is first extended via the toll line 213 and the intertoll trunk 400 to the intertoll selector 110. The intertoll selector may then be dialed to either the first or tenth level to select on idle intertoll ring control circuit, such as the ring control circuit 111, and the associated intertoll selector, such as the intertoll selector 112. The last mentioned selector is then dialed to the third level in order to select the information trunk 115 and complete the connection to the information operator position 114. Other calls, for example, from the distant manual office 200 are completed to the information operator position 114 via the toll ring-down trunk 800 to the inward and ring-down toll operator in the central office 100. The last mentioned toll operator may further extend the connection via the third level in the banks of the toll preselector 1400 and the information trunk 115, to the information operator position 114. From the foregoing, it will be seen that information calls may normally be completed to the information operator position 114 via the connector information trunk circuit 116 or via the information trunk circuit 115.

It may also be advisable to close down the information operator position 114 during light traffic hours and leave the board unattended. In order to provide facilities for answering information calls during the period of time that the information operator position 114 is closed down, a night transfer concentration unit 215 is provided for automatically routing such calls via two-way trunk circuits, such as the two-way trunk circuit 210, to the operator at the dial toll board 205. Referring now to Fig. 12, it should be noted that the key K1202 is actuated when the information operator position 114 is closed down in order to operate the start relay R1203. The last mentioned relay conditions the night transfer concentration unit 215 for subsequent operation. When an information call is now received on either the connector information trunk 115 or the information trunk 116, the night transfer unit 215 automatically operates to rotate the wiper 1204 to find the calling trunk circuit 115 or 116. Thereafter, the night transfer unit 215 rotates its wiper 1205 to forward the information call via an idle two-way trunk circuit 210 to the operator at the dial toll board 205.

From the foregoing, it will be understood that all information calls intended for the information operator position 114 will be automatically routed by the night transfer concentration unit 215 to the toll operator in the distant automatic exchange 203 to be answered.

The manner in which the information calls intended for the information operator position 114 are automatically routed from the central office 100 to the distant exchange 203 is disclosed, described and claimed in the above mentioned copending Balzer application, Serial No. 181,509, filed August 25, 1950.

While one embodiment of the invention has been disclosed, it will be understood that various modifications may be made therein which are within the true spirit and scope of the invention.

What is claimed is:

1. In a telephone system, a plurality of groups of trunk circuits, means for extending telephone calls to said trunk circuits, a non-numerical switch associated with each of said trunk circuits, an operator position, means in each of said trunk circuits operated in response to the extension of a call thereto for marking said trunk circuit as calling, a plurality of links at said position, means at said position for preselecting one of said links for use in handling a telephone call extended to one of said trunk circuits, a distributor for each of said groups of trunk circuits, means controlled in response to the preselection of said one link and the marking of one of said trunk circuits as calling for controlling one of said distributors to find said one calling trunk circuit, means operated in response to said one distributor finding said one calling trunk circuit for operating said associated non-numerical switch to search for said preselected link, and means in said one calling trunk circuit operated in response to said non-numerical switch finding said preselected link for terminating further searching operation of said non-numerical switch and for further extending said call on said one calling trunk circuit via said non-numerical switch and said preselected link to said operator position.

2. In a telephone system, a plurality of groups of trunk circuits, means for extending telephone calls to said trunk circuits, means in each of said trunk circuits operated in response to the extension of a call thereto for marking said trunk circuit as calling, a non-numerical switch associated with each of said trunk circuits, an operator position, a plurality of links at said position, means at said position for preselecting one of said links for use in handling a telephone call extended to one of said trunk circuits, a distributor for each of said groups of trunk circuits, means controlled in response to the preselection of said one link and the marking of one of said trunk circuits as calling for controlling one of said distributors to find said one calling trunk circuit, means operated in response to said one distributor finding said one calling trunk circuit for operating said associated non-numerical switch to search for said preselected link, means in said one calling trunk circuit operated in response to said non-numerical switch finding said preselected link for terminating further searching operation of said non-numerical switch and for further extending said call on said one calling trunk circuit via said non-numerical switch and said preselected link to said operator position, and means at said operator position selectively controlled by said one calling trunk circuit for indicating to the operator at said position the particular group of said plurality of groups of trunks including said one calling trunk circuit.

3. In a telephone system, a plurality of groups of trunk circuits, means for extending telephone calls to said trunk circuits, means in each of said trunk circuits operated in response to the extension of a call thereto for marking said trunk circui: as calling, a non-numerical switch associated with each of said trunk circuits, an operator position, a plurality of links at said position, means at said position for preselecting one of said links for use in handling a telephone call extended to one of said trunk circuits, a distributor for each of said groups of trunk circuits, means controlled in response to the preselection of said one link and the marking of one of said trunk circuits as calling for controlling one of said distributors to find said one calling trunk circuit, means operated in response to said one distributor finding said one calling trunk circuit for operating said associated non-numerical switch to search for said preselected link, means in said one calling trunk circuit operated in response to said non-numerical switch finding said preselected link for terminating further searching operation of said non-numerical switch and for further extending said call on said one calling trunk circuit via said non-numerical switch and said preselected link to said operator position, and trunk group signaling means at said position selectively controlled by said one calling trunk circuit over a circuit including said preselected link for indicating to the operator at said position the particular trunk group in said plurality of groups of trunks including said one calling trunk circuit.

4. In a telephone system, a plurality of groups of trunk circuits, each of said groups corresponding to a different class, means for extending telephone calls to said trunk circuits, means in each of said trunk circuits operated in response to the extension of a call thereto for marking said trunk circuit as calling, a non-numerical switch individual to each of said trunk circuits, a distributor for each of said groups, an operator position, a link at said position including a pair of talking conductors and a supervisory conductor accessible to each of said non-numerical switches, a plurality of control conductors in said link corresponding respectively to said plurality of groups of trunk circuits accessible only to the non-numerical switches individual to the trunk circuits of the corresponding groups, means at said position for selectively determining the class of calls to be answered thereat, means jointly controlled by said last mentioned means and the marking of a trunk circuit as calling in a group corresponding to said selected class for controlling the corresponding group distributor to connect with said calling trunk circuit and for controlling the non-numerical switch individual thereto to connect said calling trunk circuit to said link over said talking conductors and said supervisory conductor and one of said control conductors, and means including said one control conductor for indicating the class of said calling trunk circuit connected to said link.

5. In a telephone system, a plurality of groups of trunk circuits, each of said groups corresponding to a different class, means for extending telephone calls to said trunk circuits, means in each of said trunk circuits operated in response to the extension of a call thereto for making said trunk circuit as calling, a non-numerical switch individual to each of said trunk circuits, a distributor for each of said groups, an operator position, a link at said position including a pair of talking conductors and a supervisory conductor accessible to each of said non-numerical switches, a plurality of control conductors in said link corresponding respectively to said plurality of groups of trunk circuits accessible only to the non-numerical switches individual to the trunk circuits of the corresponding groups, means at said position for selectively determining the class of calls to be answered thereat, means jointly controlled by said last mentioned means and the marking of a trunk circuit in a group corresponding to said selected class for controlling the corresponding group distributor to connect with said calling trunk circuit and for controlling the non-numerical switch individual thereto to connect said calling trunk circuit to said link over said talking conductors and said supervisory conductor and one of said control conductors, means including said one control conductor for indicating the class of said calling trunk circuit connected to said link, and means in said operator position controlled over said supervisory conductor for signaling the operator thereat to indicate that the call on said calling trunk circuit has been completed to her position to be answered.

6. In a telephone system, a plurality of groups of trunk circuits, means for extending telephone calls to said trunk circuits, means in each of said trunk circuits operated in response to the extension of a call thereto for marking said trunk circuit as calling, a non-numerical switch associated with each of said trunk circuits, an operator position for each group of trunk circuits, a plurality of links at each of said positions accessible to all of said non-numerical switches, means at each of said positions for preselecting one of the links thereat for use in handling a telephone call extended to one of said trunk circuits, a distributor for each of said groups of trunk circuits, means controlled in response to the preselection of said one link at each of said positions and the marking of one of said trunk circuits as calling in each of said groups for controlling each of said distributors to find the one of said trunk circuits marked as calling in the associated group, means controlled in response to said distributors finding respectively said one calling trunk circuit in the associated groups for operating the non-numerical switch associated with each of said calling trunk circuits to search for the preselected link at the associated operator position, and means in each of said calling trunk circuits operated in response to the associated non-numerical switch finding the preselected link at the associated operator position for terminating further searching operation of the associated non-numerical switch and for further extending the calls on said calling trunk circuits via the associated non-numerical switches and the preselected links to the associated operator positions to be answered.

7. In a telephone system, a plurality of groups of trunk circuits, means for extending telephone calls to said trunk circuits, means in each of said trunk circuits operated in response to the extension of a call thereto for marking said trunk circuit as calling, a non-numerical switch associated with each of said trunk circuits, an operator position for each group of trunk circuits, a plurality of links at each of said positions accessible to all of said non-numerical switches, means at each of said positions for preselecting one of the links thereat for use in handling a telephone call extended to one of said trunk circuits, a distributor for each group of trunk circuits, means controlled in response to the preselection of a link at each of said positions and the marking of any one of said trunk circuits as calling for the distributor of the associated trunk group to find said one trunk circuit marked as calling, means controlled in response to said distributor finding said one calling trunk circuit for controlling the non-numerical switch associated with said one calling trunk circuit to search for the preselected one of said links at the corresponding operator position, and means in said one calling trunk circuit operated in response to said associated non-numerical switch finding said one preselected link for terminating further operation of said associated non-numerical switch and for extending the call on said one calling trunk circuit via the associated non-numerical switch and said one preselected link to the corresponding operator position.

8. In a telephone system, an operator position, a plurality of links at said position, a plurality of trunk circuits, a non-numerical switch associated with each of said trunk circuits having access to said plurality of links, means for extending telephone calls to said trunk circuits, means operated in response to the extension of a telephone call to any one of said trunk circuits for marking said one trunk circuit as a calling trunk circuit, a distributor common to said plurality of trunk circuits operative to search for and connect with said marked calling trunk circuit, means at said operator position for preselecting one of said links to answer a telephone call extended to any one of said trunk circuits, means controlled in response to said preselection of said one link for operating said distributor, means controlled in response to said distributor connecting with said marked calling trunk circuit for controlling said non-numerical switch associated with said calling trunk circuit to search for and connect with said preselected link, and means controlled in response to said connection with said preselected link for extending said telephone call on said marked calling trunk circuit via said associated non-numerical switch and said preselected link to said operator position.

9. In a telephone system, an operator position, a plurality of links associated with said position, a plurality of trunk circuits, each of said trunk circuits including an associated non-numerical switch having access to any one of said links, a distributor having access to said trunk circuits, means at said position for preselecting one of said links to answer a telephone connection, switching apparatus operated to extend telephone connections to said trunk circuits, means jointly controlled responsive to the extension of a telephone connection to one or more of said trunk circuits and responsive to said preselection of one of said links for controlling said distributor to connect with one of said trunk circuits having a telephone connection extended thereto, means controlled in response to the connection of said distributor with said one trunk circuit for controlling said associated non-numerical switch to further extend said telephone connection via said preselected link to said operator position to be answered, means at said position for answering said telephone connection and for thereafter rendering said operator position available to answer another telephone connection, and means controlled in response to said operator position becoming available to answer a second telephone connection for controlling said preselecting means to preselect a second one of said links, whereby said distributor connects with another one of said trunk circuits having a telephone connection extended thereto and the associated non-numerical switch extends said last mentioned telephone connection via said second preselected link to said operator position to be answered.

10. In a telephone system, an operator position, a plurality of links associated with said position, a plurality of trunk circuits, each of said trunk circuits including a rotary line switch having access to any one of said links, means for extending telephone calls to said trunk circuits, means in each of said trunk circuits operated in response to the extension of a call thereto for marking said trunk circuit as calling, an automatic answer control circuit at said position for preselecting idle links for use in answering calls extended to said marked calling trunk circuits, a gate control circuit associated with said position operated in response to said marking of one or more of said trunk circuits as calling, means controlled by said operation of said gate control circuit for locking in one or more of said trunk circuits that are marked as calling and for locking out one or more of said trunk circuits subsequently marked as calling, means jointly controlled by any one of said locked-in calling trunk circuits and a preselected one of said links for controlling the rotary line switch of one of said locked-in calling trunk circuits to search for said preselected link at said operator position, means controlled in response to said rotary line switch of said one locked-in calling trunk circuit finding said preselected link for extending the telephone call thereon via said preselected link to said operator position, and means at said position thereafter controlled for operating said automatic answer control circuit to preselect another link at said position and for controlling the rotary line switch of another locked-in one of said calling trunk circuits to find said other preselected link.

11. In a telephone system, an operator position, a plurality of links at said position, means at said position for preselecting one of said links each time said position is in condition to answer a telephone call, a plurality of trunk circuits, each of said trunk circuits including a non-numerical switch having access to all of said links, means for extending telephone connections to said trunk circuits, means in each of said trunk circuits operated in response to the extension of a telephone connection thereto for marking said trunk circuit as calling, a gate control circuit associated with said position operated in response to said marking of one or more of said trunk circuits as calling, means in said gate control circuit controlled in response to the marking of one or more of said trunk circuits as calling for locking in said telephone connections extended thereto and for locking out others of said trunk circuits subsequently marked as calling, a distributor having access to said trunk circuits, means jointly controlled by said locked-in trunk circuits and a preselected link for controlling said distributor to connect with one of said locked-in calling trunk circuits, means controlled in response to said distributor connecting with one of said locked-in calling trunk circuits for operating the associated non-numerical switch to find and connect with said preselected link and to complete a telephone connection from said one locked-in calling trunk circuit to said operator position, means at said position for extending said connection to a called destination and for controlling said preselecting means to preselect another link, said distributor being controlled each time another link is preselected to connect with another locked-in calling trunk circuit and to control the associated non-numerical switch to find said other preselected link, and means controlled in response to the connection of the last locked-in calling trunk circuit to a preselected link for controlling said gate control circuit lock-in means to lock in all of the locked-out telephone connections extended to said other trunk circuits during the time the first group of locked-in telephone connections are distributed one at a time to preselected links at said position and to lock out subsequent telephone connections extended to any of said trunk circuits.

12. In a telephone system, an operator position, a plurality of links associated with said position, a trunk circuit including a non-numerical switch having access to any one of said links, means at said position for preselecting one of said links to answer a call, switching apparatus operative to extend a call to said trunk circuit, means in said trunk circuit operated in response to said extension of a call thereto for marking said trunk circuit as calling, and means jointly controlled in response to marking of said trunk circuit as calling and in response to said preselection of one of said links for controlling said non-numerical switch to further extend said call on said calling trunk circuit via said preselected link to said operator position.

13. In a telephone system, an operator position, a plurality of links associated with said position, a trunk circuit including a non-numerical switch having access to any one of said links, a distributor having access to said trunk circuit, means at said position for preselecting one of said links to answer a call, switching apparatus operative to extend a call to said trunk circuit, means in said trunk circuit operated in response to said extension of a call thereto for marking said trunk circuit as calling, means jointly controlled in response to marking of said trunk circuit as calling and in response to said preselection of one of said links for controlling said distributor to connect with said calling trunk circuit, and means controlled in response to said last mentioned connection for controlling said non-numerical switch to further extend said call on said calling trunk circuit via said preselected link to said operator position.

14. In a telephone system, an operator position, a trunk circuit, a hunting switch individual to said trunk circuit, means for extending a telephone connection to said trunk circuit, means in said trunk circuit operated in response to said extension of a connection thereto for marking said trunk circuit as calling, a plurality of links at said position accessible to said hunting switch, means at said position for preselecting one of said links, means controlled in response to said preselection of one of said links and in response to the marking of said trunk circuit as calling for operating said hunting switch to search for said one preselected link, and means controlled only in response to said hunting switch finding said one preselected link for further extending said telephone connection on said marked calling trunk circuit via said hunting switch and said one preselected link to said operator position.

15. In a telephone system, an operator position, a trunk circuit, a hunting switch individual to said trunk circuit, means for extending a telephone connection to said trunk circuit, means in said trunk circuit operated in response to said extension of a connection thereto for marking said trunk circuit as calling, a plurality of links at said position accessible to said hunting switch, means at said position for preselecting one of said links, means controlled in response to said preselection of one of said links and in response to the marking of said trunk circuit as calling for operating said hunting switch to search for said one preselected link, means controlled only in response to said hunting switch finding said one preselected link for further extending said telephone connection on said marked calling trunk circuit via said hunting switch and said one preselected link to said operator position, and means controlled in response to the failure of said hunting switch to find said one preselected link within a predetermined elapsed time interval for terminating further searching operation of said hunting switch.

16. In a telephone system, an operator position, a plurality of links associated with said position over which telephone connections may be extended to and completed from said position, a plurality of incoming trunk circuits, each of said trunk circuits including a non-numerical switch having a set of bank contacts, one end of said links terminating in the bank contacts of said non-numerical switch associated with each of said trunk circuits, means for preselecting one of said links for use, means for extending telephone connections to said incoming trunk circuits, means in each of said trunk circuits operated in response to the extension of a telephone connection thereto for marking said trunk circuit as calling, means responsive to said marking of any one of said trunk circuits as calling and effective only in the event a link has been preselected for controlling the non-numerical switch associated with one of said marked calling trunk circuits to find said preselected link and to extend said telephone connection on said one marked calling trunk circuit via said preselected link to said operator position, a selector associated with said selected link, outgoing trunk circuits accessible to said selector, and means at said operator position for selectively controlling said selector to complete said telephone connection from said operator position via said link and said selector and one of said outgoing trunk circuits.

17. In a telephone system, an operator position, a trunk circuit including a pair of line conductors and a supervisory conductor, a hunting switch individual to said trunk circuit, means for extending a telephone connection to said trunk circuit, means in said trunk circuit operated in response to said extension of a connection thereto for marking said trunk circuit as calling, a plurality of links at said position accessible to said hunting switch, means at said position for preselecting one of said links, means controlled in response to said preselection of one of said links and in response to the marking of said trunk circuit as calling for operating said hunting switch to search for said preselected link, means controlled only in response to said hunting switch finding said preselected link for further extending said telephone connection on said marked calling trunk circuit over said line conductors and said supervisory conductor via said hunting switch and said preselected link to said operator position, means at said position for answering said telephone connection extended thereto over a circuit including said line conductors and for completing said connection to a desired called destination, a supervisory relay including a high and a low resistance winding included in said trunk circuit, a supervisory relay at said position connected via said supervisory conductor to said trunk supervisory relay high resistance winding, means selectively controllable over the telephone connection extended to said trunk circuit for connecting said low resistance winding of said trunk supervisory relay to said supervisory conductor in order to operate said operator position supervisory relay, and means controlled in response to operation of said operator position supervisory relay for signaling the operator thereat.

18. In a telephone system, an operator position, a plurality of links at said position, a plurality of two-way trunk circuits, a non-numerical switch individually associated with each of said trunk circuits and having access to all of said links, means at said position for preselecting one of said links for use, a trunk distributor for said trunk circuits, means for extending incoming telephone calls to said trunk circuits, means controlled in response to the extension of an incoming call to one of said trunk circuits for operating said trunk distributor to find said one trunk circuit and for operating the associated non-numerical switch to find said preselected link in order further to extend said incoming call to said position, a plurality of automatic switches having access to said two-way trunk circuits, a non-numerical switch individually associated with each of said automatic switches and having access to all of said links, a switch distributor for said automatic switches, means at said position controlled in the event the operator thereat extends an outgoing call over one of said trunk circuits for preventing said trunk distributor from operating in response to an incoming call on one of said trunk circuits and for operating said switch distributor to find an idle one of said automatic switches and for operating the associated non-numerical switch to find said preselected link in order to connect said idle automatic switch to said preselected link, and means at said position for controlilng said connected automatic switch to select an idle one of said two-way trunk circuits to extend an outgoing call thereover.

19. In a telephone system, an operator position, a plurality of links associated with said position, a calling trunk circuit including a non-numerical switch, a selector switch including a non-numerical switch, said non-numerical switches having access to any one of said links, means at said position for preselecting one of said links, means jointly controlled by said calling trunk circuit and by preselection of said one link for operating said trunk circuit non-numerical switch to find said preselected link and for connecting said calling trunk circuit to said operator position via said preselected link to enable the operator at said position to answer said call on said calling trunk circuit, means at said position controllable by the operator thereat for preventing said last mentioned means from controlling said trunk circuit non-numerical switch and for controlling said selector switch non-numerical switch to find said preselected link and connect said selector to said position via said preselected link, and means at said position for directively controlling said selector switch to enable said operator at said position to originate a call.

20. In a telephone system, an operator position, a calling trunk circuit including a non-numerical switch, a selector switch including a non-numerical switch, a plurality of links at said position, a like plurality of automatic switches, each of said links having a rear end accessible to said non-numerical switches and a front end directly connected to one of said automatic switches, means at said position for preselecting one of said links for use, means jointly controlled by said calling trunk circuit and by preselection of said one link for controlling said trunk circuit non-numerical switch to find said preselected link and connect said calling trunk to said operator position via said preselected link to enable the operator at said position to answer said call on said calling trunk circuit, means at said position selectively controllable by said operator for preventing said last mentioned means from controlling said trunk circuit non-numerical switch and for controlling said selector switch non-numerical switch to find said preselected link and connect said selector to said position via said preselected link, means at said position for thereafter directively controlling said selector to establish a connection to a called destination from said operator position over the rear end of said link, and means at said operator position for directively controlling said automatic switch to establish a connection to another called destination over the front end of said link, whereby the operator at said position may either answer a connection over the rear end of said preselected link or originate a connection over the rear end of said preselected link and in either event may also establish a connection to a called destination over the front end of said preselected link.

21. In a telephone system, an operator position, a plurality of links at said position, a first group and a second group of automatic switches, switching apparatus accessible to said automatic switches operative to complete connections to called destinations, a non-numerical switch individually associated with each of said automatic switches in said first group, said non-numerical switches having access to one end of each of said links, each of said links being directly connected over the other end thereof to one of said automatic switches in said second group, a distributor having access to each of said automatic switches in said first group, means at said position for selecting one of said links for use and for operating said distributor to select an idle automatic switch in said first group, means operated in response to said distributor selecting said idle automatic switch in said first group for controlling the associated non-numerical switch to find said selected link in order to connect said operator position via said selected link and said associated non-numerical switch to said selected automatic switch in said first group, means at said position for directively controlling said selected automatic switch and a portion of said switching apparatus in order to complete a connection from said position to a desired called destination, and means at said position for thereafter directively controlling the automatic switch in said second group connected to said selected link and another portion of said switching apparatus in order to complete another connection from said position to another desired called destination.

22. In a telephone system, an operator position, a plurality of links at said position, a first group and a second group of automatic switches, switching apparatus accessible to said automatic switches operative to complete connections to called destinations, a non-numerical switch individually associated with each of said automatic switches in said first group, said non-numerical switches having access to one end of each of said links, each of said links being directly connected over the other end thereof to one of said automatic switches in said second group, a distributor having access to each of said automatic switches in said first group, means at said position for selecting one of said links for use and for operating said distributor to select an idle automatic switch in said first group, means operated in response to said distributor selecting said idle automatic switch in said first group for controlling the associated non-numerical switch to find said selected link in order to connect said operator position via said selected link and said associated non-numerical switch to said selected automatic switch in said first group, means at said position for directively controlling said selected automatic switch and a portion of said switching apparatus in order to complete a connection from said position to a desired called destination, means at said position for thereafter directively controlling the automatic switch in said second group connected to said selected link and another portion of said switching apparatus in order to complete another connection from said position to another desired called destination, and means at said position selectively controllable by the operator thereat for disconnecting said position from the connections to said called destinations and for interconnecting said called destinations through said selected link.

23. In a telephone system, an operator position, a plurality of links associated with said position, a selector switch including a non-numerical switch, said non-numerical switch having access to said links, an automatic switch individually associated with each of said links, means at said position for selecting one of said links for use and for controlling said non-numerical switch to find said selected link in order to associate said selector switch with said position via said selected link, a register sender, manually controlled means at said operator position for associating said register sender with one end of said link through said operator position and for controlling said register sender to transmit impulses corresponding to digits of a called destination to said selector in order to establish a telephone connection from said position to said called destination over said one end of said link, means automatically controlled by said register sender for thereafter directly associating said register sender with the other end of said link, and operator controlled means for controlling said register sender to transmit impulses corresponding to digits of another called destination over said other end of said link to said automatic switch in order to establish a telephone connection to said other called destination from said position over another end of said link.

24. In a telephone system, an operator position, a plurality of links associated with said position, each of said links having a first branch and a second branch, a selector switch including a non-numerical switch, said non-numerical switch having access to said links over said first branch, an automatic switch individually associated with each of said links over said second branch, means at said position for selecting one of said links for use and for controlling said non-numerical switch to find said selected link over said first branch in order to associate said selector switch with said position via said selected link, a register sender, manually controlled means at said operator position for associating said register sender with said link through said operator position and for controlling said register sender to transmit impulses corresponding to digits of a called destination to said selector in order to establish a telephone connection from said position to said called destination over said first branch of said link, means automatically controlled by said register sender for thereafter directly associating said register sender with said link, and manually controlled means at said operator position for controlling said register sender to transmit impulses corresponding to digits of another called destination to said automatic switch in order to establish a telephone connection to said other called destination from said position over said second branch of said link, and means in said link for disconnecting said position from said link and for interconnecting said telephone connections established to said called destinations via said first and second branches of said link.

25. In a telephone system, an operator position, a link at said position having a pair of line conductors and a control conductor and an extra control conductor, an automatic switch associated with said link over said conductors, an automatic switch train accessible to said automatic switch for extending calls from said operator position to called destinations, a register sender, means at said position for associating said register sender with said link and for controlling said register sender to transmit successive series of switch controlling impulses over said extra control conductor, means in said automatic switch and said switch train selectively controlled in accordance with successive series of impulses transmitted over said extra control conductor for completing a connection from said position via said line conductors to said called destination, means in said link for holding said automatic switch and said switch train operated over said control conductor in order to retain said connection, means for disconnecting said extra control conductor from said register sender and for connecting it to a supervisory circuit, means responsive to a supervisory control from said called destination for returning a supervisory signal over said extra control conductor to control said supervisory circuit, and means connected to said supervisory circuit selectively controlled in response to said supervisory signal for signaling the operator at said position.

26. In a telephone system, an operator position, a plurality of links at said position, each of said links including a pair of line conductors and a control conductor and an extra control conductor, an automatic switch individually associated with each of said links by way of said pair of line conductors and said control conductor and said extra control conductor, means at said position for selecting one of said links, a switch train accessible to said automatic switch and controllable from said operator position for extending connections from said link to called destinations, a register sender at said position, means for associating said register sender with said selected link, means for controlling said register sender to transmit series of impulses corresponding to digits of a called destination via said extra control conductor of said selected link, means in said associated automatic switch selectively controlled in accordance with said impulses of one of said digits transmitted over said extra control conductor for operating said associated automatic switch to select said switch train and means in said switch train selectively controlled in accordance with the impulses of the remaining digits transmitted over said extra control conductor for operating said selected switch train to extend a connection from said selected link to said called destination over said line conductors, and means in said selected link for retaining said automatic switch and said switch train in their operated positions over said control conductor.

27. In a telephone system, an operator position, a plurality of links at said position, each of said links including a pair of line conductors and a control conductor and an extra control conductor, an automatic switch individually associated with each of said links by way of said pair of line conductors and said control conductor and said extra control conductor, means at said position for selecting one of said links, a switch train accessible to said automatic switches and controllable from said operator position for extending connections from said link to called destinations, a register sender at said position, means for associating said register sender with said selected link, means for controlling said register sender to transmit series of impulses corresponding to digits of a called destination via said extra control conductor of said selected link, means in said associated automatic switch selectively controlled in accordance with the impulses of one of said digits transmitted over said extra control conductor for operating said automatic switch associated with said selected link to select said switch train and means in said switch train selectively controlled in accordance with the impulses of the remaining digits transmitted over said extra control conductor for operating said switch train to extend a connection from said selected link to said called destination over said line conductors, means in said selected link for retaining said automatic switch and said switch train in their operated positions over said control conductor, a supervisory signal in said selected link, means controlled in response to the extension of said connection to said called destination for disconnecting said register sender from said selected link and for connecting said extra control conductor to said supervisory signal, and means controlled from said called destination for returning an answer supervisory signal over said extra control conductor in order to control said supervisory signal to indicate to the operator at said operator position that said connection has been answered.

28. In a telephone system, an operator position, a plurality of links at said position, means for preselecting one of said links, a trunk circuit having access to said links via a non-numerical switch, means for extending a call to said trunk circuit, means in said trunk circuit operated in response to said extension of a call thereto for marking said trunk circuit as calling, means controlled jointly responsive to preselection of said link and responsive to marking of said trunk circuit as calling for controlling said non-numerical switch to further extend said call via said preselected link to said operator position, an automatic switch, a pair of line conductors and a control conductor and an extra control conductor interconnecting said preselected link and said automatic switch, a switch train accessible to said automatic switch operative to still further extend said call from said operator position to a called destination, a register sender at said position, means for associating said register sender with said preselected link, means for controlling said register sender to transmit series of impulses corresponding to digits indicative of a particular called destination via said extra control conductor, means in said automatic switch selectively controlled in accordance with said impulses of one of said digits transmitted over said extra control conductor for operating said automatic switch to select said switch train and means in said switch train selectively controlled in accordance with said impulses of the remaining digits transmitted over said extra control conductor for operating said switch train to extend said call from said operator position to said particular called destination over said line conductors, and means in said preselected link for holding operated said automatic switch and said switch train over said control conductor.

29. In a telephone system, an operator position, a plurality of links at said position, means for preselecting one of said links, a trunk circuit having access to said links via a non-numerical switch, means for extending a call to said trunk circuit, means in said trunk circuit operated in response to said extension of a call thereto for marking said trunk circuit as calling, means controlled jointly responsive to preselection of said link and responsive to marking of said trunk circuit as calling for controlling said non-numerical switch to further extend said call via said preselected link to said operator position, an automatic switch, a pair of line conductors and a control conductor and an extra control conductor interconnecting said preselected link and said automatic switch, a switch train accessible to said automatic switch operative to still further extend said call from said operator position to a called destination, a register sender at said position, means for associating said register sender with said preselected link, means at said position for controlling said register sender to transmit series of impulses corresponding to digits indicative of a particular called destination via said extra control conductor, means in said automatic switch selectively controlled in accordance with said impulses of one of said digits transmitted over said extra control conductor for operating said automatic switch to select said switch train and means in said switch train selectively controlled in accordance with said impulses of the remaining digits transmitted over said extra control conductor for operating said switch train to extend said call from said operator position to said particular called destination over said line conductors, means in said preselected link for holding operated said automatic switch and said switch train over said control conductor, a supervisory circuit in said link, means for disconnecting said register sender from said preselected link and for connecting said extra control conductor to said supervisory circuit in response to the transmission of the series of impulses corresponding to the last digit of said called destination, and means responsive to the transmission of a supervisory control from said called destination for returning a supervisory signal to said supervisory circuit via said extra control conductor.

30. In a telephone system, an operator position, a link at said position, an automatic switch, a pair of line conductors and a control conductor and an extra control conductor interconnecting said link and said automatic switch, automatic switching apparatus accessible to said automatic switch for extending calls from said link to called destinations, a register sender associated with said position, means for registering digits designating a particular called destination in said register sender, means for associating said register sender with said automatic switch over certain of said conductors by way of said link, means responsive to said association for simultaneously preparing said automatic switch to respond to impulses of a digit transmitted by said register sender and for controlling said register sender to start transmission of impulses corresponding to said registered digits over a circuit including said extra control conductor, and means in said automatic switch controlled in accordance with the impulses of the first registered digit transmitted thereto over said extra control conductor for selecting said automatic switching apparatus and for extending said extra control conductor thereto, whereby impulses of subsequent digits registered in said register sender are transmitted to said automatic switching apparatus over said extra control conductor to complete said connection from said link to said particular called destination over said line conductors.

31. In a telephone system, an operator position, a link at said position, an automatic switch, a pair of line conductors and a control conductor and an extra control conductor interconnecting said link and said automatic switch, a register sender at said position, means for automatically associating said register sender with said link, means for registering a digit in said register sender, means in said automatic switch controlled over said extra control conductor from said register sender in response to said association of said register sender with said link for preparing said switch to respond to impulses of said registered digit transmitted from said register sender, and means in said register sender controlled over said extra control conductor from said automatic switch for initiating operation of said register sender to transmit impulses corresponding to said registered digit over said extra control conductor to said automatic switch.

32. In a telephone system, a register sender, means for registering one or more digits indicative of a particular called destination in said register sender, an automatic switch train including a first automatic switch having a pair of line conductors and a pulsing conductor, means for associating said register sender with said first automatic switch over said conductors, means in said register sender operated responsive to said association for transmitting successive series of impulses corresponding respectively to said registered digits over said pulsing conductor, means in said first automatic switch selectively controlled by impulses of a first digit transmitted over said pulsing conductor for operating said first automatic switch in said automatic switch train and means in said automatic switch train selectively controlled by impulses of other digits transmitted over said pulsing conductor for operating said automatic switch train to complete a connection to said particular called destination, and means for completing a talking circuit over said completed connection including said line conductors.

33. In a telephone system, a register sender, means for registering digits of a called destination in said register sender, an automatic switch train for completing a telephone connection to said called destination, an automatic switch having access to said switch train, means for associating said register sender with said automatic switch, an extra control pulsing conductor in said automatic switch and in said register sender, means controlled in response to said association for interconnecting said extra control pulsing conductors and for operating said register sender to transmit successive series of impulses corresponding respectively to said registered digits over said interconnected extra control pulsing conductors, and means in said first automatic switch controlled in accordance with the series of impulses of a first digit transmitted from said register sender over said extra control pulsing conductors for operating said automatic switch to select said switch train and for extending said extra control pulsing conductors thereto, whereby subsequent series of impulses transmitted from said register sender over said extra control pulsing conductors control said automatic switch train to complete said connection to said called destination.

34. In a telephone system, a register sender, means for registering digits of a called destination in said register sender, an automatic switch having a pair of line conductors and an extra control pulsing conductor, means for associating said register sender with said automatic switch, means responsive to said association for controlling said register sender to transmit successive series of impulses corresponding respectively to said registered digits over said extra control pulsing conductor, means in said switch controlled over said extra control pulsing conductor by the series of impulses of the first of said registered digits for operating said switch, means selected in response to said operation of said switch for extending said connection to said called destination under control of the series of impulses of subsequent registered digits transmitted over said extra control conductor, and means for completing a talking connection to said called destination over said line conductors.

35. In a telephone system, a register sender, means for registering one or more digits in said register sender, an automatic switch having access to a group of trunks, a pulse relay in said switch having a high resistance and a low resistance winding, a pulsing conductor normally connected in a circuit including said pulse relay low resistance winding, means for associating said register sender with said automatic switch and for transmitting a series of impulses corresponding to a registered digit over said pulsing conductor to said low resistance winding of said pulse relay, means controlled by said pulse relay for operating said switch in accordance with said impulse series to select said group of trunks and to automatically search for and seize an idle trunk in said group, means in said switch operated responsive to seizure of an idle trunk for disconnecting said pulsing conductor from said pulse relay low resistance winding and for connecting said pulsing conductor to said seized trunk, whereby subsequent series of impulses corresponding to other registered digits are transmitted over said pulsing conductor by said register sender to said seized trunk, means in said switch selectively operated in the event an idle trunk is not found in said selected group of trunks for connecting said high resistance winding and said low resistance winding of said pulse relay in series to said pulsing conductor, and means in said register sender controlled over said pulsing conductor in response to connection thereto of said high and low resistance windings in series for preventing said register sender from transmitting subsequent series of impulses over said pulsing conductor.

36. In a telephone system, a first operator position, a first trunk circuit including a first non-numerical switch, a plurality of links at said first position accessible to said first non-numerical switch, means at said first position for preselecting one of said links at said first position for use, means for extending a telephone call to said first trunk circuit, means controlled jointly by said preselection of said one link at said first position and by said extension of said call to said first trunk circuit for operating said first non-numerical switch to find said preselected link at said first operator position and for connecting said call on said first trunk circuit via said first non-numerical switch and said preselected link to said first operator position, a second operator position, a second trunk circuit including a second non-numerical switch, a plurality of links at said second position accessible to said second non-numerical switch, means at said second position for preselecting one of said links at said second position for use, means in said first trunk circuit selectively controlled from said first operator position for interconnecting said first trunk circuit and said second trunk circuit and for disconnecting said first trunk circuit from said preselected link at said first operator position, and means controlled jointly by the preselection of said one link at said second position and by said interconnection of said first and second trunk circuits for operating said second non-numerical switch to find said preselected link at said second operator position and for connecting said call on said first trunk circuit via said second trunk and said second non-numerical switch and said preselected link at said second operator position to said second operator position.

37. In a telephone system, an inward operator position, a ring-down trunk circuit including a first non-numerical switch, a plurality of links at said inward position accessible to said first non-numerical switch, means at said inward position for preselecting one of said links thereat for use, means for extending a telephone call to said ring-down trunk circuit, means controlled jointly by the preselection of said one link at said inward position and by said extension of said call to said ring-down trunk circuit for operating said first non-numerical switch to find said preselected link at said inward operator position and for connecting said call on said ring-down trunk circuit via said first non-numerical switch and said preselected link to said inward operator position to be answered, a delay call operator position, a delay call trunk circuit including a second non-numerical switch, a plurality of links at said delay call position accessible to said second non-numerical switch, means at said delay call position for preselecting one of said links thereat for use, means in said ring-down trunk circuit selectively controlled from said inward operator position for transferring said call on said ring-down trunk circuit from said inward operator position to said delay call trunk circuit and for disconnecting said ring-down trunk circuit from said preselected link at said inward operator position, and means controlled jointly by said preselection of said one link at said delay call position and by said transfer of said call on said ring-down trunk circuit to said delay call trunk circuit for operating said second non-numerical switch to find said preselected link at said delay call operator position and for connecting said call on said ring-down trunk circuit via said delay call trunk circuit and said second non-numerical switch and said preselected link at said delay call operator position to said delay call operator position to be answered.

38. In a telephone system, a first and a second operator position, a plurality of links at each of said positions, a first and a second trunk circuit having access respectively to links at said first and said second positions, means at said positions for preselecting one of the links thereat for use, means for extending a telephone call to said first trunk circuit, means operated in response to said extension of said call to said first trunk circuit for connecting said call on said first trunk circuit to said first operator position via said preselected link thereat, means in said first trunk circuit selectively controlled by the operator at said first position for interconnecting said first trunk circuit and said second trunk circuit and for simultaneously disconnecting said first trunk circuit from said preselected link at said first position, thereby to render said first operator position and said preselected link thereat available for another call, and means in said second trunk circuit operated in response to said interconnection of said first trunk circuit and said second trunk circuit for connecting said call on said first trunk circuit to said second operator position via said second trunk circuit and said preselected link at said second position.

39. In a telephone system, a first and a second operator position, a plurality of links at each of said positions, a first group and a second group of trunk circuits, said trunk circuits in said first and second groups having access respectively to said links at said first and said second operator positions, means at said positions for preselecting one of the links thereat for use, means for extending a telephone call to one of said trunk circuits in said first group of trunk circuits, means operated in response to the extension of said call to said one trunk circuit of said first group trunk circuits for establishing a connection between said one first group trunk circuit and first operator position by way of said preselected link thereat to answer said call, means at said first operator position selectively controlled by the operator thereat for transmitting a transfer signal over said connection to said one first group trunk circuit, means in said one first group trunk circuit controlled in response to said transfer signal for interconnecting an idle one of said trunk circuits in said second group and said one first group trunk circuit and for disconnecting said first operator position and said preselected link thereat from said one first group trunk circuit, and means controlled in response to said interconnection of one of said second group trunk circuits and said one first group trunk circuit for establishing a connection between said one first group trunk circuit and said second operator position via said one second group trunk circuit and said second operator position preselected link.

40. In a telephone system, a first and a second operator position, a plurality of links at each of said positions, a first group and a second group of trunk circuits, said trunk circuits in said first and second groups having access respectively to said links at said first and said second operator positions, means at said positions for preselecting one of the links thereat for use, means for extending a telephone call to one of said trunk circuits in said first group of trunk circuits, means operated in response to the extension of said call to said one trunk circuit of said first group trunk circuits for establishing a connection between said one first group trunk circuit and first operator position by way of said preselected link thereat to answer said call, means at said first operator position selectively controlled by the operator thereat for transmitting a transfer signal over said connection to said one first group trunk circuit, a distributor for selecting an idle one of said second group trunk circuits for use, a finder switch individually associated with each of said second group trunk circuits and having access to each of said first group trunk circuits, means in said one first group trunk circuit controlled by said transfer signal for operating said distributor to find and select an idle one of said second group trunk circuits and for disconnecting said first operator position and said preselected link thereat from said one first group trunk circuit, and means in said selected second group trunk circuit operated responsive to selection thereof for controlling said associated finder switch to find and connect with said one first group trunk circuit and for interconnecting said one first group trunk circuit with said second operator position via said one second trunk circuit and associated finder switch and said second position preselected link.

41. In a telephone system, an operator position, a plurality of links associated with said position, a plurality of trunk circuits, each of said trunk circuits including an associated non-numerical switch having access to any one of said links, a distributor having access to said trunk circuits, means at said position for preselecting one of said links to answer a call, switching apparatus operated to extend calls to one or more of said trunk circuits, means jointly controlled responsive to the extension of a call to one or more of said trunk circuits and responsive to preselection of one of said links for controlling said distributor to connect with one of said trunk circuits having a call extended thereto, means controlled in response to said connection of said distributor and said one trunk circuit for controlling said associated non-numerical switch to further extend said call on said one trunk circuit via said preselected link to said operator position to be answered, and means at said position selectively controlled by the operator thereat in the event said distributor fails to connect with any one of said trunk circuits having a call extended thereto for selectively controlling the said non-numerical switches associated with all of said trunk circuits having calls extended thereto in order to further extend at least one of said calls via said preselected link to said operator position to be answered.

42. In a telephone system, an operator position, a plurality of links associated with said position, a plurality of trunk circuits, each of said trunk circuits including an associated non-numerical switch having access to any one of said links, a distributor having access to said trunk circuits, means at said position for preselecting one of said links to answer a call, switching apparatus operated to extend calls to said trunk circuits, means jointly controlled responsive to the extension of a call to one or more of said trunk circuits and responsive to preselection of one of said links for controlling said distributor to connect with one of said trunk circuits having a call extended thereto, means controlled in response to said connection of said distributor and said one trunk circuit for controlling said associated non-numerical switch to further extend said call on said one trunk circuit via said preselected link to said operator position to be answered, and a key at said position selectively controlled by the operator thereat in the event said distributor fails to connect with a trunk circuit having a call extended thereto for selectively controlling the said non-numerical switches associated with all of said calling trunk circuits to search for said preselected link.

43. In a telephone system, an operator position, a plurality of links associated with said position, a plurality of trunk circuits, each of said trunk circuits including an associated non-numerical switch having access to any one of said links, a distributor having access to said trunk circuits, means at said position for preselecting one of said links to answer a call, switching apparatus operated to extend calls to said trunk circuits, means jointly controlled responsive to the extension of a call to one or more of said trunk circuits and responsive to preselection of one of said links for controlling said distributor to connect with one of said trunk circuits having a call extended thereto, means controlled in response to said connection of said distributor and said one trunk circuit for controlling said associated non-numerical switch to further extend said call on said one trunk circuit via said preselected link to said operator position to be answered, a key at said position selectively controlled by the operator thereat in the event said distributor fails to connect with a trunk circuit having a call extended thereto for selectively controlling the said non-numerical switches associated with all of the said trunk circuits having calls extended thereto to search for said preselected link, and means controlled in response to one of said non-numerical switches finding said preselected link for further extending the call on the associated calling trunk circuit via said preselected link to said operator position.

44. In a telephone system, an operator position, a plurality of links associated with said position, a plurality of trunk circuits, each of said trunk circuits including an associated non-numerical switch having access to any one of said links, a distributor having access to said trunk circuits, means at said position for preselecting one of said links to answer a call, switching apparatus operated to extend calls to said trunk circuits, means jointly controlled responsive to the extension of a call to one or more of said trunk circuits and responsive to preselection of one of said links for controlling said distributor to connect with one of said trunk circuits having a call extended thereto, means controlled in response to said connection of said distributor and said one trunk circuit for controlling said associated non-numerical switch to further extend said call on said one trunk circuit via said preselected link to said operator position to be answered, a key at said position selectively controlled by the operator thereat in the event said distributor fails to connect with a trunk circuit having a call extended thereto for selectively controlling the said non-numerical switches associated with all of said trunk circuits having calls extended thereto to search for said preselected link, means controlled in response to one of said non-numerical switches finding said preselected link for extending the call on the associated calling trunk circuit via said preselected link to said operator position, and means for terminating further searching of the remaining non-numerical switches associated with other trunk circuits having calls extended thereto.

References Cited in the file of this patent

UNITED STATES PATENTS

| Number | Name | Date |
|---|---|---|
| 1,914,357 | Brooks | June 20, 1933 |
| 1,990,438 | Moody et al. | Feb. 5, 1935 |
| 2,167,710 | Crocker | Aug. 1, 1939 |
| 2,249,449 | Wicks | July 15, 1941 |
| 2,249,475 | Kessler | July 15, 1941 |
| 2,298,751 | Crocker | Oct. 13, 1942 |
| 2,340,554 | Peterson | Feb. 1, 1944 |
| 2,359,626 | Crocker | Oct. 3, 1944 |
| 2,360,291 | Wadsworth | Oct. 10, 1944 |
| 2,361,313 | Molnar | Oct. 24, 1944 |
| 2,361,314 | Molnar | Oct. 24, 1944 |
| 2,366,232 | Bakker | Jan. 2, 1945 |
| 2,467,457 | Balzer | Apr. 19, 1949 |
| 2,530,103 | Voss | Nov. 14, 1950 |